United States Patent
Nishi et al.

(10) Patent No.: US 12,354,316 B2
(45) Date of Patent: Jul. 8, 2025

(54) THREE-DIMENSIONAL DATA ENCODING METHOD, THREE-DIMENSIONAL DATA DECODING METHOD, THREE-DIMENSIONAL DATA ENCODING DEVICE, AND THREE-DIMENSIONAL DATA DECODING DEVICE

(71) Applicant: Panasonic Intellectual Property Corporation of America, Torrance, CA (US)

(72) Inventors: Takahiro Nishi, Nara (JP); Toshiyasu Sugio, Osaka (JP); Noritaka Iguchi, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 349 days.

(21) Appl. No.: 18/124,813

(22) Filed: Mar. 22, 2023

(65) Prior Publication Data
US 2023/0281882 A1    Sep. 7, 2023

Related U.S. Application Data

(63) Continuation of application No. PCT/JP2021/036511, filed on Oct. 1, 2021.
(Continued)

(51) Int. Cl.
*G06T 9/40* (2006.01)
*H04N 19/96* (2014.01)

(52) U.S. Cl.
CPC .............. *G06T 9/40* (2013.01); *H04N 19/96* (2014.11)

(58) Field of Classification Search
None
See application file for complete search history.

(56) References Cited

U.S. PATENT DOCUMENTS

| | | | |
|---|---|---|---|
| 6,573,890 B1 * | 6/2003 | Lengyel | G06T 17/20 345/418 |
| 2011/0285708 A1 * | 11/2011 | Chen | G06T 9/004 345/420 |

(Continued)

FOREIGN PATENT DOCUMENTS

| | | |
|---|---|---|
| WO | 2014/020663 | 2/2014 |
| WO | 2020/075861 | 4/2020 |

OTHER PUBLICATIONS

International Search Report issued Nov. 22, 2021 in International (PCT) Application No. PCT/JP2021/036511.

*Primary Examiner* — Miya J Cato
(74) *Attorney, Agent, or Firm* — Wenderoth, Lind & Ponack, L.L.P.

(57) ABSTRACT

A three-dimensional data encoding method of encoding geometry information of a first three-dimensional point cloud located in a first area includes: selecting a moving method from among moving methods; determining a second area based on the moving method selected and the first area; moving a second three-dimensional point cloud located in the second area determined, to the first area, using a method in accordance with the moving method; encoding the geometry information of the first three-dimensional point cloud, based on encoded geometry information of the second three-dimensional point cloud moved to the first area; and generating a bitstream including the geometry information of the first three-dimensional point cloud encoded and moving information indicating the moving method. The moving methods include a method for rotating the second three-dimensional point cloud about a vertical axis of a mobile body that includes a sensor configured to generate the first three-dimensional point cloud.

16 Claims, 76 Drawing Sheets

Related U.S. Application Data

(60) Provisional application No. 63/087,574, filed on Oct. 5, 2020.

(56) References Cited

U.S. PATENT DOCUMENTS

| | | | |
|---|---|---|---|
| 2014/0375638 A1 | 12/2014 | Tomaru et al. | |
| 2019/0080483 A1* | 3/2019 | Mammou | G06T 3/4007 |
| 2021/0233284 A1 | 7/2021 | Sugio et al. | |
| 2021/0272323 A1* | 9/2021 | Ricard | H04N 19/597 |
| 2022/0007037 A1* | 1/2022 | Cai | H04N 19/20 |
| 2022/0343547 A1* | 10/2022 | Moguillansky | H04N 19/597 |

* cited by examiner

| | GEOMETRY INFORMATION | ATTRIBUTE INFORMATION |
|---|---|---|
| n = 1 | $G(1) = (x_1, y_1, z_1)$ | $A(1) = (R_1, G_1, B_1)$ |
| n = 2 | $G(2) = (x_2, y_2, z_2)$ | $A(2) = (R_2, G_2, B_2)$ |
| ⋮ | ⋮ | ⋮ |
| n = N | $G(N) = (x_N, y_N, z_N)$ | $A(N) = (R_N, G_N, B_N)$ |

FIG. 27

```
EXAMPLES OF SEMANTICS OF pcc_nal_unit_type
(1) if pcc_codec_type == Codec 1
      0:Codec1 Goemetry
      1:Codec1 AttributeX
      2:Codec1 AttributeY
      3:Codec1 Geom. PS
      4:Codec1 AttrX. PS
      5:Codec1 AttrY. PS
      6:Codec1 Geometry Sequence PS
      7:Codec1 AttributeX Sequence PS
      8:Codec1 AttributeY Sequence PS
      9:Codec1 AU Header
     10:Codec1 GOF Header
    11 ~:Codec1 reserved for future use (2) if pcc_codec_type == Codec 2
      0:Codec2 DataA
      1:Codec2 MetaDataA
      2:Codec2 MetaDataB
     3 ~:Codec2 reserved for future use
```

PREDICTION TREE

| PREDICTION MODE | PREDICTED VALUE |
|---|---|
| 0 | 0 (WITHOUT PREDICTION) |
| 1 | p0 |
| 2 | LINEAR PREDICTION BASED ON p0 AND p1 |
| 3 | PARALLELOGRAM PREDICTION BASED ON p0, p1 AND p2 |
| 4 | p1 |

FIG. 34

| PREDICTION MODE | PREDICTED VALUE |
|---|---|
| 0 | (0, 0, 0) |
| 1 | (p0x, p0y, p0z) |
| 2 | (2*p0x-p1x, 2*p0y-p1y, 2*p0z-p1z) |
| 3 | (p0x+p1x-p2x, p0y+p1y-p2y, p0z+p1z-p2z) |
| 4 | (p1x, p1y, p1z) |

FIG. 35

| PREDICTION MODE | PREDICTED VALUE |
|---|---|
| 0 | 0 (WITHOUT PREDICTION) |
| 1 | p0 |
| 2 | LINEAR PREDICTION BASED ON p0 AND p1 |
| 3 | not available |
| 4 | p1 |

FIG. 36

```
geometry_header {
...
NumNeighborPoint
...
NumPredMode
...
Thfix
...
QP
...
unique_point_per_leaf
}
```

FIG. 37

```
geometry_data {
...
for (i=0; i<NumOfPoint; i++) {
 child_count
 if (distdiff >= Thfix && NumPredMode > 1)
    pred_mode
 ...
 for (j=0; j<3; j++) {
  residual_value[j]
 }
 ...
}
}
```

FIG. 38

```
geometry_data {
...
 for (i=0; i<NumOfPoint; i++) {
  child_count for (j=0; j<3; j++) {
   if (distdiff >= Thfix && NumPredMode > 1)
      pred_mode[j]
   ...
   residual_value[j]
   }
  ...
 }
}
```

| seq_parameter_set() { | Descriptor |
|---|---|
| ... | |
| sps_inter_prediction_enabled_flag | u(1) |
| if( sps_inter_pred_enabled_flag ){ | |
| sps_max_num_ref_frames_minus1 | ue(v) |
| } | |
| ... | |
| } | |

| geometry_parameter_set() { | Descriptor |
|---|---|
| ... | |
| gps_inter_prediction_enabeled_flag | u(1) |
| if( gps_inter_prediction_enabeled_flag ){ | |
| gps_num_ref_frames_minus1 | u(1) |
| } | |
| ... | |
| } | |

FIG. 54

| geometry_parameter_set( ) { | Descriptor |
|---|---|
| ... | |
|   gps_alt_coordinates_flag | u(1) |
|   if( gps_alt_coordinates_flag ){ | |
|     gps_coordinate_trans_enabled_flag | u(1) |
|   } | |
| ... | |
| } | |

FIG. 55

| geometry_prediction_tree_node( ) { | Descriptor |
|---|---|
| ... | |
|   pred_mode | ae(v) |
| ... | |
|   if( gps_inter_prediction_enabeled_flag ) | |
|     intra_pred_flag | ae(v) |
|   if( !intra_pred_flag ){ | |
|     inter_pred_mode | ae(v) |
|     for( i = 0; i < NumRefPoints; i++ ) | |
|       inter_ref_point_idx[ i ] | ae(v) |
|   } | |
|   for( i = 0; i < 3; i++ ) | |
|     1st_residual_value[ i ] | ae(v) |
|   if( gps_coordinate_trans_enabled_flag ) | |
|     for( i = 0; i < 3; i++ ) | |
|       2nd_residual_value[ i ] | ae(v) |
| ... | |
| } | |

FIG. 66

| motion_info(){ | Descriptor |
|---|---|
| mc_mode | ae(v) |
| ref_frame_idx | ae(v) |
| if(mc_mode > 0){ | |
| for(k = 0; k < 3; k++) | |
| motion_vector[k] | ae(v) |
| if(mc_mode 2≥ | |
| rotation_angle[0] | ae(v) |
| if(mc_mode == 3) | |
| for(k = 1; k < 3; k++) | |
| rotation_angle[k] | ae(v) |
| } | |
| } | |

THREE-DIMENSIONAL DATA ENCODING METHOD, THREE-DIMENSIONAL DATA DECODING METHOD, THREE-DIMENSIONAL DATA ENCODING DEVICE, AND THREE-DIMENSIONAL DATA DECODING DEVICE

CROSS REFERENCE TO RELATED APPLICATIONS

This application is a U.S. continuation application of PCT International Patent Application Number PCT/JP2021/036511 filed on Oct. 1, 2021, claiming the benefit of priority of U.S. Provisional Patent Application No. 63/087,574 filed on Oct. 5, 2020, the entire contents of which are hereby incorporated by reference.

FIELD

The present disclosure relates to a three-dimensional data encoding method, a three-dimensional data decoding method, a three-dimensional data encoding device, and a three-dimensional data decoding device.

BACKGROUND

Devices or services utilizing three-dimensional data are expected to find their widespread use in a wide range of fields, such as computer vision that enables autonomous operations of cars or robots, map information, monitoring, infrastructure inspection, and video distribution, Three-dimensional data is obtained through various means including a distance sensor such as a rangefinder, as well as a stereo camera and a combination of a plurality of monocular cameras.

Methods of representing three-dimensional data include a method known as a point cloud scheme that represents the shape of a three-dimensional structure by a point cloud in a three-dimensional space. In the point cloud scheme, the positions and colors of a point cloud are stored. While point cloud is expected to be a mainstream method of representing three-dimensional data, a massive amount of data of a point cloud necessitates compression of the amount of three-dimensional data by encoding for accumulation and transmission, as in the case of a two-dimensional moving picture (examples include Moving Picture Experts Group-4 Advanced Video Coding (MPEG-4 AVC) and High Efficiency Video Coding (HEVC) standardized by MPEG).

Meanwhile, point cloud compression is partially supported by, for example, an open-source library (Point Cloud Library) for point cloud-related processing.

Furthermore, a technique for searching for and displaying a facility located in the surroundings of the vehicle by using three-dimensional map data is known (see, for example, Patent Literature (PTL) 1).

CITATION LIST

Patent Literature

PTL 1: International Publication WO 2014/020663

SUMMARY

Technical Problem

There has been a demand for improving encoding efficiency in a three-dimensional data encoding process.

The present disclosure provides a three-dimensional data encoding method, a three-dimensional data decoding method, a three-dimensional data encoding device, or a three-dimensional data decoding device that is capable of improving encoding efficiency.

Solution to Problem

A three-dimensional data encoding method according to an aspect of the present disclosure is a three-dimensional data encoding method of encoding geometry information of a first three-dimensional point cloud located in a first area, and includes: selecting a moving method from among a plurality of moving methods; determining a second area based on the moving method selected and the first area; moving a second three-dimensional point cloud located in the second area determined, to the first area, using a method in accordance with the moving method; encoding the geometry information of the first three-dimensional point cloud, based on encoded geometry information of the second three-dimensional point cloud that has been moved to the first area; and generating a bitstream including the geometry information of the first three-dimensional point cloud encoded in the encoding and moving information indicating the moving method selected, wherein the plurality of moving methods include a method for rotating the second three-dimensional point cloud about a vertical axis of a mobile body, the mobile body including a sensor configured to generate the first three-dimensional point cloud.

A three-dimensional data decoding method according to an aspect of the present disclosure is a three-dimensional data decoding method of decoding encoded geometry information of a first three-dimensional point cloud located in a first area, and includes: obtaining a bitstream including the encoded geometry information of the first three-dimensional point cloud and moving information indicating a moving method; selecting the moving method from among a plurality of moving methods, based on the moving information; determining a second area, based on the moving method selected and the first area; moving a second three-dimensional point cloud located in the second area determined, to the first area, using a method that is in accordance with the moving method; and decoding the encoded geometry information of the first three-dimensional point cloud, based on decoded geometry information of the second three-dimensional point cloud that has been moved to the first area, wherein the plurality of moving methods include a method for rotating the second three-dimensional point cloud about a vertical axis of a mobile body, the mobile body including a sensor configured to generate the first three-dimensional point cloud.

Advantageous Effects

The present disclosure can provide a three-dimensional data encoding method, a three-dimensional data decoding method, a three-dimensional data encoding device, or a three-dimensional data decoding device that is capable of improving encoding efficiency.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 27 is a diagram illustrating a semantics example of pcc_nal_unit_type according to Embodiment 2.

FIG. 34 is a diagram illustrating a specific example of the second example of the table that indicates a predicted value calculated in each prediction mode according to Embodiment 3.

FIG. 35 is a diagram illustrating a third example of the table that indicates a predicted value calculated in each prediction mode according to Embodiment 3.

FIG. 36 is a diagram illustrating an example of a syntax of a header of geometry information according to Embodiment 3.

FIG. 37 is a diagram illustrating an example of a syntax of geometry information according to Embodiment 3.

FIG. 38 is a diagram illustrating another example of the syntax of geometry information according to Embodiment 3.

FIG. 54 illustrates an example of a syntax of a GPS according to Embodiment 5.

FIG. 55 illustrates an example of a syntax of each three-dimensional point according to Embodiment 5.

FIG. 66 is a diagram illustrating a syntax example of motion compensation information according to Embodiment 6.

DESCRIPTION OF EMBODIMENTS

Figure 1:
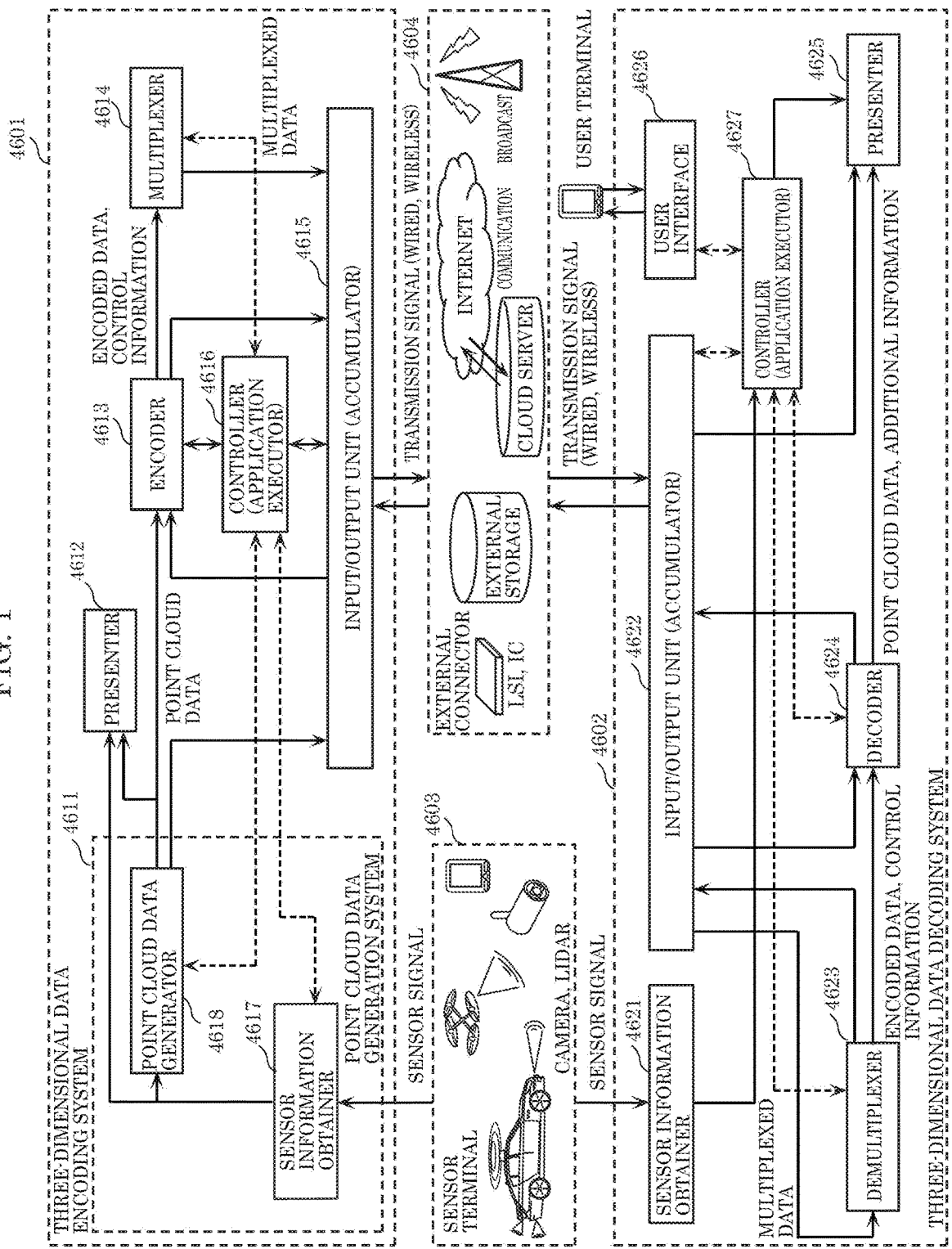
FIG. 1 is a diagram illustrating a configuration of a three-dimensional data encoding and decoding system according to Embodiment 1.

A three-dimensional data encoding method according to an aspect of the present disclosure is a three-dimensional data encoding method of encoding geometry information of a first three-dimensional point cloud located in a first area. The three-dimensional data encoding method includes: selecting a moving method from among a plurality of moving methods; determining a second area based on the moving method selected and the first area; moving a second three-dimensional point cloud located in the second area determined, to the first area, using a method in accordance with the moving method; encoding the geometry information of the first three-dimensional point cloud, based on encoded geometry information of the second three-dimensional point cloud that has been moved to the first area; and generating a bitstream including the geometry information of the first three-dimensional point cloud encoded in the encoding and moving information indicating the moving method selected. The plurality of moving methods include either one or both of a method for translating the second three-dimensional point cloud and a method for rotating the second three-dimensional point cloud.

Accordingly, the three-dimensional point cloud that is moved by a moving method appropriately selected is used to encode the geometry information of the current three-dimensional point cloud to be encoded. As a result, the encoding efficiency can be improved. For example, by encoding the geometry information of the current three-dimensional point cloud using the three-dimensional point cloud that is moved by a moving method appropriately selected, the accuracy of predicting an occurrence probability of current node information to be encoded can be improved. Therefore, an amount of information of a residual signal to be entropy encoded can be reduced, so that the encoding efficiency can be improved.

Furthermore, for example, the plurality of moving methods include a method in which the second three-dimensional point cloud is not moved.

Furthermore, for example, the plurality of moving methods include a method for translating and rotating the second three-dimensional point cloud.

For example, a three-dimensional point cloud based on information obtained by a sensor in motion such as an on-board sensor is often changed in position so that both the translation and the rotation are performed with respect to a change over time. That is, for example, when frames are seen in a time-series order, the position of the three-dimensional point cloud is often moved in such a manner as to be translated (moved by translation) and rotated. For this reason, a method including the translation and the rotation as the moving method can facilitate selection of an appropriate three-dimensional point cloud as a three-dimensional point cloud that is to be used when the current three-dimensional point cloud is encoded.

Furthermore, for example, in the method for translating and rotating the second three-dimensional point cloud, the rotating is subsequent to the translating.

Furthermore, for example, the method for rotating the second three-dimensional point cloud includes, for at least one axis among three axes in a three-dimensional Cartesian coordinate system, rotating the second three-dimensional point cloud about an axis parallel to the at least one axis.

Furthermore, for example, the at least one axis includes an axis corresponding to a vertical direction in an actual space.

For example, a three-dimensional point cloud based on information obtained by a sensor in motion such as an on-board sensor is highly likely to rotate about an axis parallel to a vertical direction of an actual space with respect to a change over time. At the same time, such a three-dimensional point cloud is less likely to rotate about an axis parallel to a horizontal direction of the actual space with respect to the change over time. For this reason, a method including the rotation about the axis corresponding to the vertical direction of the actual space as the moving method can facilitate selection of an appropriate three-dimensional point cloud as a three-dimensional point cloud that is to be used when geometry information of the current three-dimensional point cloud is encoded.

Furthermore, for example, the at least one axis is a single axis.

As described above, for example, a three-dimensional point cloud based on information obtained by a sensor in motion such as an on-board sensor is less likely to rotate about an axis parallel to the horizontal direction of the actual space with respect to the change over time. Therefore, limiting a method of the rotation to the method including rotation about the axis parallel to the vertical direction of the actual space can facilitate selection of an appropriate three-dimensional point cloud as a three-dimensional point cloud that is to be used when geometry information of the current three-dimensional point cloud is encoded, while preventing the number of a plurality of moving methods from unnecessarily increasing.

Furthermore, a three-dimensional data decoding method according to an aspect of the present disclosure is a three-dimensional data decoding method of decoding encoded geometry information of a first three-dimensional point cloud located in a first area. The three-dimensional data decoding method includes: obtaining a bitstream including the encoded geometry information of the first three-dimensional point cloud and moving information indicating a moving method; selecting the moving method from among a plurality of moving methods, based on the moving information; determining a second area, based on the moving method selected and the first area; moving a second three-dimensional point cloud located in the second area determined, to the first area, using a method that is in accordance with the moving method; and decoding the encoded geometry information of the first three-dimensional point cloud, based on decoded geometry information of the second three-dimensional point cloud that has been moved to the first area. The plurality of moving methods include either one or both of a method for translating the second three-dimensional point cloud and a method for rotating the second three-dimensional point cloud.

Accordingly, the three-dimensional point cloud that is moved by a moving method appropriately selected is used to decode the encoded geometry information of the current three-dimensional point cloud to be decoded. As a result, decoding efficiency can be improved.

Furthermore, for example, the plurality of moving methods include a method in which the second three-dimensional point cloud is not moved.

Furthermore, for example, the plurality of moving methods include a method for translating and rotating the second three-dimensional point cloud.

For example, a three-dimensional point cloud based on information obtained by a sensor in motion such as an on-board sensor is often changed in position so that both the translation and the rotation are performed with respect to a change over time. That is, for example, when frames are seen in a time-series order, the position of the three-dimensional point cloud is often moved in such a manner as to be moved by translation and rotated. For this reason, a method including the translation and the rotation as the moving method can facilitate selection of an appropriate three-dimensional point cloud as a three-dimensional point cloud that is to be used when the encoded current three-dimensional point cloud to be decoded is decoded.

Furthermore, for example, in the method for translating and rotating the second three-dimensional point cloud, the rotating is subsequent to the translating.

Furthermore, for example, the method for rotating the second three-dimensional point cloud includes, for at least one axis among three axes in a three-dimensional Cartesian coordinate system, rotating the second three-dimensional point cloud about an axis parallel to the at least one axis.

Furthermore, for example, the at least one axis includes an axis corresponding to a vertical direction in an actual space.

For example, a three-dimensional point cloud based on information obtained by a sensor in motion such as an on-board sensor is highly likely to rotate about an axis parallel to a vertical direction of an actual space with respect to a change over time. At the same time, such a three-dimensional point cloud is less likely to rotate about an axis parallel to a horizontal direction of the actual space with respect to the change over time. For this reason, a method including the rotation about the axis corresponding to the vertical direction of the actual space as the moving method can facilitate selection of an appropriate three-dimensional point cloud as a three-dimensional point cloud that is to be used when the encoded geometry information of the current three-dimensional point cloud is decoded.

Furthermore, for example, the at least one axis is a single axis.

As described above, for example, a three-dimensional point cloud based on information obtained by a sensor in motion such as an on-board sensor is less likely to rotate about an axis parallel to the horizontal direction of the actual space with respect to the change over time. For this reason, limiting a method of the rotation to the method including rotation about the axis parallel to the vertical direction of the actual space can facilitate selection of an appropriate three-dimensional point cloud as a three-dimensional point cloud that is to be used when the encoded geometry information of the current three-dimensional point cloud is decoded, while preventing the number of a plurality of moving methods from unnecessarily increasing.

Furthermore, a three-dimensional data encoding device according to an aspect of the present disclosure encodes geometry information of a first three-dimensional point cloud located in a first area. The three-dimensional data encoding device includes a processor and memory. Using the memory, the processor: selects a moving method from among a plurality of moving methods; determines a second area based on the moving method selected and the first area; moves a second three-dimensional point cloud located in the second area determined to the first area using a method that is in accordance with the moving method; encodes the geometry information of the first three-dimensional point cloud, based on encoded geometry information of the second three-dimensional point cloud that has been moved to the first area; and generates a bitstream including the geometry information of the first three-dimensional point cloud which has been encoded and moving information indicating the moving method selected. The plurality of moving methods include either one or both of a method for translating the second three-dimensional point cloud or a method for rotating the second three-dimensional point cloud.

Accordingly, the three-dimensional point cloud that is moved by a moving method appropriately selected is used to encode the geometry information of the current three-dimensional point cloud to be encoded. As a result, the encoding efficiency can be improved. For example, by encoding the geometry information of the current three-dimensional point cloud using the three-dimensional point cloud that is moved by a moving method appropriately selected, the accuracy of predicting an occurrence probability of current node information to be encoded can be improved, Therefore, an amount of information of a residual signal to be entropy encoded can be reduced, so that the encoding efficiency can be improved.

Furthermore, a three-dimensional data decoding device according to an aspect of the present disclosure decodes encoded geometry information of a first three-dimensional point cloud located in a first area. The three-dimensional data decoding device includes a processor and memory. Using the memory, the processor: obtains a bitstream including the encoded geometry information of the first three-dimensional point cloud and moving information indicating a moving method; selects the moving method from among a plurality of moving methods, based on the moving information; determines a second area, based on the moving method selected and the first area; moves a second three-dimensional point cloud located in the second area determined to the first area using a method that is in accordance with the moving method; and decodes the encoded geometry information of the first three-dimensional point cloud, based on decoded geometry information of the second three-dimensional point cloud that has been moved to the first area. The plurality of moving methods include either one or both of a method for translating the second three-dimensional point cloud or a method for rotating the second three-dimensional point cloud.

Accordingly, the three-dimensional point cloud that is moved by a moving method appropriately selected is used to decode the encoded geometry information of the current three-dimensional point cloud to be decoded. As a result, decoding efficiency can be improved.

It is to be noted that these general or specific aspects may be implemented as a system, a method, an integrated circuit, a computer program, or a computer-readable recording medium such as a CD-ROM, or may be implemented as any combination of a system, a method, an integrated circuit, a computer program, and a recording medium.

Hereinafter, embodiments will be specifically described with reference to the drawings. It is to be noted that each of the following embodiments indicate a specific example of the present disclosure. The numerical values, shapes, materials, constituent elements, the arrangement and connection of the constituent elements, steps, the processing order of the steps, etc., indicated in the following embodiments are mere examples, and thus are not intended to limit the present disclosure, Among the constituent elements described in the following embodiments, constituent elements not recited in any one of the independent claims which indicate the broadest concepts will be described as optional constituent elements.

Embodiment 1

When using encoded data of a point cloud in a device or for a service in practice, required information for the application is desirably transmitted and received in order to reduce the network bandwidth. However, conventional encoding structures for three-dimensional data have no such a function, and there is also no encoding method for such a function.

Embodiment 1 described below relates to a three-dimensional data encoding method and a three-dimensional data encoding device for encoded data of a three-dimensional point cloud that provides a function of transmitting and receiving required information for an application, a three-dimensional data decoding method and a three-dimensional data decoding device for decoding the encoded data, a three-dimensional data multiplexing method for multiplexing the encoded data, and a three-dimensional data transmission method for transmitting the encoded data.

In particular, at present, a first encoding method and a second encoding method are under investigation as encoding methods (encoding schemes) for point cloud data. However, there is no method defined for storing the configuration of encoded data and the encoded data in a system format. Thus, there is a problem that an encoder cannot perform an MUX process (multiplexing), transmission, or accumulation of data.

In addition, there is no method for supporting a format that involves two codecs, the first encoding method and the second encoding method, such as point cloud compression (PCC).

With regard to this embodiment, a configuration of PCC-encoded data that involves two codecs, a first encoding method and a second encoding method, and a method of storing the encoded data in a system format will be described.

A configuration of a three-dimensional data (point cloud data) encoding and decoding system according to this embodiment will be first described. FIG. 1 is a diagram showing an example of a configuration of the three-dimensional data encoding and decoding system according to this embodiment. As shown in FIG. 1, the three-dimensional data encoding and decoding system includes three-dimensional data encoding system 4601, three-dimensional data decoding system 4602, sensor terminal 4603, and external connector 4604.

Three-dimensional data encoding system 4601 generates encoded data or multiplexed data by encoding point cloud data, which is three-dimensional data. Three-dimensional data encoding system 4601 may be a three-dimensional data encoding device implemented by a single device or a system implemented by a plurality of devices. The three-dimensional data encoding device may include a part of a plurality of processors included in three-dimensional data encoding system 4601.

Three-dimensional data encoding system 4601 includes point cloud data generation system 4611, presenter 4612, encoder 4613, multiplexer 4614, input/output unit 4615, and controller 4616. Point cloud data generation system 4611 includes sensor information obtainer 4617, and point cloud data generator 4618.

Sensor information obtainer 4617 obtains sensor information from sensor terminal 4603, and outputs the sensor information to point cloud data generator 4618. Point cloud data generator 4618 generates point cloud data from the sensor information, and outputs the point cloud data to encoder 4613.

Presenter 4612 presents the sensor information or point cloud data to a user. For example, presenter 4612 displays information or an image based on the sensor information or point cloud data.

Encoder 4613 encodes (compresses) the point cloud data, and outputs the resulting encoded data, control information (signaling information) obtained in the course of the encoding, and other additional information to multiplexer 4614. The additional information includes the sensor information, for example.

Multiplexer 4614 generates multiplexed data by multiplexing the encoded data, the control information, and the additional information input thereto from encoder 4613. A format of the multiplexed data is a file format for accumulation or a packet format for transmission, for example.

Input/output unit 4615 (a communication unit or interface, for example) outputs the multiplexed data to the outside. Alternatively, the multiplexed data may be accumulated in an accumulator, such as an internal memory. Controller 4616 (or an application executor) controls each processor. That is, controller 4616 controls the encoding, the multiplexing, or other processing.

Note that the sensor information may be input to encoder 4613 or multiplexer 4614. Alternatively, input/output unit 4615 may output the point cloud data or encoded data to the outside as it is.

A transmission signal (multiplexed data) output from three-dimensional data encoding system 4601 is input to three-dimensional data decoding system 4602 via external connector 4604.

Three-dimensional data decoding system 4602 generates point cloud data, which is three-dimensional data, by decoding the encoded data or multiplexed data. Note that three-dimensional data decoding system 4602 may be a three-dimensional data decoding device implemented by a single device or a system implemented by a plurality of devices. The three-dimensional data decoding device may include a part of a plurality of processors included in three-dimensional data decoding system 4602.

Three-dimensional data decoding system 4602 includes sensor information obtainer 4621, input/output unit 4622, demultiplexer 4623, decoder 4624, presenter 4625, user interface 4626, and controller 4627.

Sensor information obtainer 4621 obtains sensor information from sensor terminal 4603.

Input/output unit 4622 obtains the transmission signal, decodes the transmission signal into the multiplexed data (file format or packet), and outputs the multiplexed data to demultiplexer 4623.

Demultiplexer 4623 obtains the encoded data, the control information, and the additional information from the multiplexed data, and outputs the encoded data, the control information, and the additional information to decoder 4624.

Decoder 4624 reconstructs the point cloud data by decoding the encoded data.

Presenter 4625 presents the point cloud data to a user. For example, presenter 4625 displays information or an image based on the point cloud data. User interface 4626 obtains an indication based on a manipulation by the user. Controller 4627 (or an application executor) controls each processor, That is, controller 4627 controls the demultiplexing, the decoding, the presentation, or other processing.

Note that input/output unit 4622 may obtain the point cloud data or encoded data as it is from the outside. Presenter 4625 may obtain additional information, such as sensor information, and present information based on the additional information. Presenter 4625 may perform a presentation based on an indication from a user obtained on user interface 4626.

Sensor terminal 4603 generates sensor information, which is information obtained by a sensor. Sensor terminal 4603 is a terminal provided with a sensor or a camera. For example, sensor terminal 4603 is a mobile body, such as an automobile, a flying object, such as an aircraft, a mobile terminal, or a camera.

Sensor information that can be generated by sensor terminal 4603 includes (1) the distance between sensor terminal 4603 and an object or the reflectance of the object obtained by LiDAR, a millimeter wave radar, or an infrared sensor or (2) the distance between a camera and an object or the reflectance of the object obtained by a plurality of monocular camera images or a stereo-camera image, for example. The sensor information may include the posture, orientation, gyro (angular velocity), position (GPS information or altitude), velocity, or acceleration of the sensor, for example. The sensor information may include air temperature, air pressure, air humidity, or magnetism, for example.

External connector 4604 is implemented by an integrated circuit (LSI or IC), an external accumulator, communication with a cloud server via the Internet, or broadcasting, for example.

Figures 2, 3:
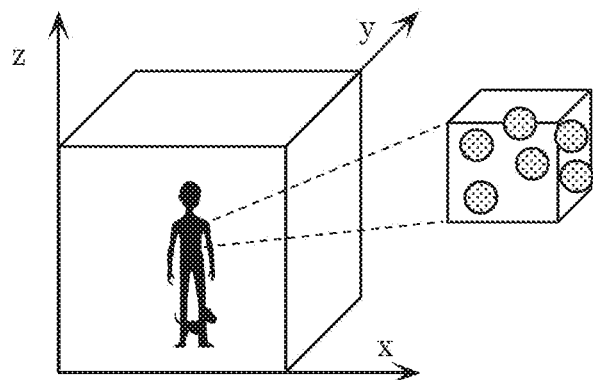
FIG. 2 is a diagram illustrating a structure example of point cloud data according to Embodiment 1.
FIG. 3 is a diagram illustrating a structure example of a data file indicating the point cloud data according to Embodiment 1.

Next, point cloud data will be described. FIG. 2 is a diagram showing a configuration of point cloud data. FIG. 3 is a diagram showing a configuration example of a data file describing information of the point cloud data.

Point cloud data includes data on a plurality of points. Data on each point includes geometry information (three-dimensional coordinates) and attribute information associated with the geometry information. A set of a plurality of such points is referred to as a point cloud. For example, a point cloud indicates a three-dimensional shape of an object.

Geometry information (position), such as three-dimensional coordinates, may be referred to as geometry. Data on each point may include attribute information (attribute) on a plurality of types of attributes. A type of attribute is color or reflectance, for example.

One item of attribute information (in other words, a piece of attribute information or an attribute information item) may be associated with one item of geometry information (in other words, a piece of geometry information or a geometry information item), or attribute information on a plurality of different types of attributes may be associated with one item of geometry information. Alternatively, items of attribute information on the same type of attribute may be associated with one item of geometry information.

The configuration example of a data file shown in FIG. 3 is an example in which geometry information and attribute information are associated with each other in a one-to-one relationship, and geometry information and attribute information on N points forming point cloud data are shown.

The geometry information is information on three axes, specifically, an x-axis, a y-axis, and a z-axis, for example. The attribute information is RGB color information, for example, A representative data file is ply file, for example.

Figure 4:
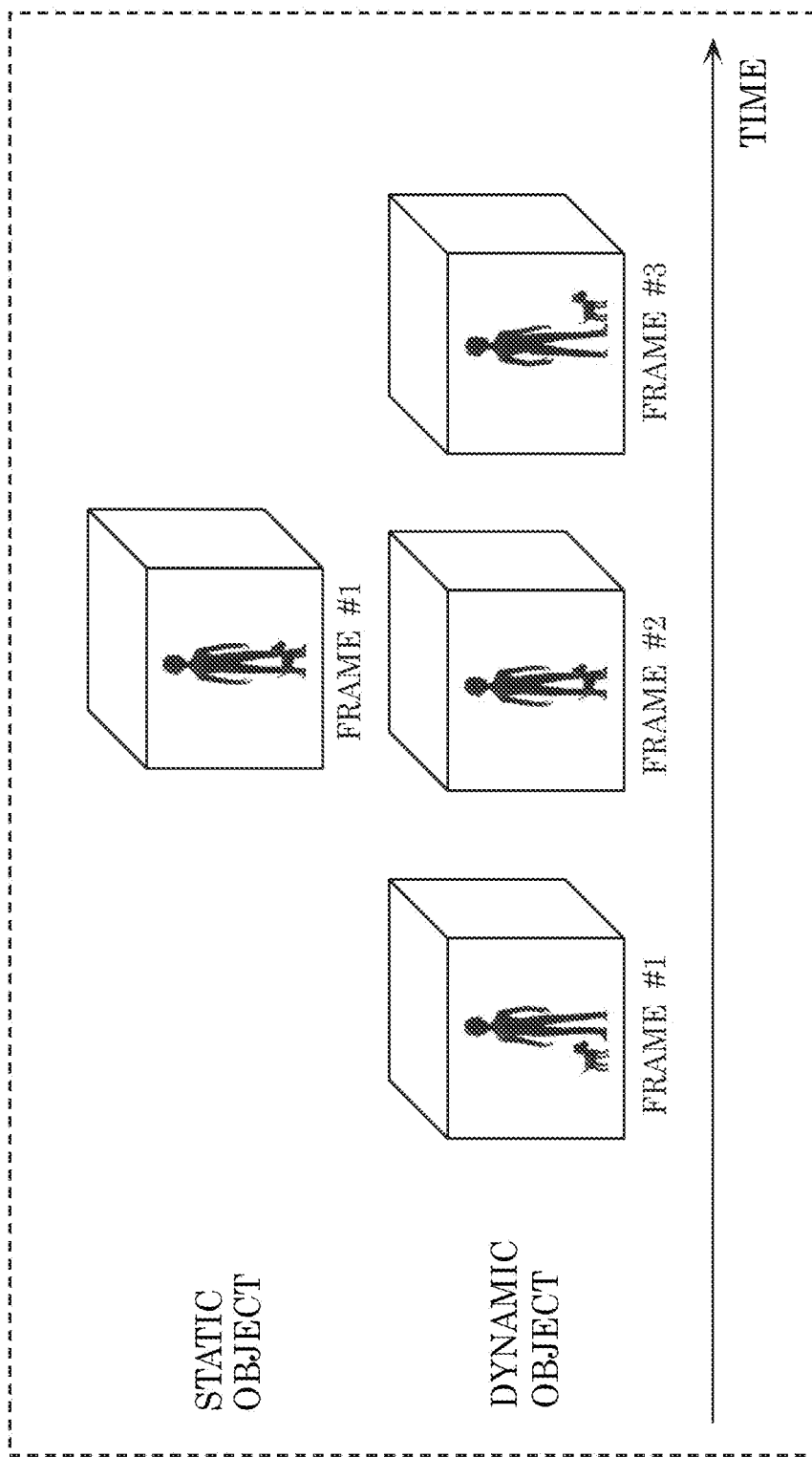
FIG. 4 is a diagram illustrating types of the point cloud data according to Embodiment 1.

Next, types of point cloud data will be described. FIG. 4 is a diagram showing types of point cloud data. As shown in FIG. 4, point cloud data includes a static object and a dynamic object.

The static object is three-dimensional point cloud data at an arbitrary time (a time point). The dynamic object is three-dimensional point cloud data that varies with time. In the following, three-dimensional point cloud data associated with a time point will be referred to as a PCC frame or a frame.

The object may be a point cloud whose range is limited to some extent, such as ordinary video data, or may be a large point cloud whose range is not limited, such as map information.

There are point cloud data having varying densities. There may be sparse point cloud data and dense point cloud data.

In the following, each processor will be described in detail. Sensor information is obtained by various means, including a distance sensor such as LiDAR or a range finder, a stereo camera, or a combination of a plurality of monocular cameras. Point cloud data generator 4618 generates point cloud data based on the sensor information obtained by sensor information obtainer 4617, Point cloud data generator 4618 generates geometry information as point cloud data, and adds attribute information associated with the geometry information to the geometry information.

When generating geometry information or adding attribute information, point cloud data generator 4618 may process the point cloud data. For example, point cloud data generator 4618 may reduce the data amount by omitting a point cloud whose position coincides with the position of another point cloud. Point cloud data generator 4618 may also convert the geometry information (such as shifting, rotating or normalizing the position) or render the attribute information.

Note that, although FIG. 1 shows point cloud data generation system 4611 as being included in three-dimensional data encoding system 4601, point cloud data generation system 4611 may be independently provided outside three-dimensional data encoding system 4601.

Encoder 4613 generates encoded data by encoding point cloud data according to an encoding method previously defined. In general, there are the two types of encoding methods described below. One is an encoding method using geometry information, which will be referred to as a first encoding method, hereinafter. The other is an encoding method using a video codec, which will be referred to as a second encoding method, hereinafter.

Decoder 4624 decodes the encoded data into the point cloud data using the encoding method previously defined.

Multiplexer 4614 generates multiplexed data by multiplexing the encoded data in an existing multiplexing method. The generated multiplexed data is transmitted or accumulated, Multiplexer 4614 multiplexes not only the PCC-encoded data but also another medium, such as a video, an audio, subtitles, an application, or a file, or reference time information. Multiplexer 4614 may further multiplex attribute information associated with sensor information or point cloud data.

Multiplexing schemes or file formats include ISOBMFF, MPEG-DASH, which is a transmission scheme based on ISOBMFF, MMT, MPEG-2 TS Systems, or RMP, for example.

Demultiplexer 4623 extracts PCC-encoded data, other media, time information and the like from the multiplexed data.

Input/output unit 4615 transmits the multiplexed data in a method suitable for the transmission medium or accumulation medium, such as broadcasting or communication. Input/output unit 4615 may communicate with another device over the Internet or communicate with an accumulator, such as a cloud server.

As a communication protocol, http, ftp, TCP, UDP or the like is used. The pull communication scheme or the push communication scheme can be used.

A wired transmission or a wireless transmission can be used. For the wired transmission, Ethernet (registered trademark), USB, RS-232C, HDMI (registered trademark), or a coaxial cable is used, for example. For the wireless transmission, wireless LAN, Wi-Fi (registered trademark), Bluetooth (registered trademark), or a millimeter wave is used, for example.

As a broadcasting scheme, DVB-T2, DVB-S2, DVB-C2, ATSC3.0, or ISDB-S3 is used, for example.

Figure 5:
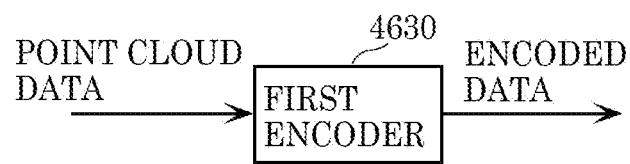
FIG. 5 is a diagram illustrating a structure of a first encoder according to Embodiment 1.
Figure 6:
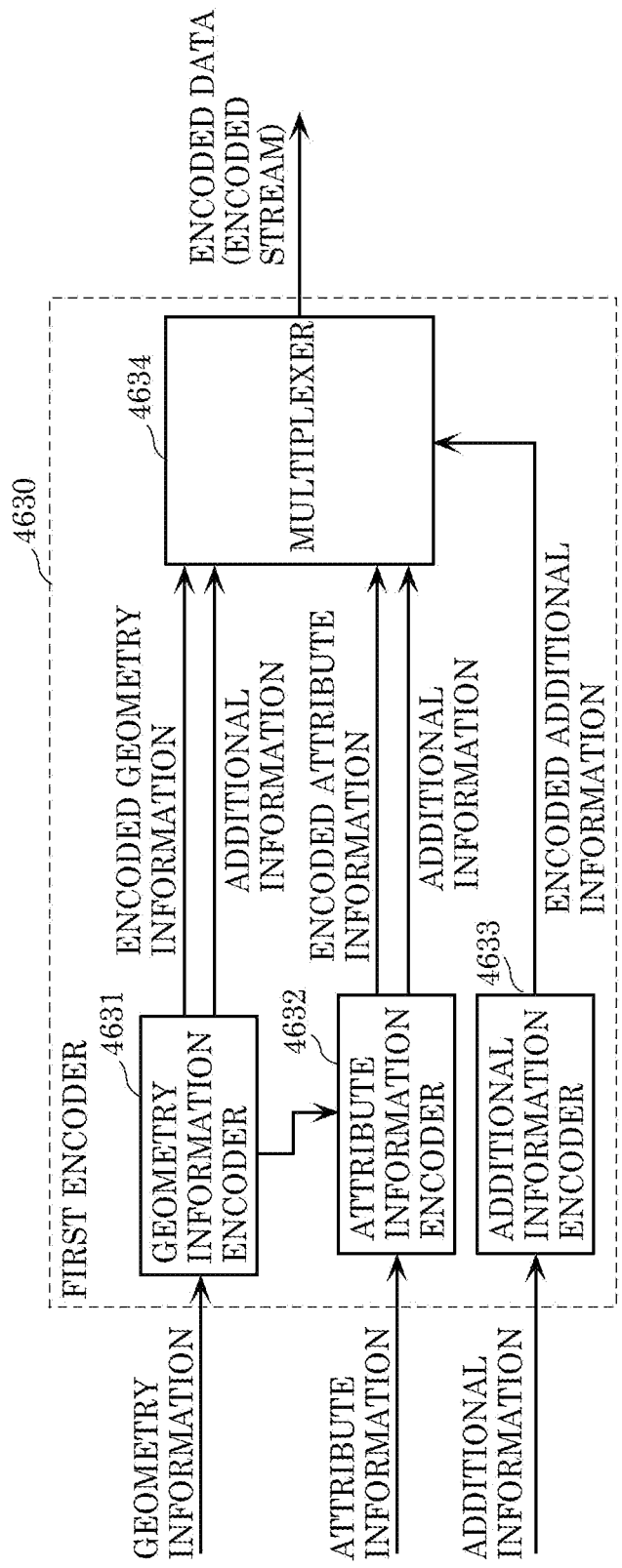
FIG. 6 is a block diagram illustrating the first encoder according to Embodiment 1.

FIG. 5 is a diagram showing a configuration of first encoder 4630, which is an example of encoder 4613 that performs encoding in the first encoding method. FIG. 6 is a block diagram showing first encoder 4630. First encoder 4630 generates encoded data (encoded stream) by encoding point cloud data in the first encoding method. First encoder 4630 includes geometry information encoder 4631, attribute information encoder 4632, additional information encoder 4633, and multiplexer 4634.

First encoder 4630 is characterized by performing encoding by keeping a three-dimensional structure in mind. First encoder 4630 is further characterized in that attribute information encoder 4632 performs encoding using information obtained from geometry information encoder 4631. The first encoding method is referred to also as geometry-based PCC (GPCC).

Point cloud data is PCC point cloud data like a PLY file or PCC point cloud data generated from sensor information, and includes geometry information (position), attribute information (attribute), and other additional information (metadata). The geometry information is input to geometry information encoder 4631, the attribute information is input to attribute information encoder 4632, and the additional information is input to additional information encoder 4633.

Geometry information encoder 4631 generates encoded geometry information (compressed geometry), which is encoded data, by encoding geometry information. For example, geometry information encoder 4631 encodes geometry information using an N-ary tree structure, such as an octree. Specifically, in the case of an octree, a current space (target space) is divided into eight nodes (subspaces), 8-bit information (occupancy code) that indicates whether each node includes a point cloud or not is generated. A node including a point cloud is further divided into eight nodes, and 8-bit information that indicates whether each of the eight nodes includes a point cloud or not is generated. This process is repeated until a predetermined level is reached or the number of the point clouds included in each node becomes equal to or less than a threshold.

Attribute information encoder 4632 generates encoded attribute information (compressed attribute), which is encoded data, by encoding attribute information using configuration information generated by geometry conformation encoder 4631. For example, attribute information encoder 4632 determines a reference point (reference node) that is to be referred to in encoding a current point (in other words, a current node or a target node) to be processed based on the octree structure generated by geometry information encoder 4631. For example, attribute information encoder 4632 refers to a node whose parent node in the octree is the same as the parent node of the current node, of peripheral nodes or neighboring nodes. Note that the method of determining a reference relationship is not limited to this method.

The process of encoding attribute information may include at least one of a quantization process, a prediction process, and an arithmetic encoding process. In this case, "refer to" means using a reference node for calculating a predicted value of attribute information or using a state of a reference node (occupancy information that indicates whether a reference node includes a point cloud or not, for example) for determining a parameter of encoding. For example, the parameter of encoding is a quantization parameter in the quantization process or a context or the like in the arithmetic encoding.

Additional information encoder 4633 generates encoded additional information (compressed metadata), which is encoded data, by encoding compressible data of additional information.

Multiplexer 4634 generates encoded stream (compressed stream), which is encoded data, by multiplexing encoded geometry information, encoded attribute information, encoded additional information, and other additional information. The generated encoded stream is output to a processor in a system layer (not shown).

Figure 7:
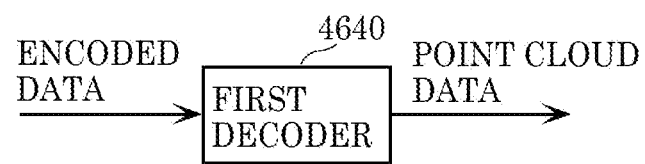
FIG. 7 is a diagram illustrating a structure of a first decoder according to Embodiment 1.
Figure 8:
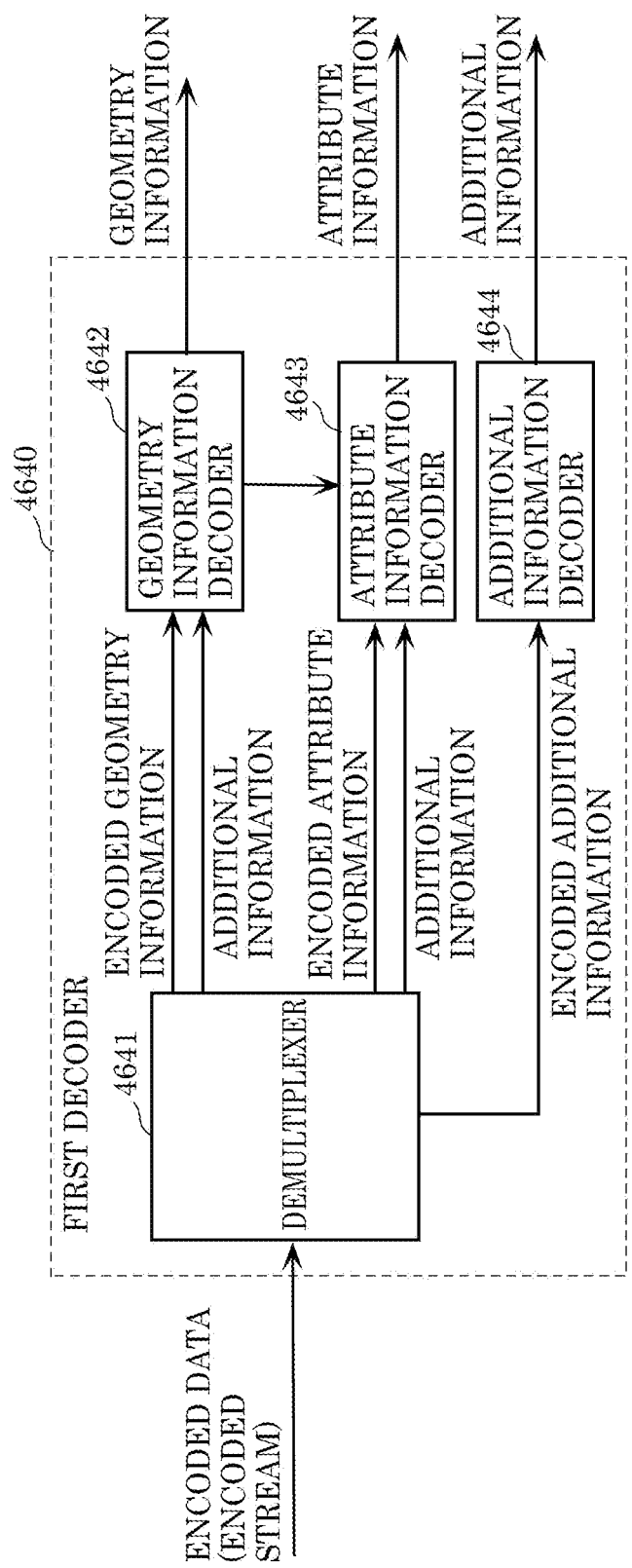
FIG. 8 is a block diagram illustrating the first decoder according to Embodiment 1.

Next, first decoder 4640, which is an example of decoder 4624 that performs decoding in the first encoding method, will be described. FIG. 7 is a diagram showing a configuration of first decoder 4640. FIG. 8 is a block diagram showing first decoder 4640, First decoder 4640 generates point cloud data by decoding encoded data (encoded stream) encoded in the first encoding method in the first encoding method. First decoder 4640 includes demultiplexer 4641, geometry information decoder 4642, attribute information decoder 4643, and additional information decoder 4644.

An encoded stream (compressed stream), which is encoded data, is input to first decoder 4640 from a processor in a system layer (not shown).

Demultiplexer 4641 separates encoded geometry information (compressed geometry), encoded attribute information (compressed attribute), encoded additional information (compressed metadata), and other additional information from the encoded data.

Geometry information decoder 4642 generates geometry information by decoding the encoded geometry information. For example, geometry information decoder 4642 restores the geometry information on a point cloud represented by three-dimensional coordinates from encoded geometry information represented by an N-ary structure, such as an octree.

Attribute information decoder 4643 decodes the encoded attribute information based on configuration information generated by geometry information decoder 4642. For example, attribute information decoder 4643 determines a reference point (reference node) that is to be referred to in decoding a current point (current node) to be processed based on the octree structure generated by geometry information decoder 4642. For example, attribute information decoder 4643 refers to a node whose parent node in the octree is the same as the parent node of the current node, of peripheral nodes or neighboring nodes. Note that the method of determining a reference relationship is not limited to this method.

The process of decoding attribute information may include at least one of an inverse quantization process, a prediction process, and an arithmetic decoding process. In this case, "refer to" means using a reference node for calculating a predicted value of attribute information or using a state of a reference node (occupancy information that indicates whether a reference node includes a point cloud or not, for example) for determining a parameter of decoding. For example, the parameter of decoding is a quantization parameter in the inverse quantization process or a context or the like in the arithmetic decoding.

Additional information decoder 4644 generates additional information by decoding the encoded additional information. First decoder 4640 uses additional information required for the decoding process for the geometry information and the attribute information in the decoding, and outputs additional information required for an application to the outside.

Figure 9:
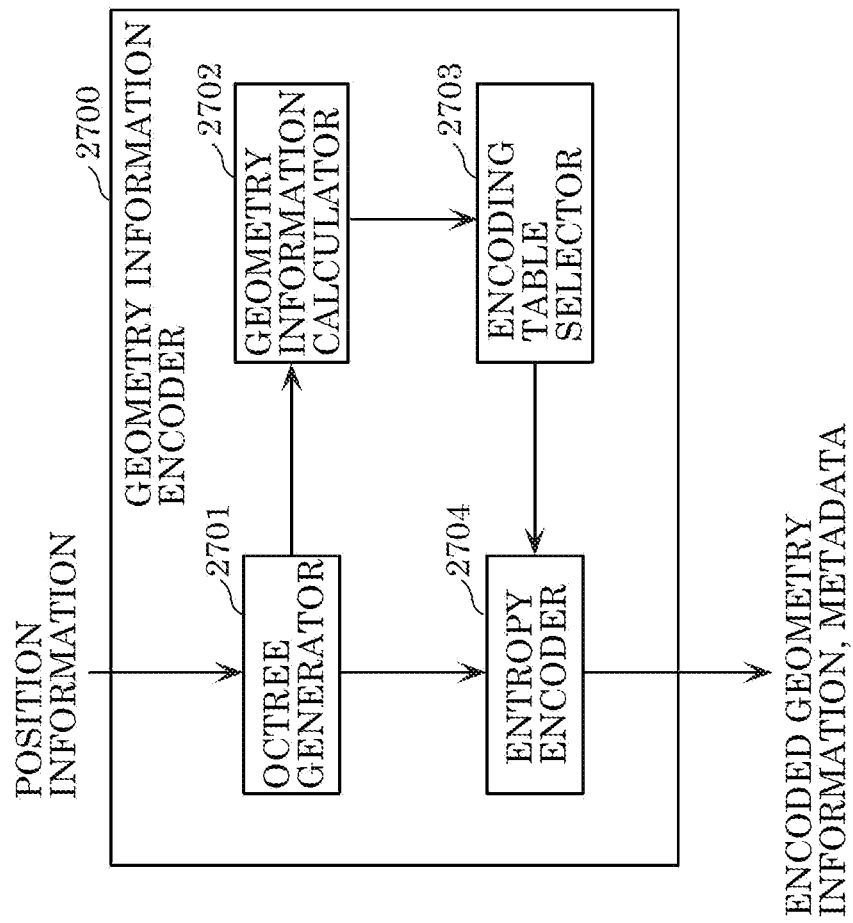
FIG. 9 is a block diagram of a three-dimensional data encoding device according to Embodiment 1.

Next, an example configuration of a geometry information encoder will be described. FIG. 9 is a block diagram of geometry information encoder 2700 according to this embodiment. Geometry information encoder 2700 includes octree generator 2701, geometry information calculator 2702, encoding table selector 2703, and entropy encoder 2704.

Octree generator 2701 generates an octree, for example, from input position information, and generates an occupancy code of each node of the octree. Geometry information calculator 2702 obtains information that indicates whether a neighboring node of a current node (target node) is an occupied node or not. For example, geometry information calculator 2702 calculates occupancy information on a neighboring node from an occupancy code of a parent node to which a current node belongs (information that indicates whether a neighboring node is an occupied node or not). Geometry information calculator 2702 may save an encoded node in a list and search the list for a neighboring node. Note that geometry information calculator 2702 may change neighboring nodes in accordance with the position of the current node in the parent node.

Encoding table selector 2703 selects an encoding table used for entropy encoding of the current node based on the occupancy information on the neighboring node calculated by geometry information calculator 2702. For example, encoding table selector 2703 may generate a bit sequence based on the occupancy information on the neighboring node and select an encoding table of an index number generated from the bit sequence.

Entropy encoder 2704 generates encoded geometry information and metadata by entropy-encoding the occupancy code of the current node using the encoding table of the selected index number. Entropy encoder 2704 may add, to the encoded geometry information, information that indicates the selected encoding table.

In the following, an octree representation and a scan order for geometry information will be described. Geometry information (geometry data) is transformed into an octree structure (octree transform) and then encoded. The octree structure includes nodes and leaves. Each node has eight nodes or leaves, and each leaf has voxel (VXL) information. FIG.

Figure 10:
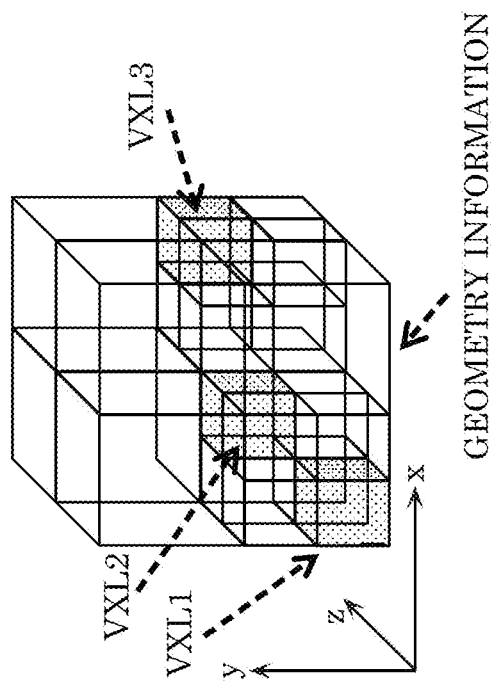
FIG. 10 is a diagram showing an example of geometry information according to Embodiment 1.
Figure 11:
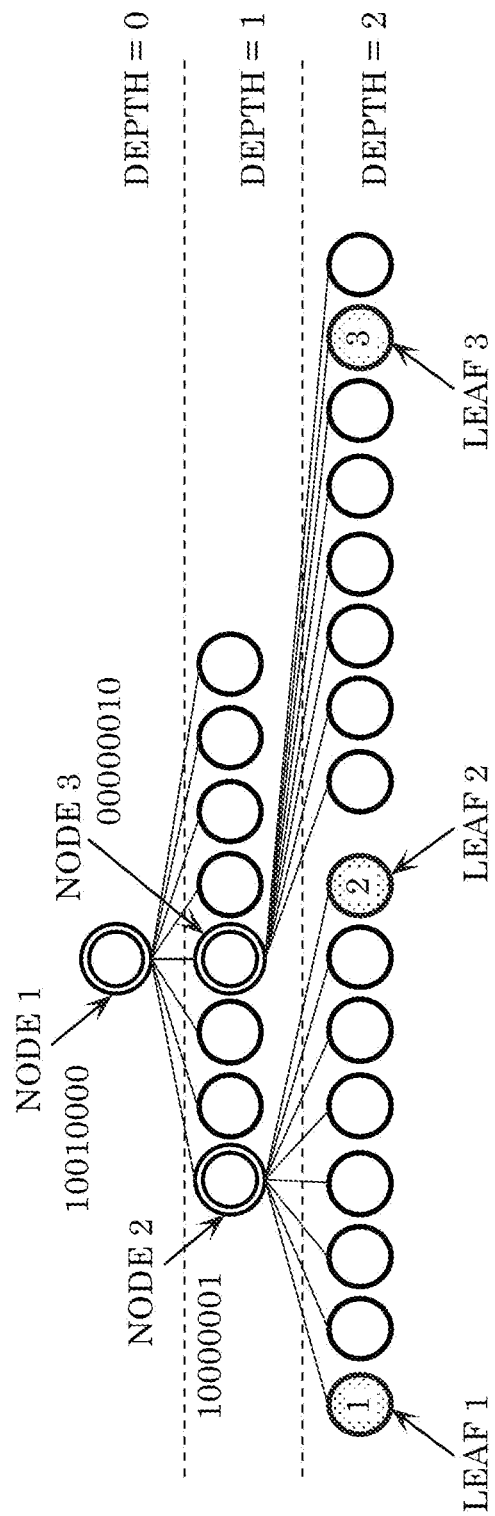
FIG. 11 is a diagram showing an example of an octree representation of geometry information according to Embodiment 1.

10 is a diagram showing an example structure of geometry information including a plurality of voxels, FIG. 11 is a diagram showing an example in which the geometry information shown in FIG. 10 is transformed into an octree structure. Here, of leaves shown in FIG. 11, leaves 1, 2, and 3 represent voxels VXL1, VXL2, and VXL3 shown in FIG. 10, respectively, and each represent VXL containing a point cloud (referred to as a valid VXL, hereinafter).

Specifically, node 1 corresponds to the entire space comprising the geometry information in FIG. 10. The entire space corresponding to node 1 is divided into eight nodes, and among the eight nodes, a node containing valid VXL is further divided into eight nodes or leaves. This process is repeated for every layer of the tree structure. Here, each node corresponds to a subspace, and has information (occupancy code) that indicates where the next node or leaf is located after division as node information. A block in the bottom layer is designated as a leaf and retains the number of the points contained in the leaf as leaf information.

Figure 12:
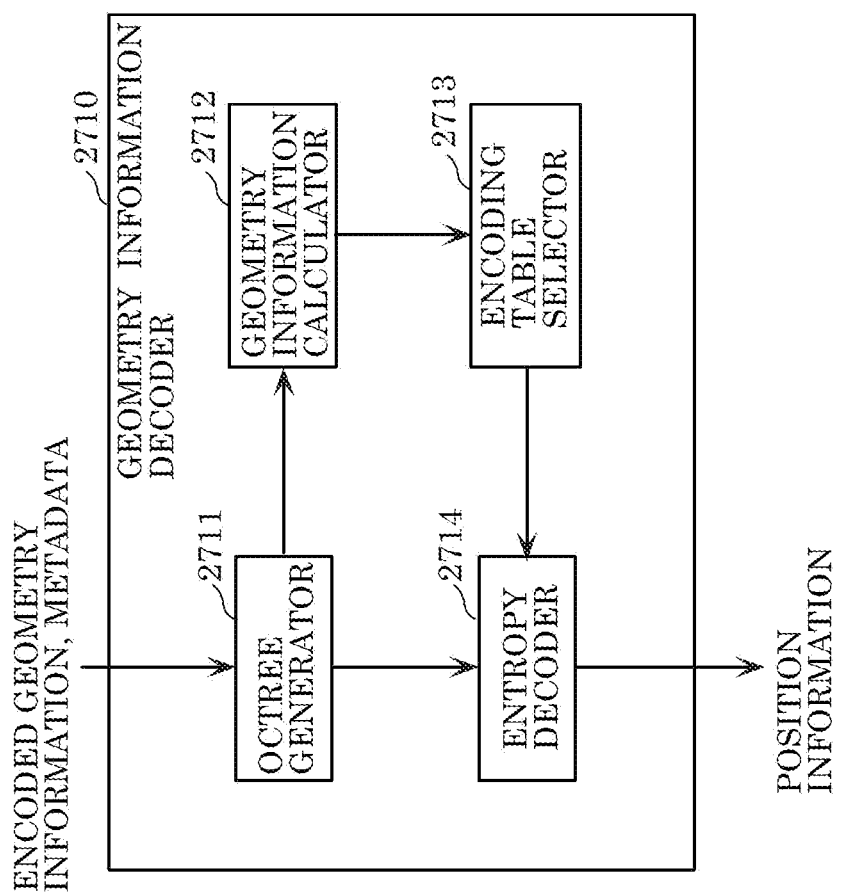
FIG. 12 is a block diagram of a three-dimensional data decoding device according to Embodiment 1.

Next, an example configuration of a geometry information decoder Will be described, FIG. 12 is a block diagram of geometry information decoder 2710 according to this embodiment. Geometry information decoder 2710 includes octree generator 2711, geometry information calculator 2712, encoding table selector 2713, and entropy decoder 2714.

Octree generator 2711 generates an octree of a space (node) based on header information, metadata or the like of a bitstream. For example, octree generator 2711 generates an octree by generating a large space (root node) based on the sizes of a space in an x-axis direction, a y-axis direction, and a z-axis direction added to the header information and dividing the space into two parts in the x-axis direction, the y-axis direction, and the z-axis direction to generate eight small spaces A (nodes A0 to A7). Nodes A0 to A7 are sequentially designated as a current node.

Geometry information calculator 2712 obtains occupancy information that indicates whether a neighboring node of a current node is an occupied node or not. For example, geometry information calculator 2712 calculates occupancy information on a neighboring node from an occupancy code of a parent node to which a current node belongs, Geometry information calculator 2712 may save a decoded node in a list and search the list for a neighboring node. Note that geometry information calculator 2712 may change neighboring nodes in accordance with the position of the current node in the parent node.

Encoding table selector 2713 selects an encoding table (decoding table) used for entropy decoding of the current node based on the occupancy information on the neighboring node calculated by geometry information calculator 2712. For example, encoding table selector 2713 may generate a bit sequence based on the occupancy information on the neighboring node and select an encoding table of an index number generated from the bit sequence.

Entropy decoder 2714 generates position information by entropy-decoding the occupancy code of the current node using the selected encoding table. Note that entropy decoder 2714 may obtain information on the selected encoding table by decoding the bitstream, and entropy-decode the occupancy code of the current node using the encoding table indicated by the information.

Figure 13:
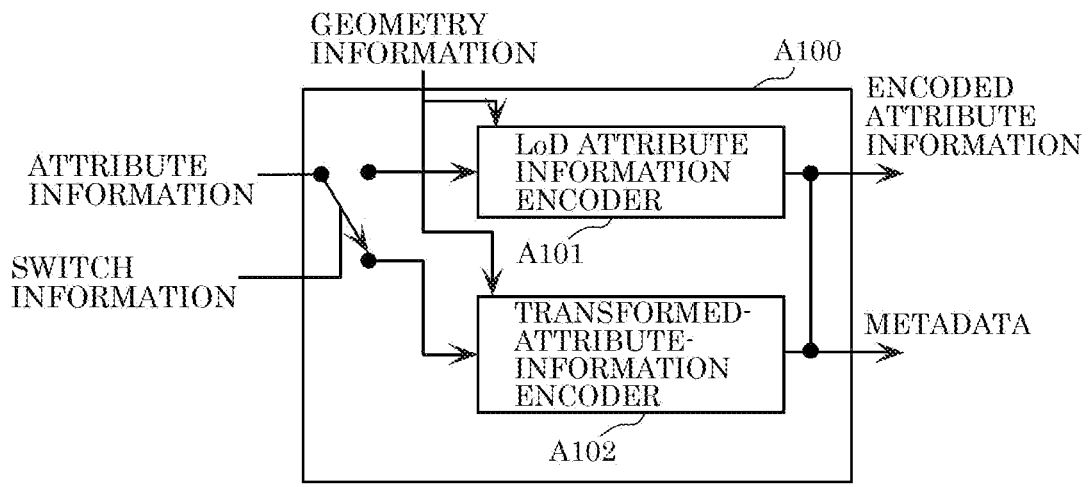
FIG. 13 is a block diagram of an attribute information encoder according to Embodiment 1.

In the following, configurations of an attribute information encoder and an attribute information decoder will be described. FIG. 13 is a block diagram showing an example configuration of attribute information encoder A100, The attribute information encoder may include a plurality of encoders that perform different encoding methods. For example, the attribute information encoder may selectively use any of the two methods described below in accordance with the use case.

Attribute information encoder A100 includes LoD attribute information encoder A101 and transformed-attribute-information encoder A102. LoD attribute information encoder A101 classifies three-dimensional points into a plurality of layers based on geometry information on the three-dimensional points, predicts attribute information on three-dimensional points belonging to each layer, and encodes a prediction residual therefor. Here, each layer into which a three-dimensional point is classified is referred to as a level of detail (LoD).

Transformed-attribute-information encoder A102 encodes attribute information using region adaptive hierarchical transform (RAHT). Specifically, transformed-attribute-information encoder A102 generates a high frequency component and a low frequency component for each layer by applying RAHT or Haar transform to each item of attribute information based on the geometry information on three-dimensional points, and encodes the values by quantization, entropy encoding or the like.

Figure 14:
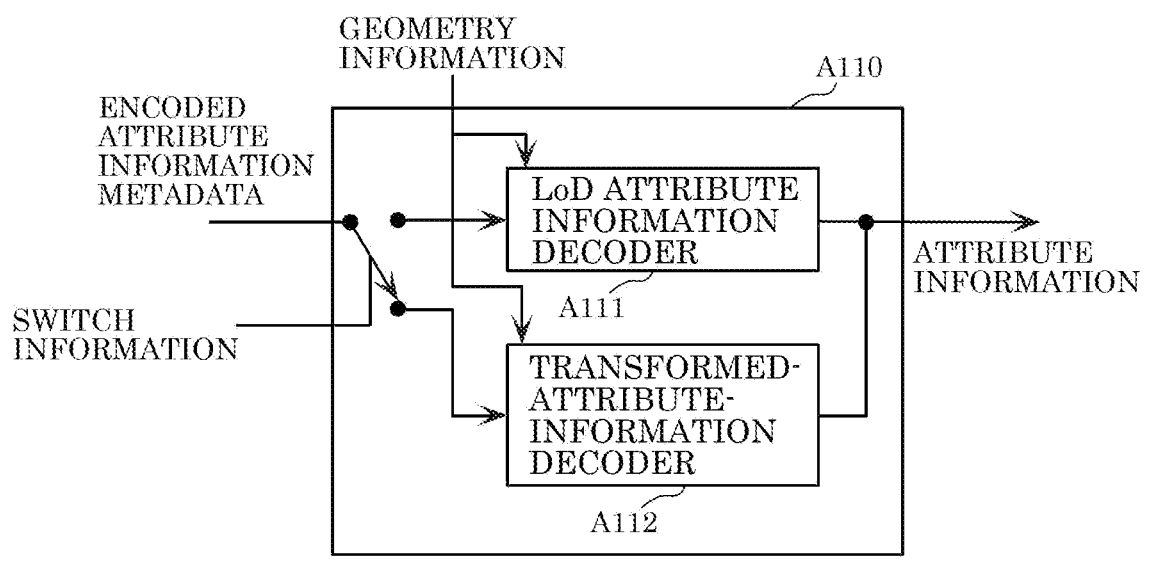
FIG. 14 is a block diagram of an attribute information decoder according to Embodiment 1.

FIG. 14 is a block diagram showing an example configuration of attribute information decoder A110. The attribute information decoder may include a plurality of decoders that perform different decoding methods. For example, the attribute information decoder may selectively use any of the two methods described below for decoding based on the information included in the header or metadata.

Attribute information decoder A110 includes LoD attribute information decoder A111 and transformed-attribute-information decoder A112. LoD attribute information decoder A111 classifies three-dimensional points into a plurality of layers based on the geometry information on the three-dimensional points, predicts attribute information on three-dimensional points belonging to each layer, and decodes attribute values thereof.

Transformed-attribute-information decoder A112 decodes attribute information using region adaptive hierarchical transform (RAHT). Specifically, transformed-attribute-information decoder A112 decodes each attribute value by applying inverse RAHT or inverse Haar transform to the high frequency component and the low frequency component of the attribute value based on the geometry information on the three-dimensional point.

Figure 15:
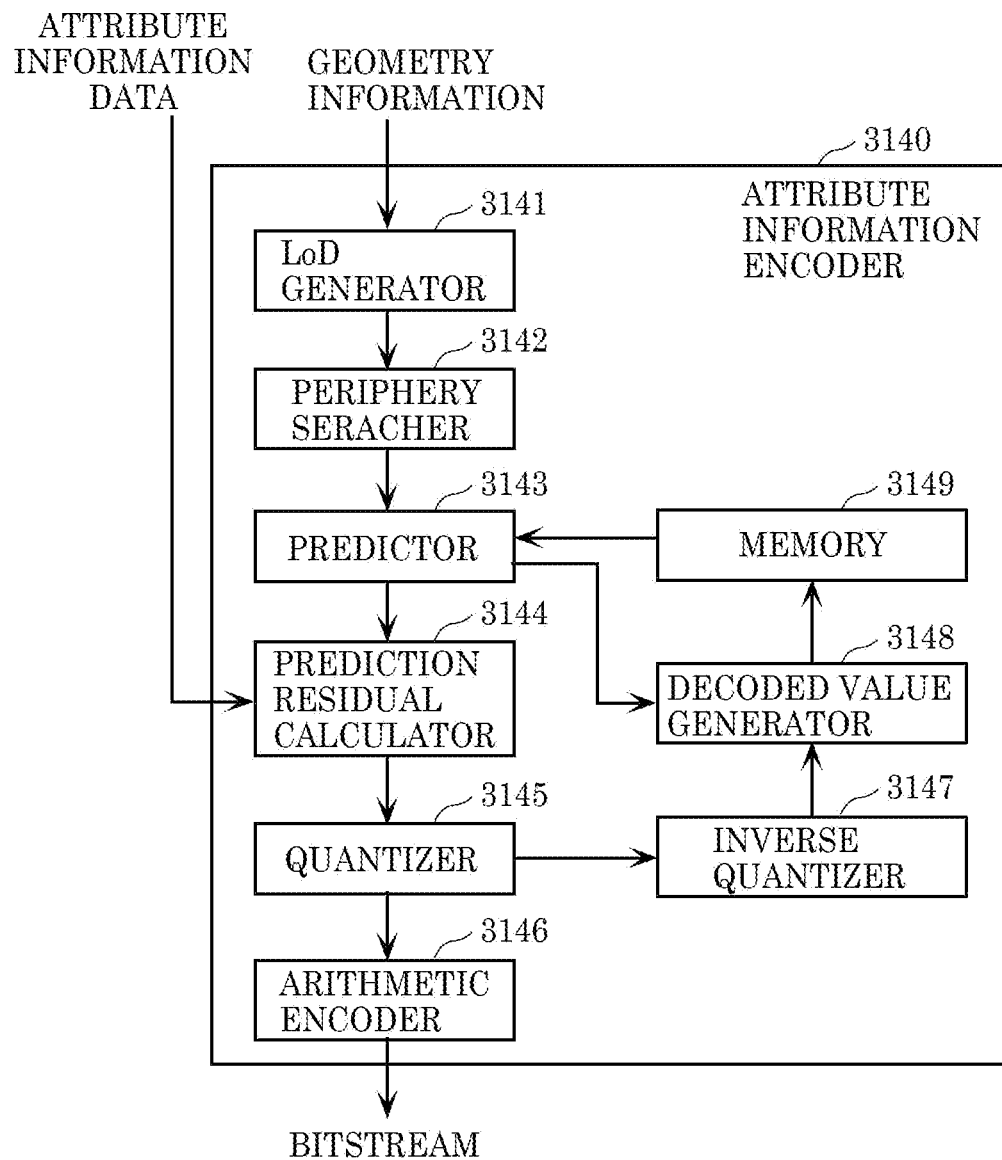
FIG. 15 is a block diagram showing a configuration of the attribute information encoder according to Embodiment 1.

FIG. 15 is a block diagram showing a configuration of attribute information encoder 3140 that is an example of LoD attribute information encoder A101.

Attribute information encoder 3140 includes LoD generator 3141, periphery searcher 3142, predictor 3143, prediction residual calculator 3144, quantizer 3145, arithmetic encoder 3146, inverse quantizer 3147, decoded value generator 3148, and memory 3149.

LoD generator 3141 generates an LoD using geometry information on a three-dimensional point.

Periphery searcher 3142 searches for a neighboring three-dimensional point neighboring each three-dimensional point using a result of LoD generation by LoD generator 3141 and distance information indicating distances between three-dimensional points.

Predictor 3143 generates a predicted value of an item of attribute information on a current (target) three-dimensional point to be encoded.

Prediction residual calculator 3144 calculates (generates) a prediction residual of the predicted value of the item of the attribute information generated by predictor 3143.

Quantizer 3145 quantizes the prediction residual of the item of attribute information calculated by prediction residual calculator 3144.

Arithmetic encoder 3146 arithmetically encodes the prediction residual quantized by quantizer 3145. Arithmetic encoder 3146 outputs a bitstream including the arithmetically encoded prediction residual to the three-dimensional data decoding device, for example.

The prediction residual may be binarized by quantizer 3145 before being arithmetically encoded by arithmetic encoder 3146.

Arithmetic encoder 3146 may initialize the encoding table used for the arithmetic encoding before performing the arithmetic encoding. Arithmetic encoder 3146 may initialize the encoding table used for the arithmetic encoding for each layer. Arithmetic encoder 3146 may output a bitstream including information that indicates the position of the layer at which the encoding table is initialized.

Inverse quantizer 3147 inverse-quantizes the prediction residual quantized by quantizer 3145.

Decoded value generator 3148 generates a decoded value by adding the predicted value of the item of attribute information generated by predictor 3143 and the prediction residual inverse-quantized by inverse quantizer 3147 together.

Memory 3149 is a memory that stores a decoded value of an item of attribute information on each three-dimensional point decoded by decoded value generator 3148, For example, when generating a predicted value of a three-dimensional point yet to be encoded, predictor 3143 may generate the predicted value using a decoded value of an item of attribute information on each three-dimensional point stored in memory 3149.

Figure 16:
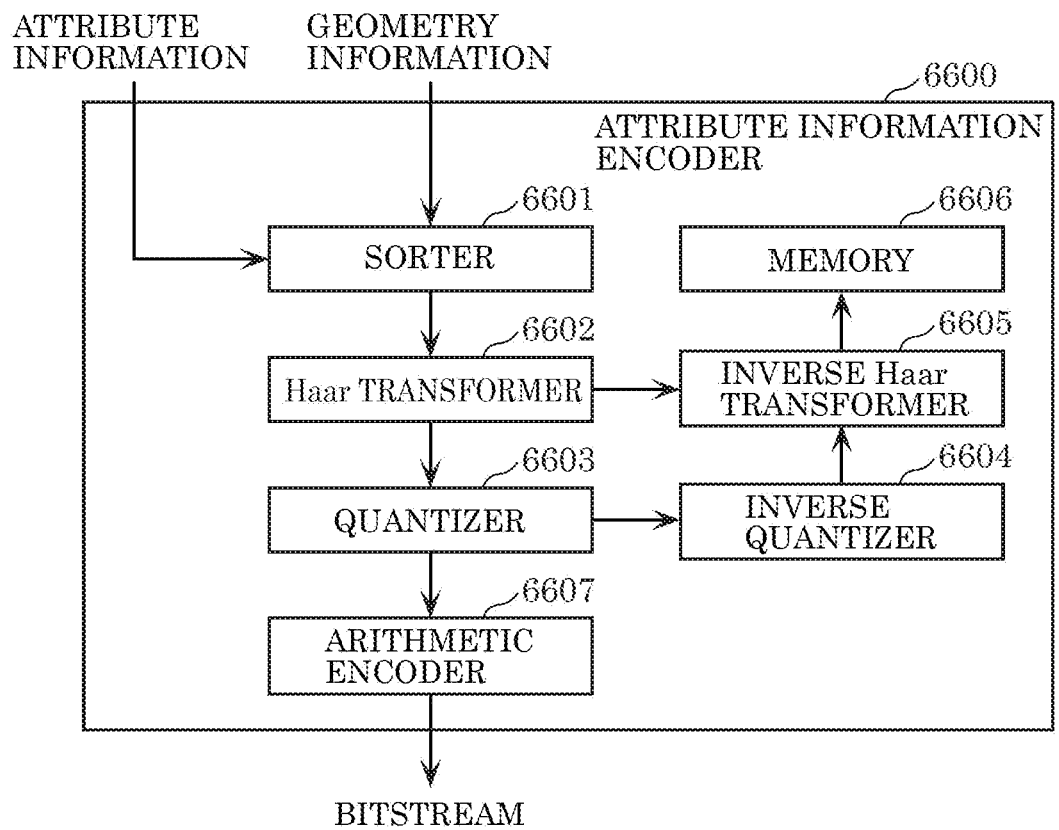
FIG. 16 is a block diagram of the attribute information encoder according to Embodiment 1.

FIG. 16 is a block diagram of attribute information encoder 6600 that is an example of transformation attribute information encoder A102, Attribute information encoder 6600 includes sorter 6601, Haar transformer 6602, quantizer 6603, inverse quantizer 6604, inverse Haar transformer 6605, memory 6606, and arithmetic encoder 6607.

Sorter 6601 generates the Morton codes by using the geometry information of three-dimensional points, and sorts the plurality of three-dimensional points in the order of the Morton codes. Haar transformer 6602 generates the coding coefficient by applying the Haar transform to the attribute information. Quantizer 6603 quantizes the coding coefficient of the attribute information.

Inverse quantizer 6604 inverse quantizes the coding coefficient after the quantization. Inverse Haar transformer 6605 applies the inverse Haar transform to the coding coefficient. Memory 6606 stores the values of items of attribute information of a plurality of decoded three-dimensional points. For example, the attribute information of the decoded three-dimensional points stored in memory 6606 may be utilized for prediction and the like of an unencoded three-dimensional point.

Arithmetic encoder 6607 calculates ZeroCnt from the coding coefficient after the quantization, and arithmetically encodes ZeroCnt. Additionally, arithmetic encoder 6607 arithmetically encodes the non-zero coding coefficient after the quantization. Arithmetic encoder 6607 may binarize the coding coefficient before the arithmetic encoding. In addition, arithmetic encoder 6607 may generate and encode various kinds of header information.

Figure 17:
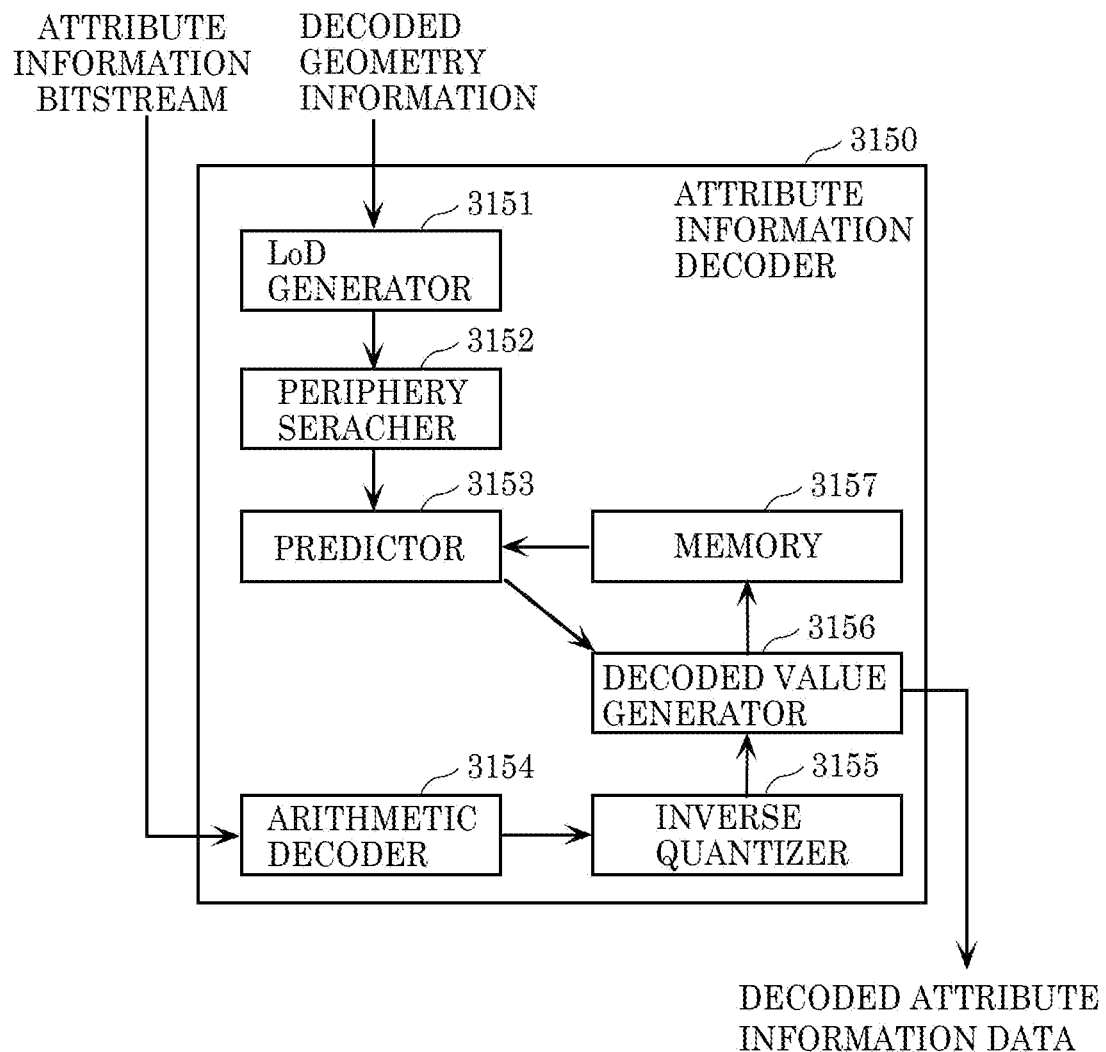
FIG. 17 is a block diagram showing a configuration of the attribute information decoder according to Embodiment 1.

FIG. 17 is a block diagram showing a configuration of attribute information decoder 3150 that is an example of LoD attribute information decoder A111.

Attribute information decoder 3150 includes LoD generator 3151, periphery searcher 3152, predictor 3153, arithmetic decoder 3154, inverse quantizer 3155, decoded value generator 3156, and memory 3157.

LoD generator 3151 generates an LoD using geometry information on a three-dimensional point decoded by the geometry information decoder (not shown in FIG. 17).

Periphery searcher 3152 searches for a neighboring three-dimensional point neighboring each three-dimensional point using a result of LoD generation by LoD generator 3151 and distance information indicating distances between three-dimensional points.

Predictor 3153 generates a predicted value of attribute information item on a current three-dimensional point to be decoded.

Arithmetic decoder 3154 arithmetically decodes the prediction residual in the bitstream obtained from attribute information encoder 3140 shown in FIG. 15. Note that arithmetic decoder 3154 may initialize the decoding table used for the arithmetic decoding. Arithmetic decoder 3154 initializes the decoding table used for the arithmetic decoding for the layer for which the encoding process has been performed by arithmetic encoder 3146 shown in FIG. 15. Arithmetic decoder 3154 may initialize the decoding table used for the arithmetic decoding for each layer. Arithmetic decoder 3154 may initialize the decoding table based on the information included in the bitstream that indicates the position of the layer for which the encoding table has been initialized.

Inverse quantizer 3155 inverse-quantizes the prediction residual arithmetically decoded by arithmetic decoder 3154.

Decoded value generator 3156 generates a decoded value by adding the predicted value generated by predictor 3153 and the prediction residual inverse-quantized by inverse quantizer 3155 together. Decoded value generator 3156 outputs the decoded attribute information data to another device.

Memory 3157 is a memory that stores a decoded value of an item of attribute information on each three-dimensional point decoded by decoded value generator 3156, For example, when generating a predicted value of a three-dimensional point yet to be decoded, predictor 3153 generates the predicted value using a decoded value of an item of attribute information on each three-dimensional point stored in memory 3157.

Figure 18:
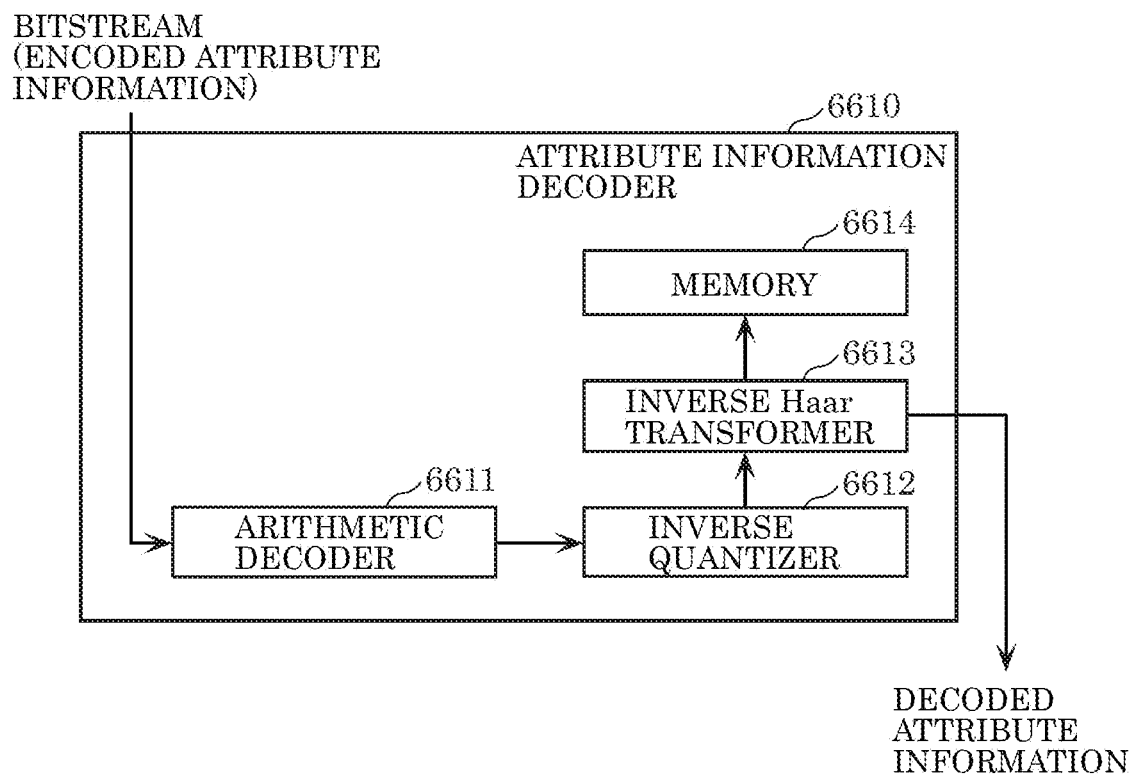
FIG. 18 is a block diagram of the attribute information decoder according to Embodiment 1.

FIG. 18 is a block diagram of attribute information decoder 6610 that is an example of transformation attribute information decoder A112. Attribute information decoder 6610 includes arithmetic decoder 6611, inverse quantizer 6612, inverse Haar transformer 6613, and memory 6614.

Arithmetic decoder 6611 arithmetically decodes ZeroCnt and the coding coefficient included in a bitstream. Note that arithmetic decoder 6611 may decode various kinds of header information.

Inverse quantizer 6612 inverse quantizes the arithmetically decoded coding coefficient, Inverse Haar transformer 6613 applies the inverse Haar transform to the coding coefficient after the inverse quantization. Memory 6614 stores the values of items of attribute information of a plurality of decoded three-dimensional points. For example, the attribute information of the decoded three-dimensional points stored in memory 6614 may be utilized for prediction of an undecoded three-dimensional point.

Figure 19:
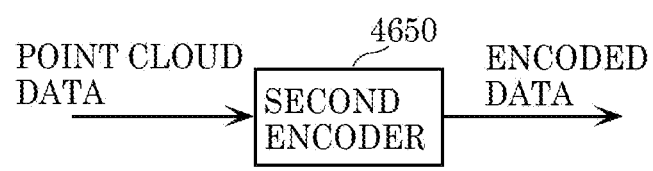
FIG. 19 is a diagram illustrating a structure of a second encoder according to Embodiment 1.
Figure 20:
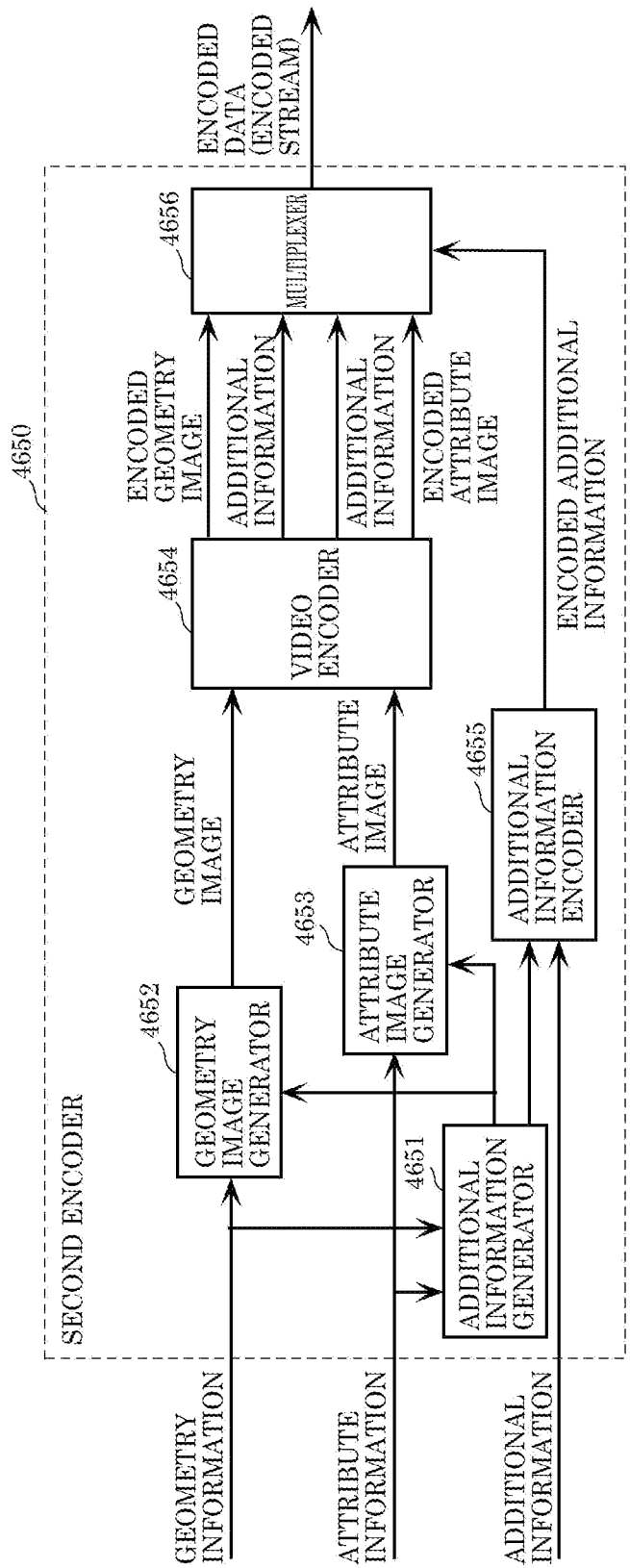
FIG. 20 is a block diagram illustrating the second encoder according to Embodiment 1.

Next, second encoder 4650, which is an example of encoder 4613 that performs encoding in the second encoding method, will be described. FIG. 19 is a diagram showing a configuration of second encoder 4650. FIG. 20 is a block diagram showing second encoder 4650.

Second encoder 4650 generates encoded data (encoded stream) by encoding point cloud data in the second encoding method. Second encoder 4650 includes additional information generator 4651, geometry image generator 4652, attribute image generator 4653, video encoder 4654, additional information encoder 4655, and multiplexer 4656.

Second encoder 4650 is characterized by generating a geometry image and an attribute image by projecting a three-dimensional structure onto a two-dimensional image, and encoding the generated geometry image and attribute image in an existing video encoding scheme. The second encoding method is referred to as video-based PCC (VPCC).

Point cloud data is PCC point cloud data like a PLY file or PCC point cloud data generated from sensor information, and includes geometry information (position), attribute information (attribute), and other additional information (metadata).

Additional information generator 4651 generates map information on a plurality of two-dimensional images by projecting a three-dimensional structure onto a two-dimensional image.

Geometry image generator 4652 generates a geometry image based on the geometry information and the map information generated by additional information generator 4651. The geometry image is a distance image in which distance (depth) is indicated as a pixel value, for example. The distance image may be an image of a plurality of point clouds viewed from one point of view (an image of a plurality of point clouds projected onto one two-dimensional plane), a plurality of images of a plurality of point clouds viewed from a plurality of points of view, or a single image integrating the plurality of images.

Attribute image generator 4653 generates an attribute image based on the attribute information and the map information generated by additional information generator 4651. The attribute image is an image in which attribute information (color (RGB), for example) is indicated as a pixel value, for example. The image may be an image of a plurality of point clouds viewed from one point of view (an image of a plurality of point clouds projected onto one two-dimensional plane), a plurality of images of a plurality of point clouds viewed from a plurality of points of view, or a single image integrating the plurality of images.

Video encoder 4654 generates an encoded geometry image (compressed geometry image) and an encoded attribute image (compressed attribute image), which are encoded data, by encoding the geometry image and the attribute image in a video encoding scheme. Note that, as the video encoding scheme, any well-known encoding method can be used. For example, the video encoding scheme is AVC or HEVC.

Additional information encoder 4655 generates encoded additional information (compressed metadata) by encoding the additional information, the map information and the like included in the point cloud data.

Multiplexer 4656 generates an encoded stream (compressed stream), which is encoded data, by multiplexing the encoded geometry image, the encoded attribute image, the encoded additional information, and other additional information. The generated encoded stream is output to a processor in a system layer (not shown).

Figure 21:
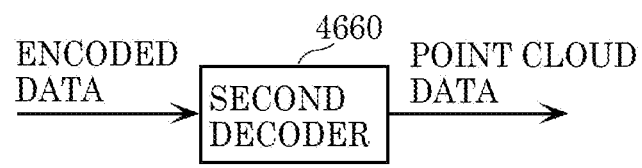
FIG. 21 is a diagram illustrating a structure of a second decoder according to Embodiment 1.
Figure 22:
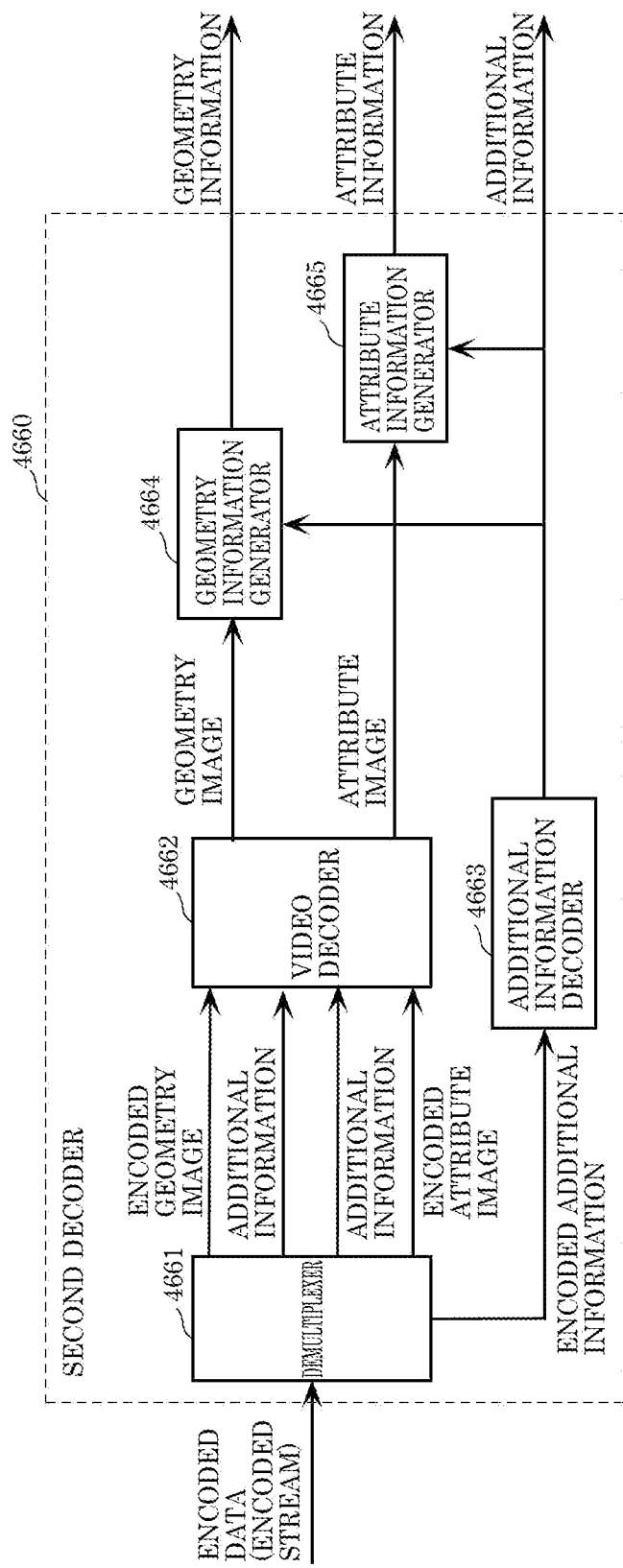
FIG. 22 is a block diagram illustrating the second decoder according to Embodiment 1.

Next, second decoder 4660, which is an example of decoder 4624 that performs decoding in the second encoding method, will be described, FIG. 21 is a diagram showing a configuration of second decoder 4660, FIG. 22 is a block diagram showing second decoder 4660. Second decoder 4660 generates point cloud data by decoding encoded data (encoded stream) encoded in the second encoding method in the second encoding method. Second decoder 4660 includes demultiplexer 4661, video decoder 4662, additional information decoder 4663, geometry information generator 4664, and attribute information generator 4665.

An encoded stream (compressed stream), which is encoded data, is input to second decoder 4660 from a processor in a system layer (not shown).

Demultiplexer 4661 separates an encoded geometry image (compressed geometry image), an encoded attribute image (compressed attribute image), an encoded additional information (compressed metadata), and other additional information from the encoded data.

Video decoder 4662 generates a geometry image and an attribute image by decoding the encoded geometry image and the encoded attribute image in a video encoding scheme. Note that, as the video encoding scheme, any well-known encoding method can be used. For example, the video encoding scheme is AVC or HEVC.

Additional information decoder 4663 generates additional information including map information or the like by decoding the encoded additional information.

Geometry information generator 4664 generates geometry information from the geometry image and the map information. Attribute information generator 4665 generates attribute information from the attribute image and the map information.

Second decoder 4660 uses additional information required for decoding in the decoding, and outputs additional information required for an application to the outside.

Figure 23:
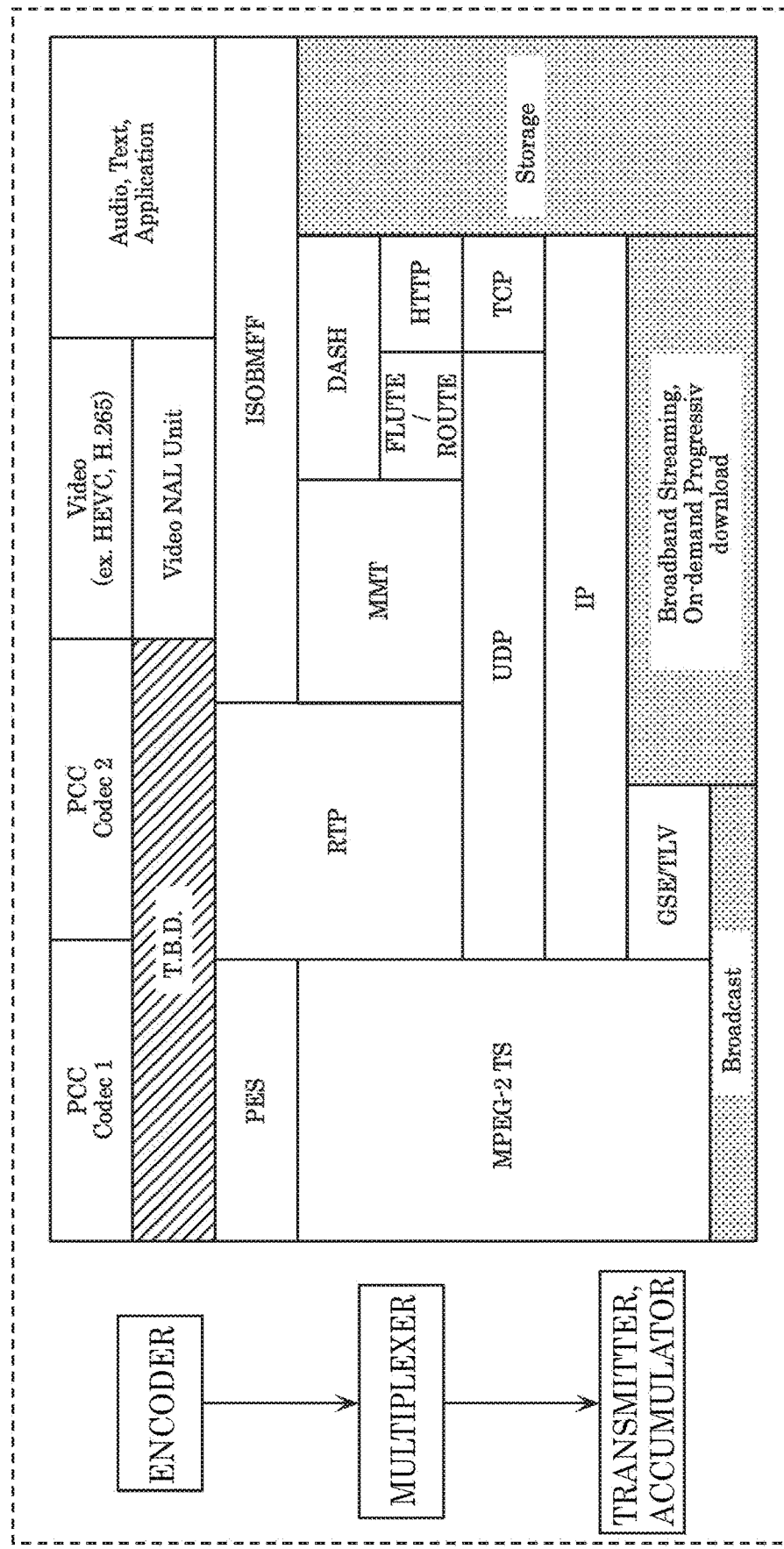
FIG. 23 is a diagram illustrating a protocol stack related to PCC encoded data according to Embodiment 1.

In the following, a problem with the PCC encoding scheme will be described. FIG. 23 is a diagram showing a protocol stack relating to PCC-encoded data. FIG. 23 shows an example in which PCC-encoded data is multiplexed with other medium data, such as a video (HEVC, for example) or an audio, and transmitted or accumulated.

A multiplexing scheme and a file format have a function of multiplexing various encoded data and transmitting or accumulating the data. To transmit or accumulate encoded data, the encoded data has to be converted into a format for the multiplexing scheme. For example, with HEVC, a technique for storing encoded data in a data structure referred to as a NAL unit and storing the NAL unit in ISOBMFF is prescribed.

At present, a first encoding method (Codec1) and a second encoding method (Codec2) are under investigation as encoding methods for point cloud data. However, there is no method defined for storing the configuration of encoded data and the encoded data in a system format. Thus, there is a problem that an encoder cannot perform an MUX process (multiplexing), transmission, or accumulation of data.

Note that, in the following, the term "encoding method" means any of the first encoding method and the second encoding method unless a particular encoding method is specified.

Embodiment 2

In this embodiment, types of the encoded data (geometry information (geometry), attribute information (attribute), and additional information (metadata)) generated by first encoder 4630 or second encoder 4650 described above, a method of generating additional information (metadata), and a multiplexing process in the multiplexer will be described.

The additional information (metadata) may be referred to as a parameter set or control information (signaling information).

In this embodiment, the dynamic object (three-dimensional point cloud data that varies with time) described above with reference to FIG. 4 will be described, for example. However, the same method can also be used for the static object (three-dimensional point cloud data associated with an arbitrary time point).

Figure 24:
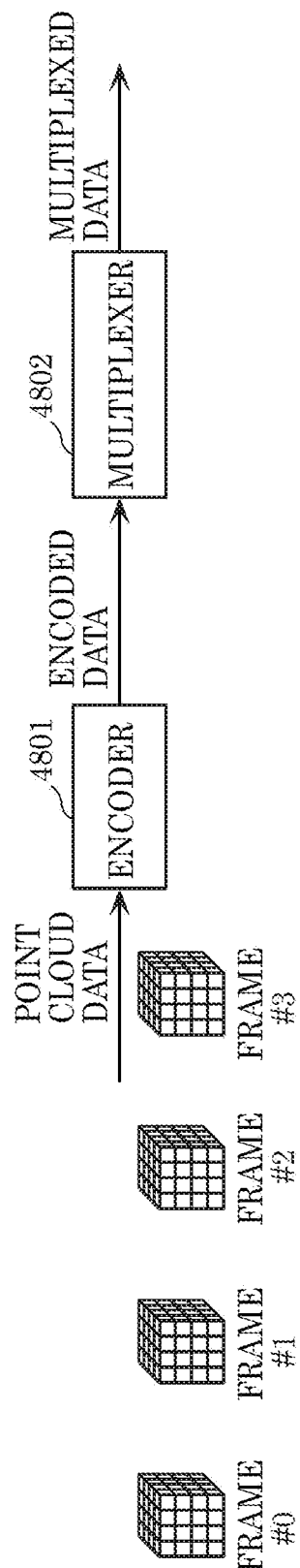
FIG. 24 is a diagram illustrating structures of an encoder and a multiplexer according to Embodiment 2.

FIG. 24 is a diagram showing configurations of encoder 4801 and multiplexer 4802 in a three-dimensional data encoding device according to this embodiment. Encoder 4801 corresponds to first encoder 4630 or second encoder 4650 described above, for example. Multiplexer 4802 corresponds to multiplexer 4634 or 4656 described above.

Encoder 4801 encodes a plurality of PCC (point cloud compression) frames of point cloud data to generate a plurality of pieces of encoded data (multiple compressed data) of geometry information, attribute information, and additional information.

Multiplexer 4802 integrates a plurality of types of data (geometry information, attribute information, and additional information) into a NAL unit, thereby converting the data into a data configuration that takes data access in the decoding device into consideration.

Figure 25:
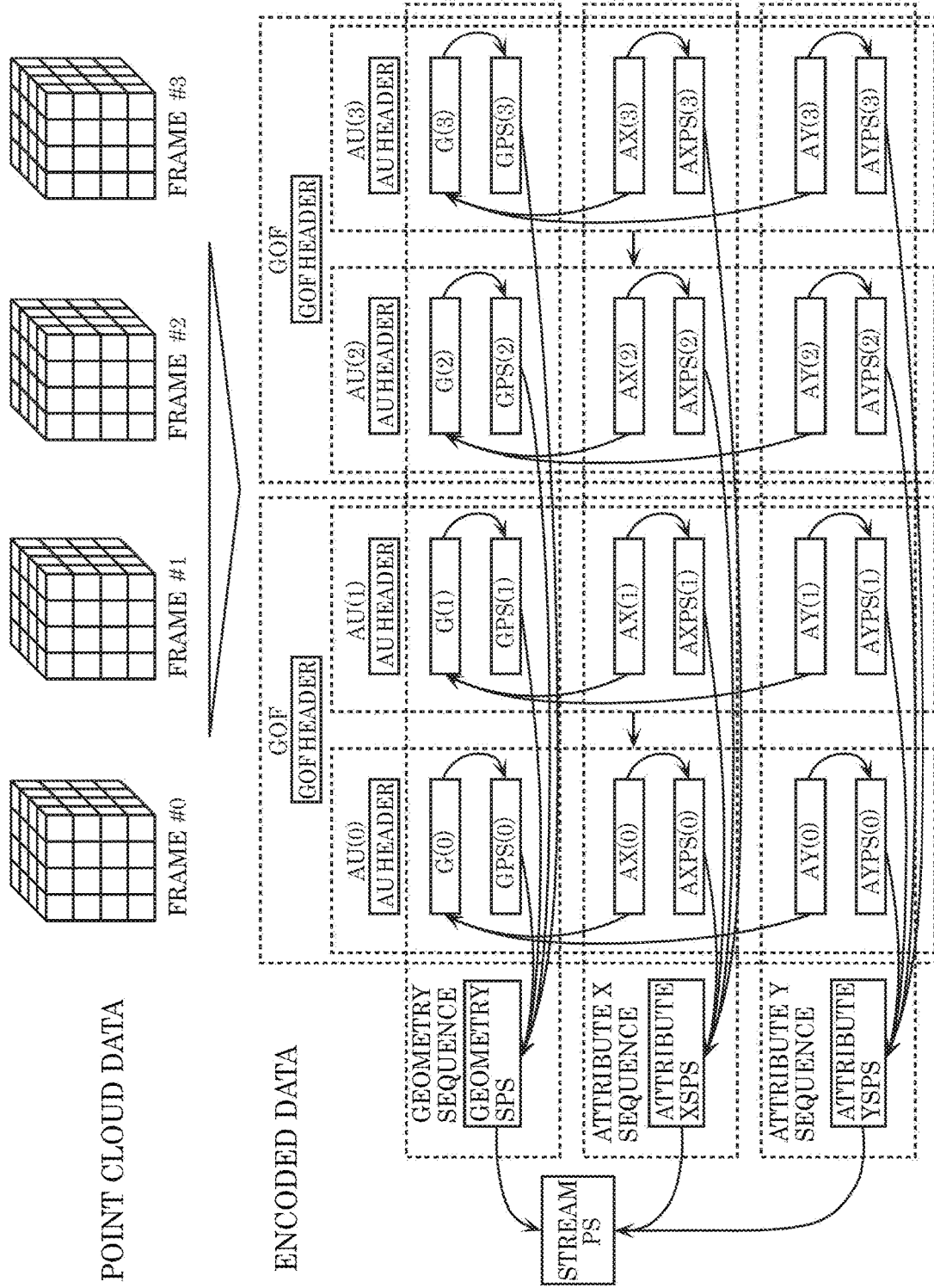
FIG. 25 is a diagram illustrating a structure example of encoded data according to Embodiment 2.

FIG. 25 is a diagram showing a configuration example of the encoded data generated by encoder 4801. Arrows in the drawing indicate a dependence involved in decoding of the encoded data. The source of an arrow depends on data of the destination of the arrow. That is, the decoding device decodes the data of the destination of an arrow, and decodes the data of the source of the arrow using the decoded data. In other words, "a first entity depends on a second entity" means that data of the second entity is referred to (used) in processing (encoding, decoding, or the like) of data of the first entity.

First, a process of generating encoded data of geometry information will be described. Encoder 4801 encodes geometry information of each frame to generate encoded geometry data (compressed geometry data) for each frame. The encoded geometry data is denoted by G(i). i denotes a frame number or a time point of a frame, for example.

Furthermore, encoder 4801 generates a geometry parameter set (GPS(i)) for each frame. The geometry parameter set includes a parameter that can be used for decoding of the encoded geometry data. The encoded geometry data for each frame depends on an associated geometry parameter set.

The encoded geometry data formed by a plurality of frames is defined as a geometry sequence. Encoder 4801 generates a geometry sequence parameter set (referred to also as geometry sequence PS or geometry SPS) that stores a parameter commonly used for a decoding process for the plurality of frames in the geometry sequence. The geometry sequence depends on the geometry SPS.

Next, a process of generating encoded data of attribute information will be described. Encoder 4801 encodes attribute information of each frame to generate encoded attribute data (compressed attribute data) for each frame. The encoded attribute data is denoted by A(i). FIG. 25 shows an example in which there are attribute X and attribute Y, and encoded attribute data for attribute X is denoted by AX(i), and encoded attribute data for attribute Y is denoted by AY(i).

Furthermore, encoder 4801 generates an attribute parameter set (APS(i)) for each frame. The attribute parameter set for attribute X is denoted by AXPS(i), and the attribute parameter set for attribute Y is denoted by AYPS(i). The attribute parameter set includes a parameter that can be used for decoding of the encoded attribute information. The encoded attribute data depends on an associated attribute parameter set.

The encoded attribute data formed by a plurality of frames is defined as an attribute sequence. Encoder 4801 generates an attribute sequence parameter set (referred to also as attribute sequence PS or attribute SPS) that stores a parameter commonly used for a decoding process for the plurality of frames in the attribute sequence. The attribute sequence depends on the attribute SPS.

In the first encoding method, the encoded attribute data depends on the encoded geometry data.

FIG. 25 shows an example in which there are two types of attribute information (attribute X and attribute Y). When there are two types of attribute information, for example, two encoders generate data and metadata for the two types of attribute information. For example, an attribute sequence is defined for each type of attribute information, and an attribute SPS is generated for each type of attribute information.

Note that, although FIG. 25 shows an example in which there is one type of geometry information, and there are two types of attribute information, the present disclosure is not limited thereto. There may be one type of attribute information or three or more types of attribute information. In such cases, encoded data can be generated in the same manner. If the point cloud data has no attribute information, there may be no attribute information. In such a case, encoder 4801 does not have to generate a parameter set associated with attribute information.

Next, a process of generating encoded data of additional information (metadata) will be described. Encoder 4801 generates a PCC stream PS (referred to also as PCC stream PS or stream PS), which is a parameter set for the entire PCC stream. Encoder 4801 stores a parameter that can be commonly used for a decoding process for one or more geometry sequences and one or more attribute sequences in the stream PS. For example, the stream PS includes identification information indicating the codec for the point cloud data and information indicating an algorithm used for the encoding, for example. The geometry sequence and the attribute sequence depend on the stream PS.

Next, an access unit and a GOF will be described. In this embodiment, concepts of access unit (AU) and group of frames (GOF) are newly introduced.

An access unit is a basic unit for accessing data in decoding, and is formed by one or more pieces of data and one or more pieces of metadata. For example, an access unit is formed by geometry information and one or more pieces of attribute information associated with a same time point. A GOF is a random access unit, and is formed by one or more access units.

Encoder 4801 generates an access unit header (AU header) as identification information indicating the top of an access unit. Encoder 4801 stores a parameter relating to the access unit in the access unit header. For example, the access unit header includes a configuration of or information on the encoded data included in the access unit. The access unit header further includes a parameter commonly used for the data included in the access unit, such as a parameter relating to decoding of the encoded data.

Note that encoder 4801 may generate an access unit delimiter that includes no parameter relating to the access unit, instead of the access unit header. The access unit delimiter is used as identification information indicating the top of the access unit. The decoding device identifies the top of the access unit by detecting the access unit header or the access unit delimiter.

Next, generation of identification information for the top of a GOF will be described. As identification information indicating the top of a GOF, encoder 4801 generates a GOF header, Encoder 4801 stores a parameter relating to the GOF in the GOF header. For example, the GOF header includes a configuration of or information on the encoded data included in the GOF. The GOF header further includes a parameter commonly used for the data included in the GOF, such as a parameter relating to decoding of the encoded data.

Note that encoder 4801 may generate a GOF delimiter that includes no parameter relating to the GOF, instead of the GOF header. The GOF delimiter is used as identification information indicating the top of the GOF, The decoding device identifies the top of the GOF by detecting the GOF header or the GOF delimiter.

In the PCC-encoded data, the access unit is defined as a PCC frame unit, for example. The decoding device accesses a PCC frame based on the identification information for the top of the access unit.

For example, the GOF is defined as one random access unit. The decoding device accesses a random access unit based on the identification information for the top of the GOF, For example, if PCC frames are independent from each other and can be separately decoded, a PCC frame can be defined as a random access unit.

Note that two or more PCC frames may be assigned to one access unit, and a plurality of random access units may be assigned to one GOF.

Encoder 4801 may define and generate a parameter set or metadata other than those described above. For example, encoder 4801 may generate supplemental enhancement information (SEI) that stores a parameter (an optional parameter) that is not always used for decoding.

Next, a configuration of encoded data and a method of storing encoded data in a NAL unit will be described.

Figure 26:
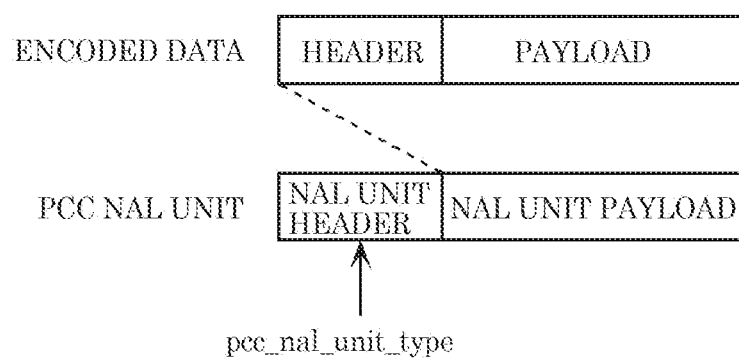
FIG. 26 is a diagram illustrating a structure example of encoded data and a NAL unit according to Embodiment 2.

For example, a data format is defined for each type of encoded data. FIG. 26 is a diagram showing an example of encoded data and a NAL unit.

For example, as shown in FIG. 26, encoded data includes a header and a payload. The encoded data may include length information indicating the length (data amount) of the encoded data, the header, or the payload. The encoded data may include no header.

The header includes identification information for identifying the data, for example. The identification information indicates a data type or a frame number, for example.

The header includes identification information indicating a reference relationship, for example. The identification information is stored in the header when there is a dependence relationship between data, for example, and allows an entity to refer to another entity. For example, the header of the entity to be referred to includes identification information for identifying the data. The header of the referring entity includes identification information indicating the entity to be referred to.

Note that, when the entity to be referred to or the referring entity can be identified or determined from other information, the identification information for identifying the data or identification information indicating the reference relationship can be omitted.

Multiplexer 4802 stores the encoded data in the payload of the NAL unit. The NAL unit header includes pcc_nal_unit_type, which is identification information for the encoded data. FIG. 27 is a diagram showing a semantics example of pcc_nal_unit_type.

As shown in FIG. 27, when pcc_codec_type is codec 1 (Codec1: first encoding method), values 0 to 10 of pcc_nal_unit_type are assigned to encoded geometry data (Geometry), encoded attribute X data (AttributeX), encoded attribute Y data (AttributeY), geometry PS (Geom. PS), attribute XPS (AttrX. PS), attribute YPS (AttrY. PS), geometry SPS (Geometry Sequence PS), attribute X SPS (AttributeX Sequence PS), attribute Y SPS (AttributeY Sequence PS), AU header (AU Header), and GOF header (GOF Header) in codec 1. Values of 11 and greater are reserved in codec 1.

When pcc_codec_type is codec 2 (Codec2: second encoding method), values of 0 to 2 of pcc_nal_unit_type are assigned to data A (DataA), metadata A (MetaDataA), and metadata B (MetaDataB) in the codec. Values of 3 and greater are reserved in codec 2.

Embodiment 3

According to a three-dimensional data encoding device according to Embodiment 3, geometry information of a plurality of three-dimensional points is encoded using a prediction tree generated based on the geometry information.

Figure 28:
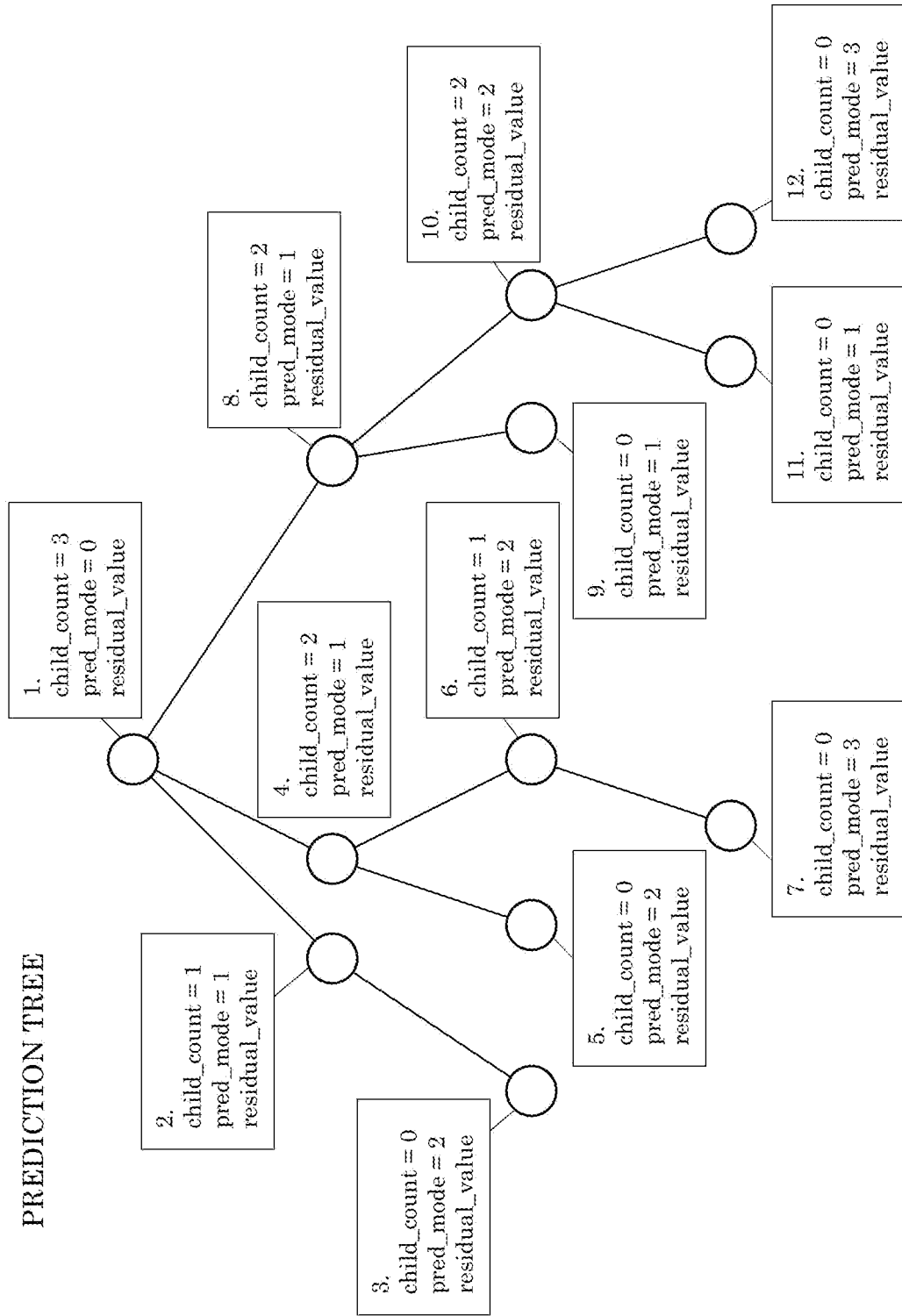
FIG. 28 is a diagram illustrating an example of a prediction tree used in a three-dimensional data encoding method according to Embodiment 3.
Figure 29:
FIG. 29 is a flowchart illustrating an example of a three-dimensional data encoding method according to Embodiment 3.

FIG. 28 is a diagram illustrating an example of a prediction tree used in the three-dimensional data encoding method according to Embodiment 3. FIG. 29 is a flowchart illustrating an example of the three-dimensional data encoding method according to Embodiment 3, FIG. 30 is a flowchart illustrating an example of a three-dimensional data decoding method according to Embodiment 3.

As shown in FIG. 28 and FIG. 29, in the three-dimensional data encoding method, a prediction tree is generated using a plurality of three-dimensional points, and node information included in each node in the prediction tree is then encoded. In this way, a bitstream including encoded node information is obtained. Each item of node information is information concerning one node of the prediction tree, for example, Each item of node information includes geometry information of one node, an index of the one node, the number of child nodes of the one node, a prediction mode used for encoding the geometry information of the one node, and a prediction residual.

Figure 30:
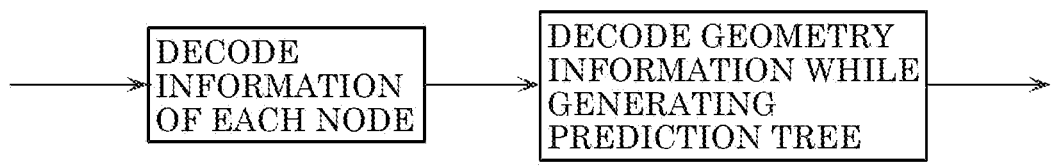
FIG. 30 is a flowchart illustrating an example of a three-dimensional data decoding method according to Embodiment 3.

As shown in FIG. 28 and FIG. 30, in the three-dimensional data decoding device, each item of encoded node information included in the bitstream is decoded, and then the geometry information is decoded while generating the prediction tree.

Next, a method of generating a prediction tree will be described with reference to FIG. 31.

Figure 31:
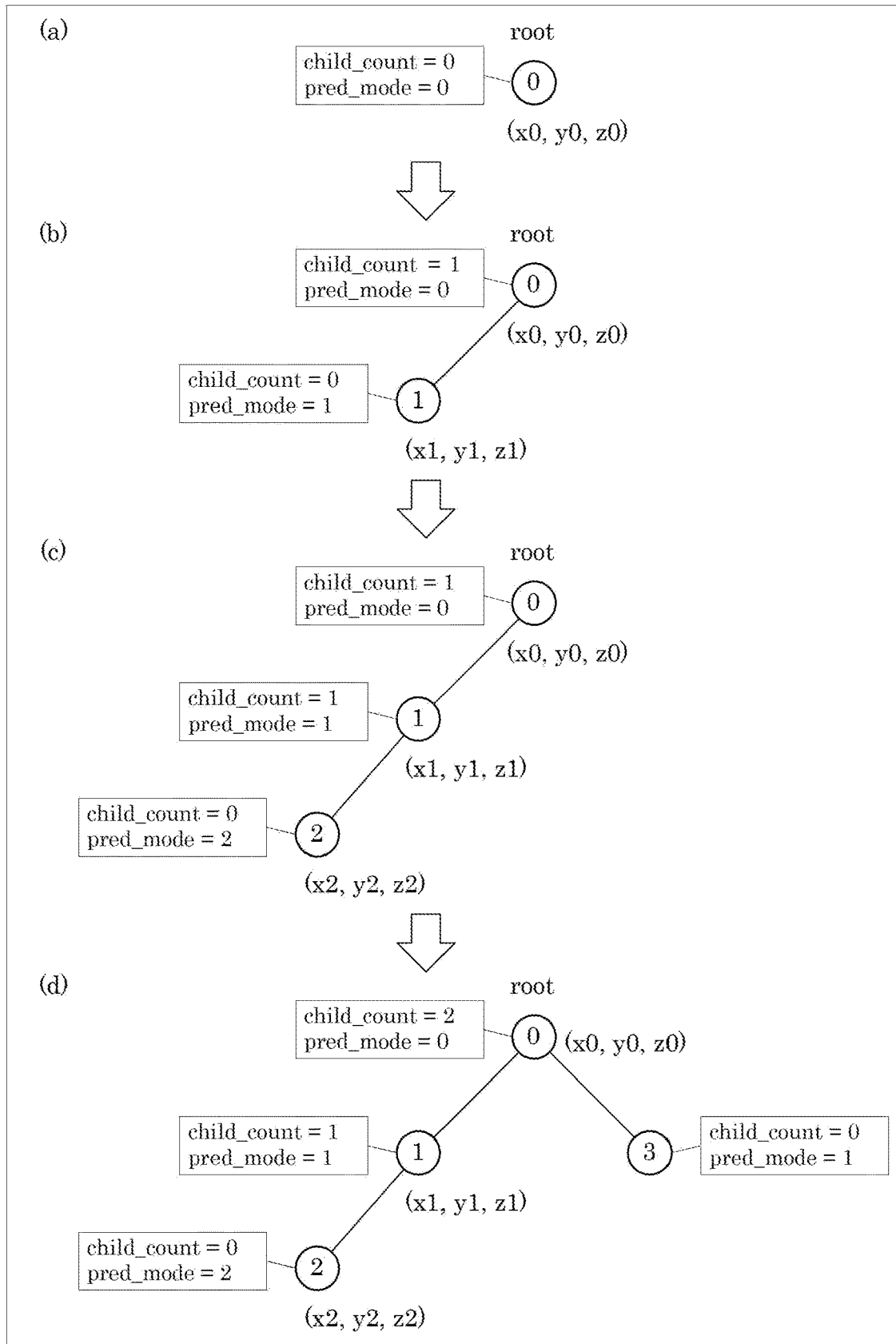
FIG. 31 is a diagram for describing a method of generating a prediction tree according to Embodiment 3.

FIG. 31 is a diagram for describing a method of generating a prediction tree according to Embodiment 3.

In the method of generating a prediction tree, as shown in Part (a) of FIG. 31, the three-dimensional data encoding device first adds point 0 as an initial point of the prediction tree. Geometry information of point 0 is represented by coordinates including three elements (x0, y0, z0). The geometry information of point 0 may be represented by coordinates of the three-dimensional Cartesian coordinate system or coordinates of the polar coordinate system.

child_count is incremented by 1 each time one child node is added to the node for which the child_count is set. Once the generation of the prediction tree is completed, child_count of each node indicates the number of child nodes of the node, and is added to the bitstream. pred_mode indicates the prediction mode for predicting values of the geometry information of each node. Details of the prediction mode will be described later.

As shown in Part (b) of FIG. 31, the three-dimensional data encoding device then adds point 1 to the prediction tree. In this step, the three-dimensional data encoding device may search the point cloud already added to the prediction tree for a point nearest to point 1 and add point 1 as a child node of the nearest point, Geometry information of point 1 is represented by coordinates including three elements (x1, y1, z1). The geometry information of point 1 may be represented by coordinates of the three-dimensional Cartesian coordinate system or coordinates of the polar coordinate system. In the case of FIG. 31, point 0 is the nearest point of point 1, and point 1 is added as a child node of point 0. The three-dimensional data encoding device then increments by 1 the value indicated by child_count of point 0.

Note that the predicted value of the geometry information of each node may be calculated when adding the node to the prediction tree. For example, in the case of Part (b) of FIG. 31, the three-dimensional data encoding device may add point 1 as a child node of point 0 and calculate the geometry information of point 0 as a predicted value. In that case, pred_mode=1 may be set. pred_mode is prediction mode information (prediction mode value) indicating a prediction mode. After calculating the predicted value, the three-dimensional data encoding device may calculate residual_value (prediction residual) of point 1. Here, residual_value is a difference value obtained by subtracting the predicted value calculated in the prediction mode indicated by pred_mode from the geometry information of the node. As described, according to the three-dimensional data encoding method, the difference value with respect to the predicted value, rather than the geometry information itself, is encoded, so that the encoding efficiency can be improved.

As shown in Part (c) of FIG. 31, the three-dimensional data encoding device then adds point 2 to the prediction tree. In this step, the three-dimensional data encoding device may search the point cloud already added to the prediction tree for a point nearest to point 2 and add point 2 as a child node of the nearest point. Geometry information of point 2 is represented by coordinates including three elements (x2, y2, z2). The geometry information of point 2 may be represented by coordinates of the three-dimensional Cartesian coordinate system or coordinates of the polar coordinate system. In the case of FIG. 31, point 1 is the nearest point of point 2, and point 2 is added as a child node of point 1, The three-dimensional data encoding device then increments by 1 the value indicated by child_count of point 1.

As shown in Part (d) of FIG. 31, the three-dimensional data encoding device then adds point 3 to the prediction tree. In this step, the three-dimensional data encoding device may search the point cloud already added to the prediction tree for a point nearest to point 3 and add point 3 as a child node of the nearest point. Geometry information of point 3 is represented by coordinates including three elements (x3, y3, z3). The geometry information of point 3 may be represented by coordinates of the three-dimensional Cartesian coordinate system or coordinates of the polar coordinate system. In the case of FIG. 31, point 0 is the nearest point of point 3, and point 3 is added as a child node of point 0. The three-dimensional data encoding device then increments by 1 the value indicated by child_count of point 0.

In this way, the three-dimensional data encoding device adds all points to the prediction tree and ends the generation of the prediction tree. When the generation of the prediction tree ends, any node having child_count=0 is a leaf of the prediction tree, After the generation of the prediction tree ends, the three-dimensional data encoding device encodes child_count, pred_mode, and residual_value of each node selected in the depth-first order from the root node. Selecting a node in the depth-first order means that the three-dimensional data encoding device selects, as a node subsequent to a node selected, a child node that has not been selected yet of the one or more child nodes of the selected node. When the selected node has no child node, the three-dimensional data encoding device selects a child node that has not been selected yet of the parent node of the selected node.

Note that the order of encoding is not limited to the depth-first order, but may be the width-first order, for example. When selecting a node in the width-first order, the three-dimensional data encoding device selects, as a node subsequent to a node selected, a node that has not been selected yet of the one or more nodes at the same depth (layer) as the selected node. When there is no node at the same depth as the selected node, the three-dimensional data encoding device selects a node that has not been selected yet of the one or more nodes at the subsequent depth.

Note that points 0 to 3 are examples of three-dimensional points.

Note that although child_count, pred_mode, and residual_value are calculated when adding each point to the prediction tree in the three-dimensional data encoding method described above, the present invention is not necessarily limited to this, and they may be calculated after the generation of the prediction tree ends.

The three-dimensional data encoding device to which a plurality of three-dimensional points are input may re-order the input three-dimensional points in ascending or descending Morton order and process the three-dimensional points in the latter order. This allows the three-dimensional data encoding device to efficiently search for the nearest point of the three-dimensional point to be processed and improve the encoding efficiency. The three-dimensional data encoding device need not re-order the three-dimensional points and may process the three-dimensional points in the order of input. For example, the three-dimensional data encoding device may generate a prediction tree without a branch in the order of input of a plurality of three-dimensional points. Specifically, the three-dimensional data encoding device may add an input three-dimensional point subsequent to a predetermined three-dimensional point in the order of input of a plurality of three-dimensional points as a child node of the predetermined three-dimensional point.

Figures 32, 33:
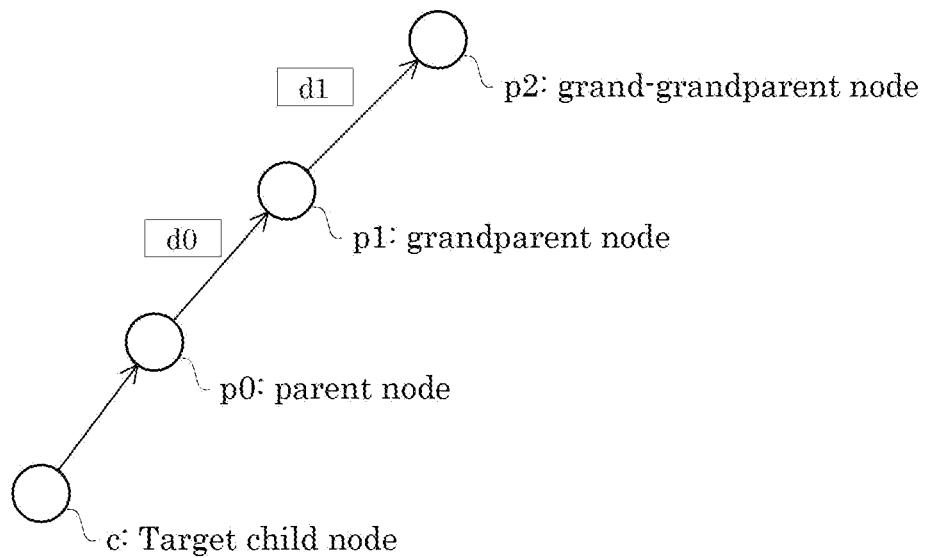
FIG. 32 is a diagram for describing a first example of prediction modes according to Embodiment 3.
FIG. 33 is a diagram illustrating a second example of a table that indicates a predicted value calculated in each prediction mode according to Embodiment 3.

Next, a first example of prediction modes will be described with reference to FIG. 32. FIG. 32 is a diagram for describing a first example of prediction modes according to Embodiment 3. FIG. 32 is a diagram illustrating a part of a prediction tree.

As shown below, eight prediction modes may be set. As an example, a case where a predicted value for point c is calculated as shown in FIG. 32 will be described. In the prediction tree, as shown, the parent node of point c is point p0, the grandparent node of point c is point p1, and the great grandparent node of point c is point p2. Note that point c, point p0, point p1, and point p2 are examples of three-dimensional points.

A prediction mode whose prediction mode value is 0 (referred to as prediction mode 0, hereinafter) may be set without prediction. That is, in prediction mode 0, the three-dimensional data encoding device may calculate geometry information of input point c as a predicted value of point c.

A prediction mode whose prediction mode value is 1 (referred to as prediction mode 1, hereinafter) may be set for a differential prediction with respect to point p0. That is, the three-dimensional data encoding device may calculate geometry information of point p0, which is the parent node of point c, as a predicted value of point c.

A prediction mode whose prediction mode value is 2 (referred to as prediction mode 2, hereinafter) may be set for a linear prediction based on point p0 and point p1. That is, the three-dimensional data encoding device may calculate, as a predicted value of point c, a prediction result of a linear prediction based on geometry information of point p0, which is the parent node of point c, and geometry information of point p1, which is the grandparent node of point c.

$$\text{Predicted value} = 2 \times p0 - p1 \qquad \text{(Equation T1)}$$

In Equation T1, p0 denotes geometry information of point p0, and p1 denotes geometry information of point p1.

A prediction mode whose prediction mode value is 3 (referred to as prediction mode 3, hereinafter) may be set for a parallelogram prediction based on point p0, point p1, and point p2. That is, the three-dimensional data encoding device may calculate, as a predicted value of point c, a prediction result of a parallelogram prediction based on geometry information of point p0, which is the parent node of point c, geometry information of point p1, which is the grandparent node of point c, and geometry information of point p2, which is the great grandparent node of point c, Specifically, the three-dimensional data encoding device calculates a predicted value of point c in prediction mode 3 according to the following equation T2.

$$\text{Predicted value} = p0 + p1 - p2 \qquad \text{(Equation T2)}$$

In Equation T2, p0 denotes geometry information of point p0, p1 denotes geometry information of point p1, and p2 denotes geometry information of point p2.

A prediction mode whose prediction mode value is 4 (referred to as prediction mode 4, hereinafter) may be set for a differential prediction with respect to point p1. That is, the three-dimensional data encoding device may calculate geometry information of point p1, which is the grandparent node of point c, as a predicted value of point c.

A prediction mode whose prediction mode value is 5 (referred to as prediction mode 5, hereinafter) may be set for a differential prediction with respect to point p2. That is, the three-dimensional data encoding device may calculate geometry information of point p2, which is the great grandparent node of point c, as a predicted value of point c.

A prediction mode whose prediction mode value is 6 (referred to as prediction mode 6, hereinafter) may be set for an average of geometry information of any two or more of point p0, point p1, and point p2. That is, the three-dimensional data encoding device may calculate, as a predicted value of point c, an average value of any two or more of geometry information of point p0, which is the parent node of point c, geometry information of point p1, which is the grandparent node of point c, and geometry information of point p2, which is the great grandparent node of point c. For example, when the three-dimensional data encoding device uses geometry information of point p0 and geometry information of point p1 for calculation of a predicted value, the three-dimensional data encoding device calculates a predicted value of point c in prediction mode 6 according to the following Equation T3.

$$\text{Predicted value} = (p0 + p1)/2 \qquad \text{(Equation T3)}$$

In Equation T3, p0 denotes geometry information of point p0, and p1 denotes geometry information of point p1.

A prediction mode whose prediction mode value is 7 (referred to as prediction mode 7, hereinafter) may be set for a non-linear prediction based on distance d0 between point p0 and point p1 and distance d1 between point p2 and point p1. That is, the three-dimensional data encoding device may calculate, as a predicted value of point c, a prediction result of a non-linear prediction based on distance d0 and distance d1.

Note that the prediction method assigned to each prediction mode is not limited to the example described above. The eight prediction modes described above and the eight prediction methods described above need not be combined in the manner described above, and can be combined in any manner. For example, when prediction modes are encoded by an entropy encoding, such as arithmetic encoding, a prediction method of high frequency of use may be assigned to prediction mode 0, In this way, the encoding efficiency can be improved. The three-dimensional data encoding device may can also improve the encoding efficiency by dynamically changing the assignment of prediction modes according to the frequency of use of the prediction modes while performing the encoding process. For example, the three-dimensional data encoding device may count the frequency of use of each prediction mode in the encoding and assign a prediction mode indicated by a smaller value to a prediction method of a higher frequency of use. In this way, the encoding efficiency can be improved. Note that M denotes a prediction mode count indicating the number of prediction modes, and in the example described above, there are eight prediction modes 0 to 7, and therefore, M=8.

As predicted values (px, py, pz) of geometry information (x, y, z) of a three-dimensional point, the three-dimensional data encoding device may calculate predicted values used for calculation of geometry information of a three-dimensional point to be encoded based on geometry information of a three-dimensional point that is at a short distance from the three-dimensional point to be encoded among peripheral three-dimensional points of the three-dimensional point to be encoded. The three-dimensional data encoding device may add prediction mode information (pred_mode) for each three-dimensional point so that a predicted value to be calculated can be selected according to the prediction mode.

For example, when the total number of prediction modes is M, it is possible that geometry information of nearest three-dimensional point p0 is assigned to prediction mode 0, . . . , and geometry information of three-dimensional point p2 is assigned to prediction mode M−1, and the prediction mode used for prediction is added for each three-dimensional point to the bitstream.

Note that prediction mode count M may be added to the bitstream. The value of prediction mode count M need not be added to the bitstream, and may be defined by profile, level or the like of a standard. The value of prediction mode count M calculated from number N of three-dimensional points used for prediction may also be used. For example, prediction mode count M may be calculated according to M=N+1.

FIG. 33 is a diagram illustrating a second example of a table that indicates a predicted value calculated in each prediction mode according to Embodiment 3.

The table shown in FIG. 33 is an example in the case where number N of three-dimensional points used for prediction is 4, and prediction mode count M=5.

In the second example, a predicted value of geometry information of point c is calculated based on geometry information of at least any one of point p0, point p1, and point p2. The prediction mode is added for each three-dimensional point to be encoded. The predicted value is calculated according to the prediction mode added.

FIG. 34 is a diagram illustrating a specific example of the second example of the table that indicates a predicted value calculated in each prediction mode according to Embodiment 3.

For example, the three-dimensional data encoding device may select prediction mode 1 and encode geometry information (x, y, z) of a three-dimensional point to be encoded based on predicted values (p0x, p0y, p0z), respectively. In that case, "1", which is a prediction mode value indicating selected prediction mode 1, is added to the bitstream.

As described, when selecting a prediction mode for calculating a predicted value of each of three elements included in the geometry information of the three-dimensional point to be encoded, the three-dimensional data encoding device may select a prediction mode common to the three elements.

FIG. 35 is a diagram illustrating a third example of the table that indicates a predicted value calculated in each prediction mode according to Embodiment 3.

The table shown in FIG. 35 is an example in the case where number N of three-dimensional points used for prediction is 2, and prediction mode count M=5.

In the third example, a predicted value of geometry information of point c is calculated based on geometry information of at least any one of point p0 and point p1. The prediction mode is added for each three-dimensional point to be encoded. The predicted value is calculated according to the prediction mode added.

Note that, when the number of peripheral three-dimensional points of point c (neighboring point count) is less than 3, as in the third example, any prediction mode to which no predicted value has been assigned may be set as "not available". When a prediction mode set as "not available" occurs, another prediction method may be assigned to the prediction mode. For example, geometry information of point p2 may be assigned to the prediction mode as a predicted value. Alternatively, a predicted value assigned to another prediction mode may be assigned to the prediction mode. For example, geometry information of point p1, which is assigned to prediction mode 4, may be assigned to prediction mode 3, which is set as "not available", In that case, geometry information of point p2 may be re-assigned to prediction mode 4, In this way, when a prediction mode set as "not available" occurs, the encoding efficiency can be improved by re-assigning a prediction method.

FIG. 36 is a diagram illustrating an example of a syntax of a header of geometry information, NumNeighborPoint, NumPredMode, Thfix, QP, and unique_point_per_leaf in the syntax in FIG. 36 will be sequentially described.

NumNeighborPoint denotes an upper limit of the number of peripheral points used for generation of a predicted value of geometry information of a three-dimensional point. When number M of peripheral points is less than NumNeighborPoint (M<NumNeighborPoint), a predicted value may be calculated using the M peripheral points in the predicted value calculation process.

NumPredMode denotes total number M of prediction modes used for prediction of geometry information. Note that maximum possible value MaxM of the prediction mode count may be defined by a standard or the like. The three-dimensional data encoding device may add the value of (MaxM−M) (0<M<=MaxM) to the header as NumPredMode, and binarize and encode (MaxM−1) with a truncated unary code. Prediction mode count NumPredMode need not be added to the bitstream, and the value of NumPredMode may be defined by profile or level of a standard or the like. The prediction mode count may be defined as NumNeighborPoint NumPredMode.

Thfix is a threshold for determining whether to fix the prediction mode or not. Distance d0 between point p1 and point p0 and distance d1 between point p2 and point p1 used for prediction are calculated, and the prediction mode is fixed to be a if absolute difference value distdiff=|d0−d1| is less than threshold Thfix[i]. α is a prediction mode for calculating a predicted value based on a linear prediction, and is "2" in the embodiment described here. Note that Thfix need not be added to the bitstream, and the value may be defined by profile or level of a standard or the like.

QP denotes a quantization parameter used for quantizing geometry information. The three-dimensional data encoding device may calculate a quantization step from the quantization parameter, and quantize geometry information using the calculated quantization step.

unique_point_per_leaf is information that indicates whether a duplicated point (a point having the same geometry information as another point) is included in the bitstream or not. When unique_point_per_leaf=1, it shows that there are no duplicated points in the bitstream. When unique_point_per_leaf=0, it shows that there is one or more duplicated points in the bitstream.

Note that although the determination of whether to fix the prediction mode or not has been described as being performed using the absolute difference value between distance d0 and distance d1 in this embodiment, the present invention is not limited to this, and the determination may be made in any manner. For example, the determination may be performed by calculating distance d0 between point p1 and point p0. Specifically, it may be determined that point p1 cannot be used for prediction and the prediction mode value may be fixed at "1" (a predicted value of p0) when distance d0 is greater than a threshold, and a prediction mode may be set otherwise. In this way, the encoding efficiency can be improved while reducing the overhead.

NumNeighborPoint, NumPredMode, Thfix, and unique_point_per_leaf described above may be entropy-encoded and added to the header. For example, these values may be binarized and arithmetically encoded. These values may be encoded with a fixed length, in order to reduce the processing amount.

FIG. 37 is a diagram illustrating an example of a syntax of geometry information, NumOfPoint, child_count, pred_mode, and residual_value[j] in the syntax in FIG. 37 will be sequentially described.

NumOfPoint denotes the total number of three-dimensional points included in a bitstream.

child_count denotes the number of child nodes of an i-th three-dimensional point (node[i]).

pred_mode denotes a prediction mode for encoding or decoding geometry information of the i-th three-dimensional point. pred_mode assumes a value from 0 to M−1 (M denotes the total number of prediction modes). When pred_mode is not in the bitstream (when the condition that distdiff>=Thfix[i] && NumPredMode>1 is not satisfied), pred_mode may be estimated to be fixed value a, a is a prediction mode for calculating a predicted value based on a linear prediction, and is "2" in the embodiment described here. Note that a is not limited to "2", and any value of 0 to M−1 may be set as an estimated value. An estimated value in the case where pred_mode is not in the bitstream may be additionally added to the header or the like, pred_mode may be binarized and arithmetically encoded with a truncated unary code using the number of prediction modes to which a predicted value is assigned.

Note that when NumPredMode=1, that is, when the prediction mode count is 1, the three-dimensional data encoding device need not encode a prediction mode value representing a prediction mode and may generate a bitstream that includes no prediction mode value. When the three-dimensional data decoding device obtains a bitstream that includes no prediction mode value, the three-dimensional data decoding device may calculate a predicted value of a particular prediction mode in the predicted value calculation. The particular prediction mode is a previously determined prediction mode.

residual_value[j] denotes encoded data of a prediction residual between geometry information and a predicted value thereof. residual_value[0] may represent element x of the geometry information, residual_value[1] may represent element y of the geometry information, and residual_value [2] may represent element z of the geometry information.

FIG. 38 is a diagram illustrating another example of the syntax of geometry information. The example in FIG. 38 is a modification of the example in FIG. 37.

As shown in FIG. 38, pred_mode may denote a prediction mode for each of three elements of geometry information (x, y, z). That is, pred_mode[0] denotes a prediction mode for element x, pred_mode[1] denotes a prediction mode for element y, and pred_mode[2] denotes a prediction mode for element z. pred_mode[0], pred_mode[1], and pred_mode[2] may be added to the bitstream.

Embodiment 4

Figure 39:
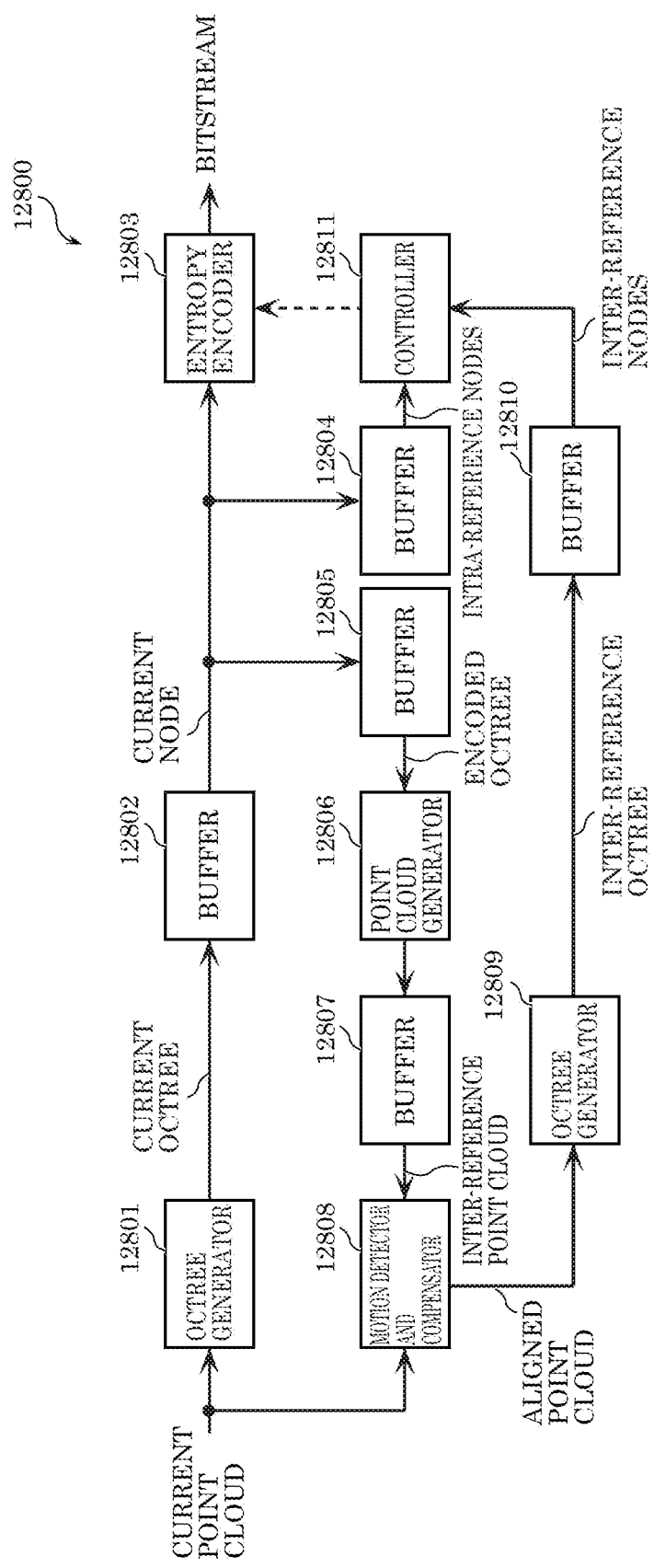
FIG. 39 is a block diagram of a three-dimensional data encoding device according to Embodiment 4.

In this embodiment, inter prediction of geometry information (an octree) on a point cloud will be described. FIG. 39 is a block diagram of three-dimensional data encoding device 12800 according to this embodiment. Although FIG. 39 shows a processor involved in the encoding of geometry information (geometry) on point clouds, three-dimensional data encoding device 12800 may include other processors, such as a processor that encodes attribute information on point clouds. In inter prediction, a point cloud to be encoded is encoded with reference to a previously encoded point cloud.

Three-dimensional data encoding device 12800 includes octree generator 12801, buffer 12802, entropy encoder 12803, buffer 12804, buffer 12805, point cloud generator 12806, buffer 12807, motion detector and compensator 12808, octree generator 12809, buffer 12810, and controller 12811.

Octree generator 12801 transforms a current point cloud, which is data on an input point cloud to be encoded, into an octree representation, thereby generating a current octree that represents geometry information on the current point cloud as an octree. In the input current point cloud, a position in the point cloud is expressed as, for example, three-dimensional coordinates (e.g., x, y, z), Buffer 12802 holds the current octree generated. An octree includes multiple nodes (branch points), each having information that includes an 8-bit occupancy code indicating whether each of eight child nodes of that node includes three-dimensional points. Buffer 12802 may initialize data held therein, for example for each octree (current point cloud).

Entropy encoder 12803 entropy-encodes information (e.g., the occupancy code) on each node to generate a bitstream. In this entropy encoding, a probability parameter (also referred to as a coding table or a probability table) is controlled based on information on nodes in the current point cloud (intra-reference nodes) or information on nodes in an encoded point cloud (inter-reference nodes).

Buffer 12804 holds, as an intra-reference node (an encoded node), information (e.g., the occupancy code) on the current node, Buffer 12804 may initialize data held therein, for example for each octree (current point cloud).

Buffer 12805 holds information (e.g., the occupancy code) on the current node. Buffer 12805 also holds, as an encoded octree, information on the current node on an octree basis. Buffer 12805 may initialize data held therein, for example for each octree (current point cloud).

Point cloud generator 12806 transforms the encoded octree into a point cloud to generate an inter-reference point cloud (an encoded point cloud). Buffer 12807 holds the inter-reference point cloud. That is, buffer 12807 holds multiple inter-reference point clouds, which may be one or more encoded point clouds.

Motion detector and compensator 12808 detects a displacement between an inter-reference point cloud and the current point cloud (motion detection), and corrects the inter-reference point cloud based on the displacement detected (motion compensation). Motion detector and compensator 12808 thus generates an aligned point cloud, which is the inter-reference point cloud aligned.

octree generator 12809 transforms the aligned point cloud into an octree representation to generate an inter-reference octree, which represents geometry information on the aligned point cloud as an octree. Buffer 12810 holds the inter-reference octree generated. Buffer 12810 may initialize data held therein, for example for each octree (current point cloud).

Three-dimensional data encoding device 12800 may perform the motion detection and the motion compensation on a frame or octree basis, or on a node (point) basis. Three-dimensional data encoding device 12800 may incorporate motion compensation information, such as motion vectors, into the header of the frame or octree, or may incorporate the information into the header of the node information after entropy-encoding the information.

The inter-reference point cloud may be a point cloud in an encoded frame different from the frame being encoded, or may be an encoded point cloud in the frame being encoded.

Controller 12811 uses intra-reference nodes in buffer 12804 or inter-reference nodes in the inter-reference octree in buffer 12810 to control the probability parameter used by entropy encoder 12803 for entropy encoding (arithmetic encoding) of the current node. Whether the probability parameter is controlled using intra-reference nodes (hereafter referred to as intra reference) or using inter-reference nodes (hereafter referred to as inter reference) may be predetermined, for example for each frame or point cloud, or may be determined in any manner. For example, actual code amounts may be tentatively calculated to select a reference scheme (intra reference or inter reference) that yields a smaller code amount.

For example, if intra reference is used, the probability parameter is selected from multiple probability parameters based on the occupancy state of each of neighboring nodes (intra-reference nodes) of the current node (whether the neighboring node includes points). If inter reference is used, the probability parameter is selected from multiple probability parameters based on the occupancy state of each of nodes (inter-reference nodes) at the same locations in the inter-reference octree as at least one of the current node and the neighboring nodes. If inter reference is selected, the probability parameter may be controlled by combining inter reference and intra reference. The multiple probability parameters may include a probability parameter updated according to the frequency of occurrence, or may include a fixed value.

Three-dimensional data encoding device 12800 may thus control the probability parameter for entropy encoding based on information on inter-reference nodes in addition to information on intra-reference nodes. This can improve the accuracy of predicting the probability of the occurrence of information on the current node, and thus will improve the coding efficiency.

Three-dimensional data encoding device 12800 does not need to always refer to the inter-reference point cloud. Rather, three-dimensional data encoding device 12800 may encode the current point cloud based on only information on the current point cloud. This may be done by clearing buffer 12807 storing inter-reference point clouds at predetermined time intervals (e.g., every second), at predetermined frame intervals (e.g., every 30 frames), or at any time when notifying the three-dimensional data decoding device. In this manner, the three-dimensional data decoding device is allowed to start random replay at a point cloud that is located at a position other than the beginning of the bitstream and that does not refer to any inter-reference point cloud. This will improve the random accessibility and error resistance of the bitstream.

Figure 40:
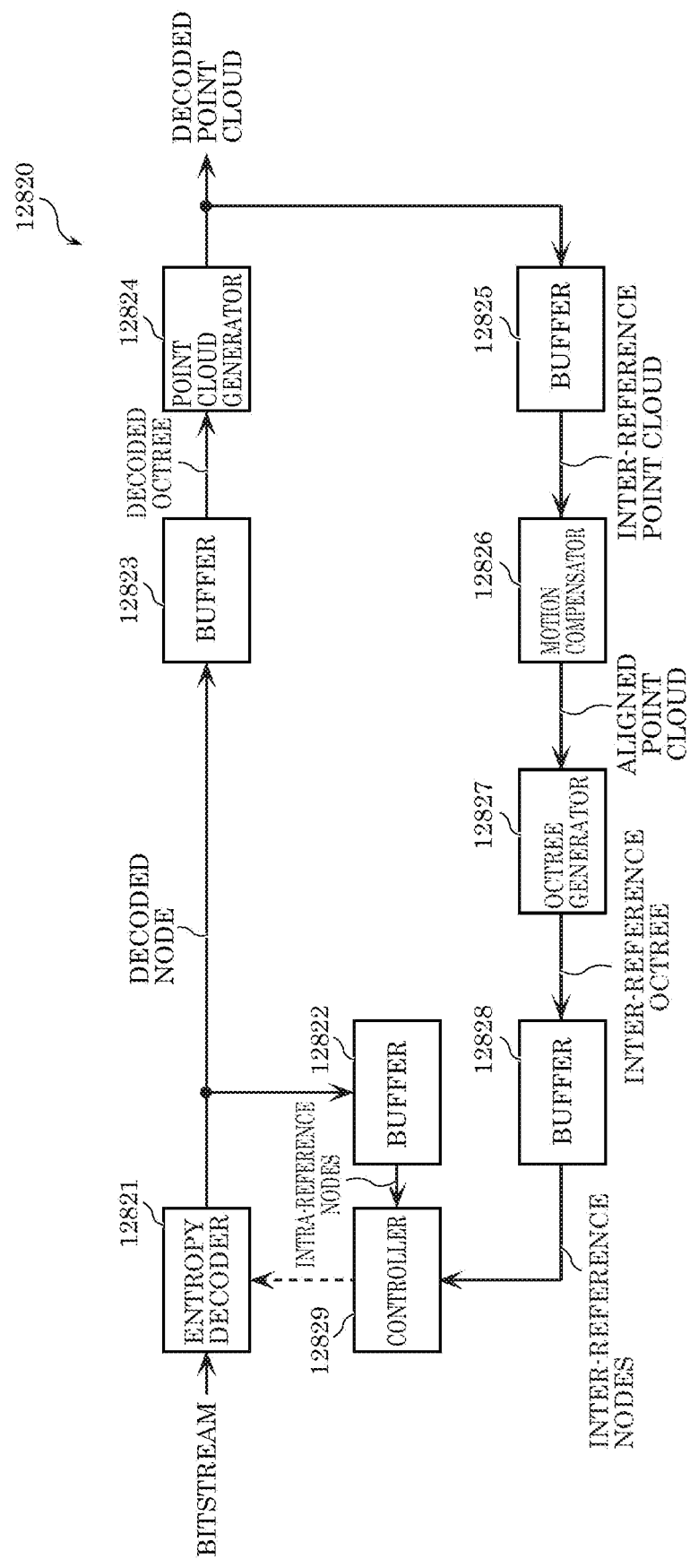
FIG. 40 is a block diagram of a three-dimensional data decoding device according to Embodiment 4.

FIG. 40 is a block diagram of three-dimensional data decoding device 12820 according to this embodiment. Although FIG. 40 shows a processor involved in the decoding of geometry information (geometry) on point clouds, three-dimensional data decoding device 12820 may include other processors, such as a processor that decodes attribute information on point clouds. Three-dimensional data decoding device 12820 performs inter-prediction decoding, in which a point cloud is decoded from a bitstream encoded with reference to encoded point clouds. For example, three-dimensional data decoding device 12820 decodes a bitstream generated by three-dimensional data encoding device 12800 illustrated in FIG. 39, Three-dimensional data decoding device 12820 includes entropy decoder 12821, buffer 12822, buffer 12823, point cloud generator 12824, buffer 12825, motion compensator 12826, octree generator 12827, buffer 12828, and controller 12829.

Entropy decoder 12821 entropy-decodes an input bitstream for each branch point (node) of an octree to generate information (e.g., the occupancy code) on the decoded node. In this entropy decoding, a probability parameter (also referred to as a coding table or a probability table) is controlled based on information on decoded nodes in the current point cloud (intra-reference nodes) or information on nodes in a decoded point cloud (inter-reference nodes).

Buffer 12822 holds, as an intra-reference node (a decoded node), the generated information on the decoded node. Buffer 12822 may initialize data held therein, for example for each octree (decoded point cloud).

Buffer 12823 holds information (e.g., the occupancy code) on the decoded node. Buffer 12823 also holds, as a decoded octree, information on the decoded node on an octree basis. Buffer 12823 may initialize data held therein, for example for each octree (decoded point cloud), Point cloud generator 12824 transforms the decoded octree into a point cloud to generate a decoded point cloud.

Buffer 12825 holds the decoded point cloud as an inter-reference point cloud. Motion compensator 12826 corrects a displacement between an inter-reference point cloud and the point cloud being decoded (motion compensation) to generate an aligned point cloud, which is the inter-reference point cloud aligned. For example, motion compensator 12826 performs motion compensation using motion compensation information, such as motion vectors, obtained from the header of the frame or octree or the header of the node information.

Octree generator 12827 transforms the aligned point cloud into an octree representation to generate an inter-reference octree, which represents geometry information on the aligned point cloud as an octree. Buffer 12828 holds the inter-reference octree generated. Buffer 12828 may initialize the data held therein, for example for each octree (decoded point cloud).

Three-dimensional data decoding device 12820 may perform the motion compensation on a frame or octree basis, or on a node (point) basis.

The inter-reference point cloud may be a point cloud in a decoded frame different from the frame being decoded, or may be a decoded point cloud in the frame being decoded.

Controller 12829 uses intra-reference nodes in buffer 12822 or inter-reference nodes in the inter-reference octree in buffer 12828 to control the probability parameter used by entropy decoder 12821 for entropy decoding (arithmetic decoding) of the current node. Whether intra reference is used or inter reference is used may be determined based on control information in the bitstream, may be predetermined for each frame or point cloud, or may be determined in any manner, for example.

For example, if intra reference is used, the probability parameter is selected based on the occupancy state of each of neighboring nodes (intra-reference nodes) of the current node (whether the neighboring node includes points). If inter reference is used, the probability parameter is selected based on the occupancy state of each of nodes (inter-reference nodes) at the same locations in the inter-reference octree as at least one of the current node and the neighboring nodes. If inter reference is selected, the probability parameter may be controlled by combining inter reference and intra reference.

Three-dimensional data decoding device 12820 may thus control the probability parameter for entropy decoding based on information on inter-reference nodes in addition to information on intra-reference nodes. In this manner, a point cloud can be decoded from a bitstream encoded with reference to encoded point clouds (e.g., a bitstream output by three-dimensional data encoding device 12800 illustrated in FIG. 39).

Three-dimensional data decoding device 12820 does not need to always refer to the inter-reference point cloud, Rather, three-dimensional data decoding device 12820 may decode the point cloud being decoded, based on only information on the point cloud being decoded. This may be done by clearing buffer 12825 storing inter-reference point clouds with the same timing as the three-dimensional data encoding device, such as at predetermined time intervals (e.g., every second), at predetermined frame intervals (e.g., every 30 frames), or at any time when notified by the three-dimensional data encoding device. In this manner, three-dimensional data decoding device 12820 is allowed to start random replay at a point cloud that is located at a position other than the beginning of the bitstream and that does not refer to any inter-reference point cloud.

Figure 41:
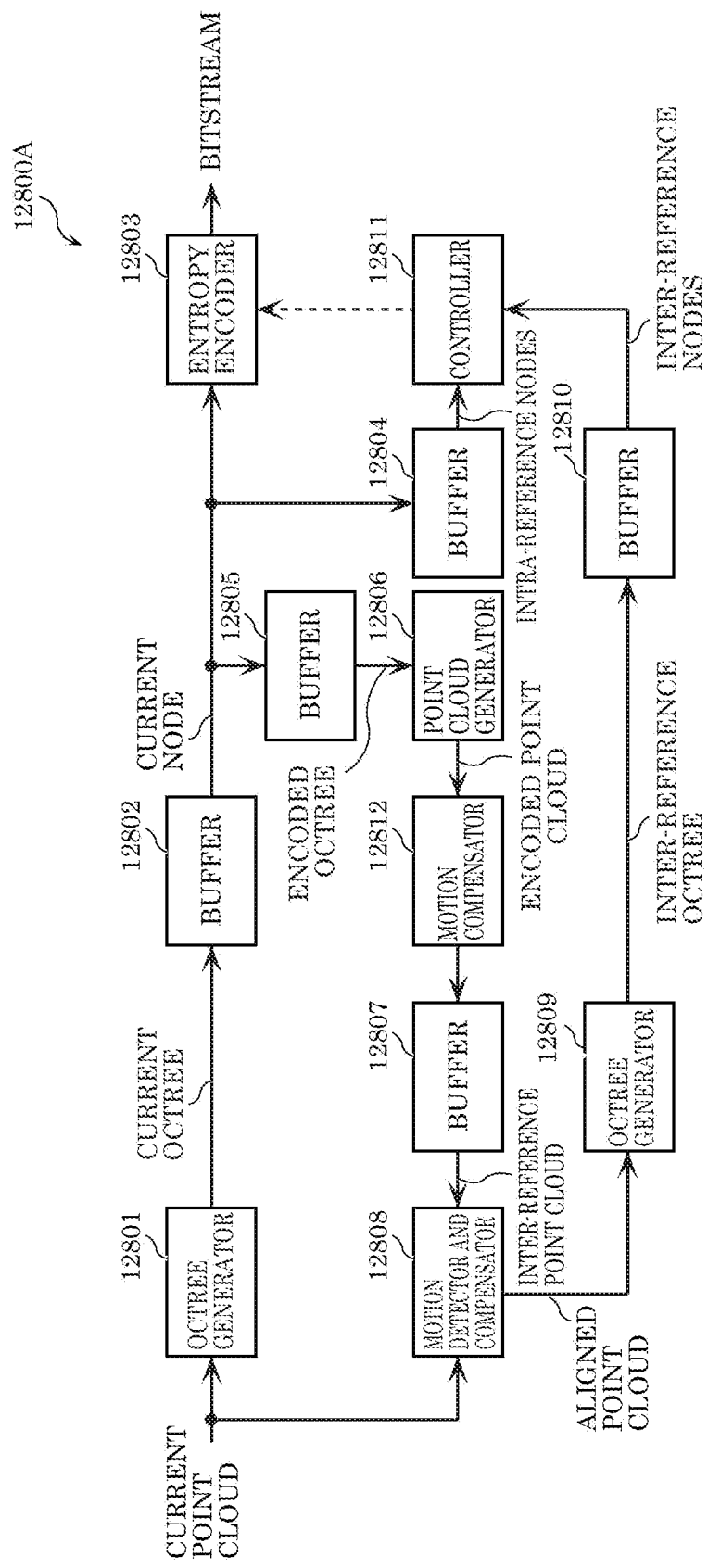
FIG. 41 is a block diagram of a three-dimensional data encoding device according to Embodiment 4.

FIG. 41 is a block diagram of three-dimensional data encoding device 12800A, which is a variation of three-dimensional data encoding device 12800. In addition to the components of three-dimensional data encoding device 12800 illustrated in FIG. 39, three-dimensional data encoding device 12800A illustrated in FIG. 41 further includes motion compensator 12812.

Motion compensator 12812 performs motion compensation on the encoded point cloud generated by point cloud generator 12806, thereby aligning the encoded point cloud with an inter-reference point cloud stored in buffer 12807. Buffer 12807 merges the motion-compensated encoded point cloud with the stored inter-reference point cloud to update the stored inter-reference point cloud. In this manner, a dense point cloud resulting from superposing point clouds of multiple frames on each other can be used as the inter-reference point cloud. Other processes are the same as in three-dimensional data encoding device 12800, for example.

The inter-reference point cloud may be a point cloud in an encoded frame different from the frame being encoded, or may be an encoded point cloud in the frame being encoded.

Three-dimensional data encoding device 12800A thus aligns and merges encoded point clouds, which will improve the point cloud density of the inter-reference point cloud. This improves the accuracy of predicting the probability of the occurrence of information on the current node, and thus will further improve the coding efficiency.

Three-dimensional data encoding device 12800A does not need to refer to all the encoded point clouds as the inter-reference point cloud. Rather, three-dimensional data encoding device 12800A may encode the current point cloud based on information on only the current point cloud or information on the current point cloud and some of the encoded point clouds. This may be done by clearing all or part of the data in buffer 12807 storing inter-reference point clouds at predetermined time intervals (e.g., every second), at predetermined frame intervals (e.g., every 5 frames), or at any time when notifying the three-dimensional data decoding device. Encoding based on information on only the current point cloud enables the three-dimensional data decoding device to start random replay at a point cloud that is located at a position other than the beginning of the bitstream and that does not refer to any inter-reference point cloud. This will improve the random accessibility and the error resistance of the bitstream. Encoding based on information on the current point cloud and some of the encoded point clouds enables reducing the capacity of buffer 12807 holding inter-reference point clouds. This will lead to a reduced implementation cost of the three-dimensional data encoding device and the three-dimensional data decoding device.

Figure 42:
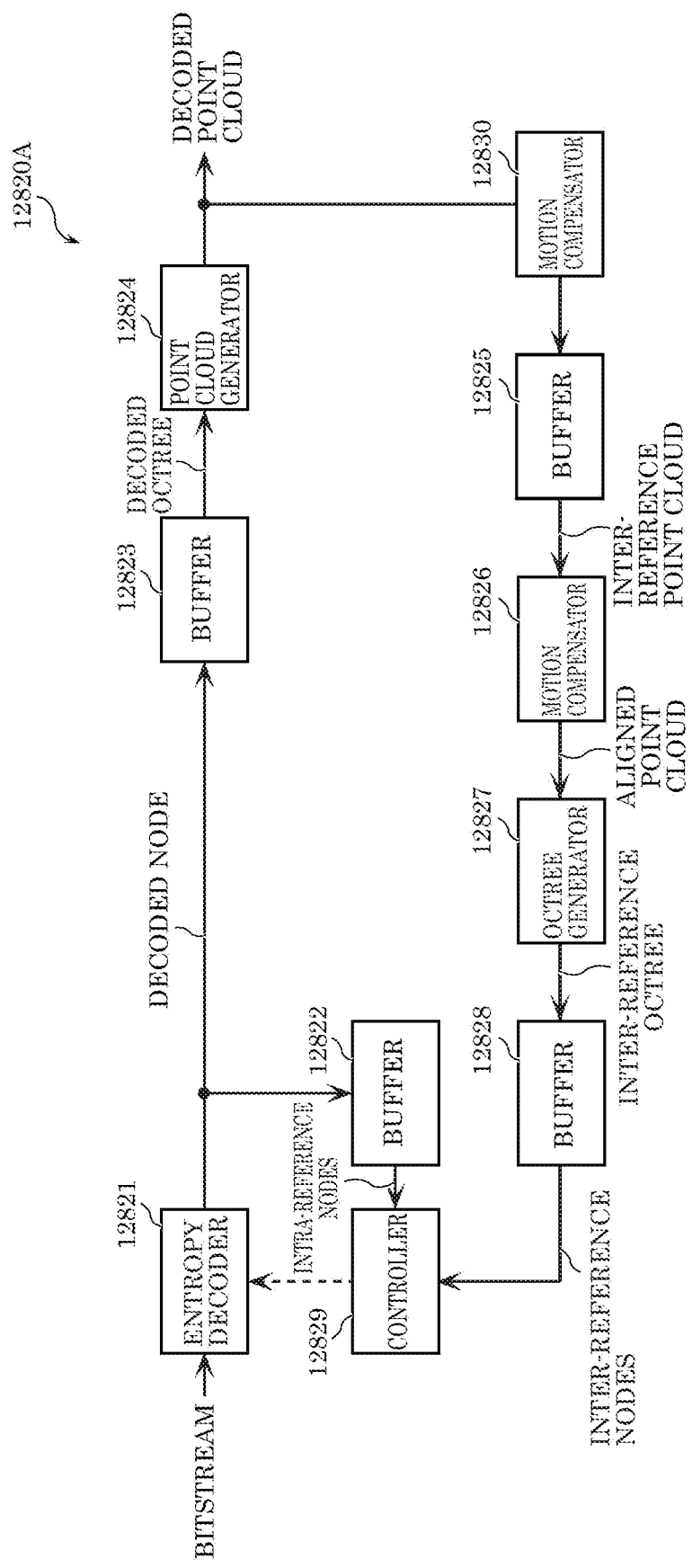
FIG. 42 is a block diagram of a three-dimensional data decoding device according to Embodiment 4.

FIG. 42 is a block diagram of three-dimensional data decoding device 12820A, which is a variation of three-dimensional data decoding device 12820, In addition to the components of three-dimensional data decoding device 12820 illustrated in FIG. 40, three-dimensional data decoding device 12820A illustrated in FIG. 42 further includes motion compensator 12830. Three-dimensional data decoding device 12820A decodes a point cloud from, for example, a bitstream generated by three-dimensional data encoding device 12800A illustrated in FIG. 41.

Motion compensator 12830 performs motion compensation on the decoded point cloud to align the decoded point cloud with an inter-reference point cloud stored in buffer 12825. Buffer 12825 merges the motion-compensated decoded point cloud with the stored inter-reference point cloud to update the stored inter-reference point cloud. In this manner, a dense point cloud resulting from superposing point clouds of multiple frames on each other can be used as the inter-reference point cloud. Other processes are the same as in three-dimensional data decoding device 12820, for example.

The inter-reference point cloud may be a point cloud in a decoded frame different from the frame being decoded, or may be a decoded point cloud in the frame being decoded.

Three-dimensional data decoding device 12820A is thus configured to align and merge decoded point clouds.

Three-dimensional data decoding device 12820A can therefore decode a point cloud from a bitstream encoded by a three-dimensional data encoding device having a similar configuration (e.g., a bitstream generated by three-dimensional data encoding device 12800A illustrated in FIG. 30).

Three-dimensional data decoding device 12820A does not need to refer to all the decoded point clouds as the inter-reference point cloud, Rather, three-dimensional data decoding device 12820A may decode the point cloud being decoded, based on information on only the point cloud being decoded or information on the point cloud being decoded and some of the decoded point clouds. This may be done by clearing all or part of the data in buffer 12825 storing inter-reference point clouds at predetermined time intervals (e.g., every second), at predetermined frame intervals (e.g., every 5 frames), or at any time when notified by the three-dimensional data encoding device.

Decoding based on information on only the point cloud being decoded enables three-dimensional data decoding device 12820A to start random replay at a point cloud that is located at a position other than the beginning of the bitstream and that does not refer to any inter-reference point cloud. This will improve the random accessibility and the error resistance of the bitstream, Decoding based on information on the point cloud being decoded and some of the decoded point clouds enables the three-dimensional data decoding device to have a reduced capacity of buffer 12825 holding inter-reference point clouds. This will lead to a reduced implementation cost of the three-dimensional data encoding device and the three-dimensional data decoding device.

Figures 43, 44, 45:
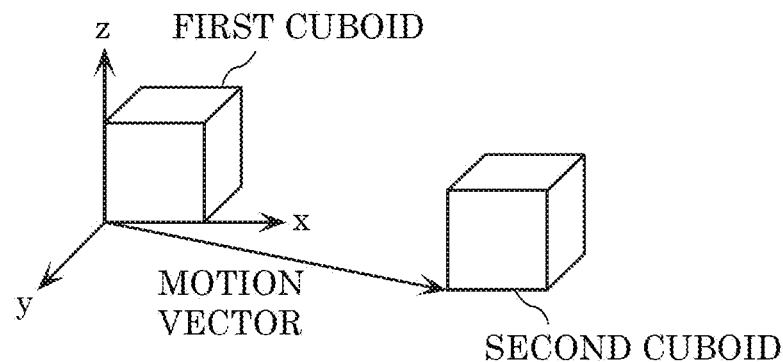
FIG. 43 is a diagram illustrating an example of inter prediction according to Embodiment 4.
FIG. 44 is a diagram illustrating a syntax example of an SPS according to Embodiment 4.
FIG. 45 is a diagram illustrating a syntax example of a GPS according to Embodiment 4.

FIG. 43 is a diagram illustrating an example of inter prediction in the three-dimensional data encoding device illustrated in FIG. 39 or 41, This also applies to inter prediction in the three-dimensional data decoding device illustrated in FIG. 40 or 42.

As illustrated in FIG. 43, the three-dimensional data encoding device sets, for example, a first cuboid that includes a current point cloud. The three-dimensional data encoding device also sets a second cuboid by translating the first cuboid. The second cuboid is a space that includes an encoded point cloud to be referred to in encoding the current point cloud. The three-dimensional data encoding device may incorporate motion vector information, which is the x, y, and z components of the translation distance between the first cuboid and the second cuboid, into the header of the frame or octree, or may incorporate the information into the header of the node information after entropy-encoding the information.

The example here illustrates the use of translation to set the space that includes the encoded point cloud to be referred to in encoding the current point cloud. Any method, however, may be employed that can uniquely set the space that includes the encoded point cloud to be referred to.

Now, an example of header information will be described. FIG. 44 is a diagram illustrating a syntax example of a sequence parameter set (SPS) in a bitstream. The SPS is control information shared by multiple frames, point clouds, or slices, and is control information shared by attribute information and geometry information.

As illustrated in FIG. 44, the SPS includes sps_inter_prediction_enabled_flag and sps_max_num_ref_frames_minus1.

The following describes a semantics example of the sequence parameter set. sps_inter_prediction_enabled_flag equal to 1 specifies that the use of inter prediction is permitted for a bitstream that refers to the SPS. sps_inter_prediction_enabled_flag equal to 0 specifies that inter prediction is invalid for a bitstream that refers to the SPS.

sps_max_num_ref_frames_minus1+1 (the value resulting from adding 1 to sps_max_num_ref_frames_minus1) specifies the maximum number of reference point cloud frames referred to by a frame. The value of sps_max_num_ref_frames_minus1 should be within the range from 0 to MaxNumRefFrames−1.

sps_max_num_ref_frames_minus1 is included in the SPS if sps_inter_prediction_enabled_flag is 1, and not included in the SPS if sps_inter_prediction_enabled_flag is 0.

FIG. 45 is a diagram illustrating a syntax example of a geometry information parameter set (GPS) in a bitstream. The GPS is control information shared by multiple frames, point clouds, or slices, and is control information for geometry information.

As illustrated in FIG. 45, the GPS includes gps_inter_prediction_enabled_flag and gps_num_ref_frames_minus1.

The following describes a semantics example of the geometry information parameter set. gps_inter_prediction_enabled_flag equal to 1 specifies that the use of inter prediction is permitted when a bitstream that refers to the GPS is decoded on a geometry information data basis, gps_inter_prediction_enabled_flag equal to 0 specifies that inter prediction is invalid when a bitstream that refers to the GPS is decoded on a geometry information data basis. If sps_inter_prediction_enabled_flag is 0, gps_inter_prediction_enabled_flag is 0.

gps_num_ref_frames_minus1+1 (the value resulting from adding 1 to gps_num_ref_frames_minus1) specifies the number of reference point cloud frames referred to by a frame that refers to the GPS. The value of gps_num_ref_frames_minus1 should be within the range from 0 to sps_max_num_ref_frames_minus1.

gps_num_ref_frames_minus1 is included in the GPS if gps_inter_prediction_enabled_flag is 1, and not included in the GPS if gps_inter_prediction_enabled_flag is 0.

As illustrated in the above examples, the three-dimensional data encoding device may notify the three-dimensional data decoding device of information indicating whether inter-prediction encoding is permitted, for example sps_inter_prediction_enabled_flag and gps_inter_prediction_enabled_flag in the sequence parameter set and the geometry information parameter set. When notifying the three-dimensional data decoding device of information indicating that inter-prediction encoding is permitted, the three-dimensional data encoding device may also notify the three-dimensional data decoding device of information on the number of frames referred to in inter-prediction encoding or the maximum value of that number, for example sps_max_num_ref_frames_minus1 or gps_num_ref_frames_minus1.

MaxNumRefFrames is a fixed value specified as a requirement to be satisfied by the three-dimensional data decoding device. This value may be set to several frames, for example 6 frames, although the value may be greater than 6 as long as both the three-dimensional data encoding device and the three-dimensional data decoding device is configured with the same value.

The above information may be notified from the three-dimensional data encoding device to the three-dimensional data decoding device. This will optimize memory allocation used for processing in the three-dimensional data decoding device.

The above information items, that is, the information indicating whether inter-prediction encoding is permitted and the information on the number of frames referred to in inter-prediction encoding or the maximum value of that number, may be stored in both or only one of the SPS and the GPS. These information items may also be stored in control information other than the SPS and the GPS.

The devices, processes, and syntaxes disclosed with reference to FIGS. 39 to 45 may be implemented in combination with at least part of other embodiments in the present disclosure. Further, some of the devices, processes, and syntaxes disclosed with reference to FIGS. 39 to 45 may be implemented in combination with other embodiments.

All the components disclosed with reference to FIGS. 39 to 45 are not necessarily essential. Rather, the devices may include only some of the components.

Figure 46:
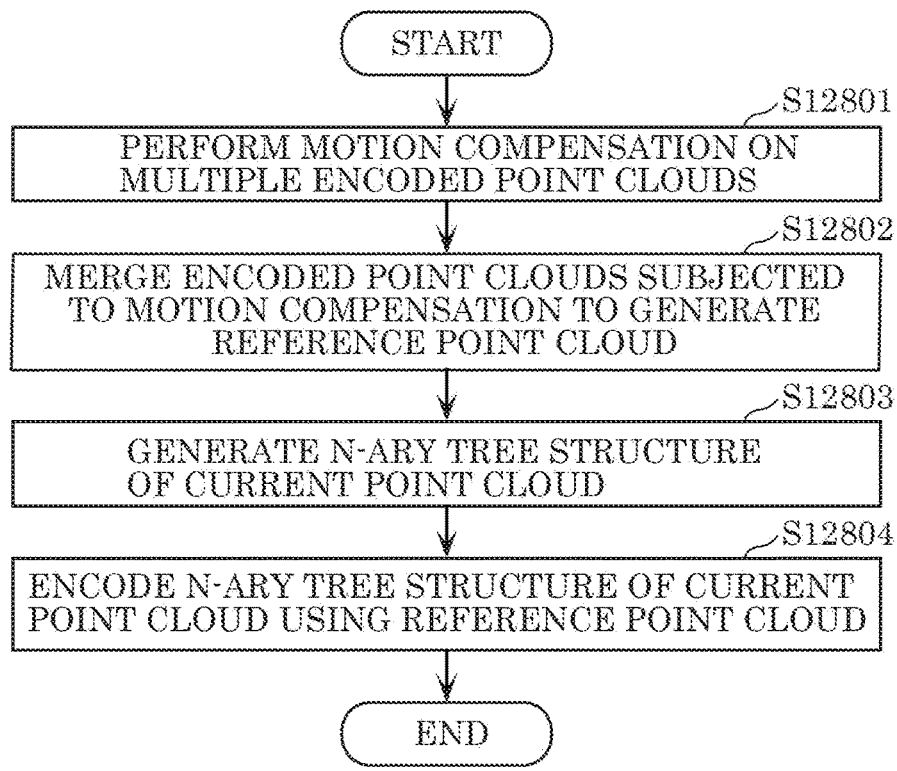
FIG. 46 is a flowchart of a three-dimensional data encoding process according to Embodiment 4.

As described above, the three-dimensional data encoding device according to the present embodiment performs the process shown in FIG. 46. The three-dimensional data encoding device performs motion compensation on a plurality of encoded point clouds (S12801). The three-dimensional data encoding device merges (synthesizes) the plurality of encoded point clouds that have been motion compensated to generate a reference point cloud (for example, the inter-reference point cloud in FIG. 41) (S12802), The three-dimensional data encoding device generates an N-ary tree structure (for example, the current octree in FIG. 41) of a current point cloud, where N is an integer greater than or equal to 2 (S12803). The three-dimensional data encoding device encodes the N-ary tree structure of the current point cloud using the reference point cloud (S12804), It should be noted that Nis, for example, 8, but may be any exponent of 2, or any other value.

Accordingly, the three-dimensional data encoding device can improve encoding efficiency by encoding a current point cloud using a reference point cloud obtained by merging a plurality of encoded point clouds.

For example, in encoding the N-ary tree structure of the current point cloud (S12804), the three-dimensional data encoding device: performs motion compensation for the current point cloud on the reference point cloud; generates an N-ary tree structure (for example, the inter-reference octree in FIG. 41) of the reference point cloud that has been motion compensated; and encodes the N-ary tree structure of the current point cloud using the N-ary tree structure of the reference point cloud.

For example, in encoding the N-ary tree structure of the current point cloud (S12804), the three-dimensional data encoding device entropy encodes the N-ary tree structure of the current point cloud; and controls a probability parameter to be used in the entropy encoding, based on the reference point cloud. For example, the three-dimensional data encoding device selects the probability parameter to be used from a plurality of probability parameters, based on the reference point cloud.

For example, the three-dimensional data encoding device: generates an encoded current point cloud from the N-ary tree structure of the current point cloud (for example, the encoded point cloud in FIG. 41); performs motion compensation for the reference point cloud on the encoded current point cloud; and merges the encoded current point cloud that has been motion compensated with the reference point cloud to update the reference point cloud.

For example, each of the plurality of encoded point clouds belongs to a different frame than the current point cloud. For example, each of the plurality of encoded point clouds belongs to a same frame as the current point cloud.

For example, the three-dimensional data encoding device stores, in control information (for example, SPS or GPS) which is common to a plurality of point clouds, first information (for example, sps_inter_prediction_enabled_flag or gps_inter_prediction_enabled_flag) indicating whether execution of encoding using the reference point cloud is permitted.

For example, the three-dimensional data encoding device stores, in the control information (for example, SPS or GPS), second information (for example, sps_max_num_ref_frames_minus1 or gps_num_ref_frames_minus1) on a total number of the plurality of encoded point clouds, when the first information indicates that the execution of the encoding using the reference point cloud is permitted. For example, the second information indicates the number of encoded point clouds to be merged or a maximum number of the encoded point clouds to be merged.

For example, the three-dimensional data encoding device includes a processor and memory, and the processor performs the above processes using the memory.

Figure 47:
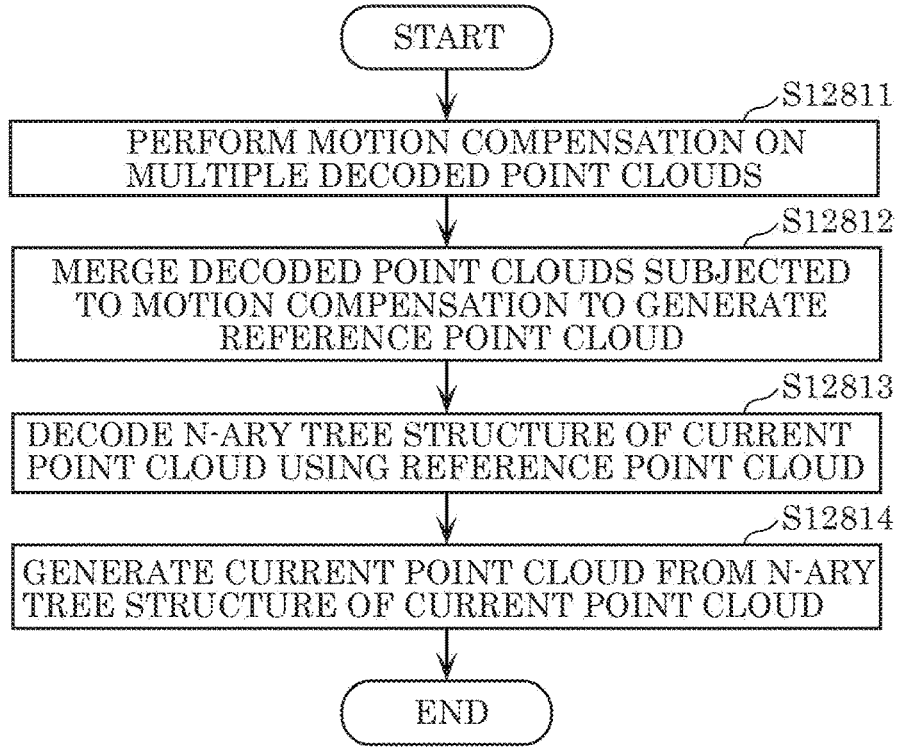
FIG. 47 is a flowchart of a three-dimensional data decoding process according to Embodiment 4.

Furthermore, the three-dimensional data decoding device performs the process shown in FIG. 47. The three-dimensional data decoding device performs motion compensation on a plurality of decoded point clouds (S12811), The three-dimensional data decoding device merges (synthesizes) the plurality of decoded point clouds that have been motion compensated, to generate a reference point cloud (for example, the inter-reference point cloud in FIG. 42) (S12812). The three-dimensional data decoding device decodes an N-ary tree structure (for example, the decoded octree in FIG. 42) of a current point cloud using the reference point cloud, where N is an integer greater than or equal to 2 (S12813). Specifically, the three-dimensional data decoding device decodes a bitstream (encoded data) generated by encoding the N-ary tree structure of the current point cloud, to obtain the N-ary tree structure of the current point cloud. The three-dimensional data decoding device generates a decoded point cloud of the current point cloud from the N-ary tree structure of the current point cloud (S12814). It should be noted that N is, for example, 8, but may be any exponent of 2, or any other value.

Accordingly, the three-dimensional data decoding device can decode the current point cloud using a reference point cloud obtained by merging a plurality of decoded point clouds.

For example, in decoding the N-ary tree structure of the current point cloud (S12813), the three-dimensional data decoding device: performs motion compensation for the current point cloud on the reference point cloud; generates an Nary tree structure (for example, the inter-reference octree in FIG. 42) of the reference point cloud that has been motion compensated; and decodes the N-ary tree structure of the current point cloud using the N-ary tree structure of the reference point cloud.

For example, in decoding the Nary tree structure of the current point cloud (S12813), the three-dimensional data decoding device: entropy decodes the Nary tree structure of the current point cloud; and controls a probability parameter to be used in the entropy decoding, based on the reference point cloud. For example, the three-dimensional data encoding device selects the probability parameter to be used from a plurality of probability parameters, based on the reference point cloud.

For example, the three-dimensional data decoding device: performs motion compensation for the reference point cloud on the decoded point cloud of the current point cloud; and merges the decoded point cloud that has been motion compensated with the reference point cloud to update the reference point cloud.

For example, each of the plurality of decoded point clouds belongs to a different frame than the current point cloud. For example, each of the plurality of decoded point clouds belongs to a same frame as the current point cloud.

For example, the three-dimensional data decoding device obtains, from control information (for example, SPS or GPS) which is common to a plurality of point clouds, first information (for example, sps_inter_prediction_enabled_flag or gps_inter_prediction_enabled_flag) indicating whether execution of decoding using the reference point cloud is permitted.

For example, the three-dimensional data decoding device obtains, from the control information (for example, SPS or GPS), second information (for example, sps_max_num_ref_frames_minus1 or gps_num_ref_frames_minus1) on a total number of the plurality of decoded point clouds, when the first information indicates that the execution of the decoding using the reference point cloud is permitted. For example, the second information indicates the number of decoded point clouds to be merged or a maximum number of the encoded point clouds to be merged.

For example, the three-dimensional data decoding device includes a processor and memory, and the processor performs the above processes using the memory.

Embodiment 5

In the present embodiment, the case where one of inter prediction and intra prediction is performed on geometry information of a point cloud (point cloud) in a switching manner will be described.

Figure 48:
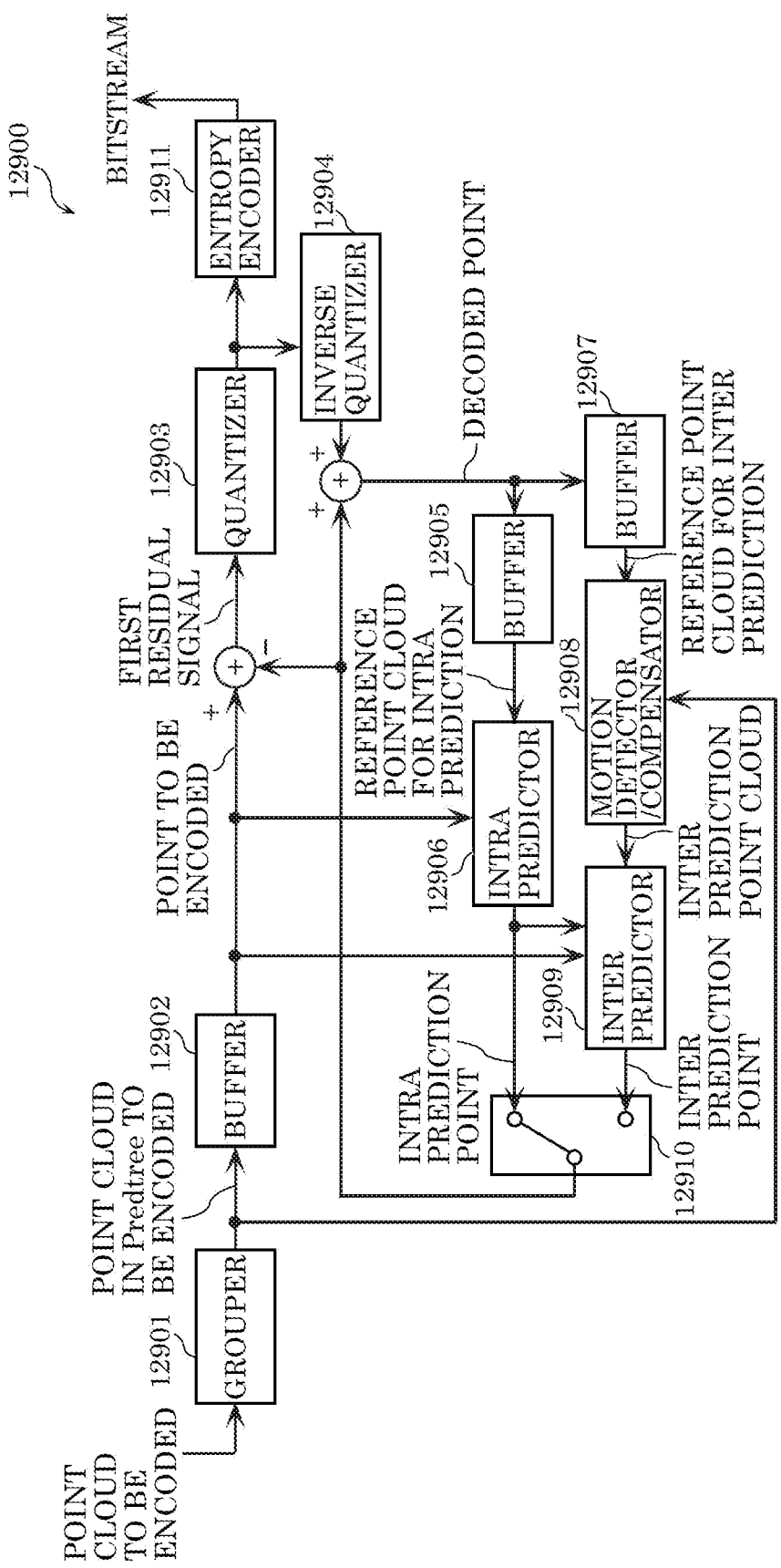
FIG. 48 is a block diagram of a three-dimensional data encoding device according to Embodiment 5.

FIG. 48 is a block diagram of three-dimensional data encoding device 12900 according to the present embodiment. FIG. 48 illustrates processors relating to encoding geometry information (geometry) of a point cloud. However; three-dimensional data encoding device 12900 may include other processors such as processors that performs encoding or the like of attribute information of the point cloud. In inter prediction and intra prediction, a point cloud to be encoded is encoded while an encoded point cloud is referred to.

Three-dimensional data encoding device 12900 includes grouper 12901, buffer 12902, quantizer 12903, inverse quantizer 12904, buffer 12905, intra predictor 12906, buffer 12907, motion detector/compensator 12908, inter predictor 12909, switches 12910, and entropy encoder 12911.

From a target point cloud which is data of an input point cloud to be encoded, grouper 12901 extracts a point cloud to be a prediction tree (Predtree) which is a unit for encoding and sets the point cloud as one group. In the input target point clouds, a position of a point cloud is represented by three-dimensional coordinates (e.g., x, y, z). Buffer 12902 retains a generated prediction tree. For example, buffer 12902 may initialize retained data for each prediction tree. Three-dimensional points included in a prediction tree (Predtree) retained in buffer 12902 are subjected one by one to a process of encoding. The three-dimensional coordinates may be represented by Cartesian coordinates or may be expressed by polar coordinates. Hereinafter, geometry information represented by Cartesian coordinates will be referred to as Cartesian-coordinate geometry information, and geometry information represented by polar coordinates will be referred to as polar-coordinate geometry information.

Then, a difference (first residual signal) between each of the three-dimensional points included in the prediction tree (Predtree) and a selected prediction point is calculated. This first residual signal will be referred to also as a prediction residual. The first residual signal is an example of a first residual.

Quantizer 12903 quantizes the first residual signal. Entropy encoder 12911 entropy encodes the quantized first residual signal to generate encoded data and outputs (generates) a bitstream including the encoded data.

Inverse quantizer 12904 inverse quantizes the first residual signal quantized by quantizer 12903. The inverse quantized first residual signal is added to a predicted value based on the selected prediction point (one or more candidate points) to be decoded as a three-dimensional point (reference point) to be used in the intra prediction and the inter prediction. The predicted value is calculated based on geometry information of one or more candidate points as described in the embodiment. Buffer 12905 retains a decoded reference point cloud for the intra prediction. For example, buffer 12905 may initialize retained data for each prediction tree (target point cloud). Buffer 12907 retains a reference point cloud for the inter prediction. For example, buffer 12907 may initialize retained data for each prediction tree (target point cloud).

Intra predictor 12906 determines an intra prediction point to be used in the prediction by a predetermined method while referring to information in a prediction tree (Predtree) including a current three-dimensional point to be encoded, such as three-dimensional points included in the prediction tree (the reference point cloud for the intra prediction). For example, intra predictor 12906 may determine the intra prediction point by, for example, extrapolation using two three-dimensional points (decoded points) that are inverse quantized immediately before the current three-dimensional point (e.g., an ancestor node in the prediction tree such as a parent node).

Motion detector/compensator 12908 generates an inter prediction point cloud which is a reference point cloud for the inter prediction after alignment, by reproducing the encoded point cloud based on the three-dimensional points (decoded points) included in the prediction tree (Predtree) including the current three-dimensional point, detecting a displacement between the encoded point cloud and the point cloud to be encoded (motion detection), and correcting the encoded point cloud based on the detected displacement (motion compensation).

Based on the inter prediction point cloud subjected to the motion compensation, inter predictor 12909 determines an inter prediction point to be used in the prediction, by a predetermined method. For example, from the inter prediction point cloud, inter predictor 12909 may select a point nearest to the intra prediction point as the inter prediction point or may select, without reference to the intra prediction point, a three-dimensional point (e.g., a three-dimensional point nearest to a three-dimensional point encoded immediately before the current three-dimensional point) in the vicinity of a three-dimensional point encoded immediately before the current three-dimensional point (or encoded last) (e.g., a three-dimensional point corresponding to an ancestor node in the prediction tree such as a parent node).

Switcher 12910 determines a prediction point to be used in the prediction by selecting one of the intra prediction point and the inter prediction point. In this manner, three-dimensional data encoding device 12900 determines geometry information of one or more candidate points from among encoded three-dimensional points as a prediction point and calculates a predicted value based on the prediction point. Intra predictor 12906 and inter predictor 12909 determines a prediction point (an intra prediction point or an inter prediction point) based on a three-dimensional point encoded immediately before the current three-dimensional point. In other words, three-dimensional data encoding device 12900 determines one or more candidate points for calculating the predicted value based on one or more base points from among the encoded three-dimensional points. The one or more base points are three-dimensional points to be encoded immediately before the current three-dimensional point and may be, for example, a three-dimensional point corresponding to a parent node (ancestor node) of one three-dimensional point to be encoded in the prediction tree.

It should be noted that three-dimensional data encoding device 12900 may select one of the intra prediction point and the inter prediction point as the prediction point under a procedure illustrated in a flowchart in FIG. 50 described later. Information relating to the prediction (prediction information) as to whether to select one of the intra prediction point and the inter prediction point as the prediction point may be entropy encoded and written in a header part of each three-dimensional point or may be written in such a manner as to be interleaved between three-dimensional points. Information relating to the motion compensation such as motion vectors may be written in a header part of a frame or a prediction tree (Predtree), may be entropy encoded and written in a header part of each three-dimensional point, or may be written in such a manner as to be interleaved between three-dimensional points. The reference point cloud for the inter prediction may be a point cloud included in an encoded frame different from a frame to be encoded or may be an encoded point cloud included in the same frame as the frame to be encoded.

In this manner, three-dimensional data encoding device 12900 predicts a point to be encoded using the inter prediction in addition to the intra prediction, so that there is a possibility that an amount of information of a first residual signal to be entropy encoded can be reduced, and thus coding efficiency can be improved.

It should be noted that three-dimensional data encoding device 12900 need not always refer to an inter prediction point. Three-dimensional data encoding device 12900 may perform the encoding based only on information of a point cloud to be encoded by, for example, initializing buffer 12907 storing a reference point cloud for the inter prediction at predetermined time intervals (e.g., every 1 second, etc.), at predetermined frame intervals (e.g., every 30 frames, etc.), or at any timing for notifying a three-dimensional data decoding device. Accordingly, the corresponding three-dimensional data decoding device is enabled to start a jump playback from a point cloud that is not a beginning of a bitstream and for which an inter prediction point is not referred to, so that there is a possibility that random accessibility or error tolerance of the bitstream can be improved.

In a case where three-dimensional data encoding device 12900 has coordinates of an input point cloud to be encoded represented by Cartesian coordinates as geometry information, three-dimensional data encoding device 12900 encodes the geometry information indicated by the coordinates represented by Cartesian coordinates. In a case where three-dimensional data encoding device 12900 has coordinates of an input point cloud to be encoded represented by polar coordinates as geometry information, three-dimensional data encoding device 12900 encodes the geometry information indicated by the coordinates represented by polar coordinates.

Figure 49:
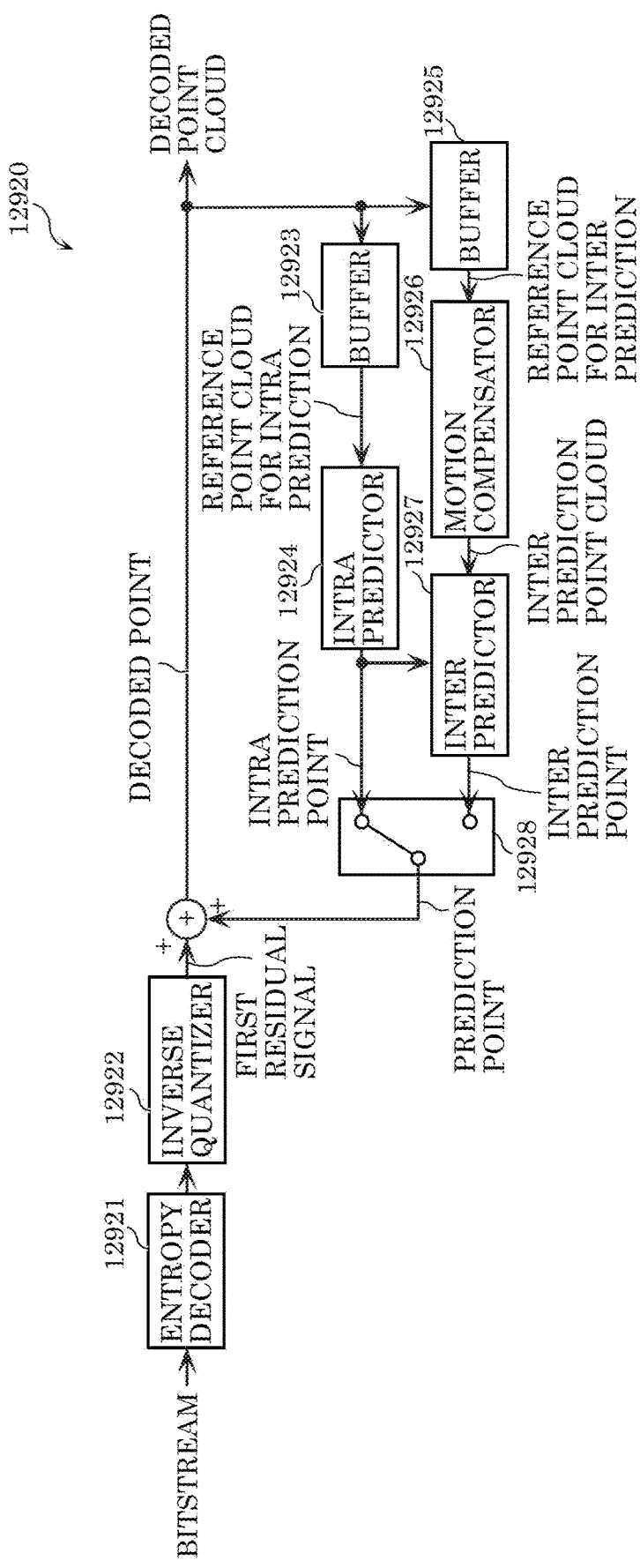
FIG. 49 is a block diagram of a three-dimensional data decoding device according to Embodiment 5.

FIG. 49 is a block diagram of three-dimensional data decoding device 12920 according to the present embodiment. FIG. 49 illustrates processors relating to decoding geometry information (geometry) of a point cloud. However, three-dimensional data decoding device 12920 may include other processors such as processors that perform decoding or the like of attribute information of the point cloud. Three-dimensional data decoding device 12920 performs inter prediction decoding, in which a point cloud to be decoded is decoded while a decoded point cloud is referred to. For example, three-dimensional data decoding device 12920 decodes a bitstream generated by three-dimensional data encoding device 12900 illustrated in FIG. 48.

Three-dimensional data decoding device 12920 includes entropy decoder 12921, inverse quantizer 12922, buffer 12923, intra predictor 12924, buffer 12925, motion compensator 12926, inter predictor 12927, and switcher 12928.

Three-dimensional data decoding device 12920 obtains a bitstream generated by three-dimensional data encoding device 12900.

Entropy decoder 12921 entropy decodes the input bitstream for each three-dimensional point in a prediction tree (Predtree) to generate a quantized first residual signal. Inverse quantizer 12922 inverse quantizes the quantized first residual signal to reproduce the first residual signal. The first residual signal for each three-dimensional point is added to a predicted value based on a prediction point corresponding to the three-dimensional point and then generated (output) as a decoded point. In other words, three-dimensional data decoding device 12920 adds the predicted value and the prediction residual together to calculate geometry information of one three-dimensional point to be decoded.

Buffer 12923 retains the generated decoded points as a reference point cloud for intra prediction. For example, buffer 12923 may initialize retained data for each prediction tree (target point cloud). Buffer 12925 retains the generated decoded points as a reference point cloud for inter prediction. For example, buffer 12925 may initialize retained data for each prediction tree (target point cloud).

Intra predictor 12924 determines an intra prediction point to be used in the prediction by a predetermined method while referring to information in a prediction tree (Predtree) including a current three-dimensional point to be decoded, such as three-dimensional points included in the prediction tree (the reference point cloud for the intra prediction), For example, intra predictor 12924 may determine the intra prediction point by, for example, extrapolation using two three-dimensional points (decoded points) that are inverse quantized immediately before the current three-dimensional point (e.g., an ancestor node in the prediction tree such as a parent node).

Motion compensator 12926 generates an inter prediction point cloud which is a reference point cloud for the inter prediction after alignment, by reproducing the decoded point cloud based on the three-dimensional points (decoded points) included in the prediction tree (Predtree) including the current three-dimensional point and correcting a displacement between the decoded point cloud and the point cloud to be decoded (motion compensation).

Based on the inter prediction point cloud subjected to the motion compensation, inter predictor 12927 determines an inter prediction point to be used in the prediction, by a predetermined method. For example, from the inter prediction point cloud, inter predictor 12927 may select a point nearest to the intra prediction point as the inter prediction point or may select, without reference to the intra prediction point, a three-dimensional point (e.g., a three-dimensional point nearest to a three-dimensional point decoded immediately before the current three-dimensional point) in the vicinity of a three-dimensional point decoded immediately before the current three-dimensional point (e.g., a three-dimensional point corresponding to an ancestor node an the prediction tree such as a parent node).

Switcher 12928 determines a prediction point to be used in the prediction by selecting one of the intra prediction point and the inter prediction point. In this manner, three-dimensional data decoding device 12920 determines geometry information of one or more candidate points from among decoded three-dimensional points as a prediction point and calculates a predicted value based on the prediction point. Intra predictor 12924 and inter predictor 12927 determines a prediction point (an intra prediction point or an inter prediction point) based on a three-dimensional point decoded immediately before the current three-dimensional point. In other words, three-dimensional data decoding device 12920 determines one or more candidate points for calculating the predicted value based on one or more base points from among the decoded three-dimensional points. The one or more base points are three-dimensional points to be encoded immediately before the current three-dimensional point and may be, for example, a three-dimensional point corresponding to a parent node (ancestor node) of one three-dimensional point to be decoded in the prediction tree.

It should be noted that three-dimensional data decoding device 12920 may select one of the intra prediction point and the inter prediction point as the prediction point under a procedure illustrated in a flowchart in FIG. 51 described later, Three-dimensional data decoding device 12920 may select one of the intra prediction point and the inter prediction point as the prediction point based on information relating to the prediction (prediction information) as to whether to select one of the intra prediction point and the inter prediction point as the prediction point. The prediction information may be entropy encoded and written in a header part of each three-dimensional point or may be written in such a manner as to be interleaved between three-dimensional points. Information relating to the motion compensation such as motion vectors may be written in a header part of a frame or a prediction tree (Predtree), may be entropy encoded and written in a header part of each point, or may be written in such a manner as to be interleaved between three-dimensional points. In this manner, three-dimensional data decoding device 12920 may be notified of the prediction information or the information relating to the motion compensation by corresponding three-dimensional data encoding device 12900. The reference point cloud for the inter prediction may be a point cloud included in an encoded frame different from a frame to be encoded or may be an encoded point cloud included in the same frame as the frame to be encoded.

In this manner, three-dimensional data decoding device 12920 predicts a point to be decoded using the inter prediction in addition to the intra prediction, thereby being capable of decoding a point cloud from a bitstream that is encoded while a decoded point cloud is referred to (e.g., the bitstream output from three-dimensional data encoding device 12900 in FIG. 48).

It should be noted that three-dimensional data decoding device 12920 need not always refer to an inter prediction point. Three-dimensional data decoding device 12920 may perform the decoding based only on information of a point cloud to be decoded by, for example, initializing buffer 12925 storing a reference point cloud for the inter prediction at predetermined time intervals (e.g., every 1 second, etc.), at predetermined frame intervals (e.g., every 30 frames, etc.), or at any timing for being notified by corresponding three-dimensional data encoding device 12900. Accordingly, three-dimensional data decoding device 12920 is enabled to start a jump playback from a point cloud that is not a beginning of a bitstream and for which an inter prediction point is not referred to, so that there is a possibility that random accessibility or error tolerance of the bitstream can be improved.

In a case where a bitstream has encoded data into which geometry information indicated by coordinates represented by Cartesian coordinates is encoded, three-dimensional data decoding device 12920 decodes the geometry information indicated by the coordinates represented by Cartesian coordinates. In a case where a bitstream has encoded data into which geometry information indicated by coordinates represented by polar coordinates is encoded, three-dimensional data decoding device 12920 decodes the geometry information indicated by the coordinates represented by polar coordinates.

Figure 50:
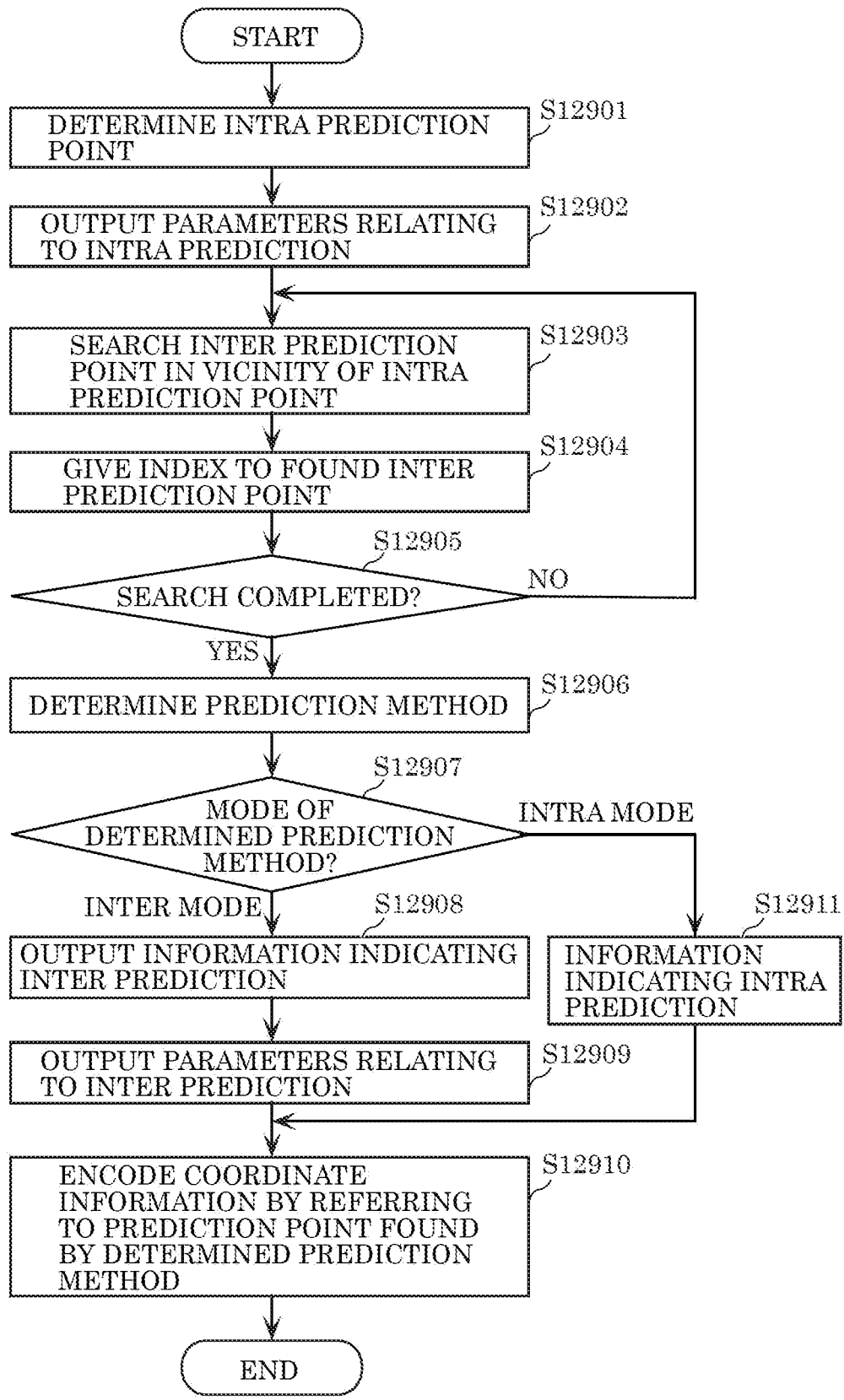
FIG. 50 is a flowchart illustrating an example of a procedure of encoding each three-dimensional point in a prediction tree according to Embodiment 5.

FIG. 50 is a flowchart illustrating an example of a procedure of encoding each three-dimensional point in a prediction tree (Predtree) by three-dimensional data encoding device 12900.

In this example, three-dimensional data encoding device 12900 first determines an intra prediction point from a reference point cloud for intra prediction (S12901). Three-dimensional data encoding device 12900 may determine the intra prediction point using, for example, a method for determining a prediction point using a prediction tree disclosed in the embodiment already described. For example, three-dimensional data encoding device 12900 may generate a prediction tree using encoded three-dimensional points and select one or more candidate points from the encoded three-dimensional points based on the prediction tree. Three-dimensional data encoding device 12900 may determine, as the intra prediction point, a prediction point that gives the smallest code amount from among at least one intra prediction point that is determined by at least one of the methods described above. Three-dimensional data encoding device 12900 may determine, as the intra prediction point, a prediction point that gives the smallest sum of absolute values (or sum of squares) of coordinate residuals from among at least one intra prediction point that is determined by at least one of the methods described above.

Next, three-dimensional data encoding device 12900 outputs parameters relating to intra prediction (S12902). In a case where the number of candidates for the methods for determining an intra prediction point determined in step S12901 is two or more, three-dimensional data encoding device 12900 may output, to a bitstream, information of a selected candidate for the determining method as the parameters relating to intra prediction.

Next, three-dimensional data encoding device 12900 determines an inter prediction point by referring to at least one candidate point that is extracted from an inter prediction point cloud. For example, three-dimensional data encoding device 12900 may determine one candidate point as the inter prediction point or may determine, as the inter prediction point, a prediction point having coordinates that are average values of sets of coordinates of candidate points. Alternatively, three-dimensional data encoding device 12900 may determine, as the inter prediction point, a prediction point having coordinates that are average values of sets of coordinates of the intra prediction point and at least one candidate point.

Here, as the at least one candidate point, three-dimensional data encoding device 12900 may search for a point that is positioned in the vicinity of the intra prediction point (S12903).

Next, three-dimensional data encoding device 12900 may give index values to at least one determined inter prediction point in such a manner that a smaller index value is given to an inter prediction point nearer to the intra prediction point (S12904).

Next, three-dimensional data encoding device 12900 determines whether the search has completed (S12905). In a case where the search has completed (Yes in S12905), the procedure proceeds to next step S12906, and in a case where the search has not completed (No in S12905), the procedure returns to step S12903. The completion may be determined by finding a predetermined number of inter prediction points, may be determined by completion of a search of the entire point cloud within a predetermined range, or may be determined by satisfaction of one of finding the predetermined number of inter prediction points and the completion of a search of the entire point cloud within the predetermined range.

Next, three-dimensional data encoding device 12900 determines a prediction method (S12906). Specifically, three-dimensional data encoding device 12900 determines the intra prediction or the inter prediction as a method for determining a prediction point. In other words, three-dimensional data encoding device 12900 determines which of the intra prediction point and the inter prediction point is determined as the prediction point. For example, three-dimensional data encoding device 12900 may determine, as the prediction method, a method for predicting a prediction point that gives a smaller code amount from between the intra prediction point and the inter prediction point, Three-dimensional data encoding device 12900 may determine, as the prediction method, a method for predicting a prediction point that gives a smaller sum of absolute values (or sum of squares) of coordinate residuals from between the intra prediction point and the inter prediction point.

Three-dimensional data encoding device 12900 determines whether a mode of the determined prediction method is an inter mode indicating that the prediction method is the inter prediction or an intra prediction mode indicating that the prediction method is the intra prediction (S12907).

In a case where the determined prediction method is the inter prediction (inter mode in S12907), three-dimensional data encoding device 12900 outputs identification information indicating that an inter prediction point is determined as a prediction point (e.g., flag) to the bitstream (S12908).

Next, three-dimensional data encoding device 12900 outputs, to the bitstream, information of the number of candidate points to be used for determining coordinates of the inter prediction point, index values of the candidate points to be used, and the like, as parameters relating to inter prediction (S12909). The index values may be assigned to one or more candidate points to be used for determining the predicted value.

In a case where the determined method for the prediction is the intra prediction (intra mode in S12907), three-dimensional data encoding device 12900 outputs identification information indicating that an intra prediction point is determined as the prediction point (e.g., flag) to the bitstream (S12911). The items of identification information in step S12908 and step S12911 are items of information indicating which of the inter prediction point and the intra prediction point is determined as the prediction point.

After step S12909 or step S12911, three-dimensional data encoding device 12900 encodes coordinate information of a current three-dimensional point to be encoded by referring to the prediction point found by the determined prediction method (S12910).

In this manner, three-dimensional data encoding device 12900 determines at least one inter prediction point by referring to the inter prediction point cloud and the intra prediction point, determines the method for finding the prediction point from the intra prediction point and the inter prediction point, and encodes geometry information (coordinate information) of the current three-dimensional point by referring to the prediction point.

Three-dimensional data encoding device 12900 may be configured, in S12903, to search for the inter prediction point, without referring to the intra prediction point, in the vicinity of a three-dimensional point that is uniquely determined independently of the parameters relating to intra prediction, such as a three-dimensional point encoded immediately before the current three-dimensional point (e.g., a three-dimensional point corresponding to an ancestor node in the prediction tree such as a parent node). In this case, three-dimensional data encoding device 12900 may be configured not to perform S12902 immediately after S12901 but to perform S12902 immediately after S12911.

Figure 51:
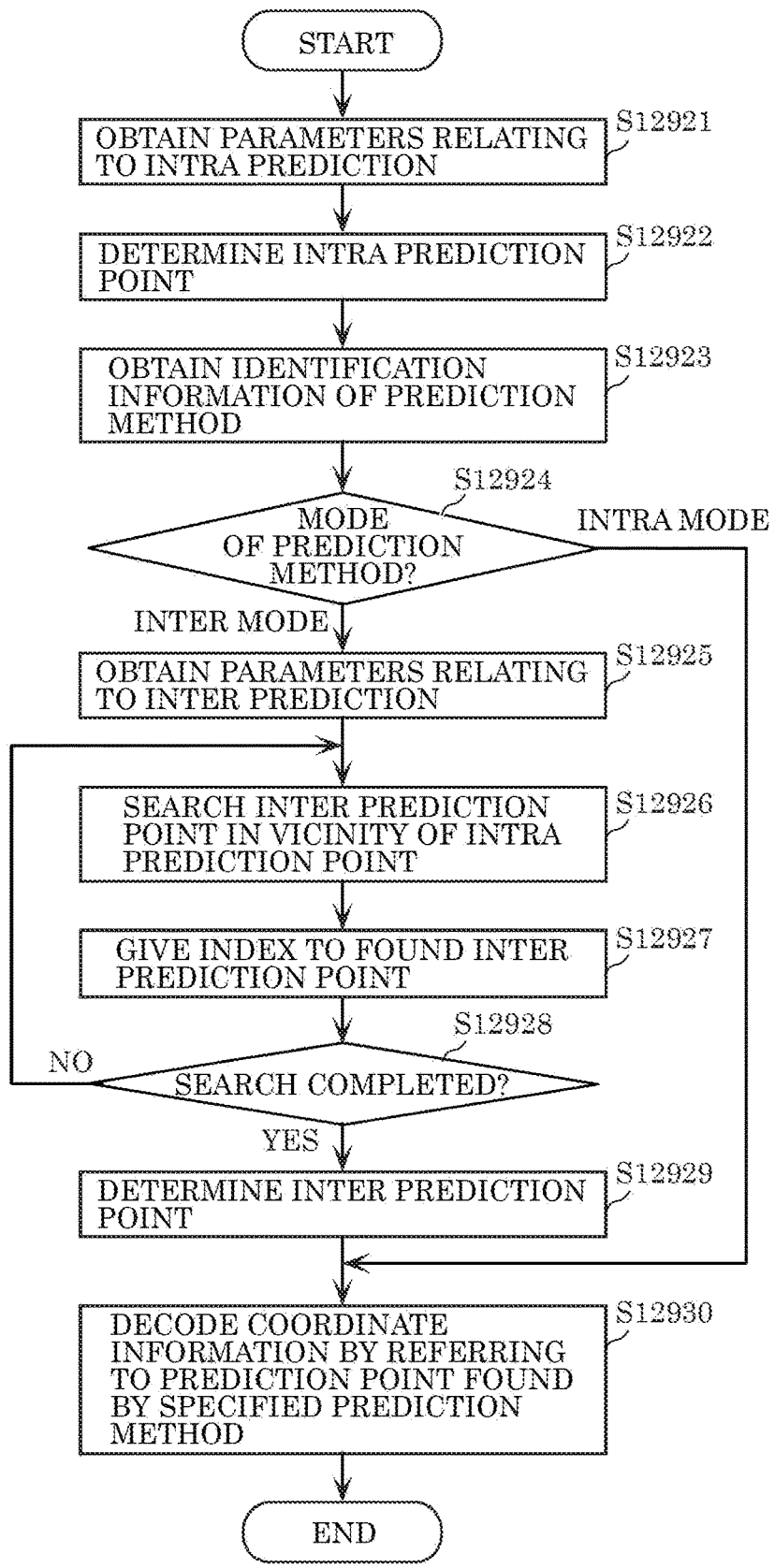
FIG. 51 is a flowchart illustrating an example of a procedure of decoding each three-dimensional point in a prediction tree according to Embodiment 5.

FIG. 51 is a flowchart illustrating an example of a procedure of decoding each three-dimensional point in a prediction tree (Predtree) by three-dimensional data decoding device 12920. FIG. 51 provides decoding of a bitstream that is generated under the procedure of encoding in FIG. 50. In other words, the bitstream includes encoded first residual signals (prediction residuals) and index values that are assigned to candidate points to be used for calculating a predicted value.

In this example, three-dimensional data decoding device 12920 first obtains the parameters relating to intra prediction from the bitstream (S12921).

Next, based on the parameters relating to intra prediction, three-dimensional data decoding device 12920 determines an intra prediction point (S12922). Specifically, three-dimensional data decoding device 12920 determines the intra prediction point by the same method as step S12901 in FIG. 50. Three-dimensional data decoding device 12920 is notified of the parameters relating to intra prediction by corresponding three-dimensional data encoding device 12900 and determines the intra prediction point based on the parameters relating to intra prediction. The parameters relating to intra prediction are obtained in step S12921 and include information for specifying at least one method for determining the intra prediction point and a parameter accompanying the information.

Next, three-dimensional data decoding device 12920 obtains identification information indicating a mode of the prediction method from the bitstream (S12923).

Next, three-dimensional data decoding device 12920 determines whether the obtained identification information indicates the inter mode indicating that the prediction method is the inter prediction or the intra prediction mode indicating that the prediction method is the intra prediction (S12924).

In a case where the prediction method is the inter prediction (inter mode in S12924), three-dimensional data decoding device 12920 obtains parameters relating to inter prediction from the bitstream (S12925).

Next, three-dimensional data decoding device 12920 performs processes for determining an inter prediction point (S12926 to S12929). Specifically, three-dimensional data decoding device 12920 determines the inter prediction point by the same method as steps S12903 to S12905 in FIG. 50. For example, three-dimensional data decoding device 12920 determines the inter prediction point by referring to at least one candidate point that is extracted from an inter prediction point cloud. For example, three-dimensional data decoding device 12920 may determine one candidate point as the inter prediction point or may determine, as the inter prediction point, a prediction point having coordinates that are average values of sets of coordinates of candidate points. Alternatively, three-dimensional data decoding device 12920 may determine, as the inter prediction point, a prediction point having coordinates that are average values of sets of coordinates of the intra prediction point and at least one candidate point.

Here, as the at least one candidate point, three-dimensional data decoding device 12920 may search for a point that is positioned in the vicinity of the intra prediction point (S12926).

Next, three-dimensional data decoding device 12920 may give index values to at least one determined inter prediction point in such a manner that a smaller index value is given to an inter prediction point nearer to the intra prediction point (S12927).

Next, three-dimensional data decoding device 12920 determines whether the search has completed (S12928). In a case where the search has completed (Yes in S12928), the procedure proceeds to next step S12929, and in a case where the search has not completed (No in S12928), the procedure returns to step S12926. The completion may be determined by finding a predetermined number of inter prediction points, may be determined by completion of a search of the entire point cloud within a predetermined range, or may be determined by satisfaction of one of finding the predetermined number of inter prediction points and the completion of a search of the entire point cloud within the predetermined range.

Next, three-dimensional data decoding device 12920 determines the inter prediction point based on the parameters relating to inter prediction while referring to the inter prediction point cloud and the intra prediction point (S12929). For example, three-dimensional data decoding device 12920 determines the inter prediction point by identifying candidate points to be used for determining coordinates of the inter prediction point based on the information of the number of candidate points to be used for determining coordinates of the inter prediction point and the index values assigned to the candidate points to be used that are included in the parameters relating to inter prediction and by determining coordinates of the inter prediction point using the identified candidate points. In other words, three-dimensional data decoding device 12920 selects one candidate point from decoded three-dimensional points based on the index values included in the bitstream.

After step S12929 or in a case of the intra mode in step S12924, three-dimensional data decoding device 12920 decodes geometry information (coordinate information) of a current three-dimensional point to be decoded by referring to the prediction point found by the specified prediction method (S12930).

In this manner, in the case where the prediction method is the inter prediction, three-dimensional data decoding device 12920 decodes the coordinate information of the point to be decoded by referring to the inter prediction point, and in the case where the prediction method is the intra prediction, three-dimensional data decoding device 12920 decodes the coordinate information of the point to be decoded by referring to the intra prediction point.

Three-dimensional data decoding device 12920 may be configured, in S12926, to search for the inter prediction point, without referring to the intra prediction point, in the vicinity of a three-dimensional point that is uniquely determined independently of the parameters relating to intra prediction, such as a three-dimensional point decoded immediately before the current three-dimensional point (e.g., a three-dimensional point corresponding to an ancestor node in the prediction tree such as a parent node), In this case, three-dimensional data decoding device 12920 may be configured to perform S12921 and S12922 not immediately before S12923 but in the case where the intra mode is determined in S12924.

Figure 52:
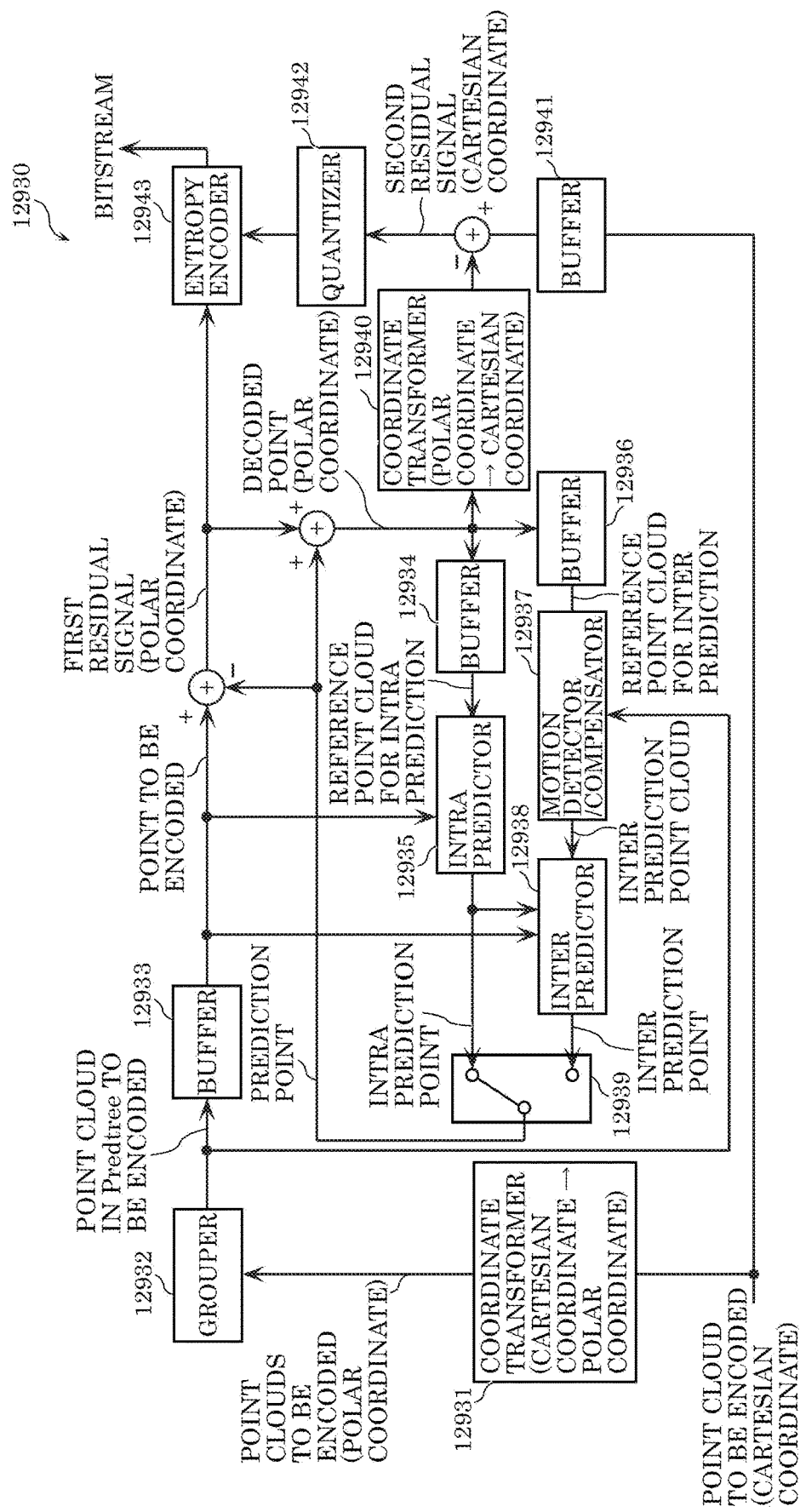
FIG. 52 is a block diagram of a three-dimensional data encoding device according to a variation of Embodiment 5.

FIG. 52 is a block diagram of three-dimensional data encoding device 12930 according to a variation of the present embodiment. FIG. 52 illustrates processors relating to encoding geometry information (geometry) of a point cloud. However, three-dimensional data encoding device 12930 may include other processors such as processors that performs encoding or the like of attribute information of the point cloud. In inter prediction and intra prediction, a point cloud to be encoded is encoded while an encoded point cloud is referred to. Compared with three-dimensional data encoding device 12900 in FIG. 48, three-dimensional data encoding device 12930 differs in its configuration and operation in that coordinate transformer 12931 for transforming a point cloud having items of geometry information represented by Cartesian coordinates to items of geometry information represented by polar coordinates and encoding the items of geometry information represented by polar coordinates is included, in that a prediction residual of geometry information represented by polar coordinates (a first residual signal) is not quantized, and in that a second residual signal in Cartesian coordinates, which is equivalent to an error that occurs in transformation between Cartesian coordinates and polar coordinates. At the same time, compared with three-dimensional data encoding device 12900, three-dimensional data encoding device 12930 is the same in its configuration and operation in regards other than the regards described above.

Three-dimensional data encoding device 12930 includes coordinate transformer 12931, grouper 12932, buffer 12933, buffer 12934, intra predictor 12935, buffer 12936, motion detector/compensator 12937, inter predictor 12938, switcher 12939, coordinate transformer 12940, buffer 12941, quantizer 12942, and entropy encoder 12943.

Coordinate transformer 12931 transforms a coordinate system of geometry information of a target point cloud which is data of an input point cloud to be encoded from a Cartesian coordinate system to a polar coordinate system. In other words, coordinate transformer 12931 transforms a coordinate system of Cartesian-coordinate geometry information of one three-dimensional point to be encoded to generate polar-coordinate geometry information. The point cloud to be encoded that is transformed in polar coordinates is output to grouper 12932.

From the target point cloud being the point cloud to be encoded that is transformed in polar coordinates grouper 12932 extracts a point cloud to be a prediction tree (Predtree) which is a unit for encoding, and sets the point cloud as one group. Buffer 12933 retains a generated prediction tree. For example, buffer 12933 may initialize retained data for each prediction tree. Three-dimensional points included in a prediction tree (Predtree) retained in buffer 12933 are subjected one by one to a process of encoding.

A difference between each of three-dimensional points included in the prediction tree retained in buffer 12933 (each point to be encoded) and a prediction point selected for the point to be encoded (first residual signal) is calculated. The first residual signal is a residual signal of geometry information represented in polar coordinates. The first residual signal will be referred to also as a prediction residual. The first residual signal is an example of a first residual. Since items of geometry information of the three-dimensional points retained in buffer 12933 are transformed into the polar coordinate system, the first residual is a difference between a transformed polar-coordinate geometry information and a predicted value.

Then, the first residual signal and the prediction point are added together and retained in buffers 12934 and 12936 as a decoded point subjected to the encoding process. Geometry information of the decoded point retained in buffers 12934 and 12936 is represented by polar coordinates. In this regard, buffers 12934 and 12936 differ in function from buffers 12905 and 12907 but are the same in function as buffers 12905 and 12907 in other respects, respectively.

Likewise, intra predictor 12935, motion detector/compensator 12937, inter predictor 12938, and switcher 12939 differ in function from intra predictor 12906, motion detector/compensator 12908, inter predictor 12909, and switcher 12910 in that geometry information of a three-dimensional point to be processed is represented by polar coordinates but are the same in function as intra predictor 12906, motion detector/compensator 12908, inter predictor 12909, and switcher 12910 in other respects, respectively.

Coordinate transformer 12940 obtains the same decoded point as the decoded point retained in buffers 12934 and 12936 and transforms a coordinate system of geometry information of the obtained decoded point from the polar coordinate system to the Cartesian coordinate system. In other words, coordinate transformer 12940 inversely transforms the coordinate system of the polar-coordinate geometry information transformed by coordinate transformer 12931 to generate Cartesian-coordinate geometry information.

Buffer 12941 retains the geometry information of the three-dimensional point that is input into three-dimensional data encoding device 12930 and represented by Cartesian coordinates.

Then, a difference (second residual signal) between the input Cartesian-coordinate geometry information and the Cartesian-coordinate geometry information of which the coordinate system is transformed from the polar coordinate system to the Cartesian coordinate system by coordinate transformer 12940 is calculated. The second residual signal is an example of a second residual. In other words, the second residual signal is a difference between the Cartesian-coordinate geometry information that is not subjected to coordinate transformation by coordinate transformer 12931 and the geometry information that is once transformed to polar coordinates and further inversely transformed to the Cartesian coordinate system. The second residual signal is a transformation error occurring in the coordinate transformation.

Quantizer 12942 quantizes the second residual signal.

Entropy encoder 12943 entropy encodes the first residual signal and the quantized second residual signal to generate items of encoded data and outputs a bitstream including the items of encoded data.

In this manner, three-dimensional data encoding device 12930 transforms a coordinate system of geometry information of a three-dimensional point from the Cartesian coordinate system to the polar coordinate system and encodes polar-coordinate geometry information. Accordingly, in a case where a point cloud generated by obtaining a three-dimensional position of a neighbor object with respect to a sensor position, as in LiDAR, is encoded, an accuracy of predicting a point to be encoded can be improved, so that there is a possibility that coding efficiency can be improved.

Figure 53:
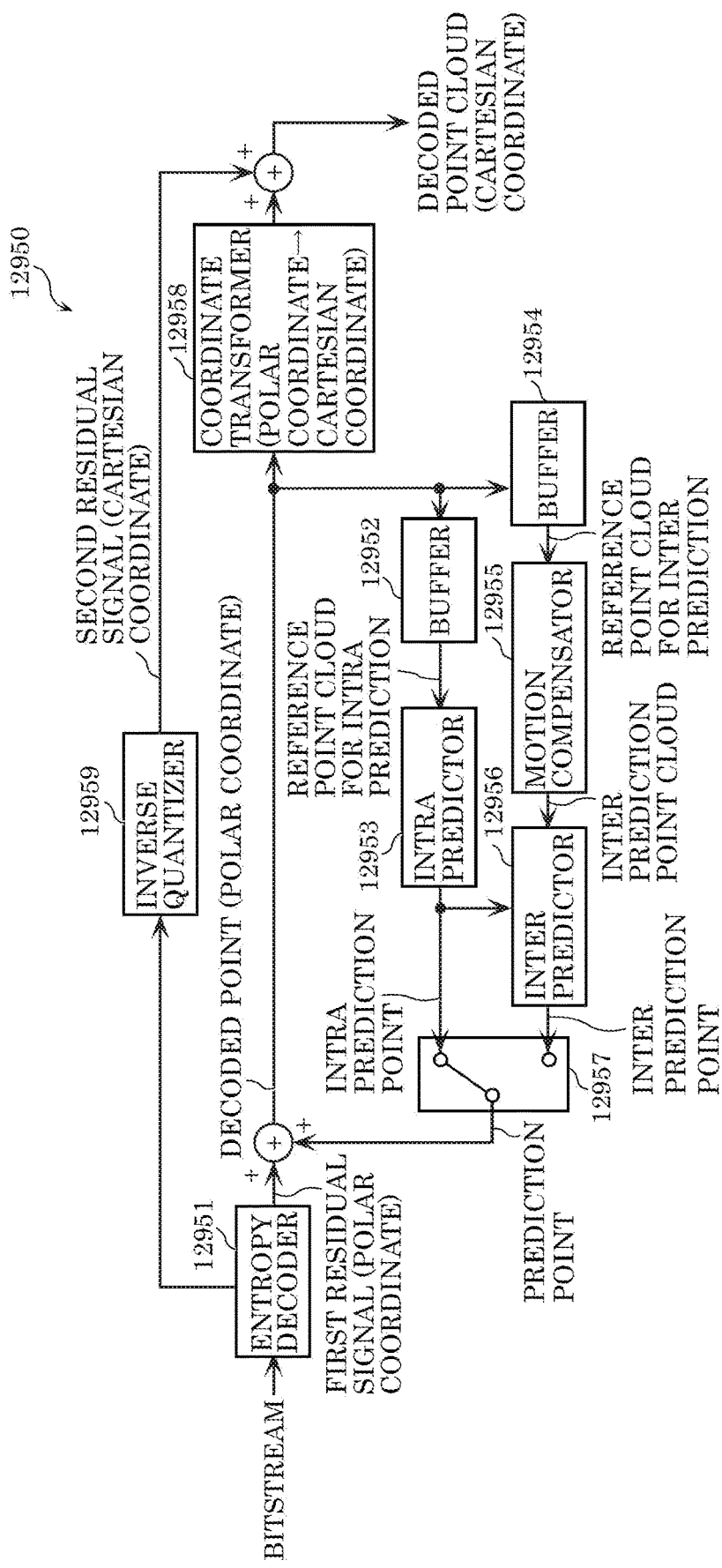
FIG. 53 is a block diagram of a three-dimensional data decoding device according to the variation of Embodiment 5.

FIG. 53 is a block diagram of three-dimensional data decoding device 12950 according to the variation of the present embodiment, FIG. 53 illustrates processors relating to decoding geometry information (geometry) of a point cloud. However, three-dimensional data decoding device 12950 may include other processors such as processors that perform decoding or the like of attribute information of the point cloud. Three-dimensional data decoding device 12950 performs inter prediction decoding, in which a point cloud to be decoded is decoded while a decoded point cloud is referred to. For example, three-dimensional data decoding device 12950 decodes a bitstream generated by three-dimensional data encoding device 12930 illustrated in FIG. 52, Compared with three-dimensional data decoding device 12920 in FIG. 49, three-dimensional data decoding device 12950 differs in its configuration and operation in that the inverse quantization of the first residual signal (prediction residual) is not performed and in that a second residual signal in Cartesian coordinates, which is equivalent to a transformation error occurring in transformation between Cartesian coordinates and polar coordinates is entropy decoded, inversely quantized, reproduced, added to a point that is transformed from a corresponding decoded point in polar coordinates into Cartesian coordinates, and output as a decoded point in Cartesian coordinates. At the same time, compared with three-dimensional data decoding device 12920, three-dimensional data decoding device 12950 is the same in regards other than the regards described above.

Three-dimensional data decoding device 12950 includes entropy decoder 12951, buffer 12952, intra predictor 12953, buffer 12954, motion compensator 12955, inter predictor 12956, switcher 12957, coordinate transformer 12958, and inverse quantizer 12959.

Entropy decoder 12951 entropy decodes the input bitstream for each three-dimensional point in a prediction tree (Predtree) to generate a first residual signal and a quantized second residual signal. The first residual signal for each three-dimensional point is added to a predicted value based on a prediction point corresponding to the three-dimensional point and then generated (output) as a decoded point represented by polar coordinates.

Buffer 12952 retains the generated decoded points as a reference point cloud for intra prediction. For example, buffer 12952 may initialize retained data for each prediction tree (target point cloud). Buffer 12954 retains the generated decoded points as a reference point cloud for inter prediction. For example, buffer 12954 may initialize retained data for each prediction tree (target point cloud), Geometry information of the decoded point retained in buffers 12952 and 12954 is represented by polar coordinates. In this regard, buffers 12952 and 12954 differ in function from buffers 12923 and 12925 but are the same in function as buffers 12923 and 12925 in other respects, respectively.

Likewise, intra predictor 12953, motion compensator 12955, inter predictor 12956, and switcher 12957 differ in function from intra predictor 12924, motion compensator 12926, inter predictor 12927, and switcher 12928 in that geometry information of a three-dimensional point to be processed is represented by polar coordinates but are the same in function as intra predictor 12924, motion compensator 12926, inter predictor 12927, and switcher 12928 in other respects, respectively.

Coordinate transformer 12958 obtains the same decoded point as the decoded point retained in buffers 12952 and 12954 and transforms a coordinate system of geometry information of the obtained decoded point from the polar coordinate system to the Cartesian coordinate system.

Inverse quantizer 12959 inverse quantizes the quantized second residual signal to reproduce the second residual signal.

The Cartesian-coordinate geometry information obtained by the coordinate transformation by coordinate transformer 12958 and the second residual signal reproduced by the inverse quantization by inverse quantizer 12959 are added together and generate (output) as a decoded point including the Cartesian-coordinate geometry information.

In this manner, three-dimensional data decoding device 12950 includes means for transforming a coordinate system of a decoded point having polar-coordinate geometry information from the polar coordinate system to the Cartesian coordinate system and adding the decoded point to the second residual signal in Cartesian coordinates that is equivalent to an error occurring in transformation between Cartesian-coordinate geometry information and polar-coordinate geometry information. Accordingly, three-dimensional data decoding device 12950 is capable of decoding a point cloud from an encoded bitstream (e.g., a bitstream output from three-dimensional data encoding device 12930 in FIG. 52) while referring to an encoded point cloud in polar coordinates.

FIG. 54 illustrates an example of a syntax of a geometry parameter set (GPS). The syntax is used in three-dimensional data encoding devices 12900 and 12930 and three-dimensional data decoding devices 12920 and 12950 described with respect to FIG. 48 to FIG. 53.

As illustrated in these examples, in the GPS, notification of information indicating whether to use a coordinate system other than the Cartesian coordinate system, such as the polar coordinate system, in a decoding process of each point, such as gps_alt_coordinates_flag, may be given. When a value of gps_alt_coordinates_flag is set to 1 (i.e., gps_alt_coordinates_flag=1), gps_alt_coordinates_flag indicates that an alternative coordinate system (e.g., polar coordinate system) is to be used in a decoding process of a data unit of geometry information in a bitstream in which the GPS is referred to. When a value of gps_alt_coordinates_flag is set to 0 (i.e., gps_alt_coordinates_flag=0), gps_alt_coordinates_flag indicates that no alternative coordinate system is to be used in the decoding process of the data unit of geometry information in the bitstream in which the GPS is referred to. In other words, gps_alt_coordinates_flag may indicate whether encoded data includes first encoded data that is calculated in the polar coordinate system. gps_alt_coordinates_flag is an example of first identification information which indicates whether encoded data includes first encoded data calculated in the polar coordinate system.

In a case where a coordinate system other than the Cartesian coordinate system (alternative coordinate system) such as the polar coordinate system is to be used in a decoding process of each three-dimensional point (e.g., in a case of gps_alt_coordinates_flag=1, etc.), notification of coordinate transformation information indicating whether to perform coordinate transformation of a decoded point (e.g., transform from the polar coordinate system to the Cartesian coordinate system, etc.) before each three-dimensional point is output from the three-dimensional data decoding device, such as gps_coordinate_trans_enabled_flag, may be given. The case of gps_alt_coordinates_flag=1 (i.e., the first identification information indicates that the encoded data includes the first encoded data) is specifically geometry information of one or more candidate points to be used for calculating a predicted value and geometry information of one three-dimensional point to be encoded to be used for calculating the first residual are items of polar-coordinate geometry information. In this case, the bitstream includes gps_coordinate_trans_enabled_flag. gps_coordinate_trans_enabled_flag is an example of second identification information which indicates whether polar-coordinate geometry information or Cartesian-coordinate geometry information is to be output in the decoding. In the case of gps_alt_coordinates_flag=1, in the encoding, three-dimensional data encoding device 12900 which quantizes the first residual and encodes the quantized first residual encodes polar-coordinate geometry information. Therefore, it can be said that, in a case of gps_alt_coordinates_flag=1 and gps_coordinate_trans_enabled_flag=0, polar-coordinate geometry information is encoded, and gps_coordinate_trans_enabled_flag=0 indicates that polar-coordinate geometry information is to be output in the decoding. It should be noted that whether to output geometry information of the polar coordinate system or not may be switched according to another flag (identification information).

In the case of gps_alt_coordinates_flag=0 (i.e., in a case where the first identification information indicates that the encoded data does not include the first encoded data), the bitstream need not include gps_coordinate_trans_enabled_flag (second identification information).

When a value of gps_coordinate_trans_enabled_flag is set to 1 (i.e., gps_coordinate_trans_enabled_flag=1), gps_coordinate_trans_enabled_flag indicates that a coordinate system is to be transformed to another coordinate system in the decoding process of the data unit of geometry information in the bitstream in which the GPS is referred to, Therefore, it can be said that, in a case of gps_alt_coordinates_flag=1 and gps_coordinate_trans_enabled_flag=0, Cartesian-coordinate geometry information is to be decoded, and thus gps_coordinate_trans_enabled_flag=0 indicates that Cartesian-coordinate geometry information is to be output in the decoding.

When the value of gps_coordinate_trans_enabled_flag is set to 0 (i.e., gps_coordinate_trans_enabled_flag=0), gps_coordinate_trans_enabled_flag indicates that a coordinate system is not to be transformed to another coordinate system in the decoding process of the data unit of geometry information in the bitstream in which the GPS is referred to. It should be noted that, when gps_coordinate_trans_enabled_flag is not provided, it may be considered that the value of gps_coordinate_trans_enabled_flag is set to 0.

It should be noted that in a case where the coordinate transformation of a decoded point is not performed before each three-dimensional point is output from the three-dimensional data decoding device (e.g., gps_coordinate_trans_enabled_flag=0), the encoding and decoding of a point cloud may be performed by three-dimensional data encoding device 12900 illustrated in FIG. 48 and three-dimensional data decoding device 12920 illustrated in FIG. 49. Further, in a case where the coordinate transformation of a decoded point is performed before each three-dimensional point is output from the three-dimensional data decoding device (e.g., gps_coordinate_trans_enabled_flag=1), the encoding and decoding of a point cloud may be performed by three-dimensional data encoding device 12930 illustrated in FIG. 52 and three-dimensional data decoding device 12950 illustrated in FIG. 53.

Giving the notification of gps_alt_coordinates_flag and gps_coordinate_trans_enabled_flag from the three-dimensional data encoding device to the three-dimensional data decoding device enables a switch between three-dimensional data encoding device 12900 illustrated in FIG. 48 and three-dimensional data encoding device 12930 illustrated in FIG. 52 based on a point cloud to be encoded even in the case where a coordinate system other than the Cartesian coordinate system, such as the polar coordinate system, in the encoding and decoding of each three-dimensional point (e.g., gps_alt_coordinates_flag=1, etc.), and there is accordingly a possibility that coding efficiency can be improved.

In FIG. 54, a syntax of the GPS is exemplified. However, gps_alt_coordinates_flag and gps_coordinate_trans_enabled_flag may be included in an SPS, may be included in a header of a data unit, or may be included as metadata in another type of control information.

FIG. 55 illustrates an example of a syntax of each three-dimensional point (Node of Predtree). The syntax is used in three-dimensional data encoding devices 12900 and 12930 and three-dimensional data decoding devices 12920 and 12950 described with respect to FIG. 48 to FIG. 54.

In this example, three-dimensional data encoding devices 12900 and 12930 first notify, respectively, three-dimensional data decoding devices 12920 and 12950 of identification information (pred_mode) that indicates how to find an intra prediction point for a current three-dimensional point to be encoded or to be decoded.

Three-dimensional data encoding devices 12900 and 12930 may additionally notify, respectively, three-dimensional data decoding devices 12920 and 12950 of additional information for determining the intra prediction point, based on the identification information (pred_mode).

Next, in a case where the inter prediction is enabled in a GPS referred to by a prediction tree (predtree) being encoded (e.g., gps_inter_prediction_enabeled_flag=1), three-dimensional data encoding devices 12900 and 12930 may notify, respectively, three-dimensional data decoding devices 12920 and 12950 of information indicating whether the prediction method for the current three-dimensional point to be encoded or to be decoded is the intra prediction or not (i.e., the inter prediction) (intra_pred_flag). In a case of gps_inter_prediction_enabeled_flag=0, a value of intra_pred_flag may be set to 1 (the intra prediction). In a case where the prediction method for the current three-dimensional point to be encoded or to be decoded is the inter prediction (e.g., intra_pred_flag=0), notification of identification information indicating how to find an inter prediction point for the current three-dimensional point to be encoded or to be decoded (inter_pred_mode) may be given. Further, three-dimensional data encoding devices 12900 and 12930 may set, to NumRefPoints, the number of candidate points in an inter prediction point cloud that is referred to when the inter prediction point is determined based on the identification information (inter_pred_mode) and may notify, respectively, three-dimensional data decoding devices 12920 and 12950 of a number NumRefPoints of indices (inter_ref_point_idx) of the candidate points. In a case where a plurality of candidate points is specified in the inter prediction point cloud that is referred to when the inter prediction point is determined, average values of sets of coordinates of the specified candidate points may be used as coordinates of the inter prediction point. For three-dimensional data encoding devices 12900 and 12930, inter_pred_mode for omitting the notification of the indices of the candidate points and selecting a specific candidate point such as a candidate point having the smallest index may be prepared. For example, three-dimensional data encoding devices 12900 and 12930 may be allowed to omit the notification of the indices of the candidate points by providing a process of determining whether inter_pred_mode indicates such a mode or setting a value of NumRefPoints to 0. Such a mode can be carried out as long as notification of information necessary for a method by which the inter prediction point is uniquely determined is given. For example, in place of inter_pred_mode, notification of the number of candidate points in the inter prediction point cloud that is referred to when the inter prediction point is determined may be given.

In a case where a candidate point is searched for in an inter prediction point cloud in the vicinity of a three-dimensional point that is uniquely determined independent of the identification information (pred_mode) indicating how to find an intra prediction point, such as a three-dimensional point that is encoded or decoded immediately before the current three-dimensional point to be encoded or to be decoded (e.g., a three-dimensional point corresponding to an ancestor node in a prediction tree such as a parent node), three-dimensional data decoding devices 12920 and 12950 may be notified of the identification information (pred_mode) indicating how to find the intra prediction point and the additional information for determining the intra prediction point only in a case where the prediction method for the current three-dimensional point to be encoded or to be decoded is the intra prediction (e.g., intra_pred_flag=1).

Next, three-dimensional data encoding devices 12900 and 12930 may give notification of a first difference (1st_residual_value) between geometry information (coordinate values) of the point to be encoded or to be decoded and geometry information (coordinate values) of the prediction point. In the case where coordinate transformation of a decoded point is performed before each three-dimensional point is output from three-dimensional data decoding devices 12920 and 12950 (e.g., gps_coordinate_trans_enabled_flag=1), notification of a second difference (2nd_residual_value) between geometry information (coordinate values) obtained by performing coordinate transformation to an original coordinate system such as the Cartesian coordinate system on a result of decoding in another coordinate system such as the polar coordinate system and original geometry information (coordinate values) may be given. Although an example of giving the notification of these items of difference information in one type of syntax is described, the notification of the items of difference information may be given in types of syntax such as positive-negative information and absolute value information.

Giving the notification of these items of information from three-dimensional data encoding devices 12900 and 12930 to three-dimensional data decoding devices 12920 and 12950 enables the prediction process to be performed consistently between three-dimensional data encoding devices 12900 and 12930 and three-dimensional data decoding devices 12920 and 12950, thus enabling three-dimensional data decoding devices 12920 and 12950 to decode a three-dimensional point to be processed without causing inconsistency with corresponding three-dimensional data encoding devices 12900 and 12930, respectively.

The devices, processes, syntax, and the like disclosed with reference to FIG. 48 to FIG. 55 may be carried out in combination with at least a part or parts of the other embodiments. A part or parts of devices, processes, syntax, and the like disclosed with reference to FIG. 48 to FIG. 55 may be carried out in combination with the other embodiments. Constituent components disclosed with reference to FIG. 48 to FIG. 55 are not all necessary and only some of the constituent components may be included.

Figure 56:
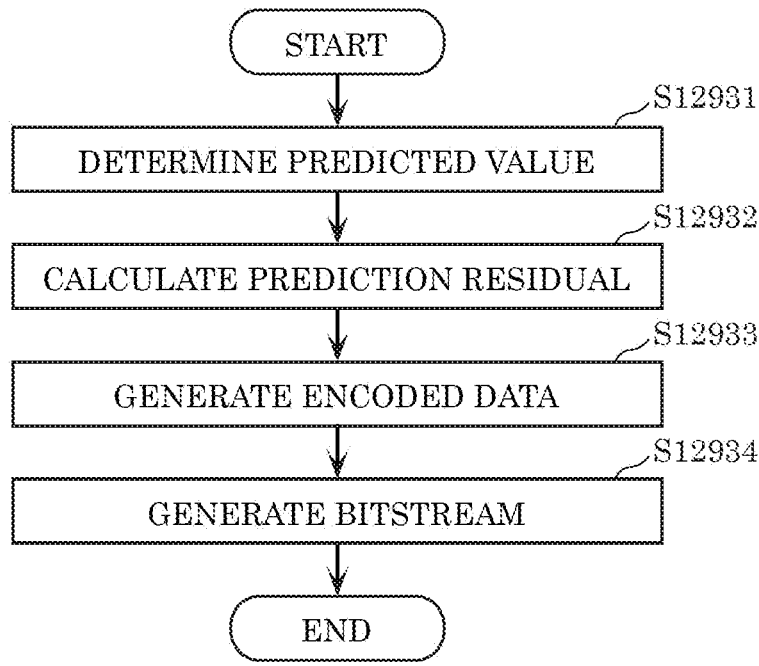
FIG. 56 is a flowchart of a three-dimensional data encoding process according to Embodiment 5.

As described above, the three-dimensional data encoding device according to the present embodiment performs the process illustrated in FIG. 56. The three-dimensional data encoding device determines a predicted value, based on geometry information of one or more candidate points among encoded three-dimensional points (S12931). The three-dimensional data encoding device calculates a prediction residual which is a difference between the predicted value and geometry information of a current three-dimensional point to be encoded among the three-dimensional points (S12932). The three-dimensional data encoding device encodes the prediction residual to generate encoded data (S12933). The three-dimensional data encoding device generates a bitstream including the encoded data (S19234). In step S12931, the three-dimensional data encoding device determines the one or more candidate points, based on one or more base points among the encoded three-dimensional points.

For example, the three-dimensional points constitute a prediction tree. The one or more base points include a three-dimensional point corresponding to a parent node of the current three-dimensional point.

Accordingly, since the one or more candidate points to be used in calculating the predicted value is determined based on the parent node of the current three-dimensional point in the prediction tree, the prediction residual can be reduced, and thus encoding efficiency can be improved.

For example, an index value is allocated to each of the one or more candidate points. The bitstream further includes the index value allocated to a candidate point to be used in the determining of the predicted value.

For this reason, a three-dimensional data decoding device can easily identify a candidate point based on the index value. Accordingly, the processing load of the three-dimensional data decoding device can be reduced.

For example, the three-dimensional data encoding device includes a processor and memory, and the processor performs the above process using the memory.

Figure 57:
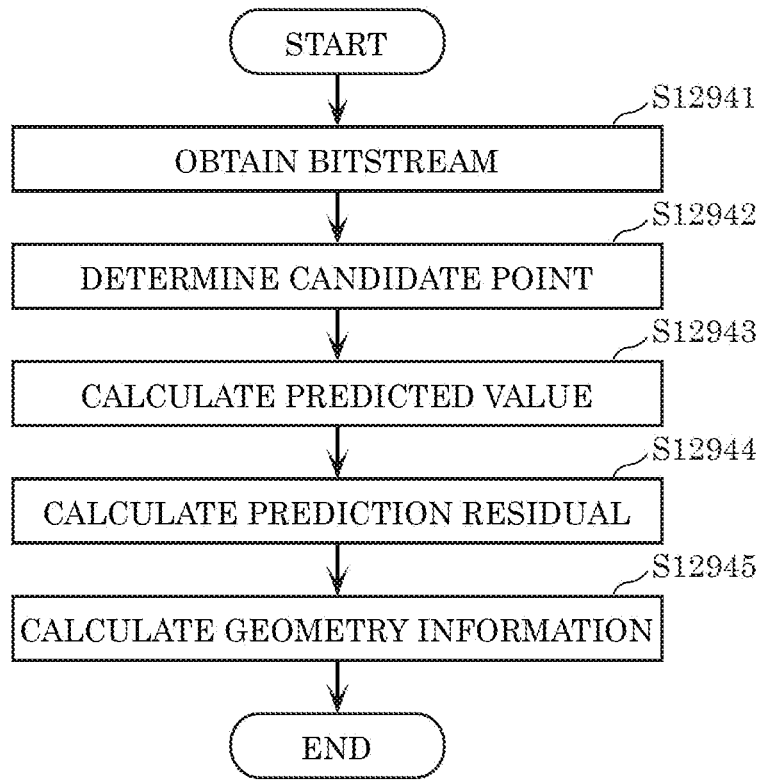
FIG. 57 is a flowchart of a three-dimensional data decoding process according to Embodiment 5.

Furthermore, the three-dimensional data decoding device according to the present embodiment performs the process illustrated in FIG. 57. The three-dimensional data decoding device obtains a bitstream including an encoded prediction residual and an index value allocated to a candidate point to be used in calculating a predicted value (S12941). The three-dimensional data decoding device determines a candidate point, based on the index value and based on one or more base points among decoded three-dimensional points (S12942). The three-dimensional data decoding device calculates the predicted value, based on geometry information of the candidate point determined (S12943). The three-dimensional data decoding device decodes the encoded prediction residual to calculate a prediction residual (S12944). The three-dimensional data decoding device calculates geometry information of a current three-dimensional point to be decoded, by adding up the predicted value and the prediction residual (S12945).

Accordingly, a candidate point can be determined based on one or more base points among encoded three-dimensional points, and a current three-dimensional point to be decoded can be decoded using a predicted value based on geometry information of the candidate point determined.

For example, the three-dimensional points constitute a prediction tree. The one or more base points include a three-dimensional point corresponding to a parent node of the current three-dimensional point.

For example, an index value is allocated to each of the one or more candidate points. The bitstream further includes the index value allocated to a candidate point to be used in the determining of the predicted value.

For this reason, a three-dimensional data decoding device can easily identify a candidate point based on the index value. Accordingly, the processing load of the three-dimensional data decoding device can be reduced.

For example, the three-dimensional data decoding device includes a processor and memory, and the processor performs the above process using the memory.

Figure 58:
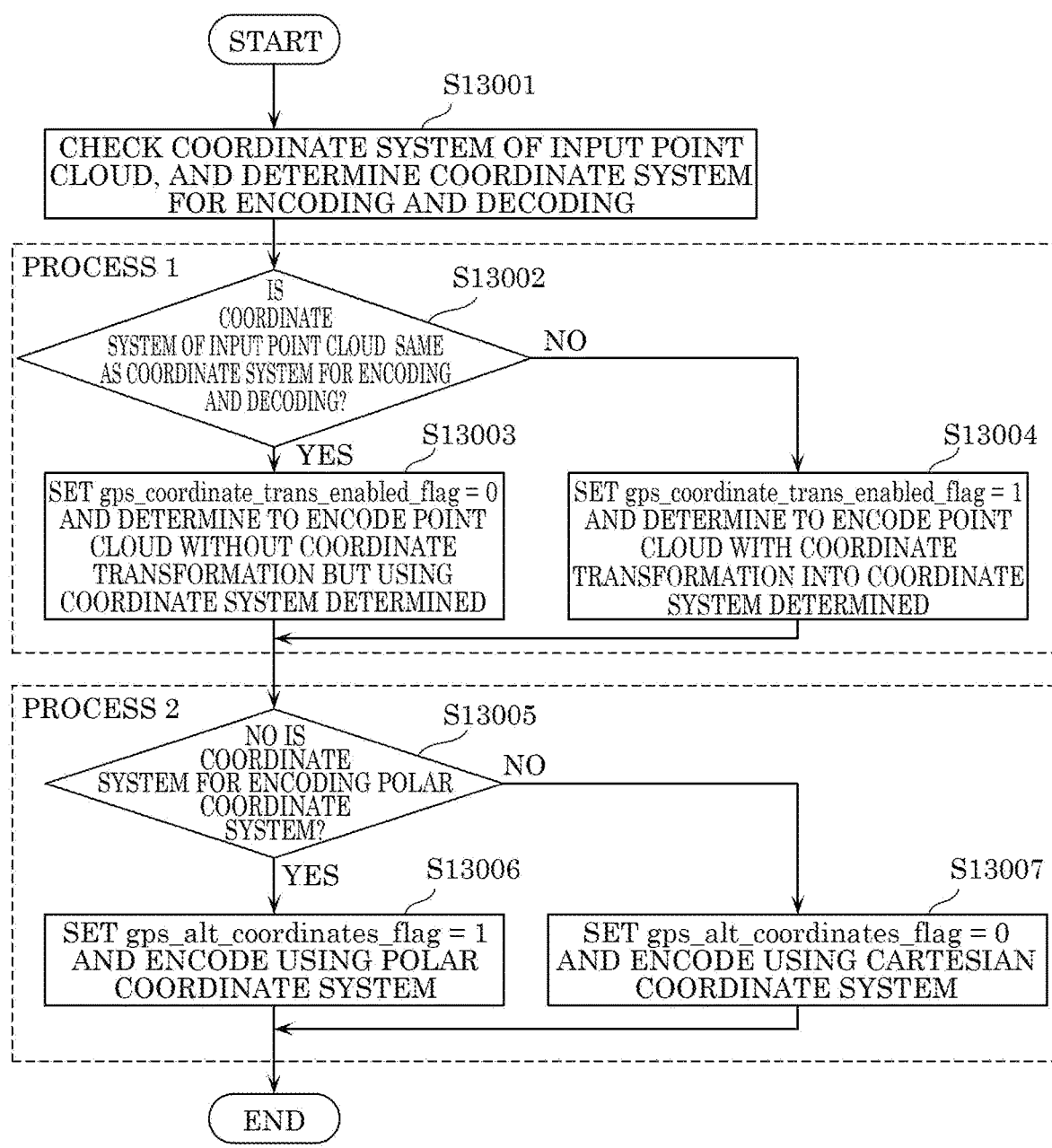
FIG. 58 is a flowchart illustrating a coordinate system switching process in an encoding process according to Embodiment 5.

FIG. 58 is a flowchart illustrating a coordinate system switching process in the encoding process. The flowchart of FIG. 58 involves switching between encoding with three-dimensional data encoding device 12900 described with reference to FIG. 48 and encoding with three-dimensional data encoding device 12930 described with reference to FIG. 52, The flowchart of FIG. 58 also involves switching between encoding the geometry information using the Cartesian coordinate system and encoding the geometry information using the polar coordinate system.

First, the three-dimensional data encoding device checks the coordinate system of an input point cloud, and determines the coordinate system for the encoding process and the decoding process (S13001). That is, the three-dimensional data encoding device determines the coordinate system of the geometry information to be processed in the encoding process and the decoding process.

Next, the three-dimensional data encoding device determines whether the coordinate system of the input point cloud is the same as the coordinate system for the encoding process and the decoding process determined (S13002).

When it is determined that the coordinate system of the input point cloud is the same as the coordinate system for the encoding process and the decoding process determined (Yes at S13002), the three-dimensional data encoding device sets gps_coordinate_trans_enabled_flag=0 and determines to encode the geometry information on the point cloud without coordinate transformation but using the coordinate system determined (S13003).

When it is determined that the coordinate system of the input point cloud is not the same as the coordinate system for the encoding process and the decoding process determined (No at S13002), the three-dimensional data encoding device sets gps_coordinate_trans_enabled_flag=1 and determines to encode the geometry information on the point cloud with coordinate transformation into the coordinate system determined (S13004).

Three-dimensional data encoding device 12930 described with reference to FIG. 52 shows an example in which the coordinate system of the input point cloud is the polar coordinate system, and the coordinate system for the encoding process and the decoding process is the Cartesian coordinate system. Alternatively, the coordinate system of the input point cloud may be the Cartesian coordinate system, and the coordinate system for the encoding process and the decoding process may be the polar coordinate system. In this case, FIG. 52 may be described by replacing "polar coordinate system" with "Cartesian coordinate system" and replacing "Cartesian coordinate system" with "polar coordinate system."

Next, the three-dimensional data encoding device determines whether the coordinate system for encoding is the polar coordinate system or not (the Cartesian coordinate system) (S13005).

When it is determined that the coordinate system for encoding is the polar coordinate system (Yes at S13005), the three-dimensional data encoding device sets gps_alt_coordinates_flag=1 and encodes the geometry information on the point cloud using the polar coordinate system (S13006).

When it is determined that the coordinate system for encoding is not the polar coordinate system (i.e., is the Cartesian coordinate system) (No at S13005), the three-dimensional data encoding device sets gps_alt_coordinates_flag=0 and encodes the geometry information on the point cloud using the Cartesian coordinate system (S13007).

Here, for configuring a syntax according to the above process, gps_coordinate_trans_enabled_flag and gps_alt_coordinates_flag described with reference to FIG. 54 may be syntax elements indicated without mutual dependence. That is, gps_coordinate_trans_enabled_flag may be indicated in the GPS irrespective of the presence or absence of or the value of gps_alt_coordinates_flag.

The above process may also adopt the syntax configuration in FIG. 54 by interchanging process 1 of steps S13002 to S13004 and process 2 of steps S13005 to S13007. If gps_alt_coordinates_flag=1 in process 2, then process 1 may be performed.

Figure 59:
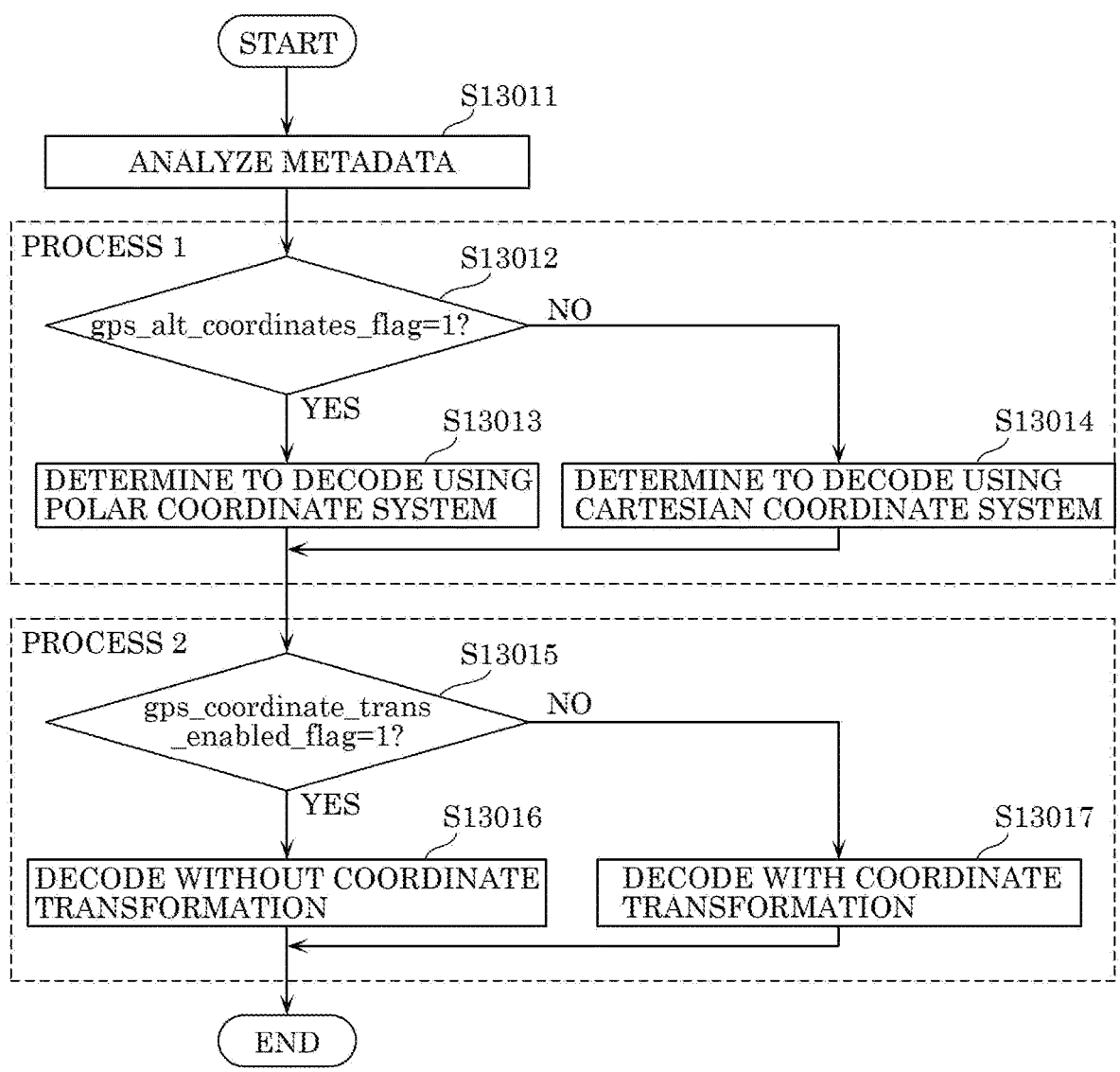
FIG. 59 is a flowchart illustrating a coordinate system switching process in a decoding process according to Embodiment 5.

FIG. 59 is a flowchart illustrating a coordinate system switching process in the decoding process. The flowchart of FIG. 59 involves switching between decoding with three-dimensional data decoding device 12920 described with reference to FIG. 49 and decoding with three-dimensional data decoding device 12950 described with reference to FIG. 53, The flowchart of FIG. 59 also involves switching between decoding the geometry information using the Cartesian coordinate system and decoding the geometry information using the polar coordinate system.

First, the three-dimensional data decoding device analyzes metadata in a bitstream (S13011). Specifically, the metadata is control information included in the GPS, SPS, or header. The three-dimensional data decoding device checks gps_alt_coordinates_flag and gps_coordinate_trans_enabled_flag included in the metadata.

Next, the three-dimensional data decoding device determines whether gps_alt_coordinates_flag=1 (S13012).

When gps_alt_coordinates_flag=1 (Yes at S13012), the three-dimensional data decoding device determines to decode using the polar coordinate system (S13013).

When gps_alt_coordinates_flag=0 (No at S13012), the three-dimensional data decoding device determines to decode using the Cartesian coordinate system (S13014).

As above, the coordinate system of the geometry information to be calculated for a current three-dimensional point to be decoded is determined according to the value of gps_alt_coordinates_flag. The coordinate system is therefore determined based on whether the first encoded data is included, as indicated by the first identification information.

Next, the three-dimensional data decoding device determines whether gps_coordinate_trans_enabled_flag=1 (S13015).

When gps_coordinate_trans_enabled_flag=1 (Yes at S13015), the three-dimensional data decoding device decodes the geometry information without coordinate transformation but using the coordinate system determined (S13016). In this case, the geometry information on the point cloud is decoded using the configuration of three-dimensional data decoding device 12920. It is to be noted that gps_coordinate_trans_enabled_flag is indicated if gps_alt_coordinates_flag=1, Therefore, if gps_coordinate_trans_enabled_flag=1 (i.e., if the second identification information indicates that the geometry information in the polar coordinate system should be output in decoding), the coordinate system of the geometry information to be calculated for the current three-dimensional point is the polar coordinate system.

When gps_coordinate_trans_enabled_flag=0 (No at S13015), the three-dimensional data decoding device decodes the geometry information with coordinate transformation into the coordinate system determined (S13017). In this case, the geometry information on the point cloud is decoded using the configuration of three-dimensional data decoding device 12950. It is to be noted that gps_coordinate_trans_enabled_flag is indicated if gps_alt_coordinates_flag=1, Therefore, if gps_coordinate_trans_enabled_flag=0 (i.e., if the second identification information indicates that the geometry information in the Cartesian coordinate system should be output in decoding), the three-dimensional data decoding device transforms the coordinate system of the geometry information in the polar coordinate system obtained by adding up the predicted value and the first residual. The three-dimensional data decoding device thus calculates, as the geometry information on the current three-dimensional point, the geometry information in the Cartesian coordinate system resulting from the transformation. Also in this case, the encoded data includes the second residual. The three-dimensional data decoding device calculates the second residual by decoding the encoded second residual. In calculating the geometry information on the current three-dimensional point, the three-dimensional data decoding device adds up the geometry information in the Cartesian coordinate system obtained by transforming the coordinate system, and the second residual. The three-dimensional data decoding device thus calculates, as the geometry information on the current three-dimensional point, the geometry information resulting from adding up the geometry information and the second residual.

If the metadata is configured according to the syntax configuration in FIG. 54, process 1 of steps S13012 to S13014 may transition to process 2 of steps S13015 to S13017 if process 1 determines that the coordinate system for decoding is the polar coordinate system. If process 1 determines that the coordinate system for decoding is the Cartesian coordinate system, the determination in process 2 may be skipped to perform decoding with three-dimensional data decoding device 12920 configured as in FIG. 49.

Note that gps_coordinate_trans_enabled_flag is coordinate transformation information indicating whether coordinate transformation for each point to be decoded should be performed before the point is output from the three-dimensional data decoding device. Alternatively, this information may be information indicating whether coordinate transformation has been performed in encoding each three-dimensional point, or may be information indicating whether the bitstream includes information on errors due to coordinate transformation (transformation errors), Further, if this information is included, the three-dimensional data decoding device or an application may determine whether to perform coordinate transformation.

Note that described above are the switching of the process according to combinations of the coordinate system of the input point cloud, the coordinate system of the output point cloud, the coordinate system of the geometry information to be processed in the encoding process, and the coordinate system of the geometry information to be processed in the decoding process, as well as the method of signaling these coordinate systems. Although these have been described for prediction-tree encoding by way of example, a similar method may also be used for octree encoding. The switching process may be omitted if only one coordinate system is used as the coordinate system of the input point cloud, the coordinate system of the output point cloud, the coordinate system of the geometry information to be processed in the encoding process, and the coordinate system of the geometry information to be processed in the decoding process. The process may be expanded if three or more coordinate systems are used. Also, described above are the coordinate systems involved in geometry-information encoding and decoding, by way of example. A similar method may also be used to switch the process when attribute-information encoding and decoding involves multiple coordinate systems, or when the coordinate system of the input point cloud and the output point cloud can switch to some other coordinate system. For example, a syntax as in FIG. 54 may be included in attribute_parameter_set.

Further, geometry-information encoding and decoding and attribute-information encoding and decoding may be controlled to use the same coordinate system.

Figure 60:
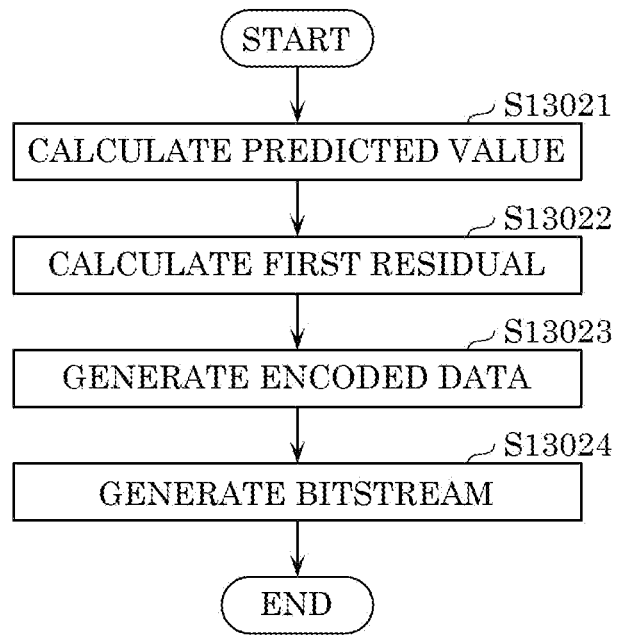
FIG. 60 is a flowchart illustrating another exemplary three-dimensional data encoding process according to Embodiment 5.

Furthermore, as described above, the three-dimensional data encoding device according to the present embodiment performs the process illustrated in FIG. 60. The three-dimensional data encoding device encodes three-dimensional points of a Cartesian coordinate system or a polar coordinate system. The three-dimensional data encoding device calculates a predicted value, based on geometry information of one or more candidate points among encoded three-dimensional points (S13021), The three-dimensional data encoding device calculates a first residual which is a difference between the predicted value and geometry information of a current three-dimensional point to be encoded among the three-dimensional points (S13022). The three-dimensional data encoding device generates encoded data by encoding the first residual (S13023). The three-dimensional data encoding device generates a bitstream including the encoded data and first identification information indicating whether the encoded data includes first encoded data calculated using the polar coordinate system (S13024).

Accordingly, the bitstream includes the first identification information indicating whether the encoded data includes the first encoded data calculated using the polar coordinate system or not. This enables a three-dimensional data decoding device to appropriately perform a decoding process based on the first identification information.

For example, the bitstream further includes second identification information, and when the geometry information of the one or more candidate points which are to be used in calculating the predicted value and the geometry information of the current three-dimensional point which is to be used in calculating the first residual are geometry information of the polar coordinate system, the first identification information indicates that the encoded data includes the first encoded data calculated using the polar coordinate system. Furthermore, in this case, the second identification information indicates whether to output the geometry information of the polar coordinate system or to output geometry information of the Cartesian coordinate system, in decoding.

For example, when the first identification information indicates that the encoded data does not include the first encoded data, the bitstream does not include the second identification information.

For example, when the geometry information of the polar coordinate system is to be output in the decoding, the second identification information indicates that the geometry information of the polar coordinate system is to be output in the decoding. Furthermore, in this case, in encoding of the first encoded data, the first residual is quantized, and the first residual quantized is encoded.

For example, when, in the calculating of the first residual, a coordinate system of the geometry information of the Cartesian coordinate system of the current three-dimensional point is transformed to generate the geometry information of the polar coordinate system, and the first residual is a difference between the predicted value and the geometry information of the polar coordinate system after the transforming, the three-dimensional data encoding device inverse-transforms a coordinate system of the geometry information of the polar coordinate system after the transforming to generate the geometry information of the Cartesian coordinate system. The three-dimensional data encoding device calculates a second residual which is a difference between geometry information of the Cartesian coordinate system and the geometry information of the Cartesian coordinate system after the inverse-transforming. In the generating of the encoded data, the encoded data is generated by encoding the first residual and the second residual. The first identification information indicates that the encoded data includes the first encoded data, and the second identification information indicates that the geometry information of the Cartesian coordinate system is to be output in the decoding.

For example, the second identification information indicates whether encoded data of the second residual is to be included in the bitstream.

For example, the three-dimensional data encoding device includes a processor and memory, and the processor performs the above processes using the memory.

Figure 61:
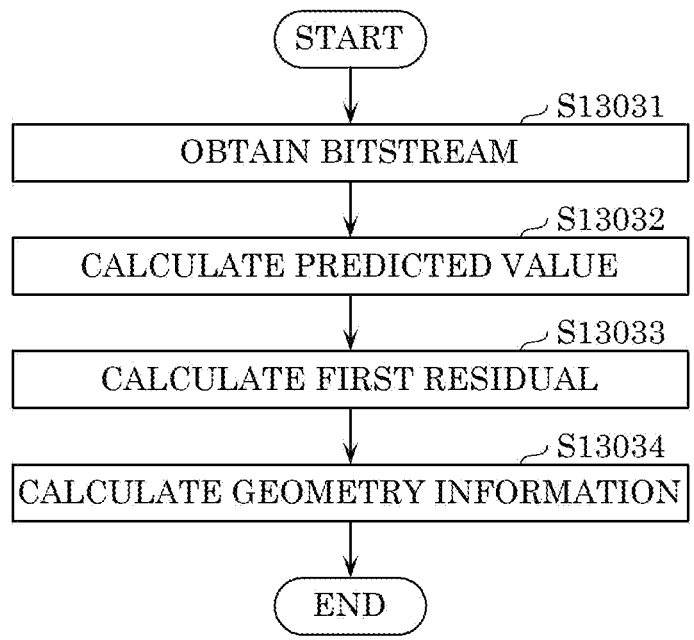
FIG. 61 is a flowchart illustrating another exemplary three-dimensional data decoding process according to Embodiment 5.

Furthermore, the three-dimensional data decoding device according to the present embodiment performs the process illustrated in FIG. 61, The three-dimensional data decoding device decodes three-dimensional points of the Cartesian coordinate system or a polar coordinate system. The three-dimensional data decoding device obtains a bitstream including encoded data and first identification information, the encoded data being obtained by encoding a first residual, the first identification information indicating whether the encoded data includes first encoded data calculated using the polar coordinate system (S13031). The three-dimensional data decoding device calculates a predicted value, based on geometry information of one or more candidate points among decoded three-dimensional points (S13032). The three-dimensional data decoding device calculates the first residual by decoding the first residual that has been encoded (S13033). The three-dimensional data decoding device calculates geometry information of a current three-dimensional point to be decoded, by adding up the predicted value and the first residual, A coordinate system of the geometry information of the current three-dimensional point that is to be calculated is a coordinate system based on whether the first identification information indicates that the encoded data includes the first encoded data.

Accordingly, the coordinate system of the geometry information on the current three-dimensional point can be determined based on the first identification information indicating whether the encoded data includes the first encoded data calculated using the polar coordinate system. This enables a three-dimensional data decoding device to appropriately perform a decoding process based on the first identification information.

For example, the bitstream further includes second identification information indicating whether to output geometry information of the polar coordinate system or to output geometry information of the Cartesian coordinate system, in decoding. When the first identification information indicates that the encoded data includes the first encoded data, the geometry information of the one or more candidate points to be used in calculating the predicted value and the geometry information of a current candidate point to be encoded which is to be used in the calculating of the first residual is geometry information of the polar coordinate system.

For example, when the first identification information indicates that the encoded data does not include the first encoded data, the bitstream does not include the second identification information.

For example, when the second identification information indicates that the geometry information of the polar coordinate system is to be output in the decoding, the encoded data is obtained by quantizing the first residual, and encoding the first residual quantized. Furthermore, in this case, the coordinate system of the geometry information of the current three-dimensional point that is to be calculated is the polar coordinate system.

For example, when the first identification information indicates that the encoded data includes the first encoded data, and the second identification data indicates that the geometry information of the Cartesian coordinate system is to be output in the decoding, the calculating of the geometry information of the current three-dimensional point includes: transforming a coordinate system of geometry information of the polar coordinate system obtained by adding up the predicted value and the first residual; and outputting, as the geometry information of the current three-dimensional point, the geometry information of the Cartesian coordinate system obtained in the transforming.

For example, when the first identification information indicates that the encoded data includes the first encoded data, and the second identification data indicates that the geometry information of the Cartesian coordinate system is to be output in the decoding, the encoded data further includes an encoded second residual. The three-dimensional data decoding device calculates a second residual by decoding the encoded second residual. The calculating of the geometry information of the current three-dimensional point includes: adding up the second residual and the geometry information the Cartesian coordinate system obtained in the transforming of the coordinate system; and outputting, as the geometry information of the current three-dimensional point, the geometry information obtained in the adding up.

For example, the second identification information indicates whether encoded data of the second residual is to be included in the bitstream.

For example, the three-dimensional data decoding device includes a processor and memory, and the processor performs the above processes using the memory.

Embodiment 6

A method for determining a three-dimensional point cloud that is referred to when a current three-dimensional point cloud to be encoded is encoded using inter prediction will be described.

Figure 62:
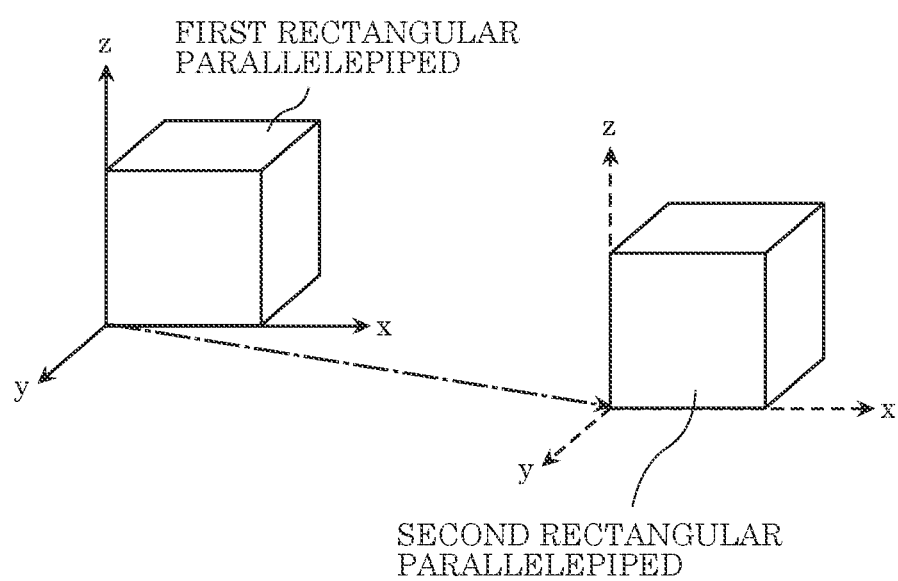
FIG. 62 is a diagram for describing a first example of a process for determining a three-dimensional point cloud that is referred to when a three-dimensional data encoding device according to Embodiment 6 encodes a current three-dimensional point cloud to be encoded.

FIG. 62 is a diagram for describing a first example of a process for determining a three-dimensional point cloud that is referred to when the three-dimensional data encoding device according to the present embodiment encodes a current three-dimensional point cloud to be encoded. Specifically, FIG. 62 illustrates an example of the inter prediction (inter prediction reference method) in the three-dimensional data encoding device. As an example of the inter prediction to be described below, a procedure performed by the three-dimensional data encoding device will be described. The procedure performed by the three-dimensional data encoding device applies to a process for determining a three-dimensional point cloud that is referred to when the three-dimensional data decoding device decodes an encoded current three-dimensional point cloud to be decoded.

In the present example, the three-dimensional data encoding device sets a space including the current three-dimensional point cloud (also referred to as a first rectangular parallelepiped) and sets a space that matches with the first rectangular parallelepiped (also referred to as a second rectangular parallelepiped) by moving the first rectangular parallelepiped based on motion compensation information. In the present example, the three-dimensional data encoding device sets the second rectangular parallelepiped by moving the first rectangular parallelepiped by translation.

The second rectangular parallelepiped set in this manner serves as a space including an encoded three-dimensional point cloud (also referred to as an inter reference point cloud) that is to be referred to in encoding the current three-dimensional point cloud. The encoded three-dimensional point cloud is a three-dimensional point cloud that has had three-dimensional data (for example, geometry information) encoded.

Note that the shape of the space set by the three-dimensional data encoding device need not be a rectangular parallelepiped and may be any shape such as a cone and a sphere.

Figure 63:
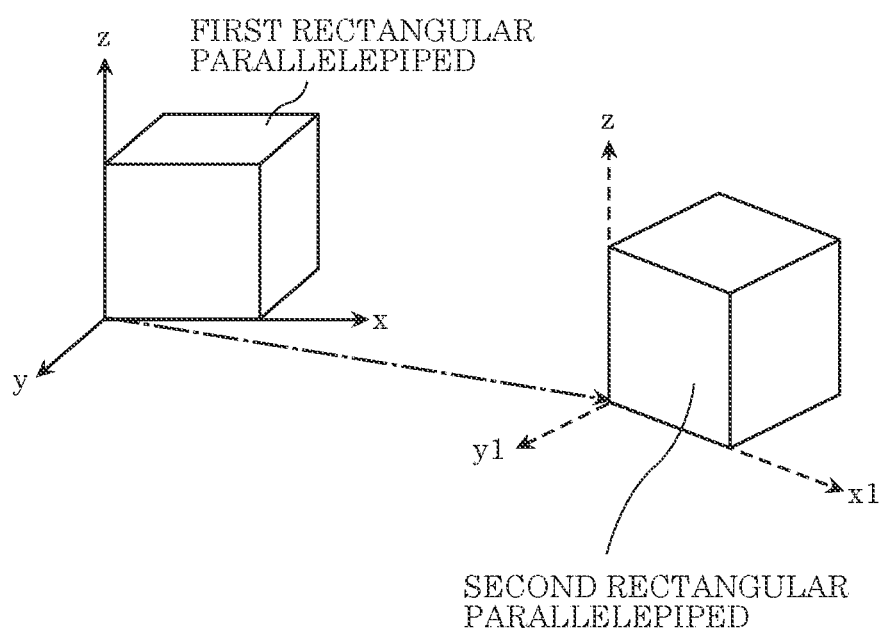
FIG. 63 is a diagram for describing a second example of the process for determining the three-dimensional point cloud that is referred to when the three-dimensional data encoding device according to Embodiment 6 encodes the current three-dimensional point cloud.

FIG. 63 is a diagram for describing a second example of a process for determining a three-dimensional point cloud that is referred to when the three-dimensional data encoding device according to the present embodiment encodes a current three-dimensional point cloud to be encoded.

As in the above example, in the present example, the three-dimensional data encoding device moves the first rectangular parallelepiped by translation and further rotates (horizontally rotates in the present example) the first rectangular parallelepiped to set a space including the inter reference point cloud (i.e., the second rectangular parallelepiped).

The horizontal rotation means a rotation centered on an axis corresponding to a vertical direction in an actual space (i.e., a rotation about the axis). For example, the horizontal rotation is a rotation centered on a z-axis of a three-dimensional Cartesian coordinate system. Accordingly, sides of the first rectangular parallelepiped that are parallel to a y-axis become parallel to a y1-axis in the second rectangular parallelepiped. Sides of the first rectangular parallelepiped that are parallel to an x-axis become parallel to an x1-axis in the second rectangular parallelepiped.

In the present example, the three-dimensional data encoding device sets the second rectangular parallelepiped by moving the first rectangular parallelepiped by translation and then horizontally rotating the first rectangular parallelepiped. The three-dimensional data encoding device may set the second rectangular parallelepiped by horizontally rotating the first rectangular parallelepiped and then moving the first rectangular parallelepiped by translation.

In addition, the three-dimensional data encoding device may rotate the first rectangular parallelepiped about a preset z-axis or may set a new axis parallel to the preset z-axis based on a position of the first rectangular parallelepiped and rotate the first rectangular parallelepiped about the axis newly set. For example, the three-dimensional data encoding device may set a side of the first rectangular parallelepiped parallel to the z-axis as the new axis.

Figure 64:
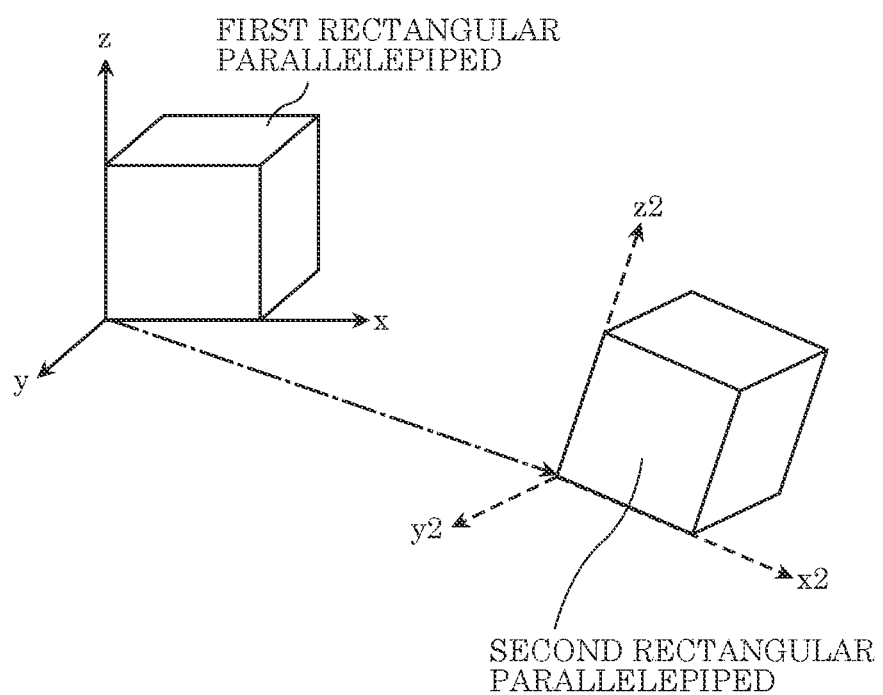
FIG. 64 is a diagram for describing a third example of the process for determining the three-dimensional point cloud that is referred to when the three-dimensional data encoding device according to Embodiment 6 encodes the current three-dimensional point cloud.

FIG. 64 is a diagram for describing a third example of a process for determining a three-dimensional point cloud that is referred to when the three-dimensional data encoding device according to the present embodiment encodes a current three-dimensional point cloud to be encoded.

In the present example, the three-dimensional data encoding device sets the second rectangular parallelepiped by moving the first rectangular parallelepiped by translation and further three-dimensionally rotating the first rectangular parallelepiped.

The 3D rotation refers to a rotation centered on one or more axes. In the 3D rotation, for example, the three-dimensional data encoding device rotates the first rectangular parallelepiped about the x-axis, rotates the rotated first rectangular parallelepiped about the y-axis, and further rotates the rotated first rectangular parallelepiped about the z-axis. Accordingly, sides of the first rectangular parallelepiped that are parallel to the x-axis become parallel to an x2-axis in the second rectangular parallelepiped. Sides of the first rectangular parallelepiped that are parallel to the y-axis become parallel to a y2-axis in the second rectangular parallelepiped. Sides of the first rectangular parallelepiped that are parallel to the z-axis become parallel to a z2-axis in the second rectangular parallelepiped.

Note that, in the 3D rotation, the three-dimensional data encoding device only has to perform, for example, rotation centered on at least one of an x-axis, a y-axis, and a z-axis of a three-dimensional Cartesian coordinate system. In addition, in the 3D rotation, the three-dimensional data encoding device performs rotation centered on the at least one of the x-axis, the y-axis, and the z-axis in any order.

In addition, the three-dimensional data encoding device may rotate the first rectangular parallelepiped about each of preset axes or may set new axes parallel to the preset axes based on a position of the first rectangular parallelepiped and rotate the first rectangular parallelepiped about the axes newly set.

As information for identifying a position of the second rectangular parallelepiped, predicting mode information indicating which of prediction of any one of the above examples (moving methods) may be written in a header part of a frame, a slice, an octree (Octree), a prediction tree (Predtree), or the like, or the predicting mode information may be entropy encoded and written in a header part of node information of an octree or a prediction tree.

Alternatively, as the information for identifying the position of the second rectangular parallelepiped, motion compensation information that indicates an amount of movement between the first vertex of the first rectangular parallelepiped and the corresponding second vertex of the second rectangular parallelepiped that is determined under a predetermined rule (e.g., selecting a vertex that is the closest to origin coordinates, etc.) and indicates a rotation angle or rotation angles of the horizontal rotation or the 3D rotation, and the like may be written in a header part of a frame, a slice, an octree, a prediction tree, or the like, or the motion compensation information may be entropy encoded and written in a header part of node information of an octree or a prediction tree.

Note that all of the rotation angle or rotation angles are not necessarily expressed. For example, the rotation angle or rotation angles within a limited range such as ±30° may be expressed.

In addition, all of the above methods in the examples are not necessarily always required, and one or some of the methods may be used.

In addition, to one or some or all of the methods in the examples, another method capable of uniquely setting a space including the inter reference point cloud (e.g., a method not performing motion compensation by setting the amount of movement to zero) may be added and allowed to be selected.

As stated above, performing the inter prediction using the rotation in addition to the translation enables the above three-dimensional data encoding device and three-dimensional data decoding device to improve the accuracy of predicting an occurrence probability of current node information to be encoded. Therefore, the three-dimensional data encoding device can reduce an amount of information of a residual signal to be entropy encoded, so that there is a possibility that the encoding efficiency can be improved. Similarly, the three-dimensional data decoding device can reduce the amount of information of the residual signal to be entropy decoded, so that there is a possibility that the decoding efficiency can be improved.

It should be noted that the moving method may be determined arbitrarily. For example, the three-dimensional data encoding device may move the first rectangular parallelepiped using the above moving methods, calculate code amounts resulting from the moving methods when geometry information of the three-dimensional point cloud is encoded by a method described later, and select a moving method that gives the smallest code amount of the calculated code amounts.

Subsequently, an example of a procedure of the motion compensation will be described.

The three-dimensional data encoding device moves a three-dimensional point cloud included in the second rectangular parallelepiped (the inter reference point cloud) by the moving method by which the first rectangular parallelepiped has been moved (e.g., the translation) so that the three-dimensional point cloud is included in the first rectangular parallelepiped. The three-dimensional data encoding device refers to an encoded three-dimensional point cloud (i.e., a three-dimensional point cloud that has been encoded once), which is the three-dimensional point cloud that has been moved in this manner, (also referred to as an inter prediction point cloud) to encode the current three-dimensional point cloud (specifically, point cloud data, more specifically, geometry information). For example, the three-dimensional data encoding device sets the inter reference point cloud as the inter prediction point cloud by moving the inter reference point cloud in a direction opposite to that of the movement of the first rectangular parallelepiped to the position of the second rectangular parallelepiped so that the inter reference point cloud is included in the first rectangular parallelepiped.

Figure 65:
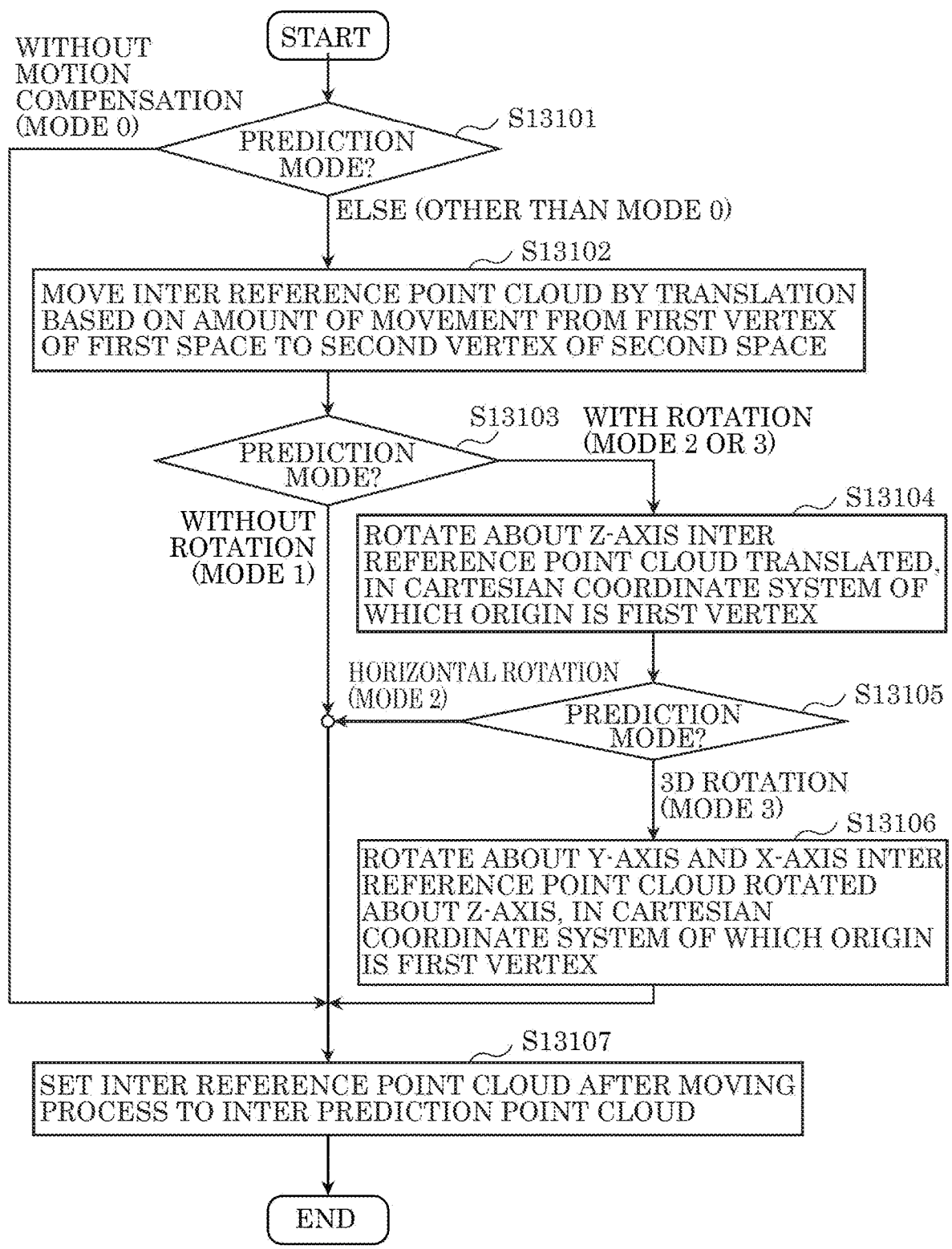
FIG. 65 is a flowchart illustrating a procedure for determining a three-dimensional point cloud that is referred to when the three-dimensional data encoding device according to Embodiment 6 encodes the current three-dimensional point cloud.

FIG. 65 is a flowchart illustrating the procedure for determining (setting) a three-dimensional point cloud that is referred to when the three-dimensional data encoding device according to the present embodiment encodes the current three-dimensional point cloud. Specifically, FIG. 65 is the flowchart illustrating an example of the procedure of the motion compensation in the inter prediction. The three-dimensional data encoding device moves the inter reference point cloud included in the second rectangular parallelepiped by translation or rotates the inter reference point cloud to derive the inter prediction point cloud that is referred to when the current three-dimensional point cloud is encoded, which corresponds to the current three-dimensional point cloud included in the first rectangular parallelepiped.

Note that, in the present example, mode 0 does not include the motion compensation, that is, mode 0 is a mode indicating a moving method in which the inter reference point cloud is not moved (without motion compensation). In the present example, mode 1 is a mode indicating a moving method in which the inter reference point cloud is only moved by translation (without rotation). In the present example, mode 2 is a mode indicating a moving method in which the inter reference point cloud is moved by translation and then horizontally rotated (horizontal rotation). In the present example, mode 3 is a mode indicating a moving method in which the inter reference point cloud is moved by translation and then three-dimensionally rotated (3D rotation). In the present example, it is assumed that one of these modes is determined in advance as a prediction mode (e.g., mc_mode described later). For example, the three-dimensional data encoding device determines the moving method so that the moving method gives the smallest code amount as described above, determines a prediction mode indicating the determined moving method in advance, and performs the following process using the determined prediction mode.

When the prediction mode is a mode that does not include the motion compensation (mode 0 in the present example) ("Without motion compensation (mode 0)" in step S13101), that is, when the three-dimensional point cloud (i.e., the inter reference point cloud) is to be moved by the moving method indicated as mode 0, the three-dimensional data encoding device proceeds the process to step S13107.

The three-dimensional data encoding device performs a moving process of moving the inter reference point cloud by the moving method indicated as the determined mode including the translation and/or the rotation, and the like to set the inter reference point cloud subjected to the moving process as the inter prediction point cloud (S13107), When the prediction mode is mode 0, the three-dimensional data encoding device performs no motion compensation in step S13107, that is, sets the second space to the same position as that of the first space to set the inter reference point cloud included in the second space (i.e., the first space in this case) as the inter prediction point cloud.

In contrast, when the prediction mode is not mode 0 ("Else (other than mode 0)" in step S13101), the three-dimensional data encoding device moves the inter reference point cloud by translation based on an amount of movement (e.g., a distance) from a first vertex (e.g., any one of the vertices of the first rectangular parallelepiped) of the first space (e.g., a space corresponding to the first rectangular parallelepiped) to a second vertex (e.g., any one of the vertices of the second rectangular parallelepiped) of the second space (e.g., a space corresponding to the second rectangular parallelepiped), which corresponds to the first vertex (S13102). For example, the three-dimensional data encoding device moves the inter reference point cloud in an opposite direction to the above predetermined direction by the predetermined amount of movement.

When the prediction mode is a mode that includes only the translation (mode 1 in the present example), that is, when the inter reference point cloud is to be moved by the moving method indicated as mode 1 ("Without rotation (mode 1)" in step S13103), the three-dimensional data encoding device proceeds the process to step S13107.

When the prediction mode is mode 1, the three-dimensional data encoding device sets in step S13107 the inter reference point cloud subjected to the translation in step S13102 as the inter prediction point cloud.

In contrast, when the prediction mode is mode 2 or 3 ("With rotation (mode 2 or 3)" in step S13103), the three-dimensional data encoding device sets a Cartesian coordinate system of which the origin is the first vertex subjected to the translation, and rotates the inter reference point cloud subjected to the translation in step S13102 about a z-axis of the Cartesian coordinate system (a vertical axis) by an angle corresponding to a first rotation angle (S13104). For example, the three-dimensional data encoding device rotates the inter reference point cloud by the first rotation angle in an opposite direction to a rotating direction in which the first rectangular parallelepiped has been rotated about the z-axis when the first rectangular parallelepiped is moved to the second rectangular parallelepiped.

When the prediction mode is a mode that includes the translation and the horizontal rotation (mode 2 in the present example), that is, when the inter reference point cloud is to be moved by the moving method indicated as mode 2 ("Horizontal rotation (mode 2)" in step S13105), the three-dimensional data encoding device proceeds the process to step S13107.

When the prediction mode is mode 2, the three-dimensional data encoding device sets in step S13107 the inter reference point cloud subjected to the translation in step S13102 and then to the rotation in step S13104 as the inter prediction point cloud.

In contrast, when the prediction mode is mode 3 ("3D rotation (mode 3)" in step S13105), the three-dimensional data encoding device sets a Cartesian coordinate system of which the origin is the first vertex subjected to the rotation in step S13104, and rotates the inter reference point cloud subjected to the rotation in step S13104 about a y-axis and an x-axis of the Cartesian coordinate system by a second rotation angle and a third rotation angle, respectively (S13106). For example, the three-dimensional data encoding device rotates the inter reference point cloud subjected to the rotation in step S13104 about the y-axis by an angle corresponding to the second rotation angle, further sets a Cartesian coordinate system of which the origin is the first vertex subjected to the rotation about the y-axis, and rotates the inter reference point cloud about the x-axis of the Cartesian coordinate system by an angle corresponding to the third rotation angle. For example, the three-dimensional data encoding device rotates the inter reference point cloud by the second rotation angle in an opposite direction to a rotating direction in which the first rectangular parallelepiped has been rotated about the y-axis when the first rectangular parallelepiped is moved to the second rectangular parallelepiped, and further rotates the inter reference point cloud by the third rotation angle in an opposite direction to a rotating direction in which the first rectangular parallelepiped has been rotated about the x-axis when the first rectangular parallelepiped is moved to the second rectangular parallelepiped. After performing step S13106, the three-dimensional data encoding device proceeds the process to step S13107.

When the prediction mode is mode 3, the three-dimensional data encoding device further rotates in step S13106 the inter reference point cloud subjected to the translation in step S13102 and then to the rotation in step S13104 and sets in step S13107 the inter reference point cloud subjected to the rotation in step S13106 as the inter prediction point cloud.

It should be noted that, for example, when the three-dimensional Cartesian coordinate system is set in a case where a three-dimensional point cloud obtained by a sensor in motion such as an on-board sensor is to be encoded, the motion compensation (rotation) may be performed in the order of yaw, pitch, and roll, with an axis parallel to a direction corresponding to a vertical direction in an actual space set as a z-axis, an axis parallel to a direction corresponding to a forward direction of a mobile body set as an x-axis, and an axis parallel to a direction corresponding to a lateral direction of the mobile body set as a y-axis.

Although the above mode 3 is described with an example in which the rotation is performed in the order of the z-axis, the y-axis, and the x-axis, the rotation may be performed in a transposed order of rotation, such as the order of the z-axis, the x-axis, and the y-axis.

In addition, although the above mode 2 or 3 is described with an example in which the rotation is performed after the translation, the translation and the rotation may be exchanged; the translation may be performed after the rotation.

In addition, the predetermined direction, the predetermined amount of movement, the first rotation angle, the second rotation angle, and the third rotation angle may be determined arbitrarily.

Subsequently, an example of the motion compensation information will be described.

FIG. 66 is a diagram illustrating a syntax example of the motion compensation information according to the present embodiment (motion_info( ) in the present example). For example, the three-dimensional data encoding device notifies the three-dimensional data decoding device of the motion compensation information by generating a bitstream including motion_info( ).

mc_mode is information indicating a method of calculating the inter prediction point cloud. For example, the three-dimensional data encoding device notifies the three-dimensional data decoding device of information indicating how to determine the inter prediction point cloud, such as mc_mode. For example, the three-dimensional data encoding device generates a bitstream including mc_mode that indicates mode 0 (without motion compensation), mode 1 (translation), mode 2 (translation and horizontal rotation), or mode 3 (translation and 3D rotation), and the like.

ref_frame_idx is information indicating a frame to which the inter reference point cloud belongs. Specifically, ref_frame_idx is information indicating an index value of the frame to which the inter reference point cloud belongs. For example, the three-dimensional data encoding device generates a bitstream including ref_frame_idx indicating an index value of a frame to which the inter reference point cloud belongs.

motion_vector is information indicating the amount of movement in the translation. For example, in a mode other than mode 0 (without motion compensation), the three-dimensional data encoding device generates a bitstream including motion_vector that is information concerning an amount of movement from the first vertex of the first space to the second vertex of the second space corresponding to the first vertex.

Note that, for example, when motion_vector is not included in a bitstream obtained from the three-dimensional data encoding device, that is, when motion_vector is not notified of, the three-dimensional data decoding device may set motion_vector to 0 (zero), The information concerning the amount of movement may be information indicating an absolute amount or may be information indicating a difference between the absolute amount and a predicted value of the amount of movement determined by using the absolute amount, spatiotemporal continuity, and the like.

rotation_angle is information indicating the rotation angle of the rotation. For example, in mode 2 and mode 3 including the rotation, the three-dimensional data encoding device generates a bitstream including information (rotation_angle[0]) concerning the first rotation angle about the vertical axis (z-axis). For example, in mode 3, the three-dimensional data encoding device generates the bitstream further including information (rotation_angle[1]) concerning the second rotation angle about the y-axis and information (rotation_angle[2]) concerning the third rotation angle about the x-axis.

Note that, for example, when rotation angle is not included in a bitstream obtained from the three-dimensional data encoding device, that is, when rotation_angle[k] (k=0, 1, 2) are not notified of, the three-dimensional data decoding device may set rotation_angle to 0 (zero).

In addition, although mode 2 is described with an example in which the translation and the horizontal rotation (rotation centered on the z-axis) are combined, the rotation is not necessarily limited to the rotation centered on the z-axis and may include rotation centered on the x-axis and/or rotation centered on the y-axis. Alternatively, for example, the three-dimensional data encoding device may be capable of changing an axis on which the rotation is to be centered by writing the axis on which the rotation is to be centered in a header part of an SPS, a GPS, a frame, a slice, an octree, a prediction tree, or the like so as to notify the three-dimensional data decoding device of the axis. Alternatively, for example, the three-dimensional data encoding device may entropy encodes information indicating on which of the axes the rotation is to be centered and writes the encoded information in a header part of node information of an octree or a prediction tree.

In addition, motion_vector and rotation_angle each may be any type of information that allows a positional relationship between the inter reference point cloud and the inter prediction point cloud to be identified uniquely and are not limited to particular types of information. For example, motion_vector and rotation_angle may be an amount of movement and a rotation angle of the movement of the first space to the second space, respectively. Alternatively, for example, motion_vector and rotation_angle may be an amount of movement and a rotation angle of the movement of the second space to the first space, respectively. The motion compensation performed by both the three-dimensional data encoding device and the three-dimensional data decoding device only has to be performed by both the three-dimensional data encoding device and the three-dimensional data decoding device under common definitions.

The process, the syntax, and the like according to the present embodiment may be carried out in combination with at least part of the other embodiments.

In addition, part of the process and the syntax, and the like according to the present embodiment may be carried out in combination with the other embodiments.

Furthermore, all of the structural components are not necessarily required at all times, and it is also acceptable for the three-dimensional data encoding device and the three-dimensional data decoding device to include only part of the structural elements. Alternatively, the three-dimensional data encoding device and the three-dimensional data decoding device may be configured to execute only part of the processes of the present embodiment.

Figure 67:
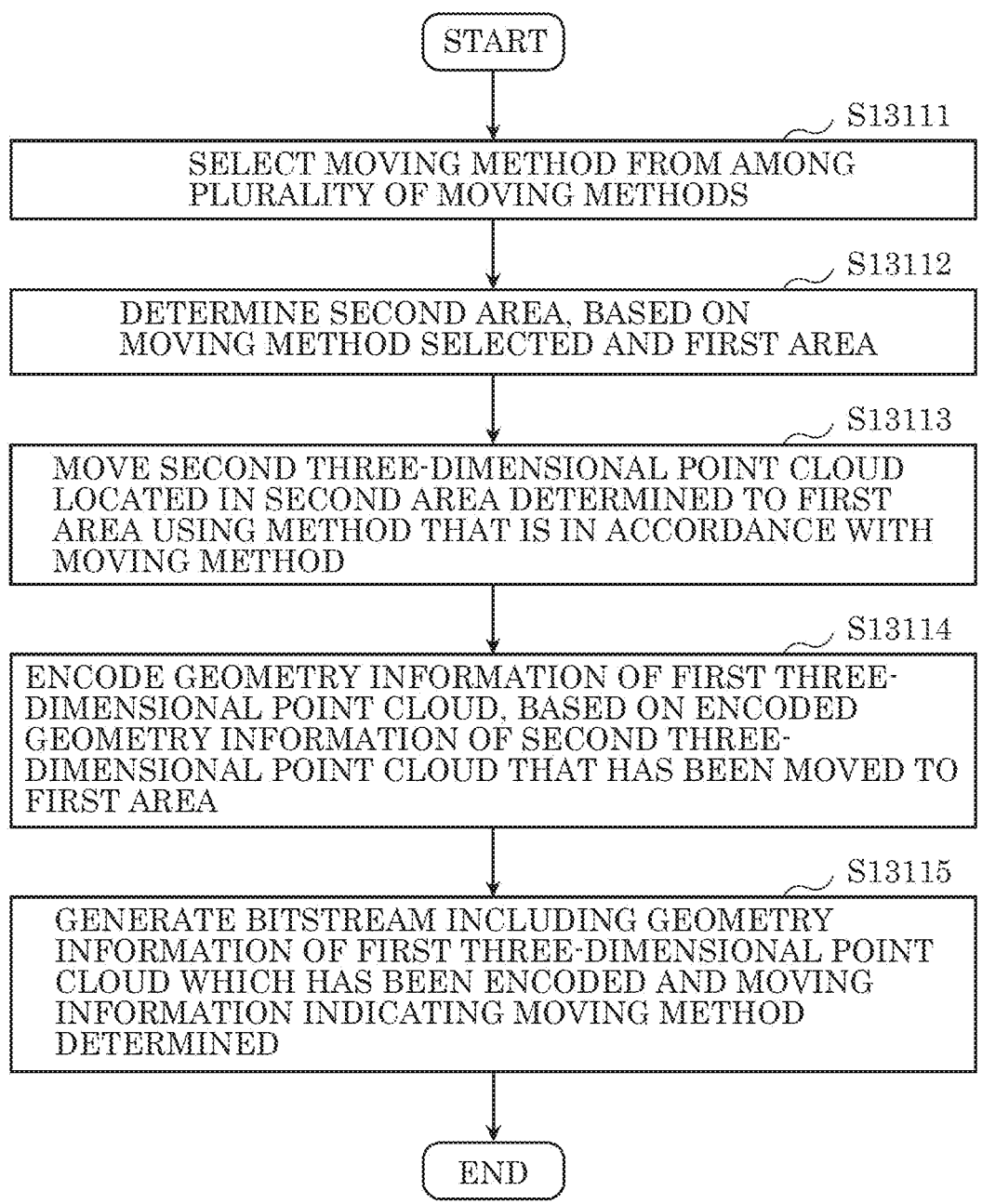
FIG. 67 is a flowchart of a procedure by the three-dimensional data encoding device according to Embodiment 6.

As described above, the three-dimensional data encoding device according to the present embodiment performs the process illustrated in FIG. 67.

FIG. 67 is a flowchart illustrating a procedure performed by the three-dimensional data encoding device according to the present embodiment.

First, the three-dimensional data encoding device selects a moving method from among a plurality of moving methods (S13111).

Next, the three-dimensional data encoding device determines a second area based on the moving method selected and the first area (for example, information indicating the position and the size of the first area) (S13112). For example, the three-dimensional data encoding device determines the second area by moving the first area using the moving method selected.

Next, the three-dimensional data encoding device moves a second three-dimensional point cloud located in the second area determined to the first area using a method that is in accordance with the moving method (S13113). For example, the second three-dimensional point cloud prior to being moved is, for example, the above-described inter reference point cloud, and the second three-dimensional point cloud is the above-described inter prediction point cloud.

Next, the three-dimensional data encoding device encodes the geometry information of the first three-dimensional point cloud, based on encoded geometry information of the second three-dimensional point cloud that has been moved to the first area (S13114). The first three-dimensional point cloud is, for example, the above-described current three-dimensional point cloud to be encoded. For example, the first three-dimensional point cloud belongs to a first frame. Furthermore, for example, the second three-dimensional point cloud belongs to a second frame different from the first frame. For example, the three-dimensional data encoding device may perform encoding using inter prediction. It should be noted that the first three-dimensional point cloud and the second three-dimensional point cloud may belong to the same frame. In this case, the three-dimensional data encoding device may perform encoding using a prediction method that is the same as inter prediction.

Next, the three-dimensional data encoding device generates a bitstream including the geometry information of the first three-dimensional point cloud which has been encoded and moving information indicating the moving method selected (S13115). The moving information is, for example, the above-described mc_mode.

The plurality of moving methods includes either one or both of a method for translating the second three-dimensional point cloud and a method for rotating the second three-dimensional point cloud. The plurality of moving methods may include at least the method for translating the second three-dimensional point cloud and at least the method for rotating the second three-dimensional point cloud.

It should be noted that, regarding the plurality of moving methods, methods other than the methods described above are not particularly limited and may be determined arbitrarily in advance. Alternatively, it is also acceptable for the plurality of moving methods to include only the method for translating the second three-dimensional point cloud and the method for rotating the second three-dimensional point cloud.

Accordingly, the three-dimensional point cloud that is moved by a moving method appropriately selected is used to encode the geometry information of the current three-dimensional point cloud to be encoded. As a result, the encoding efficiency can be improved. For example, by encoding the geometry information of the current three-dimensional point cloud using the three-dimensional point cloud that is moved by a moving method appropriately selected, the accuracy of predicting an occurrence probability of current node information to be encoded can be improved. Therefore, an amount of information of a residual signal to be entropy encoded can be reduced, so that the encoding efficiency can be improved.

Furthermore, for example, the plurality of moving methods include a method in which the second three-dimensional point cloud is not moved. Specifically, the first area and the second area may be the same area, Stated differently, the above-described motion compensation need not be performed.

Furthermore, for example, the plurality of moving methods include a method for translating and rotating the second three-dimensional point cloud.

For example, a three-dimensional point cloud based on information obtained by a sensor in motion such as an on-board sensor is often changed in position so that both the translation and the rotation are performed with respect to a change over time, That is, for example, when frames are seen in a time-series order, the position of the three-dimensional point cloud is often moved in such a manner as to be moved by translation and rotated. For this reason, a method including the translation and the rotation as the moving method can facilitate selection of an appropriate three-dimensional point cloud as a three-dimensional point cloud that is to be used when the current three-dimensional point cloud is encoded.

Furthermore, for example, in the method for translating and rotating the second three-dimensional point cloud, the rotating is subsequent to the translating.

Furthermore, for example, the method for rotating the second three-dimensional point cloud includes, for at least one axis among three axes in a three-dimensional Cartesian coordinate system, rotating the second three-dimensional point cloud about an axis parallel to the at least one axis.

Furthermore, for example, the at least one axis includes an axis corresponding to a vertical direction in an actual space. The three-dimensional point cloud is, for example, a point cloud corresponding to an object or the like in an actual space that is generated by sensing the actual space such as photographing. For example, when the three-dimensional point cloud is to be rotated, the three-dimensional point cloud is rotated about an axis that corresponds to a vertical direction in the actual space where the object or the like corresponding to the three-dimensional point cloud is located.

For example, a three-dimensional point cloud based on information obtained by a sensor in motion such as an on-board sensor is highly likely to rotate about an axis parallel to a vertical direction of an actual space with respect to a change over time. At the same time, such a three-dimensional point cloud is less likely to rotate about an axis parallel to a horizontal direction of the actual space with respect to the change over time. For this reason, a method including the rotation about the axis corresponding to the vertical direction of the actual space as the moving method can facilitate selection of an appropriate three-dimensional point cloud as a three-dimensional point cloud that is to be used when geometry information of the current three-dimensional point cloud is encoded.

Furthermore, for example, the at least one axis is a single axis.

As described above, for example, a three-dimensional point cloud based on information obtained by a sensor in motion such as an on-board sensor is less likely to rotate about an axis parallel to the horizontal direction of the actual space with respect to the change over time, Therefore, limiting a method of the rotation to the method including rotation about the axis parallel to the vertical direction of the actual space can facilitate selection of an appropriate three-dimensional point cloud as a three-dimensional point cloud that is to be used when geometry information of the current three-dimensional point cloud is encoded, while preventing the number of a plurality of moving methods from unnecessarily increasing.

Furthermore, for example, the three-dimensional data decoding device includes a processor and memory, and the processor performs the above process using the memory. A control program for performing the above process may be stored in the memory.

Figure 68:
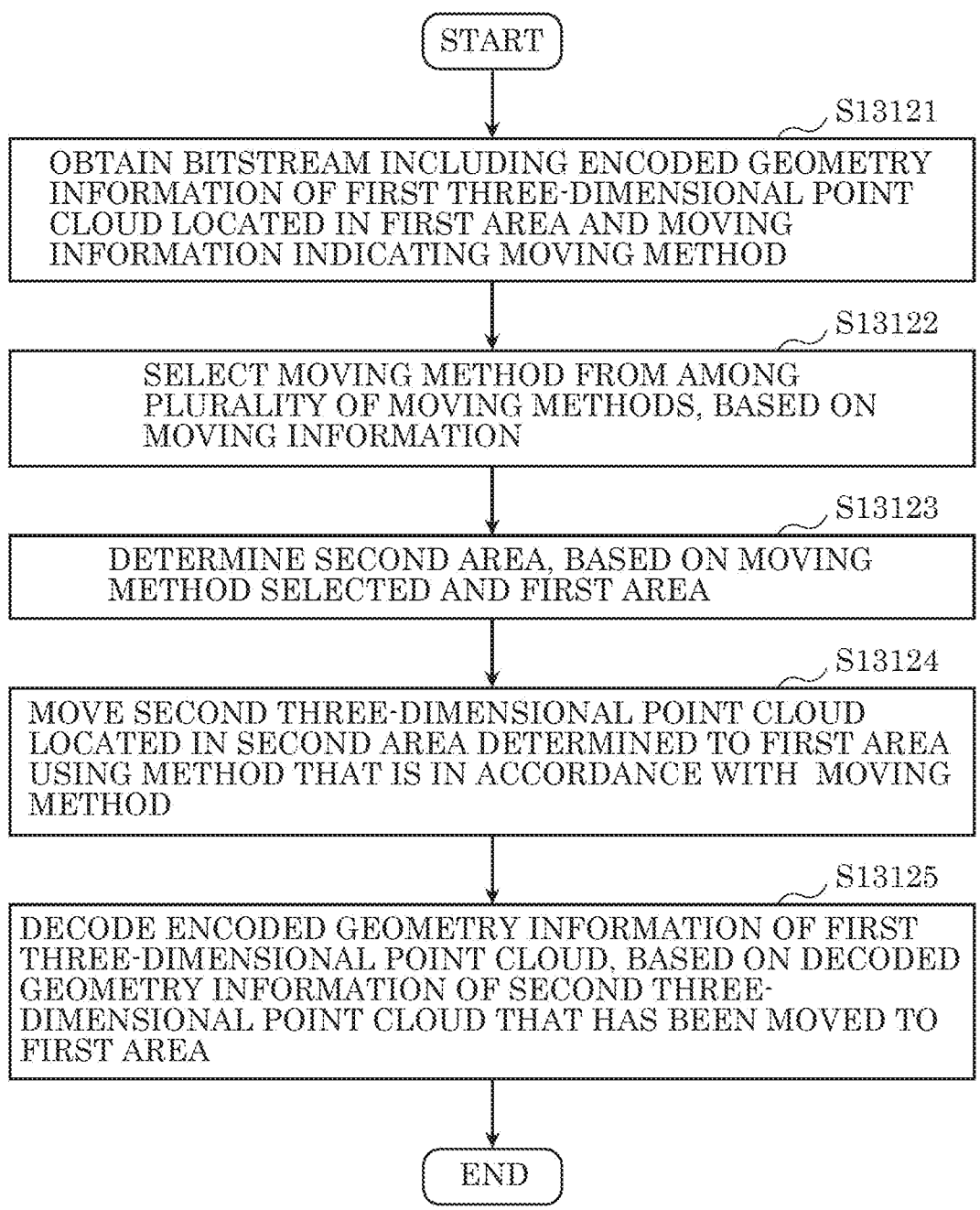
FIG. 68 is a flowchart of a procedure by the three-dimensional data decoding device according to Embodiment 6.

Furthermore, the three-dimensional data decoding device according to the present embodiment performs the process illustrated in FIG. 68.

FIG. 68 is a flowchart illustrating a procedure performed by the three-dimensional data decoding device according to the present embodiment.

First, the three-dimensional data decoding device obtains a bi stream including the encoded geometry information of the first three-dimensional point cloud and moving information indicating a moving method (S13121).

Next, the three-dimensional data decoding device selects the moving method from among a plurality of moving methods, based on the moving information (S13122).

Next, the three-dimensional data decoding device determines a second area based on the moving method selected and the first area (for example, information indicating the position and the size of the first area) (S13123). For example, the three-dimensional data decoding device determines the second area by moving the first area using the moving method selected.

Next, the three-dimensional data decoding device moves a second three-dimensional point cloud located in the second area determined to the first area using a method that is in accordance with the moving method (S13124).

Next, the three-dimensional data decoding device decodes the encoded geometry information of the first three-dimensional point cloud, based on decoded geometry information of the second three-dimensional point cloud that has been moved to the first area (S13125). The decoded three-dimensional point cloud is a three-dimensional point cloud that has had three-dimensional data (for example, geometry information) decoded.

The plurality of moving methods includes either one or both of a method for translating the second three-dimensional point cloud and a method for rotating the second three-dimensional point cloud.

Accordingly, the three-dimensional point cloud that is moved by a moving method appropriately selected is used to decode the encoded geometry information of the current three-dimensional point cloud to be decoded. As a result, decoding efficiency can be improved.

Furthermore, for example, the plurality of moving methods include a method in which the second three-dimensional point cloud is not moved.

Furthermore, for example, the plurality of moving methods include a method for translating and rotating the second three-dimensional point cloud.

For example, a three-dimensional point cloud based on information obtained by a sensor in motion such as an on-board sensor is often changed in position so that both the translation and the rotation are performed with respect to a change over time. That is, for example, when frames are seen in a time-series order, the position of the three-dimensional point cloud is often moved in such a manner as to be moved by translation and rotated. For this reason, a method including the translation and the rotation as the moving method can facilitate selection of an appropriate three-dimensional point cloud as a three-dimensional point cloud that is to be used when the encoded current three-dimensional point cloud is decoded.

Furthermore, for example, in the method for translating and rotating the second three-dimensional point cloud, the rotating is subsequent to the translating.

Furthermore, for example, the method for rotating the second three-dimensional point cloud includes, for at least one axis among three axes in a three-dimensional Cartesian coordinate system, rotating the second three-dimensional point cloud about an axis parallel to the at least one axis.

Furthermore, for example, the at least one axis includes an axis corresponding to a vertical direction in an actual space.

For example, a three-dimensional point cloud based on information obtained by a sensor in motion such as an on-board sensor is highly likely to rotate about an axis parallel to a vertical direction of an actual space with respect to a change over time. At the same time, such a three-dimensional point cloud is less likely to rotate about an axis parallel to a horizontal direction of the actual space with respect to the change over time. For this reason, a method including the rotation about the axis corresponding to the vertical direction of the actual space as the moving method can facilitate selection of an appropriate three-dimensional point cloud as a three-dimensional point cloud that is to be used when the encoded geometry information of the current three-dimensional point cloud is decoded.

Furthermore, for example, the at least one axis is a single axis.

As described above, for example, a three-dimensional point cloud based on information obtained by a sensor in motion such as an on-board sensor is less likely to rotate about an axis parallel to the horizontal direction of the actual space with respect to the change over time. For this reason, limiting a method of the rotation to the method including rotation about the axis parallel to the vertical direction of the actual space can facilitate selection of an appropriate three-dimensional point cloud as a three-dimensional point cloud that is to be used when the encoded geometry information of the current three-dimensional point cloud is decoded, while preventing the number of a plurality of moving methods from unnecessarily increasing.

Furthermore, for example, the three-dimensional data decoding device includes a processor and memory, and the processor performs the above process using the memory. A control program for performing the above process may be stored in the memory.

Embodiment 7

Figure 69:
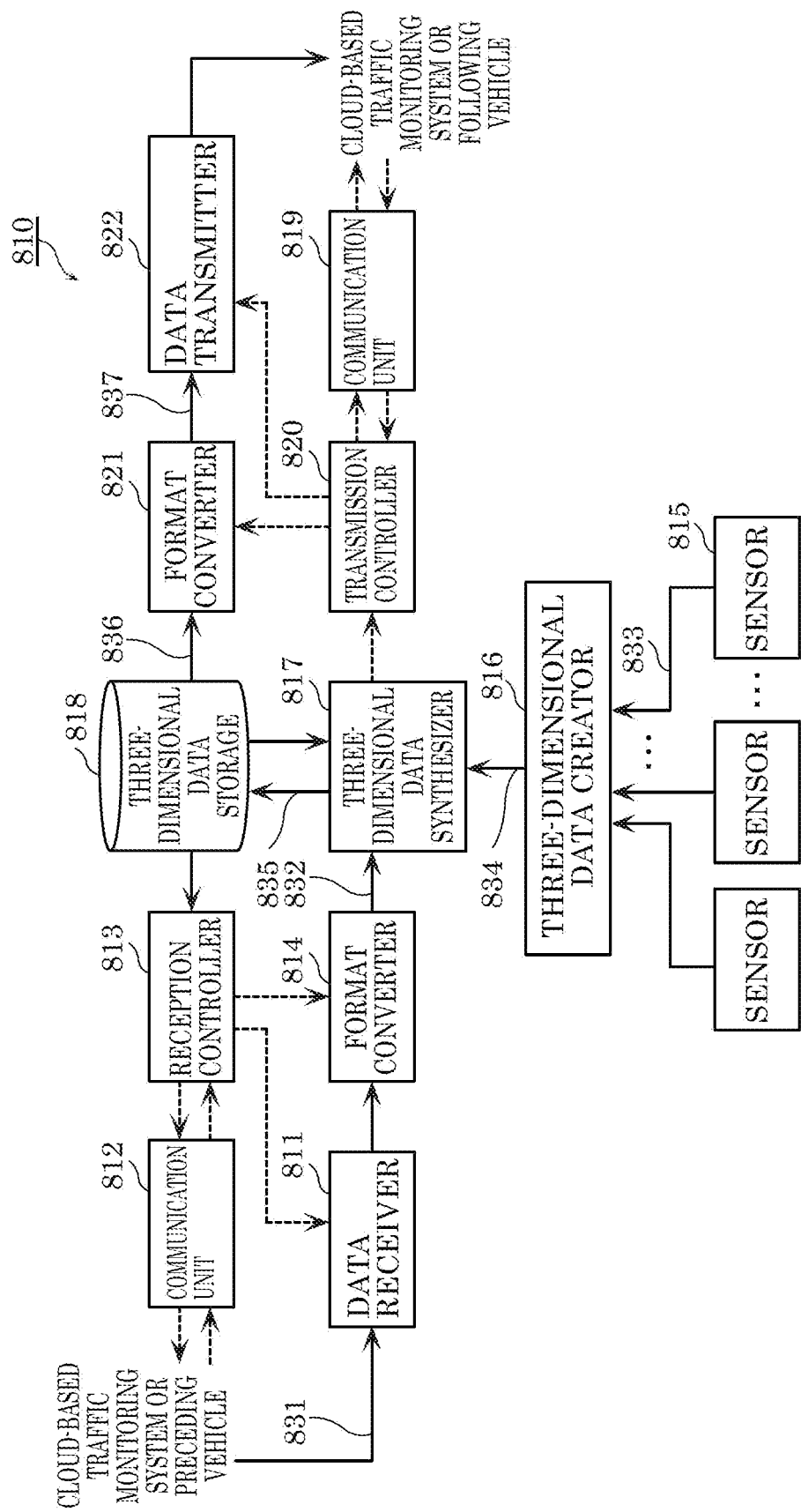
FIG. 69 is a block diagram of a three-dimensional data creation device according to Embodiment 7.

The following describes the structure of three-dimensional data creation device 810 according to the present embodiment, FIG. 69 is a block diagram of an exemplary structure of three-dimensional data creation device 810 according to the present embodiment. Such three-dimensional data creation device 810 is equipped, for example, in a vehicle. Three-dimensional data creation device 810 transmits and receives three-dimensional data to and from an external cloud-based traffic monitoring system, a preceding vehicle, or a following vehicle, and creates and stores three-dimensional data.

Three-dimensional data creation device 810 includes data receiver 811, communication unit 812, reception controller 813, format converter 814, a plurality of sensors 815, three-dimensional data creator 816, three-dimensional data synthesizer 817, three-dimensional data storage 818, communication unit 819, transmission controller 820, format converter 821, and data transmitter 822.

Data receiver 811 receives three-dimensional data 831 from a cloud-based traffic monitoring system or a preceding vehicle. Three-dimensional data 831 includes, for example, information on a region undetectable by sensors 815 of the own vehicle, such as a point cloud, visible light video, depth information, sensor position information, and speed information.

Communication unit 812 communicates with the cloud-based traffic monitoring system or the preceding vehicle to transmit a data transmission request, etc. to the cloud-based traffic monitoring system or the preceding vehicle.

Reception controller 813 exchanges information, such as information on supported formats, with a communications partner via communication unit 812 to establish communication with the communications partner.

Format converter 814 applies format conversion, etc. on three-dimensional data 831 received by data receiver 811 to generate three-dimensional data 832. Format converter 814 also decompresses or decodes three-dimensional data 831 when three-dimensional data 831 is compressed or encoded.

A plurality of sensors 815 are a group of sensors, such as visible light cameras and infrared cameras, that obtain information on the outside of the vehicle and generate sensor information 833. Sensor information 833 is, for example, three-dimensional data such as a point cloud (point group data), when sensors 815 are laser sensors such as LIDARs. Note that a single sensor may serve as a plurality of sensors 815.

Three-dimensional data creator 816 generates three-dimensional data 834 from sensor information 833. Three-dimensional data 834 includes, for example, information such as a point cloud, visible light video, depth information, sensor position information, and speed information.

Three-dimensional data synthesizer 817 synthesizes three-dimensional data 834 created on the basis of sensor information 833 of the own vehicle with three-dimensional data 832 created by the cloud-based traffic monitoring system or the preceding vehicle, etc., thereby forming three-dimensional data 835 of a space that includes the space ahead of the preceding vehicle undetectable by sensors 815 of the own vehicle.

Three-dimensional data storage 818 stores generated three-dimensional data 835, etc.

Communication unit 819 communicates with the cloud-based traffic monitoring system or the following vehicle to transmit a data transmission request, etc. to the cloud-based traffic monitoring system or the following vehicle.

Transmission controller 820 exchanges information such as information on supported formats with a communications partner via communication unit 819 to establish communication with the communications partner. Transmission controller 820 also determines a transmission region, which is a space of the three-dimensional data to be transmitted, on the basis of three-dimensional data formation information on three-dimensional data 832 generated by three-dimensional data synthesizer 817 and the data transmission request from the communications partner.

More specifically, transmission controller 820 determines a transmission region that includes the space ahead of the own vehicle undetectable by a sensor of the following vehicle, in response to the data transmission request from the cloud-based traffic monitoring system or the following vehicle. Transmission controller 820 judges, for example, whether a space is transmittable or whether the already transmitted space includes an update, on the basis of the three-dimensional data formation information to determine a transmission region. For example, transmission controller 820 determines, as a transmission region, a region that is: a region specified by the data transmission request; and a region, corresponding three-dimensional data 835 of which is present. Transmission controller 820 then notifies format converter 821 of the format supported by the communications partner and the transmission region.

Of three-dimensional data 835 stored in three-dimensional data storage 818, format converter 821 converts three-dimensional data 836 of the transmission region into the format supported by the receiver end to generate three-dimensional data 837. Note that format converter 821 may compress or encode three-dimensional data 837 to reduce the data amount.

Data transmitter 822 transmits three-dimensional data 837 to the cloud-based traffic monitoring system or the following vehicle. Such three-dimensional data 837 includes, for example, information on a blind spot, which is a region hidden from view of the following vehicle, such as a point cloud ahead of the own vehicle, visible light video, depth information, and sensor position information.

Note that an example has been described in which format converter 814 and format converter 821 perform format conversion, etc., but format conversion may not be performed.

With the above structure, three-dimensional data creation device 810 obtains, from an external device, three-dimensional data 831 of a region undetectable by sensors 815 of the own vehicle, and synthesizes three-dimensional data 831 with three-dimensional data 834 that is based on sensor information 833 detected by sensors 815 of the own vehicle, thereby generating three-dimensional data 835. Three-dimensional data creation device 810 is thus capable of generating three-dimensional data of a range undetectable by sensors 815 of the own vehicle.

Three-dimensional data creation device 810 is also capable of transmitting, to the cloud-based traffic monitoring system or the following vehicle, etc., three-dimensional data of a space that includes the space ahead of the own vehicle undetectable by a sensor of the following vehicle, in response to the data transmission request from the cloud-based traffic monitoring system or the following vehicle.

Figure 70:
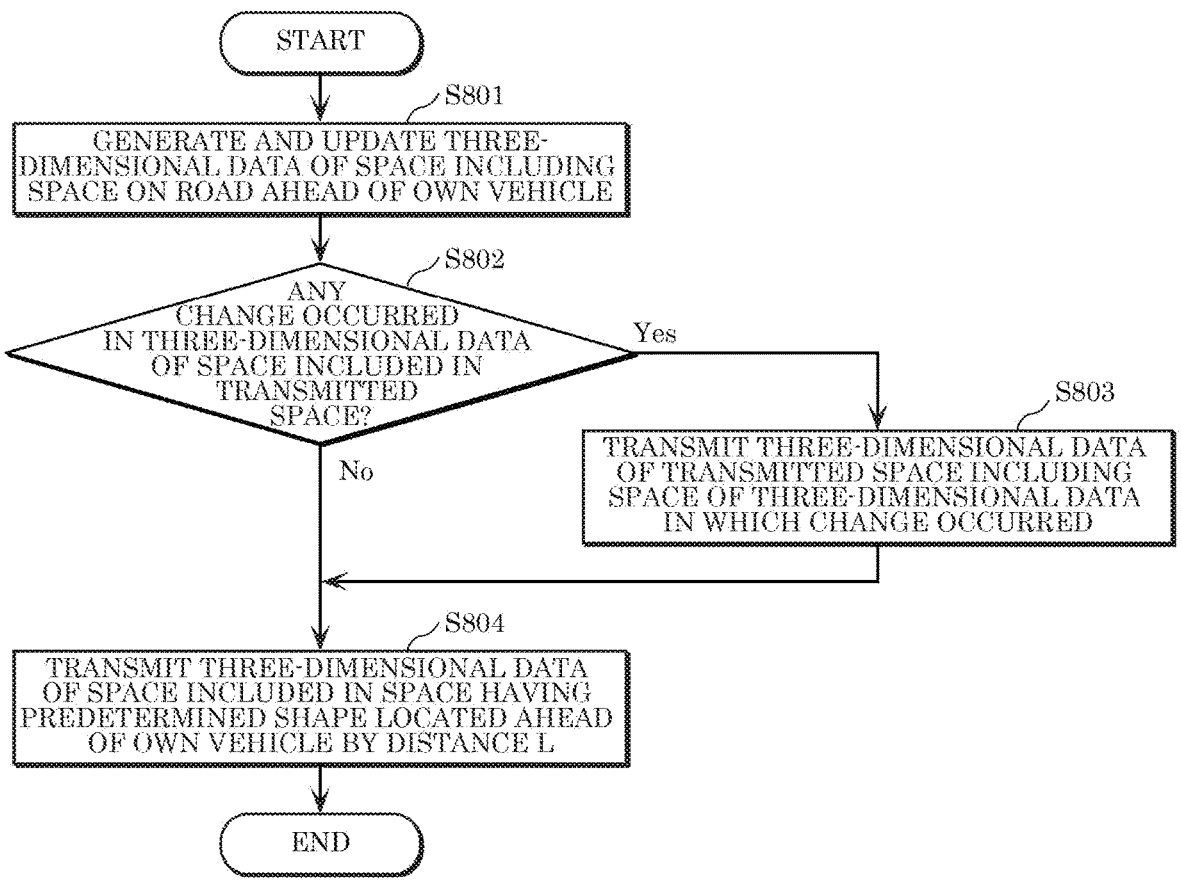
FIG. 70 is a flowchart of a three-dimensional data creation method according to Embodiment 7.

The following describes the steps performed by three-dimensional data creation device 810 of transmitting three-dimensional data to a following vehicle. FIG. 70 is a flowchart showing exemplary steps performed by three-dimensional data creation device 810 of transmitting three-dimensional data to a cloud-based traffic monitoring system or a following vehicle.

First, three-dimensional data creation device 810 generates and updates three-dimensional data 835 of a space that includes space on the road ahead of the own vehicle (S801). More specifically, three-dimensional data creation device 810 synthesizes three-dimensional data 834 created on the basis of sensor information 833 of the own vehicle with three-dimensional data 831 created by the cloud-based traffic monitoring system or the preceding vehicle, etc., for example, thereby forming three-dimensional data 835 of a space that also includes the space ahead of the preceding vehicle undetectable by sensors 815 of the own vehicle.

Three-dimensional data creation device 810 then judges whether any change has occurred in three-dimensional data 835 of the space included in the space already transmitted (S802).

When a change has occurred in three-dimensional data 835 of the space included in the space already transmitted due to, for example, a vehicle or a person entering such space from outside (Yes in S802), three-dimensional data creation device 810 transmits, to the cloud-based traffic monitoring system or the following vehicle, the three-dimensional data that includes three-dimensional data 835 of the space in which the change has occurred (S803).

Three-dimensional data creation device 810 may transmit three-dimensional data in which a change has occurred, at the same timing of transmitting three-dimensional data that is transmitted at a predetermined time interval, or may transmit three-dimensional data in which a change has occurred soon after the detection of such change, Stated differently, three-dimensional data creation device 810 may prioritize the transmission of three-dimensional data of the space in which a change has occurred to the transmission of three-dimensional data that is transmitted at a predetermined time interval.

Also, three-dimensional data creation device 810 may transmit, as three-dimensional data of a space in which a change has occurred, the whole three-dimensional data of the space in which such change has occurred, or may transmit only a difference in the three-dimensional data (e.g., information on three-dimensional points that have appeared or vanished, or information on the displacement of three-dimensional points).

Three-dimensional data creation device 810 may also transmit, to the following vehicle, meta-data on a risk avoidance behavior of the own vehicle such as hard breaking warning, before transmitting three-dimensional data of the space in which a change has occurred. This enables the following vehicle to recognize at an early stage that the preceding vehicle is to perform hard braking, etc., and thus to start performing a risk avoidance behavior at an early stage such as speed reduction.

When no change has occurred in three-dimensional data 835 of the space included in the space already transmitted (No in S802), or after step S803, three-dimensional data creation device 810 transmits, to the cloud-based traffic monitoring system or the following vehicle, three-dimensional data of the space included in the space having a predetermined shape and located ahead of the own vehicle by distance L (S804).

The processes of step S801 through step S804 are repeated, for example at a predetermined time interval.

When three-dimensional data 835 of the current space to be transmitted includes no difference from the three-dimensional map, three-dimensional data creation device 810 may not transmit three-dimensional data 837 of the space.

In the present embodiment, a client device transmits sensor information obtained through a sensor to a server or another client device.

Figure 71:
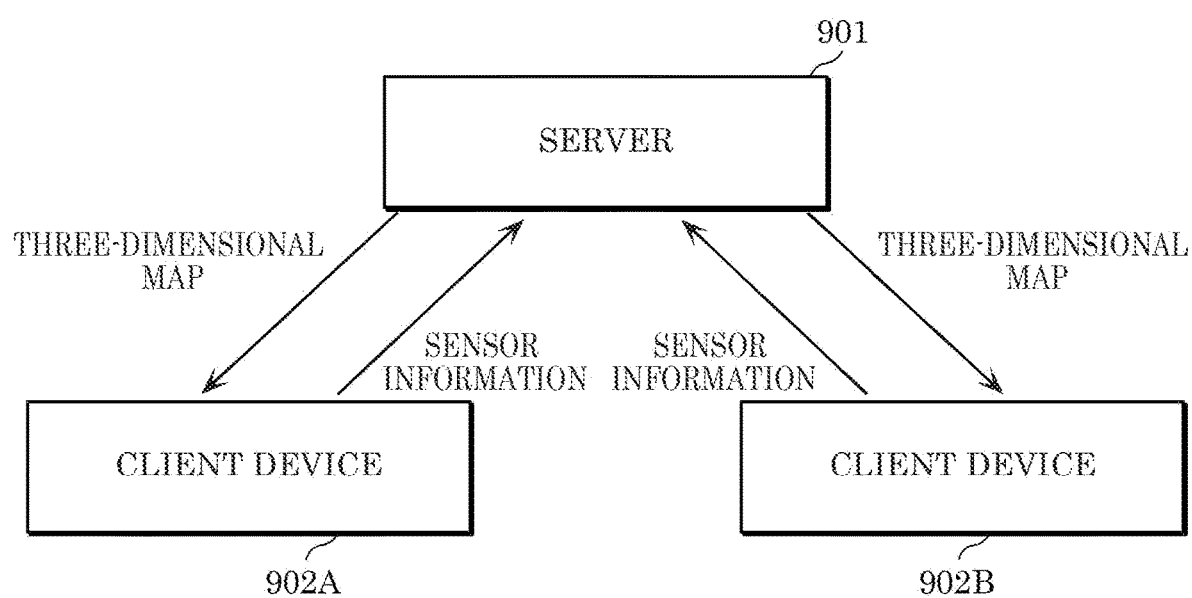
FIG. 71 is a diagram showing a structure of a system according to Embodiment 7.

A structure of a system according to the present embodiment will first be described. FIG. 71 is a diagram showing the structure of a transmission/reception system of a three-dimensional map and sensor information according to the present embodiment. This system includes server 901, and client devices 902A and 902B, Note that client devices 902A and 902B are also referred to as client device 902 when no particular distinction is made therebetween.

Client device 902 is, for example, a vehicle-mounted device equipped in a mobile object such as a vehicle. Server 901 is, for example, a cloud-based traffic monitoring system, and is capable of communicating with the plurality of client devices 902.

Server 901 transmits the three-dimensional map formed by a point cloud to client device 902, Note that a structure of the three-dimensional map is not limited to a point cloud, and may also be another structure expressing three-dimensional data such as a mesh structure.

Client device 902 transmits the sensor information obtained by client device 902 to server 901. The sensor information includes, for example, at least one of information obtained by LiDAR, a visible light image, an infrared image, a depth image, sensor position information, or sensor speed information.

The data to be transmitted and received between server 901 and client device 902 may be compressed in order to reduce data volume, and may also be transmitted uncompressed in order to maintain data precision. When compressing the data, it is possible to use a three-dimensional compression method on the point cloud based on, for example, an octree structure. It is possible to use a two-dimensional image compression method on the visible light image, the infrared image, and the depth image. The two-dimensional image compression method is, for example, MPEG-4 AVC or HEVC standardized by MPEG.

Server 901 transmits the three-dimensional map managed by server 901 to client device 902 in response to a transmission request for the three-dimensional map from client device 902. Note that server 901 may also transmit the three-dimensional map without waiting for the transmission request for the three-dimensional map from client device 902. For example, server 901 may broadcast the three-dimensional map to at least one client device 902 located in a predetermined space. Server 901 may also transmit the three-dimensional map suited to a position of client device 902 at fixed time intervals to client device 902 that has received the transmission request once, Server 901 may also transmit the three-dimensional map managed by server 901 to client device 902 every time the three-dimensional map is updated.

Client device 902 sends the transmission request for the three-dimensional map to server 901. For example, when client device 902 wants to perform the self-location estimation during traveling, client device 902 transmits the transmission request for the three-dimensional map to server 901.

Note that in the following cases, client device 902 may send the transmission request for the three-dimensional map to server 901. Client device 902 may send the transmission request for the three-dimensional map to server 901 when the three-dimensional map stored by client device 902 is old. For example, client device 902 may send the transmission request for the three-dimensional map to server 901 when a fixed period has passed since the three-dimensional map is obtained by client device 902.

Client device 902 may also send the transmission request for the three-dimensional map to server 901 before a fixed time when client device 902 exits a space shown in the three-dimensional map stored by client device 902. For example, client device 902 may send the transmission request for the three-dimensional map to server 901 when client device 902 is located within a predetermined distance from a boundary of the space shown in the three-dimensional map stored by client device 902. When a movement path and a movement speed of client device 902 are understood, a time when client device 902 exits the space shown in the three-dimensional map stored by client device 902 may be predicted based on the movement path and the movement speed of client device 902.

Client device 902 may also send the transmission request for the three-dimensional map to server 901 when an error during alignment of the three-dimensional data and the three-dimensional map created from the sensor information by client device 902 is at least at a fixed level.

Client device 902 transmits the sensor information to server 901 in response to a transmission request for the sensor information from server 901. Note that client device 902 may transmit the sensor information to server 901 without waiting for the transmission request for the sensor information from server 901. For example, client device 902 may periodically transmit the sensor information during a fixed period when client device 902 has received the transmission request for the sensor information from server 901 once. Client device 902 may determine that there is a possibility of a change in the three-dimensional map of a surrounding area of client device 902 having occurred, and transmit this information and the sensor information to server 901, when the error during alignment of the three-dimensional data created by client device 902 based on the sensor information and the three-dimensional map obtained from server 901 is at least at the fixed level.

Server 901 sends a transmission request for the sensor information to client device 902, For example, server 901 receives position information, such as GPS information, about client device 902 from client device 902. Server 901 sends the transmission request for the sensor information to client device 902 in order to generate a new three-dimensional map, when it is determined that client device 902 is approaching a space in which the three-dimensional map managed by server 901 contains little information, based on the position information about client device 902. Server 901 may also send the transmission request for the sensor information, when wanting to (i) update the three-dimensional map, (ii) check road conditions during snowfall, a disaster; or the like, or (iii) check traffic congestion conditions, accident/incident conditions, or the like.

Client device 902 may set an amount of data of the sensor information to be transmitted to server 901 in accordance with communication conditions or bandwidth during reception of the transmission request for the sensor information to be received from server 901. Setting the amount of data of the sensor information to be transmitted to server 901 is, for example, increasing/reducing the data itself or appropriately selecting a compression method.

Figure 72:
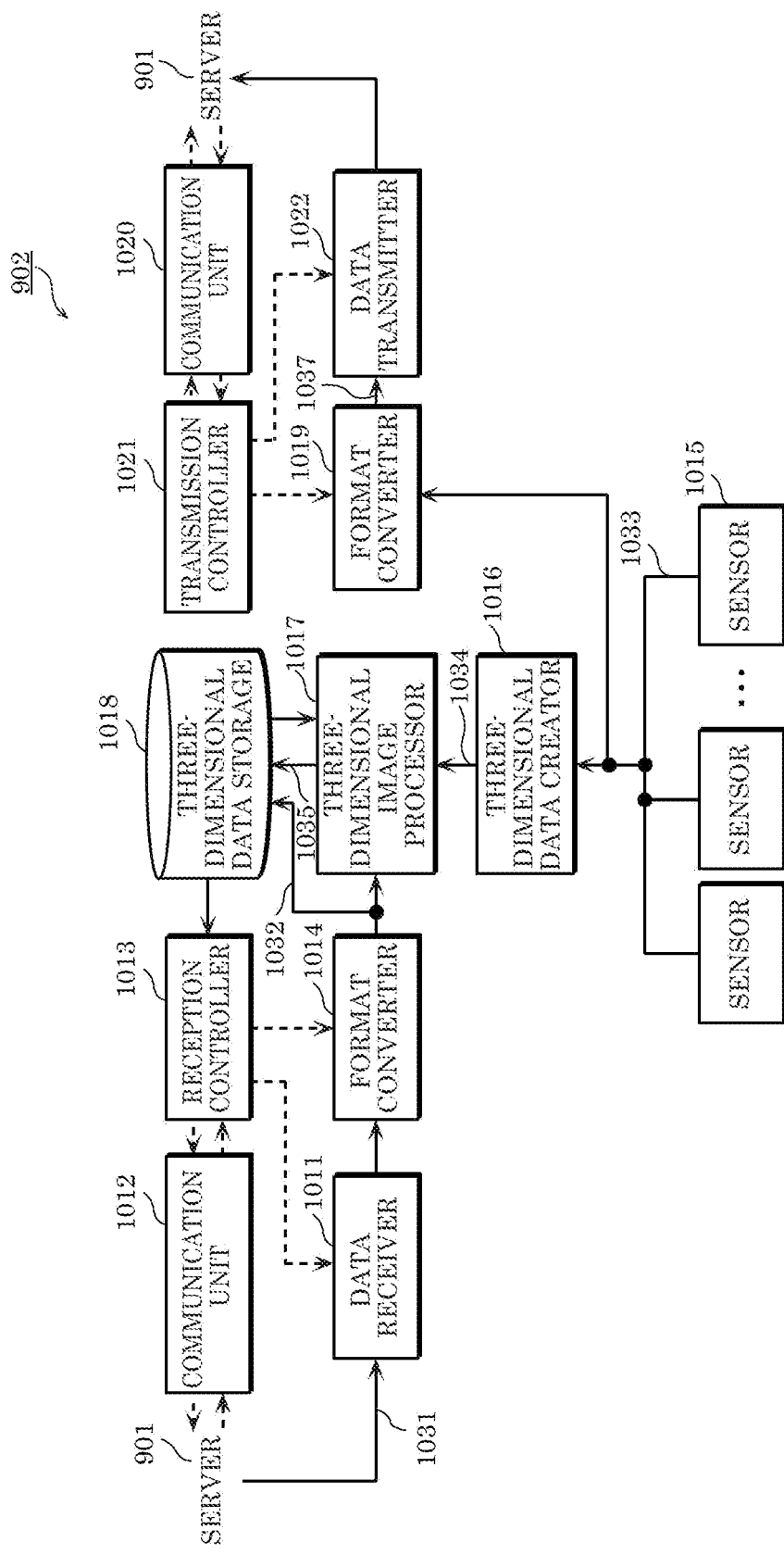
FIG. 72 is a block diagram of a client device according to Embodiment 7.

FIG. 72 is a block diagram showing an example structure of client device 902. Client device 902 receives the three-dimensional map formed by a point cloud and the like from server 901, and estimates a self-location of client device 902 using the three-dimensional map created based on the sensor information of client device 902, Client device 902 transmits the obtained sensor information to server 901.

Client device 902 includes data receiver 1011, communication unit 1012, reception controller 1013, format converter 1014, sensors 1015, three-dimensional data creator 1016, three-dimensional image processor 1017, three-dimensional data storage 1018, format converter 1019, communication unit 1020, transmission controller 1021, and data transmitter 1022.

Data receiver 1011 receives three-dimensional map 1031 from server 901, Three-dimensional map 1031 is data that includes a point cloud such as a WLD or a SWLD, Three-dimensional map 1031 may include compressed data or uncompressed data.

Communication unit 1012 communicates with server 901 and transmits a data transmission request (e.g., transmission request for three-dimensional map) to server 901.

Reception controller 1013 exchanges information, such as information on supported formats, with a communications partner via communication unit 1012 to establish communication with the communications partner.

Format converter 1014 performs a format conversion and the like on three-dimensional map 1031 received by data receiver 1011 to generate three-dimensional map 1032. Format converter 1014 also performs a decompression or decoding process when three-dimensional map 1031 is compressed or encoded, Note that format converter 1014 does not perform the decompression or decoding process when three-dimensional map 1031 is uncompressed data.

Sensors 1015 are a group of sensors, such as LiDARs, visible light cameras, infrared cameras, or depth sensors that obtain information about the outside of a vehicle equipped with client device 902, and generate sensor information 1033. Sensor information 1033 is, for example, three-dimensional data such as a point cloud (point group data) when sensors 1015 are laser sensors such as LiDARs. Note that a single sensor may serve as sensors 1015.

Three-dimensional data creator 1016 generates three-dimensional data 1034 of a surrounding area of the own vehicle based on sensor information 1033. For example, three-dimensional data creator 1016 generates point cloud data with color information on the surrounding area of the own vehicle using information obtained by LiDAR and visible light video obtained by a visible light camera.

Three-dimensional image processor 1017 performs a self-location estimation process and the like of the own vehicle, using (i) the received three-dimensional map 1032 such as a point cloud, and (ii) three-dimensional data 1034 of the surrounding area of the own vehicle generated using sensor information 1033. Note that three-dimensional image processor 1017 may generate three-dimensional data 1035 about the surroundings of the own vehicle by merging three-dimensional map 1032 and three-dimensional data 1034, and may perform the self-location estimation process using the created three-dimensional data 1035.

Three-dimensional data storage 1018 stores three-dimensional map 1032, three-dimensional data 1034, three-dimensional data 1035, and the like.

Format converter 1019 generates sensor information 1037 by converting sensor information 1033 to a format supported by a receiver end. Note that format converter 1019 may reduce the amount of data by compressing or encoding sensor information 1037, Format converter 1019 may omit this process when format conversion is not necessary. Format converter 1019 may also control the amount of data to be transmitted in accordance with a specified transmission range.

Communication unit 1020 communicates with server 901 and receives a data transmission request (transmission request for sensor information) and the like from server 901, Transmission controller 1021 exchanges information, such as information on supported formats, with a communications partner via communication unit 1020 to establish communication with the communications partner.

Data transmitter 1022 transmits sensor information 1037 to server 901. Sensor information 1037 includes, for example, information obtained through sensors 1015, such as information obtained by LiDAR, a luminance image obtained by a visible light camera, an infrared image obtained by an infrared camera, a depth image obtained by a depth sensor, sensor position information, and sensor speed information.

Figure 73:
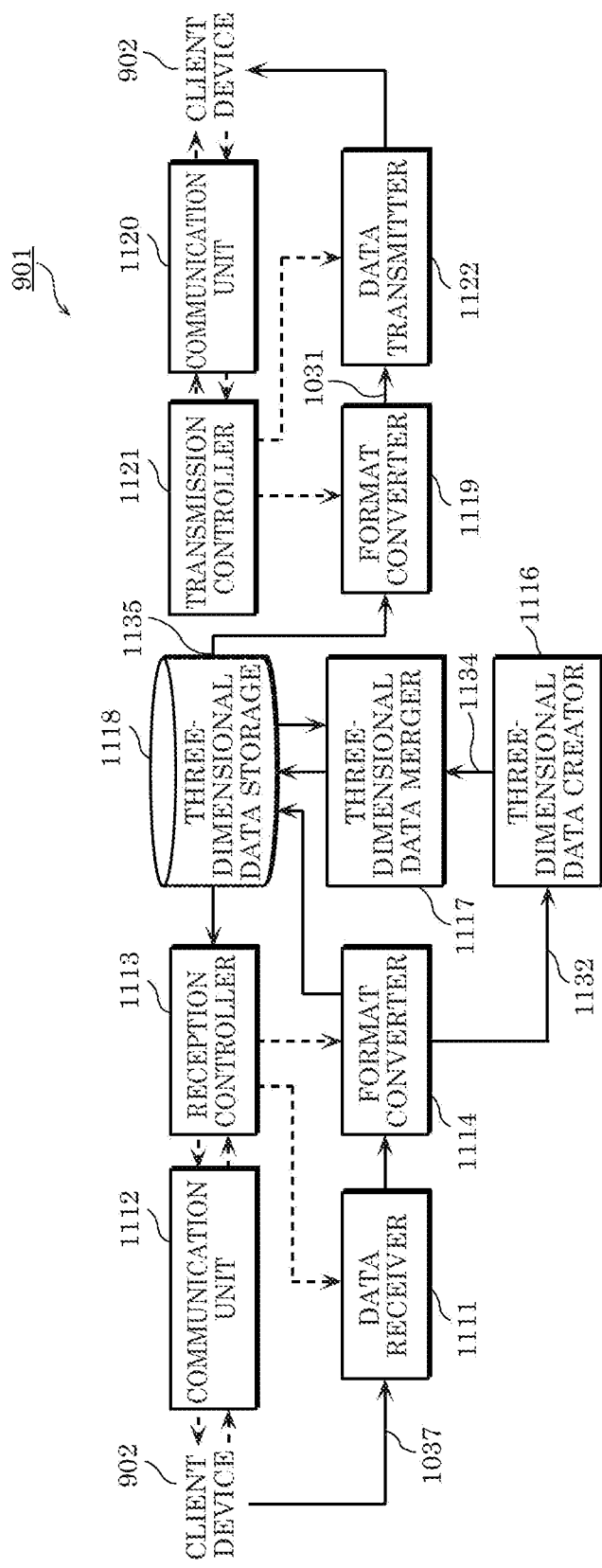
FIG. 73 is a block diagram of a server according to Embodiment 7.

A structure of server 901 will be described next. FIG. 73 is a block diagram showing an example structure of server 901. Server 901 transmits sensor information from client device 902 and creates three-dimensional data based on the received sensor information, Server 901 updates the three-dimensional map managed by server 901 using the created three-dimensional data. Server 901 transmits the updated three-dimensional map to client device 902 in response to a transmission request for the three-dimensional map from client device 902.

Server 901 includes data receiver 1111, communication unit 1112, reception controller 1113, format converter 1114, three-dimensional data creator 1116, three-dimensional data merger 1117, three-dimensional data storage 1118, format converter 1119, communication unit 1120, transmission controller 1121, and data transmitter 1122.

Data receiver 1111 receives sensor information 1037 from client device 902. Sensor information 1037 includes, for example, information obtained by LiDAR, a luminance image obtained by a visible light camera, an infrared image obtained by an infrared camera, a depth image obtained by a depth sensor, sensor position information, sensor speed information, and the like.

Communication unit 1112 communicates with client device 902 and transmits a data transmission request (e.g., transmission request for sensor information) and the like to client device 902.

Reception controller 1113 exchanges information, such as information on supported formats, with a communications partner via communication unit 1112 to establish communication with the communications partner.

Format converter 1114 generates sensor information 1132 by performing a decompression or decoding process when received sensor information 1037 is compressed or encoded. Note that format converter 1114 does not perform the decompression or decoding process when sensor information 1037 is uncompressed data.

Three-dimensional data creator 1116 generates three-dimensional data 1134 of a surrounding area of client device 902 based on sensor information 1132. For example, three-dimensional data creator 1116 generates point cloud data with color information on the surrounding area of client device 902 using information obtained by LiDAR and visible light video obtained by a visible light camera.

Three-dimensional data merger 1117 updates three-dimensional map 1135 by merging three-dimensional data 1134 created based on sensor information 1132 with three-dimensional map 1135 managed by server 901.

Three-dimensional data storage 1118 stores three-dimensional map 1135 and the like.

Format converter 1119 generates three-dimensional map 1031 by converting three-dimensional map 1135 to a format supported by the receiver end. Note that format converter 1119 may reduce the amount of data by compressing or encoding three-dimensional map 1135. Format converter 1119 may omit this process when format conversion is not necessary. Format converter 1119 may also control the amount of data to be transmitted in accordance with a specified transmission range.

Communication unit 1120 communicates with client device 902 and receives a data transmission request (transmission request for three-dimensional map) and the like from client device 902.

Transmission controller 1121 exchanges information, such as information on supported formats, with a communications partner via communication unit 1120 to establish communication with the communications partner.

Data transmitter 1122 transmits three-dimensional map 1031 to client device 902. Three-dimensional map 1031 is data that includes a point cloud such as a WLD or a SWLD. Three-dimensional map 1031 may include one of compressed data and uncompressed data.

Figure 74:
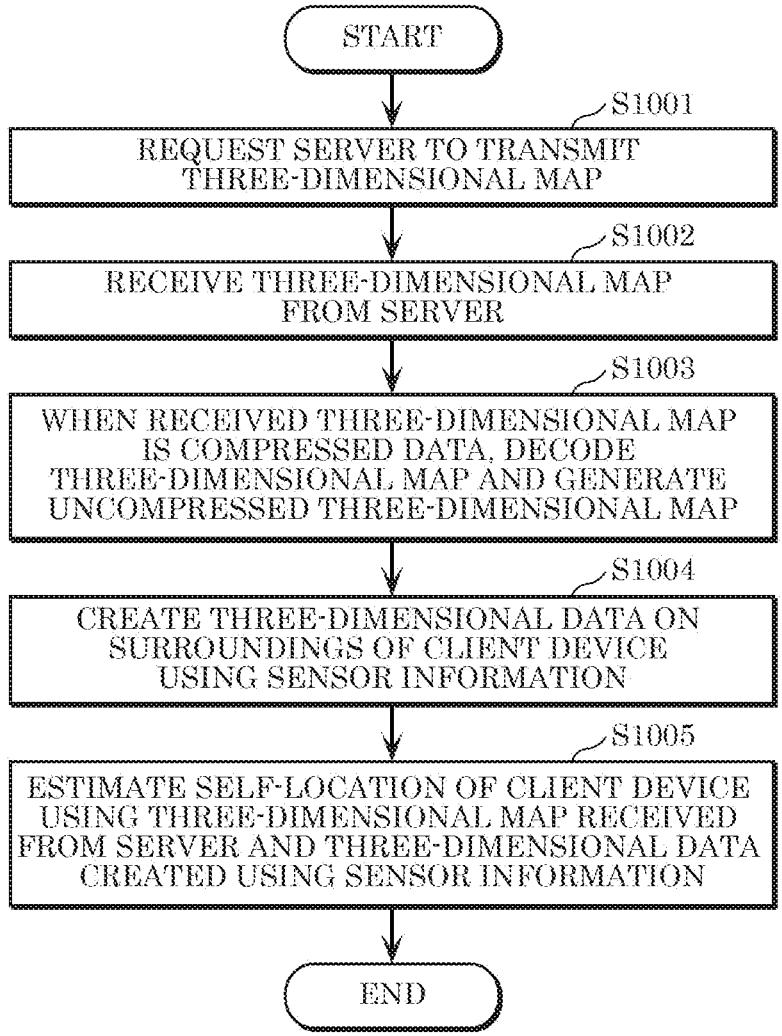
FIG. 74 is a flowchart of a three-dimensional data creation process performed by the client device according to Embodiment 7.

An operational flow of client device 902 will be described next. FIG. 74 is a flowchart of an operation when client device 902 obtains the three-dimensional map.

Client device 902 first requests server 901 to transmit the three-dimensional map (point cloud, etc.) (S1001). At this point, by also transmitting the position information about client device 902 obtained through GPS and the like, client device 902 may also request server 901 to transmit a three-dimensional map relating to this position information.

Client device 902 next receives the three-dimensional map from server 901 (S1002). When the received three-dimensional map is compressed data, client device 902 decodes the received three-dimensional map and generates an uncompressed three-dimensional map (S1003).

Client device 902 next creates three-dimensional data 1034 of the surrounding area of client device 902 using sensor information 1033 obtained by sensors 1015 (S1004). Client device 902 next estimates the self-location of client device 902 using three-dimensional map 1032 received from server 901 and three-dimensional data 1034 created using sensor information 1033 (S1005).

Figure 75:
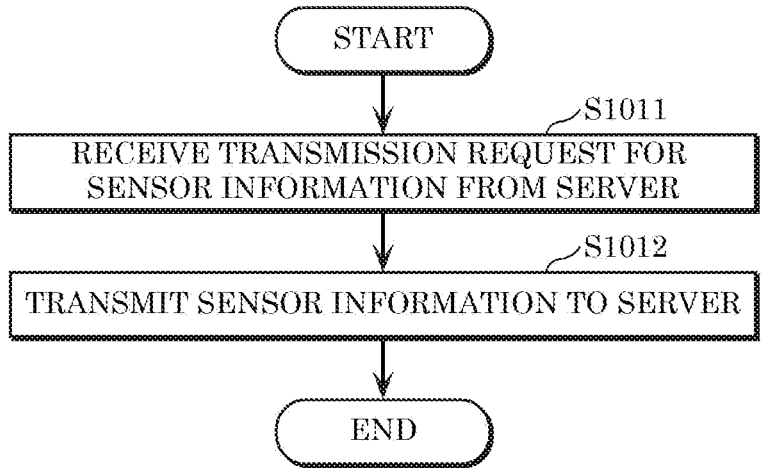
FIG. 75 is a flowchart of a sensor information transmission process performed by the client device according to Embodiment 7.

FIG. 75 is a flowchart of an operation when client device 902 transmits the sensor information. Client device 902 first receives a transmission request for the sensor information from server 901 (S1011). Client device 902 that has received the transmission request transmits sensor information 1037 to server 901 (S1012), Note that client device 902 may generate sensor information 1037 by compressing each piece of information using a compression method suited to each piece of information, when sensor information 1033 includes a plurality of pieces of information obtained by sensors 1015.

Figure 76:
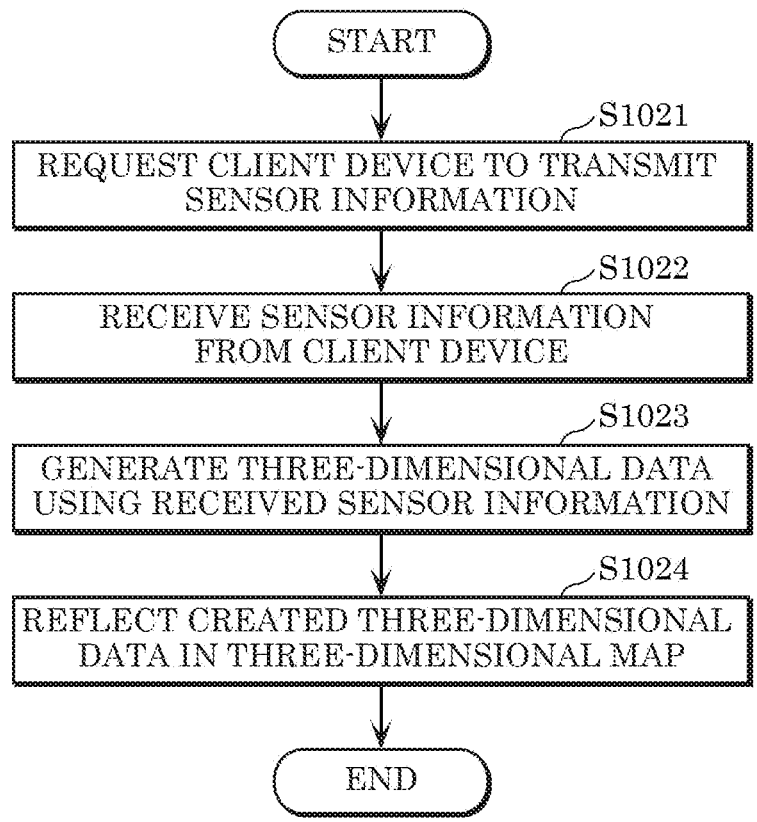
FIG. 76 is a flowchart of a three-dimensional data creation process performed by the server according to Embodiment 7.

An operational flow of server 901 will be described next. FIG. 76 is a flowchart of an operation when server 901 obtains the sensor information, Server 901 first requests client device 902 to transmit the sensor information (S1021). Server 901 next receives sensor information 1037 transmitted from client device 902 in accordance with the request (S1022). Server 901 next creates three-dimensional data 1134 using the received sensor information 1037 (S1023). Server 901 next reflects the created three-dimensional data 1134 in three-dimensional map 1135 (S1024).

Figure 77:
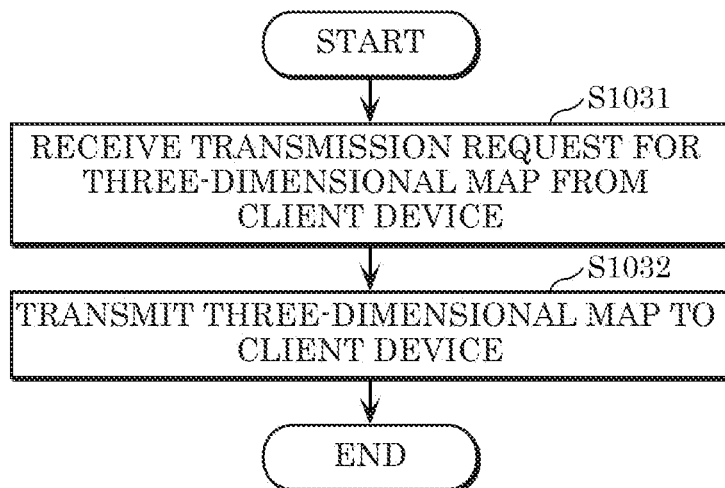
FIG. 77 is a flowchart of a three-dimensional map transmission process performed by the server according to Embodiment 7.

FIG. 77 is a flowchart of an operation when server 901 transmits the three-dimensional map. Server 901 first receives a transmission request for the three-dimensional map from client device 902 (S1031). Server 901 that has received the transmission request for the three-dimensional map transmits the three-dimensional map to client device 902 (S1032). At this point, server 901 may extract a three-dimensional map of a vicinity of client device 902 along with the position information about client device 902, and transmit the extracted three-dimensional map. Server 901 may compress the three-dimensional map formed by a point cloud using, for example, an octree structure compression method, and transmit the compressed three-dimensional map.

The following describes variations of the present embodiment.

Server 901 creates three-dimensional data 1134 of a vicinity of a position of client device 902 using sensor information 1037 received from client device 902. Server 901 next calculates a difference between three-dimensional data 1134 and three-dimensional map 1135, by matching the created three-dimensional data 1134 with three-dimensional map 1135 of the same area managed by server 901. Server 901 determines that a type of anomaly has occurred in the surrounding area of client device 902, when the difference is greater than or equal to a predetermined threshold. For example, it is conceivable that a large difference occurs between three-dimensional map 1135 managed by server 901 and three-dimensional data 1134 created based on sensor information 1037, when land subsidence and the like occurs due to a natural disaster such as an earthquake.

Sensor information 1037 may include information indicating at least one of a sensor type, a sensor performance, and a sensor model number, Sensor information 1037 may also be appended with a class ID and the like in accordance with the sensor performance. For example, when sensor information 1037 is obtained by LiDAR, it is conceivable to assign identifiers to the sensor performance. A sensor capable of obtaining information with precision in units of several millimeters is class 1, a sensor capable of obtaining information with precision in units of several centimeters is class 2, and a sensor capable of obtaining information with precision in units of several meters is class 3. Server 901 may estimate sensor performance information and the like from a model number of client device 902. For example, when client device 902 is equipped in a vehicle, server 901 may determine sensor specification information from a type of the vehicle. In this case, server 901 may obtain information on the type of the vehicle in advance, and the information may also be included in the sensor information, Server 901 may change a degree of correction with respect to three-dimensional data 1134 created using sensor information 1037, using obtained sensor information 1037. For example, when the sensor performance is high in precision (class 1), server 901 does not correct three-dimensional data 1134. When the sensor performance is low in precision (class 3), server 901 corrects three-dimensional data 1134 in accordance with the precision of the sensor. For example, server 901 increases the degree (intensity) of correction with a decrease in the precision of the sensor.

Server 901 may simultaneously send the transmission request for the sensor information to the plurality of client devices 902 in a certain space, Server 901 does not need to use all of the sensor information for creating three-dimensional data 1134 and may, for example, select sensor information to be used in accordance with the sensor performance, when having received a plurality of pieces of sensor information from the plurality of client devices 902. For example, when updating three-dimensional map 1135, server 901 may select high-precision sensor information (class 1) from among the received plurality of pieces of sensor information, and create three-dimensional data 1134 using the selected sensor information.

Figure 78:
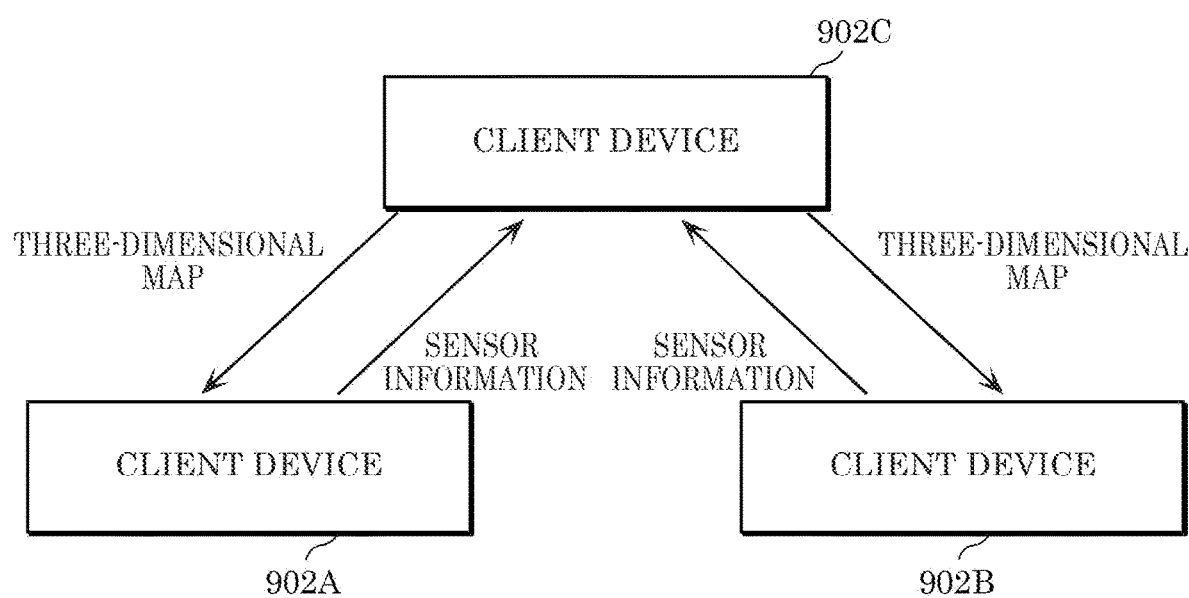
FIG. 78 is a diagram illustrating a structure of a variation of the system according to Embodiment 7.

Server 901 is not limited to only being a server such as a cloud-based traffic monitoring system, and may also be another (vehicle-mounted) client device. FIG. 78 is a diagram of a system structure in this case.

For example, client device 902C sends a transmission request for sensor information to client device 902A located nearby, and obtains the sensor information from client device 902A. Client device 902C then creates three-dimensional data using the obtained sensor information of client device 902A, and updates a three-dimensional map of client device 902C. This enables client device 902C to generate a three-dimensional map of a space that can be obtained from client device 902A, and fully utilize the performance of client device 902C. For example, such a case is conceivable when client device 902C has high performance.

In this case, client device 902A that has provided the sensor information is given rights to obtain the high-precision three-dimensional map generated by client device 902C. Client device 902A receives the high-precision three-dimensional map from client device 902C in accordance with these rights.

Server 901 may send the transmission request for the sensor information to the plurality of client devices 902 (client device 902A and client device 902B) located nearby client device 902C. When a sensor of client device 902A or client device 902B has high performance, client device 902C is capable of creating the three-dimensional data using the sensor information obtained by this high-performance sensor.

Figure 79:
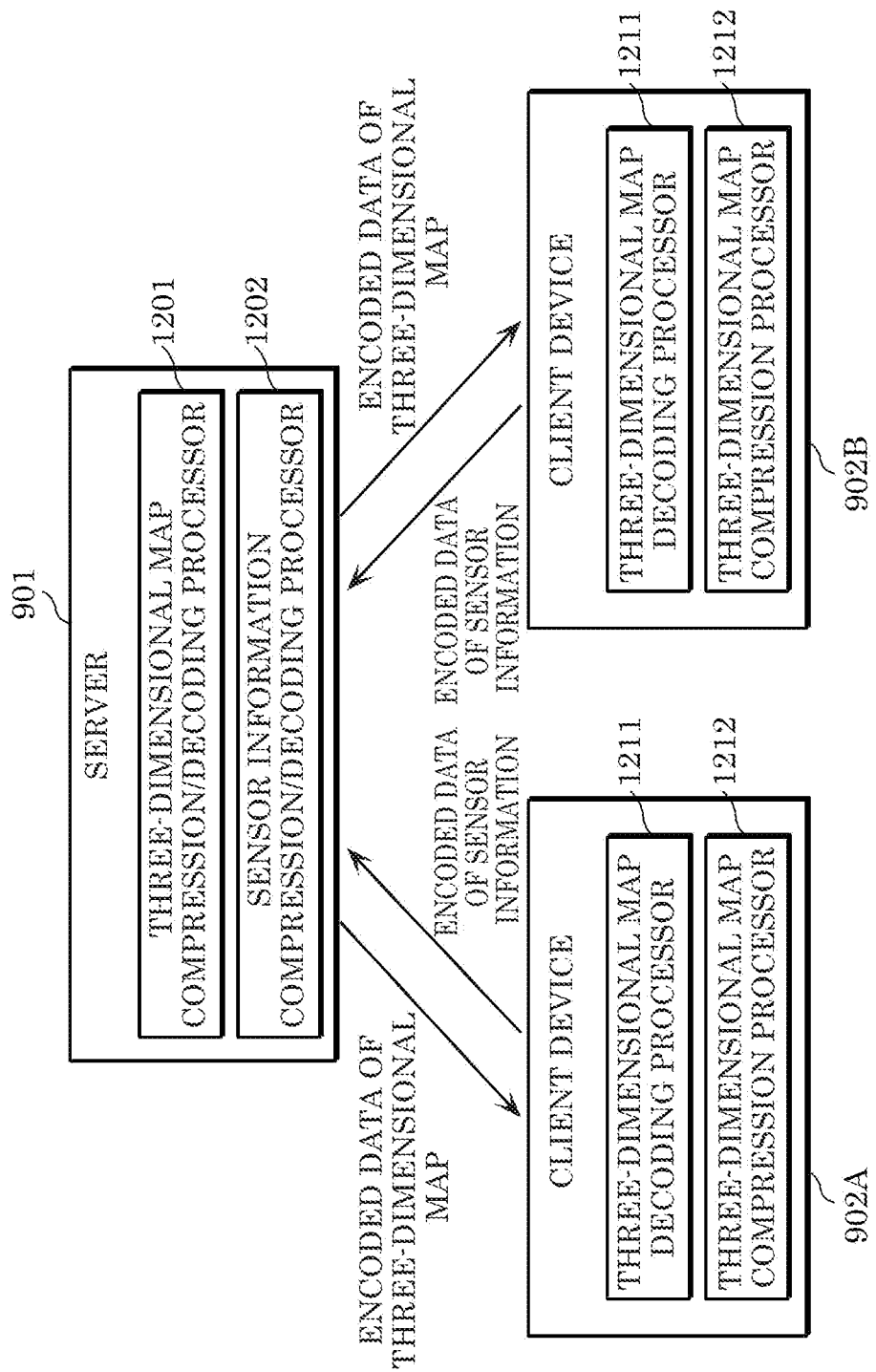
FIG. 79 is a diagram illustrating a structure of the server and client devices according to Embodiment 7.

FIG. 79 is a block diagram showing a functionality structure of server 901 and client device 902, Server 901 includes, for example, three-dimensional map compression/decoding processor 1201 that compresses and decodes the three-dimensional map and sensor information compression/decoding processor 1202 that compresses and decodes the sensor information.

Client device 902 includes three-dimensional map decoding processor 1211 and sensor information compression processor 1212. Three-dimensional map decoding processor 1211 receives encoded data of the compressed three-dimensional map, decodes the encoded data, and obtains the three-dimensional map. Sensor information compression processor 1212 compresses the sensor information itself instead of the three-dimensional data created using the obtained sensor information, and transmits the encoded data of the compressed sensor information to server 901. With this structure, client device 902 does not need to internally store a processor that performs a process for compressing the three-dimensional data of the three-dimensional map (point cloud, etc.), as long as client device 902 internally stores a processor that performs a process for decoding the three-dimensional map (point cloud, etc.). This makes it possible to limit costs, power consumption, and the like of client device 902.

As stated above, client device 902 according to the present embodiment is equipped in the mobile object, and creates three-dimensional data 1034 of a surrounding area of the mobile object using sensor information 1033 that is obtained through sensor 1015 equipped in the mobile object and indicates a surrounding condition of the mobile object, Client device 902 estimates a self-location of the mobile object using the created three-dimensional data 1034. Client device 902 transmits obtained sensor information 1033 to server 901 or another client device 902.

This enables client device 902 to transmit sensor information 1033 to server 901 or the like. This makes it possible to further reduce the amount of transmission data compared to when transmitting the three-dimensional data. Since there is no need for client device 902 to perform processes such as compressing or encoding the three-dimensional data, it is possible to reduce the processing amount of client device 902. As such, client device 902 is capable of reducing the amount of data to be transmitted or simplifying the structure of the device.

Client device 902 further transmits the transmission request for the three-dimensional map to server 901 and receives three-dimensional map 1031 from server 901. In the estimating of the self-location, client device 902 estimates the self-location using three-dimensional data 1034 and three-dimensional map 1032.

Sensor information 1033 includes at least one of information obtained by a laser sensor, a luminance image, an infrared image, a depth image, sensor position information, or sensor speed information.

Sensor information 1033 includes information that indicates a performance of the sensor.

Client device 902 encodes or compresses sensor information 1033, and in the transmitting of the sensor information, transmits sensor information 1037 that has been encoded or compressed to server 901 or another client device 902. This enables client device 902 to reduce the amount of data to be transmitted.

For example, client device 902 includes a processor and memory. The processor performs the above processes using the memory.

Server 901 according to the present embodiment is capable of communicating with client device 902 equipped in the mobile object, and receives sensor information 1037 that is obtained through sensor 1015 equipped in the mobile object and indicates a surrounding condition of the mobile object, Server 901 creates three-dimensional data 1134 of a surrounding area of the mobile object using received sensor information 1037.

With this, server 901 creates three-dimensional data 1134 using sensor information 1037 transmitted from client device 902. This makes it possible to further reduce the amount of transmission data compared to when client device 902 transmits the three-dimensional data. Since there is no need for client device 902 to perform processes such as compressing or encoding the three-dimensional data, it is possible to reduce the processing amount of client device 902. As such, server 901 is capable of reducing the amount of data to be transmitted or simplifying the structure of the device.

Server 901 further transmits a transmission request for the sensor information to client device 902.

Server 901 further updates three-dimensional map 1135 using the created three-dimensional data 1134, and transmits three-dimensional map 1135 to client device 902 in response to the transmission request for three-dimensional map 1135 from client device 902.

Sensor information 1037 includes at least one of information obtained by a laser sensor, a luminance image, an infrared image, a depth image, sensor position information, or sensor speed information.

Sensor information 1037 includes information that indicates a performance of the sensor.

Server 901 further corrects the three-dimensional data in accordance with the performance of the sensor. This enables the three-dimensional data creation method to improve the quality of the three-dimensional data.

In the receiving of the sensor information, server 901 receives a plurality of pieces of sensor information 1037 received from a plurality of client devices 902, and selects sensor information 1037 to be used in the creating of three-dimensional data 1134, based on a plurality of pieces of information that each indicates the performance of the sensor included in the plurality of pieces of sensor information 1037. This enables server 901 to improve the quality of three-dimensional data 1134.

Server 901 decodes or decompresses received sensor information 1037, and creates three-dimensional data 1134 using sensor information 1132 that has been decoded or decompressed. This enables server 901 to reduce the amount of data to be transmitted.

For example, server 901 includes a processor and memory. The processor performs the above processes using the memory.

Figure 80:
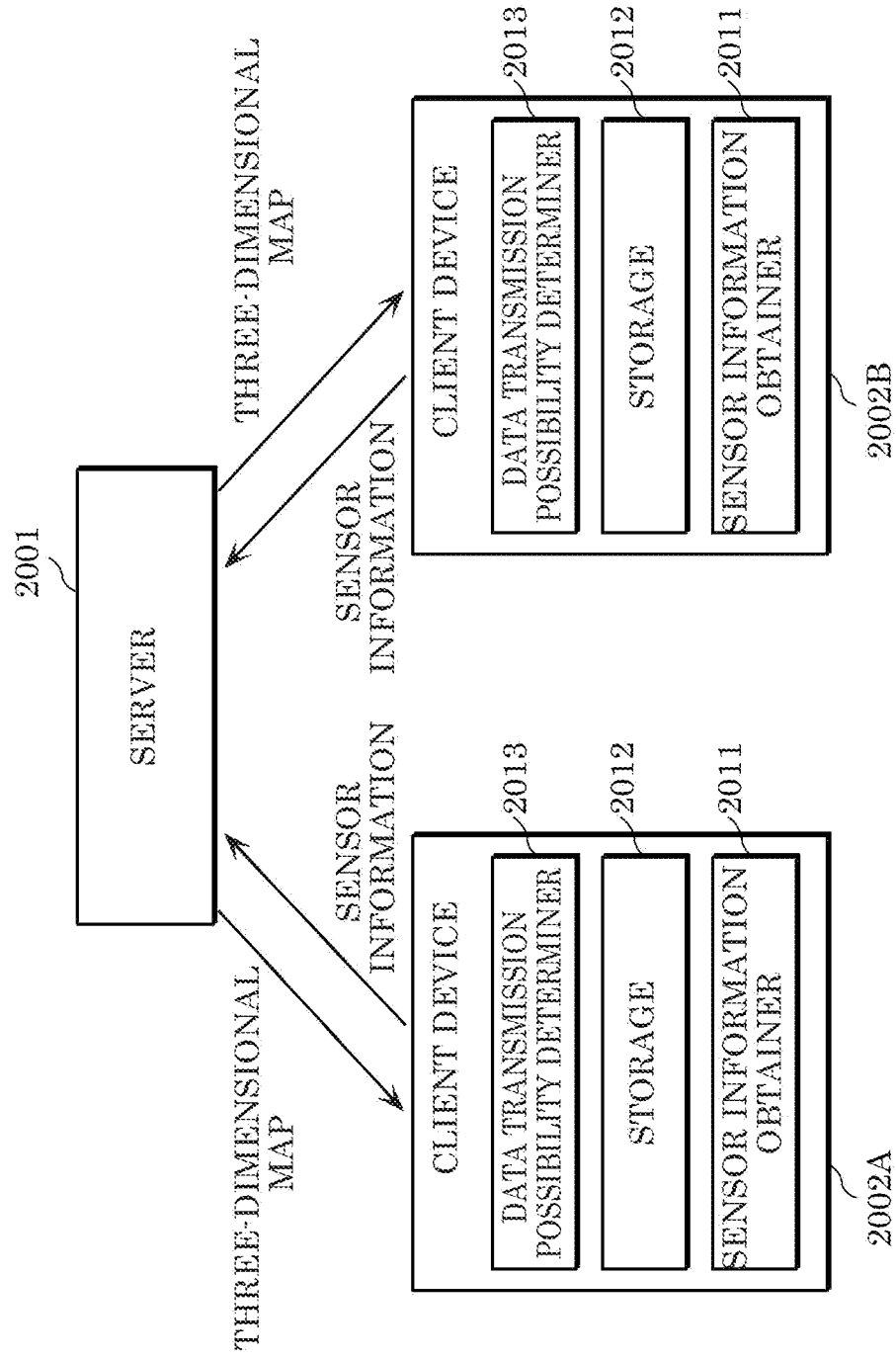
FIG. 80 is a diagram illustrating a configuration of the server and client devices according to Embodiment 7.

The following will describe a variation of the present embodiment. FIG. 80 is a diagram illustrating a configuration of a system according to the present embodiment. The system illustrated in FIG. 80 includes server 2001, client device 2002A, and client device 2002B.

Client device 2002A and client device 2002B are each provided in a mobile object such as a vehicle, and transmit sensor information to server 2001. Server 2001 transmits a three-dimensional map (a point cloud) to client device 2002A and client device 2002B.

Client device 2002A includes sensor information obtainer 2011, storage 2012, and data transmission possibility determiner 2013. It should be noted that client device 2002B has the same configuration, Additionally, when client device 2002A and client device 2002B are not particularly distinguished below, client device 2002A and client device 2002B are also referred to as client device 2002.

Figure 81:
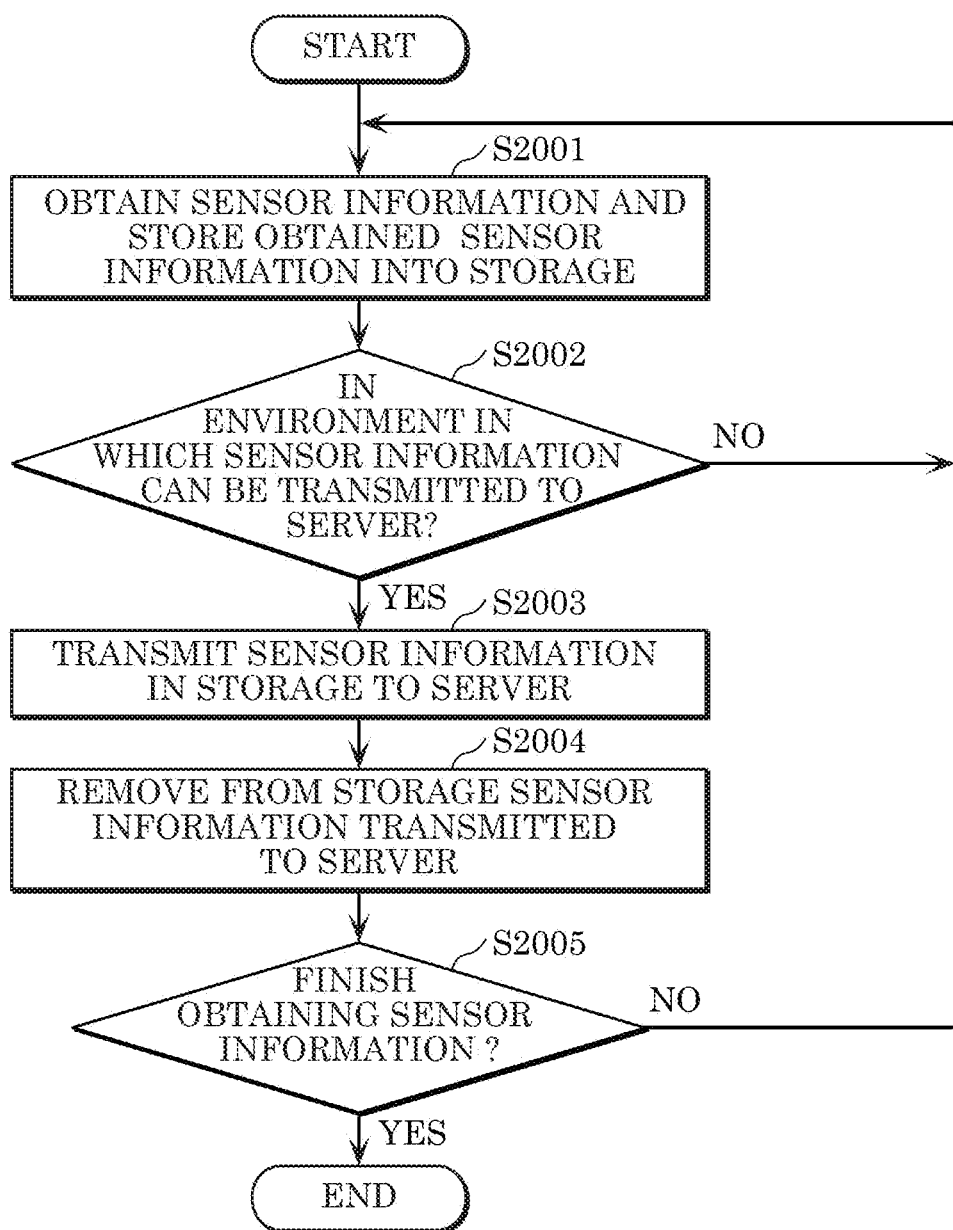
FIG. 81 is a flowchart of a process performed by the client device according to Embodiment 7.

FIG. 81 is a flowchart illustrating operation of client device 2002 according to the present embodiment.

Sensor information obtainer 2011 obtains a variety of sensor information using sensors (a group of sensors) provided in a mobile object. In other words, sensor information obtainer 2011 obtains sensor information obtained by the sensors (the group of sensors) provided in the mobile object and indicating a surrounding state of the mobile object. Sensor information obtainer 2011 also stores the obtained sensor information into storage 2012. This sensor information includes at least one of information obtained by LiDAR, a visible light image, an infrared image, or a depth image. Additionally, the sensor information may include at least one of sensor position information, speed information, obtainment time information, or obtainment location information. Sensor position information indicates a position of a sensor that has obtained sensor information. Speed information indicates a speed of the mobile object when a sensor obtained sensor information, Obtainment time information indicates a time when a sensor obtained sensor information. Obtainment location information indicates a position of the mobile object or a sensor when the sensor obtained sensor information.

Next, data transmission possibility determiner 2013 determines whether the mobile object (client device 2002) is in an environment in which the mobile object can transmit sensor information to server 2001 (S2002), For example, data transmission possibility determiner 2013 may specify a location and a time at which client device 2002 is present using GPS information etc., and may determine whether data can be transmitted. Additionally, data transmission possibility determiner 2013 may determine whether data can be transmitted, depending on whether it is possible to connect to a specific access point.

When client device 2002 determines that the mobile object is in the environment in which the mobile object can transmit the sensor information to server 2001 (YES in S2002), client device 2002 transmits the sensor information to server 2001 (S2003). In other words, when client device 2002 becomes capable of transmitting sensor information to server 2001, client device 2002 transmits the sensor information held by client device 2002 to server 2001. For example, an access point that enables high-speed communication using millimeter waves is provided in an intersection or the like. When client device 2002 enters the intersection, client device 2002 transmits the sensor information held by client device 2002 to server 2001 at high speed using the millimeter-wave communication.

Next, client device 2002 deletes from storage 2012 the sensor information that has been transmitted to server 2001 (S2004). It should be noted that when sensor information that has not been transmitted to server 2001 meets predetermined conditions, client device 2002 may delete the sensor information. For example, when an obtainment time of sensor information held by client device 2002 precedes a current time by a certain time, client device 2002 may delete the sensor information from storage 2012. In other words, when a difference between the current time and a time when a sensor obtained sensor information exceeds a predetermined time, client device 2002 may delete the sensor information from storage 2012. Besides, when an obtainment location of sensor information held by client device 2002 is separated from a current location by a certain distance, client device 2002 may delete the sensor information from storage 2012. In other words, when a difference between a current position of the mobile object or a sensor and a position of the mobile object or the sensor when the sensor obtained sensor information exceeds a predetermined distance, client device 2002 may delete the sensor information from storage 2012. Accordingly, it is possible to reduce the capacity of storage 2012 of client device 2002.

When client device 2002 does not finish obtaining sensor information (NO in S2005), client device 2002 performs step S2001 and the subsequent steps again. Further, when client device 2002 finishes obtaining sensor information (YES in S2005), client device 2002 completes the process.

Client device 2002 may select sensor information to be transmitted to server 2001, in accordance with communication conditions. For example, when high-speed communication is available, client device 2002 preferentially transmits sensor information (e.g., information obtained by LiDAR) of which the data size held in storage 2012 is large. Additionally, when high-speed communication is not readily available, client device 2002 transmits sensor information (e.g., a visible light image) which has high priority and of which the data size held in storage 2012 is small. Accordingly, client device 2002 can efficiently transmit sensor information held in storage 2012, in accordance with network conditions.

Client device 2002 may obtain, from server 2001, time information indicating a current time and location information indicating a current location. Moreover, client device 2002 may determine an obtainment time and an obtainment location of sensor information based on the obtained time information and location information. In other words, client device 2002 may obtain time information from server 2001 and generate obtainment time information using the obtained time information. Client device 2002 may also obtain location information from server 2001 and generate obtainment location information using the obtained location information.

For example, regarding time information, server 2001 and client device 2002 perform clock synchronization using a means such as the Network Time Protocol (NTP) or the Precision Time Protocol (PTP). This enables client device 2002 to obtain accurate time information. What's more, since it is possible to synchronize clocks between server 2001 and client devices 2002, it is possible to synchronize times included in pieces of sensor information obtained by separate client devices 2002. As a result, server 2001 can handle sensor information indicating a synchronized time. It should be noted that a means of synchronizing clocks may be any means other than the NTP or PTP, In addition, GPS information may be used as the time information and the location information.

Server 2001 may specify a time or a location and obtain pieces of sensor information from client devices 2002. For example, when an accident occurs, in order to search for a client device in the vicinity of the accident, server 2001 specifies an accident occurrence time and an accident occurrence location and broadcasts sensor information transmission requests to client devices 2002. Then, client device 2002 having sensor information obtained at the corresponding time and location transmits the sensor information to server 2001. In other words, client device 2002 receives, from server 2001, a sensor information transmission request including specification information specifying a location and a time. When sensor information obtained at a location and a time indicated by the specification information is stored in storage 2012, and client device 2002 determines that the mobile object is present in the environment in which the mobile object can transmit the sensor information to server 2001, client device 2002 transmits, to server 2001, the sensor information obtained at the location and the time indicated by the specification information. Consequently, server 2001 can obtain the pieces of sensor information pertaining to the occurrence of the accident from client devices 2002, and use the pieces of sensor information for accident analysis etc.

It should be noted that when client device 2002 receives a sensor information transmission request from server 2001, client device 2002 may refuse to transmit sensor information. Additionally, client device 2002 may set in advance which pieces of sensor information can be transmitted. Alternatively, server 2001 may inquire of client device 2002 each time whether sensor information can be transmitted.

A point may be given to client device 2002 that has transmitted sensor information to server 2001. This point can be used in payment for, for example, gasoline expenses, electric vehicle (EV) charging expenses, a highway toll, or rental car expenses. After obtaining sensor information, server 2001 may delete information for specifying client device 2002 that has transmitted the sensor information. For example, this information is a network address of client device 2002. Since this enables the anonymization of sensor information, a user of client device 2002 can securely transmit sensor information from client device 2002 to server 2001. Server 2001 may include servers. For example, by servers sharing sensor information, even when one of the servers breaks down, the other servers can communicate with client device 2002. Accordingly, it is possible to avoid service outage due to a server breakdown.

A specified location specified by a sensor information transmission request indicates an accident occurrence location etc., and may be different from a position of client device 2002 at a specified time specified by the sensor information transmission request. For this reason, for example, by specifying, as a specified location, a range such as within XX meters of a surrounding area, server 2001 can request information from client device 2002 within the range. Similarly, server 2001 may also specify, as a specified time, a range such as within N seconds before and after a certain time. As a result, server 2001 can obtain sensor information from client device 2002 present for a time from t−N to t+N and in a location within XX meters from absolute position S. When client device 2002 transmits three-dimensional data such as LiDAR, client device 2002 may transmit data created immediately after time t.

Server 2001 may separately specify information indicating, as a specified location, a location of client device 2002 from which sensor information is to be obtained, and a location at which sensor information is desirably obtained. For example, server 2001 specifies that sensor information including at least a range within YY meters from absolute position S is to be obtained from client device 2002 present within XX meters from absolute position S. When client device 2002 selects three-dimensional data to be transmitted, client device 2002 selects one or more pieces of three-dimensional data so that the one or more pieces of three-dimensional data include at least the sensor information including the specified range. Each of the one or more pieces of three-dimensional data is a random-accessible unit of data. In addition, when client device 2002 transmits a visible light image, client device 2002 may transmit pieces of temporally continuous image data including at least a frame immediately before or immediately after time t.

When client device 2002 can use physical networks such as 5G, Wi-Fi, or modes in 5G for transmitting sensor information, client device 2002 may select a network to be used according to the order of priority notified by server 2001. Alternatively, client device 2002 may select a network that enables client device 2002 to ensure an appropriate bandwidth based on the size of transmit data. Alternatively, client device 2002 may select a network to be used, based on data transmission expenses etc. A transmission request from server 2001 may include information indicating a transmission deadline, for example, performing transmission when client device 2002 can start transmission by time t. When server 2001 cannot obtain sufficient sensor information within a time limit, server 2001 may issue a transmission request again.

Sensor information may include header information indicating characteristics of sensor data along with compressed or uncompressed sensor data. Client device 2002 may transmit header information to server 2001 via a physical network or a communication protocol that is different from a physical network or a communication protocol used for sensor data. For example, client device 2002 transmits header information to server 2001 prior to transmitting sensor data. Server 2001 determines whether to obtain the sensor data of client device 2002, based on a result of analysis of the header information. For example, header information may include information indicating a point cloud obtainment density, an elevation angle, or a frame rate of LiDAR, or information indicating, for example, a resolution, an SN ratio, or a frame rate of a visible light image. Accordingly, server 2001 can obtain the sensor information from client device 2002 having the sensor data of determined quality.

As stated above, client device 2002 is provided in the mobile object, obtains sensor information that has been obtained by a sensor provided in the mobile object and indicates a surrounding state of the mobile object, and stores the sensor information into storage 2012. Client device 2002 determines whether the mobile object is present in an environment in which the mobile object is capable of transmitting the sensor information to server 2001, and transmits the sensor information to server 2001 when the mobile object is determined to be present in the environment in which the mobile object is capable of transmitting the sensor information to server 2001.

Additionally, client device 2002 further creates, from the sensor information, three-dimensional data of a surrounding area of the mobile object, and estimates a self-location of the mobile object using the three-dimensional data created.

Besides, client device 2002 further transmits a transmission request for a three-dimensional map to server 2001, and receives the three-dimensional map from server 2001. In the estimating, client device 2002 estimates the self-location using the three-dimensional data and the three-dimensional map.

It should be noted that the above process performed by client device 2002 may be realized as an information transmission method for use in client device 2002.

In addition, client device 2002 may include a processor and memory. Using the memory, the processor may perform the above process.

Figure 82:
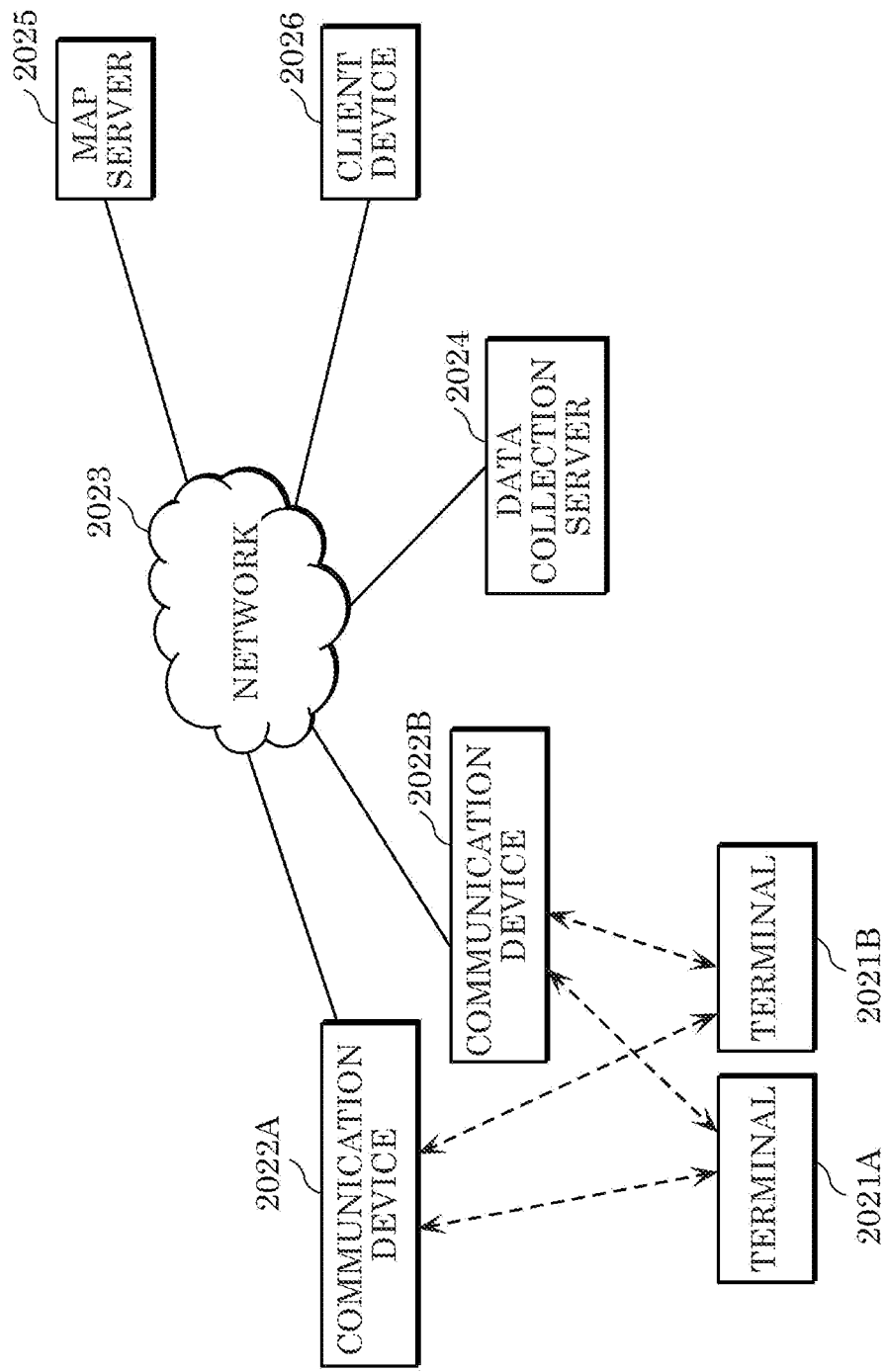
FIG. 82 is a diagram illustrating a configuration of a sensor information collection system according to Embodiment 7.

Next, a sensor information collection system according to the present embodiment will be described. FIG. 82 is a diagram illustrating a configuration of the sensor information collection system according to the present embodiment. As illustrated in FIG. 82, the sensor information collection system according to the present embodiment includes terminal 2021A, terminal 20213, communication device 2022A, communication device 20223, network 2023, data collection server 2024, map server 2025, and client device 2026. It should be noted that when terminal 2021A and terminal 2021B are not particularly distinguished, terminal 2021A and terminal 2021B are also referred to as terminal 2021. Additionally, when communication device 2022A and communication device 20223 are not particularly distinguished, communication device 2022A and communication device 2022B are also referred to as communication device 2022.

Data collection server 2024 collects data such as sensor data obtained by a sensor included in terminal 2021 as position-related data in which the data is associated with a position in a three-dimensional space.

Sensor data is data obtained by, for example, detecting a surrounding state of terminal 2021 or an internal state of terminal 2021 using a sensor included in terminal 2021. Terminal 2021 transmits, to data collection server 2024, one or more pieces of sensor data collected from one or more sensor devices in locations at which direct communication with terminal 2021 is possible or at which communication with terminal 2021 is possible by the same communication system or via one or more relay devices.

Data included in position-related data may include, for example, information indicating an operating state, an operating log, a service use state, etc. of a terminal or a device included in the terminal. In addition, the data include in the position-related data may include, for example, information in which an identifier of terminal 2021 is associated with a position or a movement path etc. of terminal 2021.

Information indicating a position included in position-related data is associated with, for example, information indicating a position in three-dimensional data such as three-dimensional map data. The details of information indicating a position will be described later.

Position-related data may include at least one of the above-described time information or information indicating an attribute of data included in the position-related data or a type (e.g., a model number) of a sensor that has created the data, in addition to position information that is information indicating a position. The position information and the time information may be stored in a header area of the position-related data or a header area of a frame that stores the position-related data. Further, the position information and the time information may be transmitted and/or stored as metadata associated with the position-related data, separately from the position-related data.

Map server 2025 is connected to, for example, network 2023, and transmits three-dimensional data such as three-dimensional map data in response to a request from another device such as terminal 2021. Besides, as described in the aforementioned embodiments, map server 2025 may have, for example, a function of updating three-dimensional data using sensor information transmitted from terminal 2021.

Data collection server 2024 is connected to, for example, network 2023, collects position-related data from another device such as terminal 2021, and stores the collected position-related data into a storage of data collection server 2024 or a storage of another server. In addition, data collection server 2024 transmits, for example, metadata of collected position-related data or three-dimensional data generated based on the position-related data, to terminal 2021 in response to a request from terminal 2021.

Network 2023 is, for example, a communication network such as the Internet. Terminal 2021 is connected to network 2023 via communication device 2022. Communication device 2022 communicates with terminal 2021 using one communication system or switching between communication systems. Communication device 2022 is a communication satellite that performs communication using, for example, (1) a base station compliant with Long-Term Evolution (LTE) etc., (2) an access point (AP) for Wi-Fi or millimeter-wave communication etc., (3) a low-power wide-area (LPWA) network gateway such as SIGFOX, LoRaWAN, or Wi-SUN, or (4) a satellite communication system such as DVB-S2.

It should be noted that a base station may communicate with terminal 2021 using a system classified as an LPWA network such as Narrowband Internet of Things (NB IoT) or LTE-M, or switching between these systems.

Here, although, in the example given, terminal 2021 has a function of communicating with communication device 2022 that uses two types of communication systems, and communicates with map server 2025 or data collection server 2024 using one of the communication systems or switching between the communication systems and between communication devices 2022 to be a direct communication partner; a configuration of the sensor information collection system and terminal 2021 is not limited to this. For example, terminal 2021 need not have a function of performing communication using communication systems, and may have a function of performing communication using one of the communication systems. Terminal 2021 may also support three or more communication systems. Additionally, each terminal 2021 may support a different communication system.

Terminal 2021 includes, for example, the configuration of client device 902 illustrated in FIG. 72, Terminal 2021 estimates a self-location etc. using received three-dimensional data. Besides, terminal 2021 associates sensor data obtained from a sensor and position information obtained by self-location estimation to generate position-related data.

Position information appended to position-related data indicates, for example, a position in a coordinate system used for three-dimensional data. For example, the position information is coordinate values represented using a value of a latitude and a value of a longitude. Here, terminal 2021 may include, in the position information, a coordinate system serving as a reference for the coordinate values and information indicating three-dimensional data used for location estimation, along with the coordinate values. Coordinate values may also include altitude information.

The position information may be associated with a data unit or a space unit usable for encoding the above three-dimensional data. Such a unit is, for example, WLD, GOS, SPC, VLM, or VXL. Here, the position information is represented by, for example, an identifier for identifying a data unit such as the SPC corresponding to position-related data. It should be noted that the position information may include, for example, information indicating three-dimensional data obtained by encoding a three-dimensional space including a data unit such as the SPC or information indicating a detailed position within the SPC, in addition to the identifier for identifying the data unit such as the SPC. The information indicating the three-dimensional data is, for example, a file name of the three-dimensional data.

As stated above, by generating position-related data associated with position information based on location estimation using three-dimensional data, the system can give more accurate position information to sensor information than when the system appends position information based on a self-location of a client device (terminal 2021) obtained using a GPS to sensor information. As a result, even when another device uses the position-related data in another service, there is a possibility of more accurately determining a position corresponding to the position-related data in an actual space, by performing location estimation based on the same three-dimensional data.

It should be noted that although the data transmitted from terminal 2021 is the position-related data in the example given in the present embodiment, the data transmitted from terminal 2021 may be data unassociated with position information. In other words, the transmission and reception of three-dimensional data or sensor data described in the other embodiments may be performed via network 2023 described in the present embodiment.

Next, a different example of position information indicating a position in a three-dimensional or two-dimensional actual space or in a map space will be described. The position information appended to position-related data may be information indicating a relative position relative to a keypoint in three-dimensional data. Here, the keypoint serving as a reference for the position information is encoded as, for example, SWLD, and notified to terminal 2021 as three-dimensional data.

The information indicating the relative position relative to the keypoint may be, for example, information that is represented by a vector from the keypoint to the point indicated by the position information, and indicates a direction and a distance from the keypoint to the point indicated by the position information. Alternatively, the information indicating the relative position relative to the keypoint may be information indicating an amount of displacement from the keypoint to the point indicated by the position information along each of the x axis, the y axis, and the z axis. Additionally, the information indicating the relative position relative to the keypoint may be information indicating a distance from each of three or more keypoints to the point indicated by the position information. It should be noted that the relative position need not be a relative position of the point indicated by the position information represented using each keypoint as a reference, and may be a relative position of each keypoint represented with respect to the point indicated by the position information. Examples of position information based on a relative position relative to a keypoint include information for identifying a keypoint to be a reference, and information indicating the relative position of the point indicated by the position information and relative to the keypoint. When the information indicating the relative position relative to the keypoint is provided separately from three-dimensional data, the information indicating the relative position relative to the keypoint may include, for example, coordinate axes used in deriving the relative position, information indicating a type of the three-dimensional data, and/or information indicating a magnitude per unit amount (e.g., a scale) of a value of the information indicating the relative position.

The position information may include, for each keypoint, information indicating a relative position relative to the keypoint. When the position information is represented by relative positions relative to keypoints, terminal 2021 that intends to identify a position in an actual space indicated by the position information may calculate candidate points of the position indicated by the position information from positions of the keypoints each estimated from sensor data, and may determine that a point obtained by averaging the calculated candidate points is the point indicated by the position information. Since this configuration reduces the effects of errors when the positions of the keypoints are estimated from the sensor data, it is possible to improve the estimation accuracy for the point in the actual space indicated by the position information. Besides, when the position information includes information indicating relative positions relative to keypoints, if it is possible to detect any one of the keypoints regardless of the presence of keypoints undetectable due to a limitation such as a type or performance of a sensor included in terminal 2021, it is possible to estimate a value of the point indicated by the position information.

A point identifiable from sensor data can be used as a keypoint. Examples of the point identifiable from the sensor data include a point or a point within a region that satisfies a predetermined keypoint detection condition, such as the above-described three-dimensional feature or feature of visible light data is greater than or equal to a threshold value.

Moreover, a marker etc. placed in an actual space may be used as a keypoint. In this case, the maker may be detected and located from data obtained using a sensor such as LiDAR or a camera. For example, the marker may be represented by a change in color or luminance value (degree of reflection), or a three-dimensional shape (e.g., unevenness). Coordinate values indicating a position of the marker, or a two-dimensional bar code or a bar code etc. generated from an identifier of the marker may be also used.

Furthermore, a light source that transmits an optical signal may be used as a marker. When a light source of an optical signal is used as a marker, not only information for obtaining a position such as coordinate values or an identifier but also other data may be transmitted using an optical signal. For example, an optical signal may include contents of service corresponding to the position of the marker, an address for obtaining contents such as a URL, or an identifier of a wireless communication device for receiving service, and information indicating a wireless communication system etc. for connecting to the wireless communication device. The use of an optical communication device (a light source) as a marker not only facilitates the transmission of data other than information indicating a position but also makes it possible to dynamically change the data.

Terminal 2021 finds out a correspondence relationship of keypoints between mutually different data using, for example, a common identifier used for the data, or information or a table indicating the correspondence relationship of the keypoints between the data. When there is no information indicating a correspondence relationship between keypoints, terminal 2021 may also determine that when coordinates of a keypoint in three-dimensional data are converted into a position in a space of another three-dimensional data, a keypoint closest to the position is a corresponding keypoint.

When the position information based on the relative position described above is used, terminal 2021 that uses mutually different three-dimensional data or services can identify or estimate a position indicated by the position information with respect to a common keypoint included in or associated with each three-dimensional data. As a result, terminal 2021 that uses the mutually different three-dimensional data or the services can identify or estimate the same position with higher accuracy.

Even when map data or three-dimensional data represented using mutually different coordinate systems are used, since it is possible to reduce the effects of errors caused by the conversion of a coordinate system, it is possible to coordinate services based on more accurate position information.

Hereinafter, an example of functions provided by data collection server 2024 will be described. Data collection server 2024 may transfer received position-related data to another data server. When there are data servers, data collection server 2024 determines to which data server received position-related data is to be transferred, and transfers the position-related data to a data server determined as a transfer destination.

Data collection server 2024 determines a transfer destination based on, for example, transfer destination server determination rules preset to data collection server 2024. The transfer destination server determination rules are set by, for example, a transfer destination table in which identifiers respectively associated with terminals 2021 are associated with transfer destination data servers.

Terminal 2021 appends an identifier associated with terminal 2021 to position-related data to be transmitted, and transmits the position-related data to data collection server 2024. Data collection server 2024 determines a transfer destination data server corresponding to the identifier appended to the position-related data, based on the transfer destination server determination rules set out using the transfer destination table etc.; and transmits the position-related data to the determined data server. The transfer destination server determination rules may be specified based on a determination condition set using a time, a place, etc. at which position-related data is obtained. Here, examples of the identifier associated with transmission source terminal 2021 include an identifier unique to each terminal 2021 or an identifier indicating a group to which terminal 2021 belongs.

The transfer destination table need not be a table in which identifiers associated with transmission source terminals are directly associated with transfer destination data servers. For example, data collection server 2024 holds a management table that stores tag information assigned to each identifier unique to terminal 2021, and a transfer destination table in which the pieces of tag information are associated with transfer destination data servers. Data collection server 2024 may determine a transfer destination data server based on tag information, using the management table and the transfer destination table. Here, the tag information is, for example, control information for management or control information for providing service assigned to a type, a model number, an owner of terminal 2021 corresponding to the identifier, a group to which terminal 2021 belongs, or another identifier. Moreover, in the transfer destination able, identifiers unique to respective sensors may be used instead of the identifiers associated with transmission source terminals 2021. Furthermore, the transfer destination server determination rules may be set by client device 2026.

Data collection server 2024 may determine data servers as transfer destinations, and transfer received position-related data to the data servers. According to this configuration, for example, when position-related data is automatically backed up or when, in order that position-related data is commonly used by different services, there is a need to transmit the position-related data to a data server for providing each service, it is possible to achieve data transfer as intended by changing a setting of data collection server 2024. As a result, it is possible to reduce the number of steps necessary for building and changing a system, compared to when a transmission destination of position-related data is set for each terminal 2021.

Data collection server 2024 may register, as a new transfer destination, a data server specified by a transfer request signal received from a data server; and transmit position-related data subsequently received to the data server, in response to the transfer request signal.

Data collection server 2024 may store position-related data received from terminal 2021 into a recording device, and transmit position-related data specified by a transmission request signal received from terminal 2021 or a data server to request source terminal 2021 or the data server in response to the transmission request signal.

Data collection server 2024 may determine whether position-related data is suppliable to a request source data server or terminal 2021, and transfer or transmit the position-related data to the request source data server or terminal 2021 when determining that the position-related data is suppliable.

When data collection server 2024 receives a request for current position-related data from client device 2026, even if it is not a timing for transmitting position-related data by terminal 2021, data collection server 2024 may send a transmission request for the current position-related data to terminal 2021, and terminal 2021 may transmit the current position-related data in response to the transmission request.

Although terminal 2021 transmits position information data to data collection server 2024 in the above description, data collection server 2024 may have a function of managing terminal 2021 such as a function necessary for collecting position-related data from terminal 2021 or a function used when collecting position-related data from terminal 2021.

Data collection server 2024 may have a function of transmitting, to terminal 2021, a data request signal for requesting transmission of position information data, and collecting position-related data.

Management information such as an address for communicating with terminal 2021 from which data is to be collected or an identifier unique to terminal 2021 is registered in advance in data collection server 2024. Data collection server 2024 collects position-related data from terminal 2021 based on the registered management information. Management information may include information such as types of sensors included in terminal 2021, the number of sensors included in terminal 2021, and communication systems supported by terminal 2021.

Data collection server 2024 may collect information such as an operating state or a current position of terminal 2021 from terminal 2021.

Registration of management information may be instructed by client device 2026, or a process for the registration may be started by terminal 2021 transmitting a registration request to data collection server 2024. Data collection server 2024 may have a function of controlling communication between data collection server 2024 and terminal 2021.

Communication between data collection server 2024 and terminal 2021 may be established using a dedicated line provided by a service provider such as a mobile network operator (MNO) or a mobile virtual network operator (MVNO), or a virtual dedicated line based on a virtual private network (VPN). According to this configuration, it is possible to perform secure communication between terminal 2021 and data collection server 2024.

Data collection server 2024 may have a function of authenticating terminal 2021 or a function of encrypting data to be transmitted and received between data collection server 2024 and terminal 2021. Here, the authentication of terminal 2021 or the encryption of data is performed using, for example, an identifier unique to terminal 2021 or an identifier unique to a terminal group including terminals 2021, which is shared in advance between data collection server 2024 and terminal 2021. Examples of the identifier include an international mobile subscriber identity (IMSI) that is a unique number stored in a subscriber identity module (SIM) card. An identifier for use in authentication and an identifier for use in encryption of data may be identical or different.

The authentication or the encryption of data between data collection server 2024 and terminal 2021 is feasible when both data collection server 2024 and terminal 2021 have a function of performing the process. The process does not depend on a communication system used by communication device 2022 that performs relay. Accordingly, since it is possible to perform the common authentication or encryption without considering whether terminal 2021 uses a communication system, the user's convenience of system architecture is increased. However, the expression "does not depend on a communication system used by communication device 2022 that performs relay" means a change according to a communication system is not essential. In other words, in order to improve the transfer efficiency or ensure security, the authentication or the encryption of data between data collection server 2024 and terminal 2021 may be changed according to a communication system used by a relay device.

Data collection server 2024 may provide client device 2026 with a User Interface (UI) that manages data collection rules such as types of position-related data collected from terminal 2021 and data collection schedules. Accordingly, a user can specify, for example, terminal 2021 from which data is to be collected using client device 2026, a data collection time, and a data collection frequency. Additionally, data collection server 2024 may specify, for example, a region on a map from which data is to be desirably collected, and collect position-related data from terminal 2021 included in the region.

When the data collection rules are managed on a per terminal 2021 basis, client device 2026 presents, on a screen, a list of terminals 2021 or sensors to be managed. The user sets, for example, a necessity for data collection or a collection schedule for each item in the list.

When a region on a map from which data is to be desirably collected is specified, client device 2026 presents, on a screen, a two-dimensional or three-dimensional map of a region to be managed. The user selects the region from which data is to be collected on the displayed map. Examples of the region selected on the map include a circular or Cartesian region having a point specified on the map as the center, or a circular or Cartesian region specifi-able by a drag operation. Client device 2026 may also select a region in a preset unit such as a city, an area or a block in a city, or a main road, etc. Instead of specifying a region using a map, a region may be set by inputting values of a latitude and a longitude, or a region may be selected from a list of candidate regions derived based on inputted text information. Text information is, for example, a name of a region, a city, or a landmark.

Moreover, data may be collected while the user dynamically changes a specified region by specifying one or more terminals 2021 and setting a condition such as within 100 meters of one or more terminals 2021.

When client device 2026 includes a sensor such as a camera, a region on a map may be specified based on a position of client device 2026 in an actual space obtained from sensor data. For example, client device 2026 may estimate a self-location using sensor data, and specify, as a region from which data is to be collected, a region within a predetermined distance from a point on a map corresponding to the estimated location or a region within a distance specified by the user. Client device 2026 may also specify, as the region from which the data is to be collected, a sensing region of the sensor, that is, a region corresponding to obtained sensor data. Alternatively, client device 2026 may specify, as the region from which the data is to be collected, a region based on a location corresponding to sensor data specified by the user. Either client device 2026 or data collection server 2024 may estimate a region on a map or a location corresponding to sensor data.

When a region on a map is specified, data collection server 2024 may specify terminal 2021 within the specified region by collecting current position information of each terminal 2021, and may send a transmission request for position-related data to specified terminal 2021. When data collection server 2024 transmits information indicating a specified region to terminal 2021, determines whether terminal 2021 is present within the specified region, and determines that terminal 2021 is present within the specified region, rather than specifying terminal 2021 within the region, terminal 2021 may transmit position-related data.

Data collection server 2024 transmits, to client device 2026, data such as a list or a map for providing the above-described User Interface (UI) in an application executed by client device 2026. Data collection server 2024 may transmit, to client device 2026, not only the data such as the list or the map but also an application program. Additionally, the above UI may be provided as contents created using HTML displayable by a browser. It should be noted that part of data such as map data may be supplied from a server, such as map server 2025, other than data collection server 2024.

When client device 2026 receives an input for notifying the completion of an input such as pressing of a setup key by the user, client device 2026 transmits the inputted information as configuration information to data collection server 2024. Data collection server 2024 transmits, to each terminal 2021, a signal for requesting position-related data or notifying position-related data collection rules, based on the configuration information received from client device 2026, and collects the position-related data.

Next, an example of controlling operation of terminal 2021 based on additional information added to three-dimensional or two-dimensional map data will be described.

In the present configuration, object information that indicates a position of a power feeding part such as a feeder antenna or a feeder coil for wireless power feeding buried under a road or a parking lot is included in or associated with three-dimensional data, and such object information is provided to terminal 2021 that is a vehicle or a drone.

A vehicle or a drone that has obtained the object information to get charged automatically moves so that a position of a charging part such as a charging antenna or a charging coil included in the vehicle or the drone becomes opposite to a region indicated by the object information, and such vehicle or a drone starts to charge itself. It should be noted that when a vehicle or a drone has no automatic driving function, a direction to move in or an operation to perform is presented to a driver or an operator by using an image displayed on a screen, audio, etc. When a position of a charging part calculated based on an estimated self-location is determined to fall within the region indicated by the object information or a predetermined distance from the region, an image or audio to be presented is changed to a content that puts a stop to driving or operating, and the charging is started.

Object information need not be information indicating a position of a power feeding part, and may be information indicating a region within which placement of a charging part results in a charging efficiency greater than or equal to a predetermined threshold value. A position indicated by object information may be represented by, for example, the central point of a region indicated by the object information, a region or a line within a two-dimensional plane, or a region, a line, or a plane within a three-dimensional space.

According to this configuration, since it is possible to identify the position of the power feeding antenna unidentifiable by sensing data of LiDAR or an image captured by the camera, it is possible to highly accurately align a wireless charging antenna included in terminal 2021 such as a vehicle with a wireless power feeding antenna buried under a road. As a result, it is possible to increase a charging speed at the time of wireless charging and improve the charging efficiency.

Object information may be an object other than a power feeding antenna. For example, three-dimensional data includes, for example, a position of an AP for millimeter-wave wireless communication as object information. Accordingly, since terminal 2021 can identify the position of the AP in advance, terminal 2021 can steer a directivity of beam to a direction of the object information and start communication. As a result, it is possible to improve communication quality such as increasing transmission rates, reducing the duration of time before starting communication, and extending a communicable period.

Object information may include information indicating a type of an object corresponding to the object information. In addition, when terminal 2021 is present within a region in an actual space corresponding to a position in three-dimensional data of the object information or within a predetermined distance from the region, the object information may include information indicating a process to be performed by terminal 2021.

Object information may be provided by a server different from a server that provides three-dimensional data. When object information is provided separately from three-dimensional data, object groups in which object information used by the same service is stored may be each provided as separate data according to a type of a target service or a target device.

Three-dimensional data used in combination with object information may be point cloud data of WLD or keypoint data of SWLD.

In the three-dimensional data encoding device, when attribute information of a current three-dimensional point to be encoded is layer-encoded using Levels of Detail (LoDs), the three-dimensional data decoding device may decode the attribute information in layers down to LoD required by the three-dimensional data decoding device and need not decode the attribute information in layers not required. For example, when the total number of LoDs for the attribute information in a bitstream generated by the three-dimensional data encoding device is N, the three-dimensional data decoding device may decode M LoDs (M<N), i.e., layers from the uppermost layer LoD0 to LoD(M−1), and need not decode the remaining LoDs, i.e., layers down to LoD(N−1). With this, while reducing the processing load, the three-dimensional data decoding device can decode the attribute information in layers from LoD0 to LoD(M−1) required by the three-dimensional data decoding device.

Figure 83:
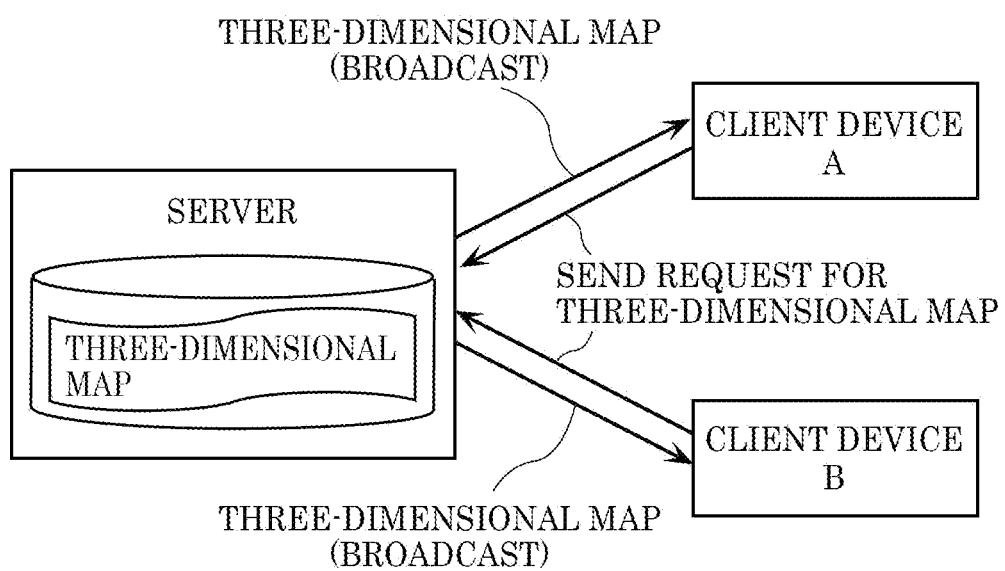
FIG. 83 is a diagram illustrating an example of a system according to Embodiment 7.

FIG. 83 is a diagram illustrating the foregoing use case. In the example shown in FIG. 83, a server stores a three-dimensional map obtained by encoding three-dimensional geometry information and attribute information. The server (the three-dimensional data encoding device) broadcasts the three-dimensional map to client devices (the three-dimensional data decoding devices: for example, vehicles, drones, etc.) in an area managed by the server, and each client device uses the three-dimensional map received from the server to perform a process for identifying the self-position of the client device or a process for displaying map information to a user or the like who operates the client device.

The following describes an example of the operation in this case, First, the server encodes the geometry information of the three-dimensional map using an octree structure or the like. Then, the sever layer-encodes the attribute information of the three-dimensional map using N LoDs established based on the geometry information. The server stores a bitstream of the three-dimensional map obtained by the layer-encoding.

Next, in response to a send request for the map information from the client device in the area managed by the server, the server sends the bitstream of the encoded three-dimensional map to the client device.

The client device receives the bitstream of the three-dimensional map sent from the server, and decodes the geometry information and the attribute information of the three-dimensional map in accordance with the intended use of the client device. For example, when the client device performs highly accurate estimation of the self-position using the geometry information and the attribute information in N LoDs, the client device determines that a decoding result to the dense three-dimensional points is necessary as the attribute information, and decodes all the information in the bitstream.

Moreover, when the client device displays the three-dimensional map information to a user or the like, the client device determines that a decoding result to the sparse three-dimensional points is necessary as the attribute information, and decodes the geometry information and the attribute information in M LoDs (M<N) starting from an upper layer LoD0.

In this way, the processing load of the client device can be reduced by changing LoDs for the attribute information to be decoded in accordance with the intended use of the client device.

In the example shown in FIG. 83, for example, the three-dimensional map includes geometry information and attribute information. The geometry information is encoded using the octree. The attribute information is encoded using N LoDs.

Client device A performs highly accurate estimation of the self-position. In this case, client device A determines that all the geometry information and all the attribute information are necessary, and decodes all the geometry information and all the attribute information constructed from N LoDs in the bitstream.

Client device B displays the three-dimensional map to a user. In this case, client device B determines that the geometry information and the attribute information in M LoDs (M<N) are necessary, and decodes the geometry information and the attribute information constructed from M LoDs in the bitstream.

It is to be noted that the server may broadcast the three-dimensional map to the client devices, or multicast or unicast the three-dimensional map to the client devices.

The following describes a variation of the system according to the present embodiment. In the three-dimensional data encoding device, when attribute information of a current three-dimensional point to be encoded is layer-encoded using LoDs, the three-dimensional data encoding device may encode the attribute information in layers down to LoD required by the three-dimensional data decoding device and need not encode the attribute information in layers not required. For example, when the total number of LoDs is N, the three-dimensional data encoding device may generate a bitstream by encoding M LoDs (M<N), i.e., layers from the uppermost layer LoD0 to LoD(M−1), and not encoding the remaining LoDs, i.e., layers down to LoD(N−1), With this, in response to a request from the three-dimensional data decoding device, the three-dimensional data encoding device can provide a bitstream in which the attribute information from LoD0 to LoD(M−1) required by the three-dimensional data decoding device is encoded.

Figure 84:
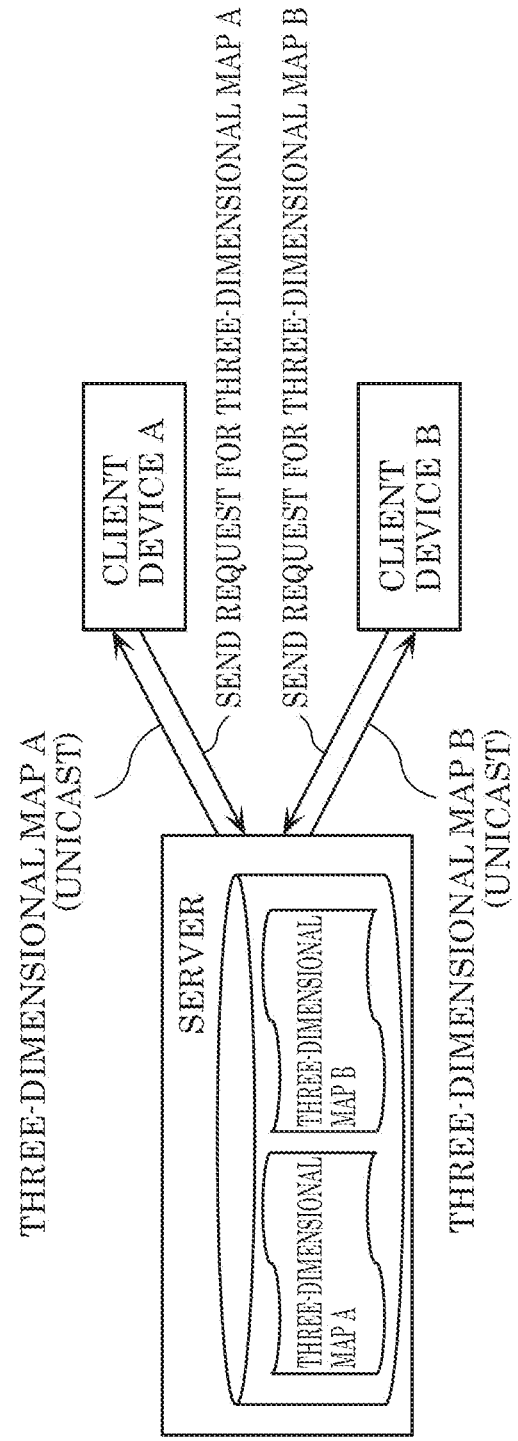
FIG. 84 is a diagram illustrating a variation of the system according to Embodiment 7.

FIG. 84 is a diagram illustrating the foregoing use case. In the example shown in FIG. 84, a server stores a three-dimensional map obtained by encoding three-dimensional geometry information and attribute information. The server (the three-dimensional data encoding device) unicasts, in response to a request from the client device, the three-dimensional map to a client device (the three-dimensional data decoding device: for example, a vehicle, a drone, etc.) in an area managed by the server, and the client device uses the three-dimensional map received from the server to perform a process for identifying the self-position of the client device or a process for displaying map information to a user or the like who operates the client device.

The following describes an example of the operation in this case. First, the server encodes the geometry information of the three-dimensional map using an octree structure, or the like. Then, the sever generates a bitstream of three-dimensional map A by layer-encoding the attribute information of the three-dimensional map using N LoDs established based on the geometry information, and stores the generated bitstream in the server. The sever also generates a bitstream of three-dimensional map B by layer-encoding the attribute information of the three-dimensional map using M LoDs (M<N) established based on the geometry information, and stores the generated bitstream in the server.

Next, the client device requests the server to send the three-dimensional map in accordance with the intended use of the client device. For example, when the client device performs highly accurate estimation of the self-position using the geometry information and the attribute information in N LoDs, the client device determines that a decoding result to the dense three-dimensional points is necessary as the attribute information, and requests the server to send the bitstream of three-dimensional map A, Moreover, when the client device displays the three-dimensional map information to a user or the like, the client device determines that a decoding result to the sparse three-dimensional points is necessary as the attribute information, and requests the server to send the bitstream of three-dimensional map B including the geometry information and the attribute information in M LoDs (M<N) starting from an upper layer LoD0, Then, in response to the send request for the map information from the client device, the server sends the bitstream of encoded three-dimensional map A or B to the client device.

The client device receives the bitstream of three-dimensional map A or B sent from the server in accordance with the intended use of the client device, and decodes the received bitstream. In this way, the server changes a bitstream to be sent, in accordance with the intended use of the client device. With this, it is possible to reduce the processing load of the client device.

In the example shown in FIG. 84, the server stores three-dimensional map A and three-dimensional map B. The server generates three-dimensional map A by encoding the geometry information of the three-dimensional map using, for example, an octree structure, and encoding the attribute information of the three-dimensional map using N LoDs. In other words, NumLoD included in the bitstream of three-dimensional map A indicates N.

The server also generates three-dimensional map B by encoding the geometry information of the three-dimensional map using, for example, an octree structure, and encoding the attribute information of the three-dimensional map using M LoDs. In other words, NumLoD included in the bitstream of three-dimensional map B indicates M.

Client device A performs highly accurate estimation of the self-position. In this case, client device A determines that all the geometry information and all the attribute information are necessary, and requests the server to send three-dimensional map A including all the geometry information and the attribute information constructed from N LoDs. Client device A receives three-dimensional map A, and decodes all the geometry information and the attribute information constructed from N LoDs.

Client device B displays the three-dimensional map to a user. In this case, client device B determines that all the geometry information and the attribute information in M LoDs (M<N) are necessary, and requests the server to send three-dimensional map B including all the geometry information and the attribute information constructed from M LoDs. Client device B receives three-dimensional map B, and decodes all the geometry information and the attribute information constructed from M LoDs.

It is to be noted that in addition to three-dimensional map B, the server (the three-dimensional data encoding device) may generate three-dimensional map C in which attribute information in the remaining N-M LoDs is encoded, and send three-dimensional map C to client device B in response to the request from client device B. Moreover, client device B may obtain the decoding result of N LoDs using the bitstreams of three-dimensional maps B and C.

Figure 85:
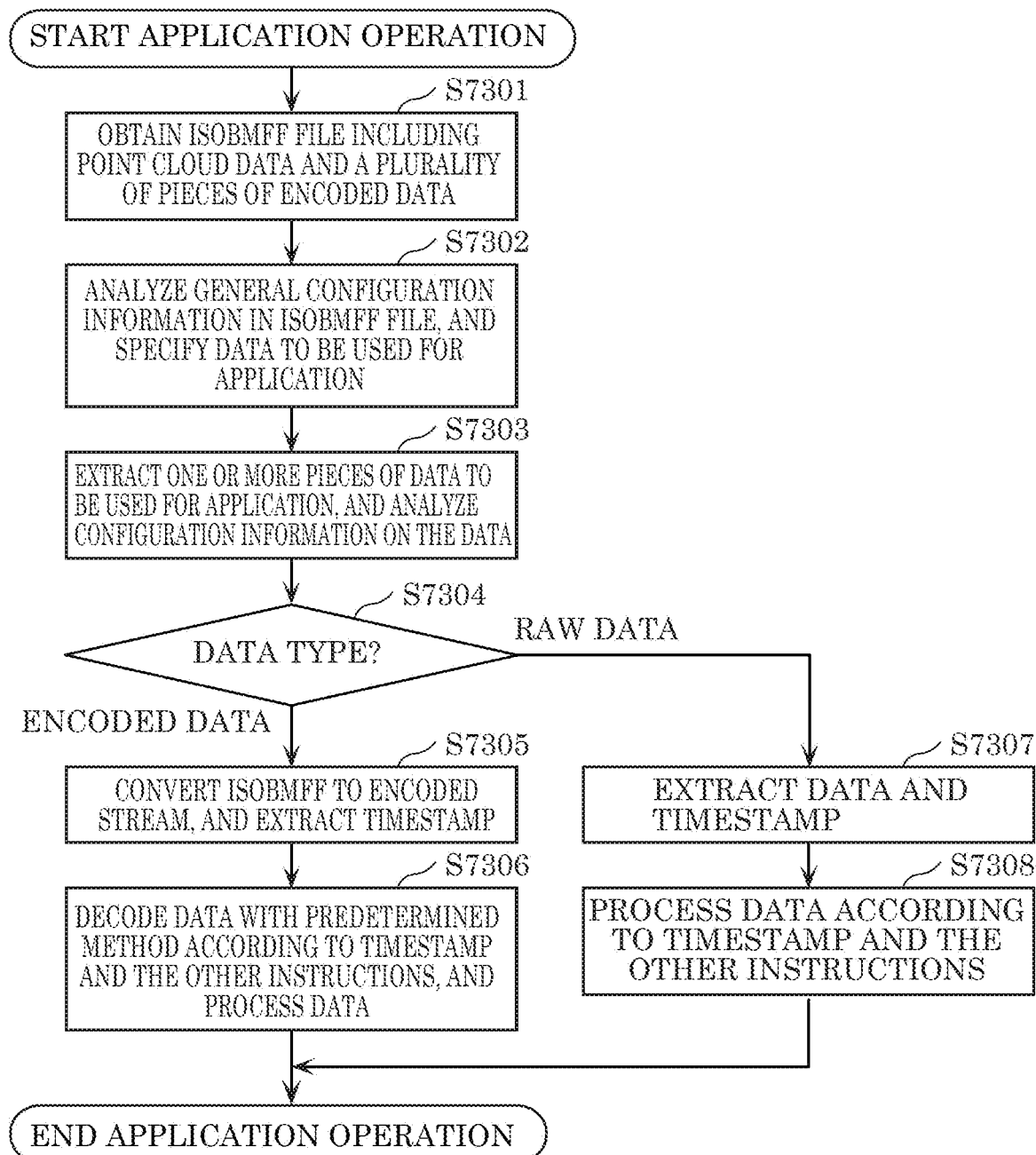
FIG. 85 is a flowchart illustrating an example of an application process according to Embodiment 7.

Hereinafter, an example of an application process will be described. FIG. 85 is a flowchart illustrating an example of the application process. When an application operation is started, a three-dimensional data demultiplexing device obtains an ISOBMFF file including point cloud data and a plurality of pieces of encoded data (S7301). For example, the three-dimensional data demultiplexing device may obtain the ISOBMFF file through communication, or may read the ISOBMFF file from the accumulated data.

Next, the three-dimensional data demultiplexing device analyzes the general configuration information in the ISOBMFF file, and specifies the data to be used for the application (S7302). For example, the three-dimensional data demultiplexing device obtains data that is used for processing, and does not obtain data that is not used for processing.

Next, the three-dimensional data demultiplexing device extracts one or more pieces of data to be used for the application, and analyzes the configuration information on the data (S7303).

When the type of the data is encoded data (encoded data in S7304), the three-dimensional data demultiplexing device converts the ISOBMFF to an encoded stream, and extracts a timestamp (S7305). Additionally, the three-dimensional data demultiplexing device refers to, for example, the flag indicating whether or not the synchronization between data is aligned to determine whether or not the synchronization between data is aligned, and may perform a synchronization process when not aligned.

Next, the three-dimensional data demultiplexing device decodes the data with a predetermined method according to the timestamp and the other instructions, and processes the decoded data (S7306).

On the other hand, when the type of the data is RAW data (RAW data in S7304), the three-dimensional data demultiplexing device extracts the data and timestamp (S7307). Additionally, the three-dimensional data demultiplexing device may refer to, for example, the flag indicating whether or not the synchronization between data is aligned to determine whether or not the synchronization between data is aligned, and may perform a synchronization process when not aligned, Next, the three-dimensional data demultiplexing device processes the data according to the timestamp and the other instructions (S7308).

Figure 86:
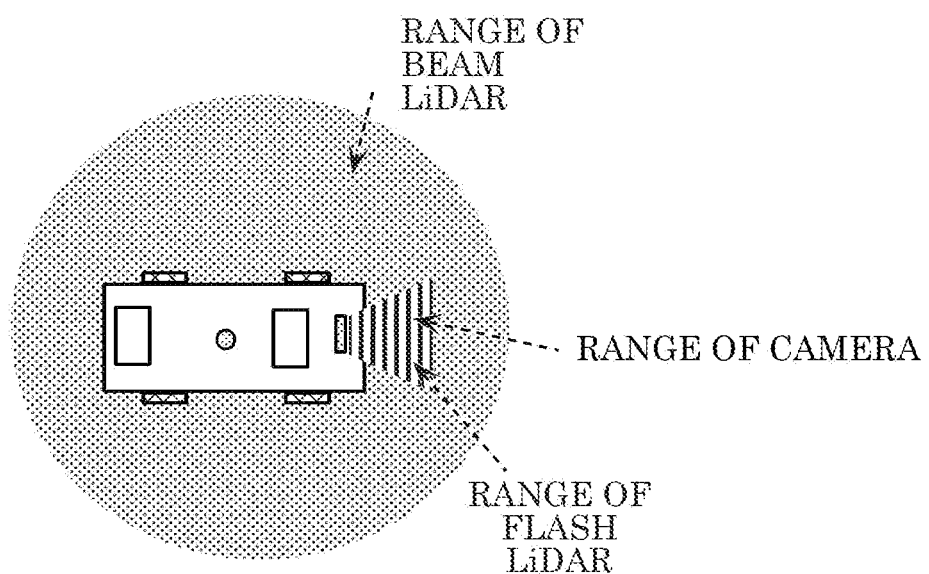
FIG. 86 is a diagram illustrating the sensor range of various sensors according to Embodiment 7.

For example, an example will be described in which the sensor signals obtained by a beam LiDAR, a FLASH LiDAR, and a camera are encoded and multiplexed with respective different encoding schemes. FIG. 86 is a diagram illustrating examples of the sensor ranges of a beam LiDAR, a FLASH LiDAR, and a camera. For example, the beam LiDAR detects all directions in the periphery of a vehicle (sensor), and the FLASH LiDAR and the camera detect the range in one direction (for example, the front) of the vehicle.

In the case of an application that integrally handles a LiDAR point cloud, the three-dimensional data demultiplexing device refers to the general configuration information, and extracts and decodes the encoded data of the beam LiDAR and the FLASH LiDAR, Additionally, the three-dimensional data demultiplexing device does not extract camera images.

According to the timestamps of the beam LiDAR and the FLASH LiDAR, the three-dimensional data demultiplexing device simultaneously processes the respective encoded data of the time of the same timestamp.

For example, the three-dimensional data demultiplexing device may present the processed data with a presentation device, may synthesize the point cloud data of the beam LiDAR and the FLASH LiDAR, or may perform a process such as rendering.

Additionally, in the case of an application that performs calibration between data, the three-dimensional data demultiplexing device may extract sensor geometry information, and use the sensor geometry information in the application.

For example, the three-dimensional data demultiplexing device may select whether to use beam LiDAR information or FLASH LiDAR information in the application, and may switch the process according to the selection result.

In this manner, since it is possible to adaptively change the obtaining of data and the encoding process according to the process of the application, the processing amount and the power consumption can be reduced.

Figure 87:
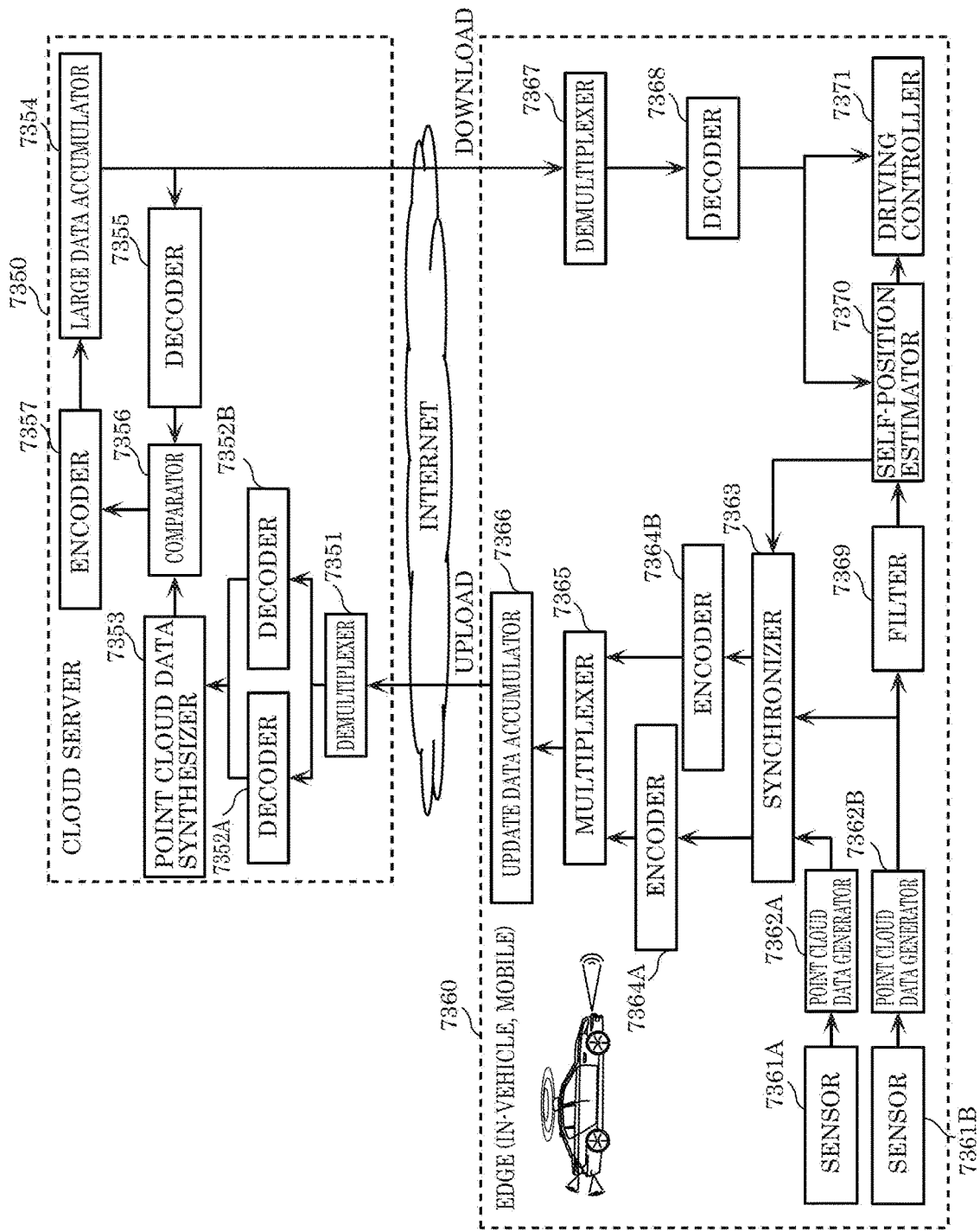
FIG. 87 is a diagram illustrating a configuration example of an automated driving system according to Embodiment 7.

Hereinafter, a use case in automated driving will be described. FIG. 87 is a diagram illustrating a configuration example of an automated driving system. This automated driving system includes cloud server 7350, and edge 7360 such as an in-vehicle device or a mobile device. Cloud server 7350 includes demultiplexer 7351, decoders 7352A, 7352B, and 7355, point cloud data synthesizer 7353, large data accumulator 7354, comparator 7356, and encoder 7357. Edge 7360 includes sensors 7361A and 7361B, point cloud data generators 7362A and 7362B, synchronizer 7363, encoders 7364A and 7364B, multiplexer 7365, update data accumulator 7366, demultiplexer 7367, decoder 7368, filter 7369, self-position estimator 7370, and driving controller 7371.

In this system, edge 7360 downloads large data, which is large point-cloud map data accumulated in cloud server 7350. Edge 7360 performs a self-position estimation process of edge 7360 (a vehicle or a terminal) by matching the large data with the sensor information obtained by edge 7360. Additionally, edge 7360 uploads the obtained sensor information to cloud server 7350, and updates the large data to the latest map data.

Additionally, in various applications that handle point cloud data in the system, point cloud data with different encoding methods are handled.

Cloud server 7350 encodes and multiplexes large data. Specifically, encoder 7357 performs encoding by using a third encoding method suitable for encoding a large point cloud. Additionally, encoder 7357 multiplexes encoded data. Large data accumulator 7354 accumulates the data encoded and multiplexed by encoder 7357.

Edge 7360 performs sensing. Specifically, point cloud data generator 7362A generates first point cloud data (geometry information (geometry) and attribute information) by using the sensing information obtained by sensor 7361A. Point cloud data generator 7362B generates second point cloud data (geometry information and attribute information) by using the sensing information obtained by sensor 7361B. The generated first point cloud data and second point cloud data are used for the self-position estimation or vehicle control of automated driving, or for map updating. In each process, a part of information of the first point cloud data and the second point cloud data may be used.

Edge 7360 performs the self-position estimation. Specifically, edge 7360 downloads large data from cloud server 7350. Demultiplexer 7367 obtains encoded data by demultiplexing the large data in a file format. Decoder 7368 obtains large data, which is large point-cloud map data, by decoding the obtained encoded data.

Self-position estimator 7370 estimates the self-position in the map of a vehicle by matching the obtained large data with the first point cloud data and the second point cloud data generated by point cloud data generators 7362A and 7362B. Additionally, driving controller 7371 uses the matching result or the self-position estimation result for driving control.

Note that self-position estimator 7370 and driving controller 7371 may extract specific information, such as geometry information, of the large data, and may perform processes by using the extracted information. Additionally, filter 7369 performs a process such as correction or decimation on the first point cloud data and the second point cloud data. Self-position estimator 7370 and driving controller 7371 may use the first point cloud data and second point cloud data on which the process has been performed. Additionally, self-position estimator 7370 and driving controller 7371 may use the sensor signals obtained by sensors 7361A and 7361B.

Synchronizer 7363 performs time synchronization and geometry correction between a plurality of sensor signals or the pieces of data of a plurality of pieces of point cloud data, Additionally, synchronizer 7363 may correct the geometry information on the sensor signal or point cloud data to match the large data, based on geometry correction information on the large data and sensor data generated by the self-position estimation process.

Note that synchronization and geometry correction may be performed not by edge 7360, but by cloud server 7350. In this case, edge 7360 may multiplex the synchronization information and the geometry information to transmit the synchronization information and the geometry information to cloud server 7350.

Edge 7360 encodes and multiplexes the sensor signal or point cloud data. Specifically, the sensor signal or point cloud data is encoded by using a first encoding method or a second encoding method suitable for encoding each signal. For example, encoder 7364A generates first encoded data by encoding first point cloud data by using the first encoding method, Encoder 7364B generates second encoded data by encoding second point cloud data by using the second encoding method.

Multiplexer 7365 generates a multiplexed signal by multiplexing the first encoded data, the second encoded data, the synchronization information, and the like. Update data accumulator 7366 accumulates the generated multiplexed signal. Additionally, update data accumulator 7366 uploads the multiplexed signal to cloud server 7350.

Cloud server 7350 synthesizes the point cloud data. Specifically, demultiplexer 7351 obtains the first encoded data and the second encoded data by demultiplexing the multiplexed signal uploaded to cloud server 7350. Decoder 7352A obtains the first point cloud data (or sensor signal) by decoding the first encoded data. Decoder 7352B obtains the second point cloud data (or sensor signal) by decoding the second encoded data.

Point cloud data synthesizer 7353 synthesizes the first point cloud data and the second point cloud data with a predetermined method. When the synchronization information and the geometry correction information are multiplexed in the multiplexed signal, point cloud data synthesizer 7353 may perform synthesis by using these pieces of information.

Decoder 7355 demultiplexes and decodes the large data accumulated in large data accumulator 7354. Comparator 7356 compares the point cloud data generated based on the sensor signal obtained by edge 7360 with the large data held by cloud server 7350, and determines the point cloud data that needs to be updated. Comparator 7356 updates the point cloud data that is determined to need to be updated of the large data to the point cloud data obtained from edge 7360.

Encoder 7357 encodes and multiplexes the updated large data, and accumulates the obtained data in large data accumulator 7354.

As described above, the signals to be handled may be different, and the signals to be multiplexed or encoding methods may be different, according to the usage or applications to be used. Even in such a case, flexible decoding and application processes are enabled by multiplexing data of various encoding schemes by using the present embodiment. Additionally, even in a case where the encoding schemes of signals are different, by conversion to an encoding scheme suitable for demultiplexing, decoding, data conversion, encoding, and multiplexing processing, it becomes possible to build various applications and systems, and to offer of flexible services.

Figure 88:
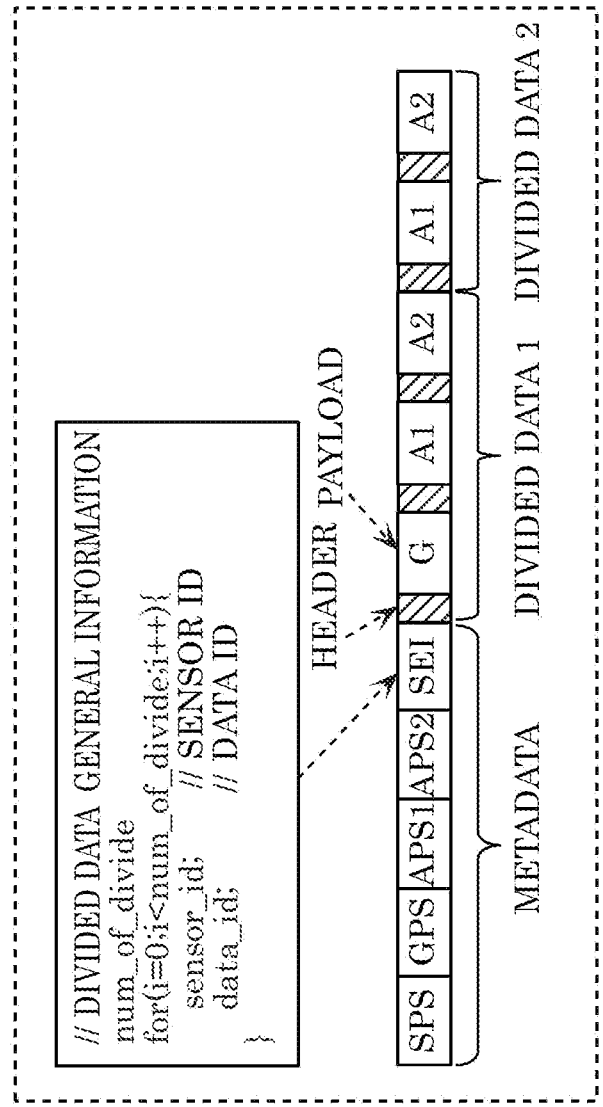
FIG. 88 is a diagram illustrating a configuration example of a bitstream according to Embodiment 7.

Hereinafter, an example of decoding and application of divided data will be described. First, the information on divided data will be described, FIG. 88 is a diagram illustrating a configuration example of a bitstream. The general information of divided data indicates, for each divided data, the sensor ID (sensor_id) and data ID (data_id) of the divided data. Note that the data ID is also indicated in the header of each encoded data.

Note that, as in FIG. 73, the general information of divided data illustrated in FIG. 88 includes, in addition to the sensor ID, at least one of the sensor information (Sensor), the version (Version) of the sensor, the maker name (Maker) of the sensor, the mount information (Mount Info.) of the sensor, and the position coordinates of the sensor (World Coordinate). Accordingly, the three-dimensional data decoding device can obtain the information on various sensors from the configuration information.

The general information of divided data may be stored in SPS, GPS, or APS, which is the metadata, or may be stored in SEI, which is the metadata not required for encoding. Additionally, at the time of multiplexing, the three-dimensional data encoding device stores the SEI in a file of ISOBMFF. The three-dimensional data decoding device can obtain desired divided data based on the metadata.

In FIG. 88, SPS is the metadata of the entire encoded data, GPS is the metadata of the geometry information, APS is the metadata for each attribute information, G is encoded data of the geometry information for each divided data, and A1, etc. are encoded data of the attribute information for each divided data.

Figure 89:
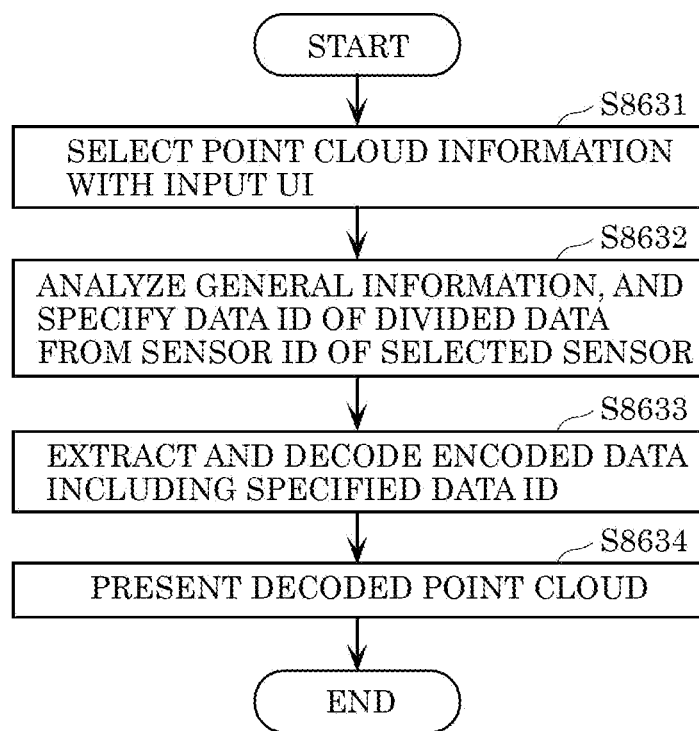
FIG. 89 is a flowchart of a point cloud selection process according to Embodiment 7.
Figure 90:
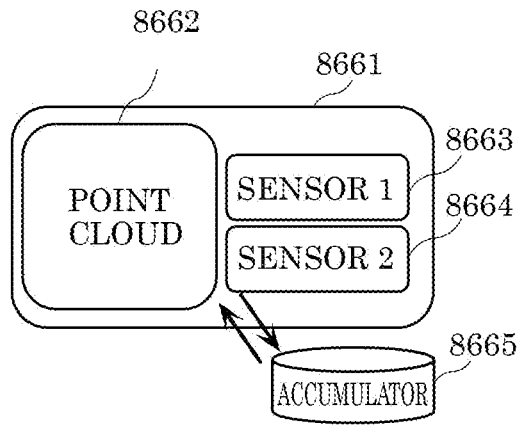
FIG. 90 is a diagram illustrating a screen example for point cloud selection process according to Embodiment 7.
Figure 91:
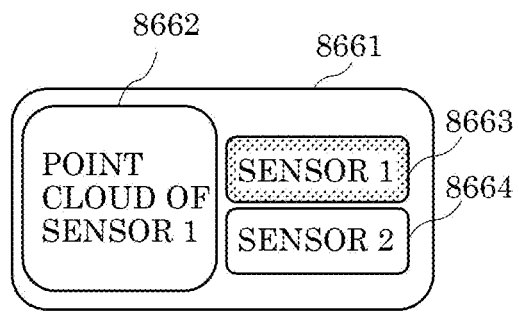
FIG. 91 is a diagram illustrating a screen example of the point cloud selection process according to Embodiment 7.
Figure 92:
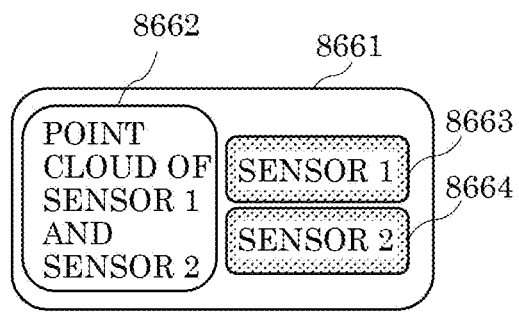
FIG. 92 is a diagram illustrating a screen example of the point cloud selection process according to Embodiment 7.

Next, an application example of divided data will be described. An example of application will be described in which an arbitrary point cloud is selected, and the selected point cloud is presented. FIG. 89 is a flowchart of a point cloud selection process performed by this application. FIG. 90 to FIG. 92 are diagrams illustrating screen examples of the point cloud selection process.

As illustrated in FIG. 90, the three-dimensional data decoding device that performs the application includes, for example, a UI unit that displays an input UI (user interface) 8661 for selecting an arbitrary point cloud. Input UI 8661 includes presenter 8662 that presents the selected point cloud, and an operation unit (buttons 8663 and 8664) that receives operations by a user. After a point cloud is selected in UI 8661, the three-dimensional data decoding device obtains desired data from accumulator 8665.

First, based on an operation by the user on input UI 8661, the point cloud information that the user wants to display is selected (S8631). Specifically, by selecting button 8663, the point cloud based on sensor 1 is selected. By selecting button 8664, the point cloud based on sensor 2 is selected. Alternatively, by selecting both button 8663 and button 8664, the point cloud based on sensor 1 and the point cloud based on sensor 2 are selected. Note that it is an example of the selection method of point cloud, and it is not limited to this.

Next, the three-dimensional data decoding device analyzes the general information of divided data included in the multiplexed signal (bitstream) or encoded data, and specifies the data ID (data_id) of the divided data constituting the selected point cloud from the sensor ID (sensor_id) of the selected sensor (S8632). Next, the three-dimensional data decoding device extracts, from the multiplexed signal, the encoded data including the specified and desired data ID, and decodes the extracted encoded data to decode the point cloud based on the selected sensor (S8633). Note that the three-dimensional data decoding device does not decode the other encoded data.

Lastly, the three-dimensional data decoding device presents (for example, displays) the decoded point cloud (S8634). FIG. 91 illustrates an example in the case where button 8663 for sensor 1 is pressed, and the point cloud of sensor 1 is presented. FIG. 92 illustrates an example in the case where both button 8663 for sensor 1 and button 8664 for sensor 2 are pressed, and the point clouds of sensor 1 and sensor 2 are presented.

A three-dimensional data encoding device, a three-dimensional data decoding device, and the like according to the embodiments of the present disclosure have been described above, but the present disclosure is not limited to these embodiments.

Note that each of the processors included in the three-dimensional data encoding device, the three-dimensional data decoding device, and the like according to the above embodiments is typically implemented as a large-scale integrated (LSI) circuit, which is an integrated circuit (IC). These may take the form of individual chips, or may be partially or entirely packaged into a single chip.

Such IC is not limited to an LSI, and thus may be implemented as a dedicated circuit or a general-purpose processor. Alternatively, a field programmable gate array (FPGA) that allows for programming after the manufacture of an LSI, or a reconfigurable processor that allows for reconfiguration of the connection and the setting of circuit cells inside an LSI may be employed.

Moreover, in the above embodiments, the structural components may be implemented as dedicated hardware or may be realized by executing a software program suited to such structural components. Alternatively, the structural components may be implemented by a program executor such as a CPU or a processor reading out and executing the software program recorded in a recording medium such as a hard disk or a semiconductor memory.

The present disclosure may also be implemented as a three-dimensional data encoding method, a three-dimensional data decoding method, or the like executed by the three-dimensional data encoding device, the three-dimensional data decoding device, and the like.

Also, the divisions of the functional blocks shown in the block diagrams are mere examples, and thus a plurality of functional blocks may be implemented as a single functional block, or a single functional block may be divided into a plurality of functional blocks, or one or more functions may be moved to another functional block. Also, the functions of a plurality of functional blocks having similar functions may be processed by single hardware or software in a parallelized or time-divided manner.

Also, the processing order of executing the steps shown in the flowcharts is a mere illustration for specifically describing the present disclosure, and thus may be an order other than the shown order. Also, one or more of the steps may be executed simultaneously (in parallel) with another step.

A three-dimensional data encoding device, a three-dimensional data decoding device, and the like according to one or more aspects have been described above based on the embodiments, but the present disclosure is not limited to these embodiments. The one or more aspects may thus include forms achieved by making various modifications to the above embodiments that can be conceived by those skilled in the art, as well forms achieved by combining structural components in different embodiments, without materially departing from the spirit of the present disclosure.

INDUSTRIAL APPLICABILITY

The present disclosure is applicable to a three-dimensional data encoding device and a three-dimensional data decoding device.

The invention claimed is:

1. A three-dimensional data encoding method of encoding geometry information of a first three-dimensional point cloud located in a first area, the three-dimensional data encoding method comprising:
    selecting a moving method from among a plurality of moving methods;
    determining a second area based on the moving method selected and the first area;
    moving a second three-dimensional point cloud located in the second area determined, to the first area, using a method in accordance with the moving method;
    encoding the geometry information of the first three-dimensional point cloud, based on encoded geometry information of the second three-dimensional point cloud that has been moved to the first area; and
    generating a bitstream including the geometry information of the first three-dimensional point cloud encoded in the encoding and moving information indicating the moving method selected, wherein
    the plurality of moving methods include a method for rotating the second three-dimensional point cloud about a vertical axis of a mobile body, the mobile body including a sensor configured to generate the first three-dimensional point cloud.

2. The three-dimensional data encoding method according to claim 1, wherein
    the plurality of moving methods include a method in which the second three-dimensional point cloud is not moved.

3. The three-dimensional data encoding method according to claim 1, wherein
    the plurality of moving methods include a method for translating and rotating the second three-dimensional point cloud.

4. The three-dimensional data encoding method according to claim 3, wherein
    in the method for translating and rotating the second three-dimensional point cloud, the rotating is subsequent to the translating.

5. The three-dimensional data encoding method according to claim 1, wherein
    the method for rotating the second three-dimensional point cloud includes, for at least one axis among three axes in a three-dimensional Cartesian coordinate system, rotating the second three-dimensional point cloud about an axis parallel to the at least one axis.

6. The three-dimensional data encoding method according to claim 5, wherein
    the at least one axis includes an axis corresponding to a vertical direction in an actual space.

7. The three-dimensional data encoding method according to claim 5, wherein
    the at least one axis is a single axis.

8. A three-dimensional data decoding method of decoding encoded geometry information of a first three-dimensional point cloud located in a first area, the three-dimensional data decoding method comprising:
- obtaining a bitstream including the encoded geometry information of the first three-dimensional point cloud and moving information indicating a moving method;
- selecting the moving method from among a plurality of moving methods, based on the moving information;
- determining a second area, based on the moving method selected and the first area;
- moving a second three-dimensional point cloud located in the second area determined, to the first area, using a method that is in accordance with the moving method; and
- decoding the encoded geometry information of the first three-dimensional point cloud, based on decoded geometry information of the second three-dimensional point cloud that has been moved to the first area, wherein
- the plurality of moving methods include a method for rotating the second three-dimensional point cloud about a vertical axis of a mobile body, the mobile body including a sensor configured to generate the first three-dimensional point cloud.

9. The three-dimensional data decoding method according to claim 8, wherein
the plurality of moving methods include a method in which the second three-dimensional point cloud is not moved.

10. The three-dimensional data decoding method according to claim 8, wherein
the plurality of moving methods include a method for translating and rotating the second three-dimensional point cloud.

11. The three-dimensional data decoding method according to claim 10, wherein
in the method for translating and rotating the second three-dimensional point cloud, the rotating is subsequent to the translating.

12. The three-dimensional data decoding method according to claim 8, wherein
the method for rotating the second three-dimensional point cloud includes, for at least one axis among three axes in a three-dimensional Cartesian coordinate system, rotating the second three-dimensional point cloud about an axis parallel to the at least one axis.

13. The three-dimensional data decoding method according to claim 12, wherein
the at least one axis includes an axis corresponding to a vertical direction in an actual space.

14. The three-dimensional data decoding method according to claim 12, wherein
the at least one axis is a single axis.

15. A three-dimensional data encoding device that encodes geometry information of a first three-dimensional point cloud located in a first area, the three-dimensional data encoding device comprising:
- a processor; and
- memory, wherein
- using the memory, the processor:
  - selects a moving method from among a plurality of moving methods;
  - determines a second area based on the moving method selected and the first area;
  - moves a second three-dimensional point cloud located in the second area determined to the first area using a method that is in accordance with the moving method;
  - encodes the geometry information of the first three-dimensional point cloud, based on encoded geometry information of the second three-dimensional point cloud that has been moved to the first area; and
  - generates a bitstream including the geometry information of the first three-dimensional point cloud which has been encoded and moving information indicating the moving method selected, and
- the plurality of moving methods include a method for rotating the second three-dimensional point cloud about a vertical axis of a mobile body, the mobile body including a sensor configured to generate the first three-dimensional point cloud.

16. A three-dimensional data decoding device that decodes encoded geometry information of a first three-dimensional point cloud located in a first area, the three-dimensional data decoding device comprising:
- a processor; and
- memory, wherein
- using the memory, the processor:
  - obtains a bitstream including the encoded geometry information of the first three-dimensional point cloud and moving information indicating a moving method;
  - selects the moving method from among a plurality of moving methods, based on the moving information;
  - determines a second area, based on the moving method selected and the first area;
  - moves a second three-dimensional point cloud located in the second area determined to the first area using a method that is in accordance with the moving method; and
  - decodes the encoded geometry information of the first three-dimensional point cloud, based on decoded geometry information of the second three-dimensional point cloud that has been moved to the first area, and
- the plurality of moving methods include a method for rotating the second three-dimensional point cloud about a vertical axis of a mobile body, the mobile body including a sensor configured to generate the first three-dimensional point cloud.

* * * * *